United States Patent [19]
Perholtz et al.

[11] Patent Number: 5,566,339
[45] Date of Patent: Oct. 15, 1996

[54] SYSTEM AND METHOD FOR MONITORING COMPUTER ENVIRONMENT AND OPERATION

[75] Inventors: Ronald J. Perholtz, Silver Spring, Md.; Eric J. Elmquest, Arlington, Va.

[73] Assignee: Fox Network Systems, Inc., Rockville, Md.

[21] Appl. No.: 966,081

[22] Filed: Oct. 23, 1992

[51] Int. Cl.⁶ ................................................. H04M 11/00
[52] U.S. Cl. .................... 395/750; 395/700; 364/705.05; 379/38
[58] Field of Search ................................. 395/750, 700; 364/200, 900, 705.05; 379/6, 5, 8, 59, 93, 143, 413, 38; 371/66

[56] References Cited

U.S. PATENT DOCUMENTS

| | | | |
|---|---|---|---|
| 4,051,326 | 9/1977 | Badagnani et al. | 364/900 |
| 4,213,015 | 7/1980 | Kimbrough | 455/9 |
| 4,371,751 | 2/1983 | Hilligoss, Jr. et al. | 179/5 R |
| 4,381,427 | 4/1983 | Cheal et al. | 370/67 |
| 4,390,750 | 6/1983 | Bartelink | 179/5 R |
| 4,475,193 | 10/1984 | Brown | 370/124 |
| 4,503,291 | 3/1985 | Von Holten et al. | 179/90 AN |
| 4,593,323 | 6/1986 | Kanda et al. | 364/900 |
| 4,656,318 | 4/1987 | Noyes | 379/93 |
| 4,692,941 | 9/1987 | Jacks et al. | 381/52 |
| 4,731,815 | 3/1988 | Hanscom et al. | 379/79 |
| 4,748,656 | 5/1988 | Gibbs | 379/93 |
| 4,873,712 | 10/1989 | Porco | 379/58 |
| 4,878,196 | 10/1989 | Rose | 395/750 |
| 4,937,850 | 6/1990 | Borbas et al. | 379/6 |
| 4,964,065 | 10/1990 | Hicks et al. | 364/514 |
| 4,972,452 | 11/1990 | Chack et al. | 379/2 |
| 4,972,504 | 11/1990 | Daniel, Jr. et al. | 364/403 |
| 5,220,597 | 6/1993 | Horiuchi | 379/362 |
| 5,233,642 | 8/1993 | Renton | 379/59 |
| 5,283,905 | 2/1994 | Saadeh et al. | 395/750 |
| 5,311,582 | 5/1994 | Davenport et al. | 379/143 |
| 5,375,163 | 12/1994 | Kamimoto et al. | 379/61 |
| 5,438,607 | 8/1995 | Przygoda, Jr. et al. | 379/38 |

OTHER PUBLICATIONS

Enviro Com II–Environmental Monitor and Modem, Operating Instructions.
Server–Monitoring Software: Getting Inside Your File Server, by Frank Derfler, Jr., PC Magazine, Sep. 15, 1992.
Watchdog Board, Home Automation Laboratories.
Sensaphone Security System.
Compaq System Manager, Features/Specifications.
Watchdog Keeps Finger on Network Pulse, By Eric J. Bowden Products, Feb. 10, 1992.

(List continued on next page.)

*Primary Examiner*—George B. Davis
*Attorney, Agent, or Firm*—Sixbey, Friedman, Leedom & Ferguson, P.C.; Evan R. Smith; Eric J. Robinson

[57] ABSTRACT

An advanced electronic alert system for monitoring computer network(s), environment, security and the status of tasks being processed by a computer. The system stores voice recorded and text alert messages on computer readable magnetic media; automatically dials designated persons when alert situation(s) are detected; and then replays the applicable recorded voice alert message(s) once an alert call has been completed. Alternatively, alert messages may be transmitted by the system using phone dialing tones, in those cases where an alert call is placed to a digital device, such as a pager. The system issues automatic alert warnings to one or more designated persons when main electrical power fails or is restored; the temperature becomes too hot or too cold; a loud sound is detected, such as that produced by a smoke detector, fire alarm, etc.; a central network computer/file server fails; an intruder and/or water has been detected; main and/or backup power fails; a computer software program fails and/or is successfully completed; or a microprocessor based computer used as part of the system fails.

11 Claims, 70 Drawing Sheets

Microfiche Appendix Included
(275 Microfiche, 4 Pages)

OTHER PUBLICATIONS

Innovative Data Communication Products.

NetAlarm 3.1 Offers Pager, E–Mail Alerts, By Nico Krohn, PC Week, Jun. 22, 1992.

Lan Server Watch–Proactive Disaster Prevention, Lan Times Readers Choice 1992.

Enviro Com I–Environmental Monitor, Operating Instructions.

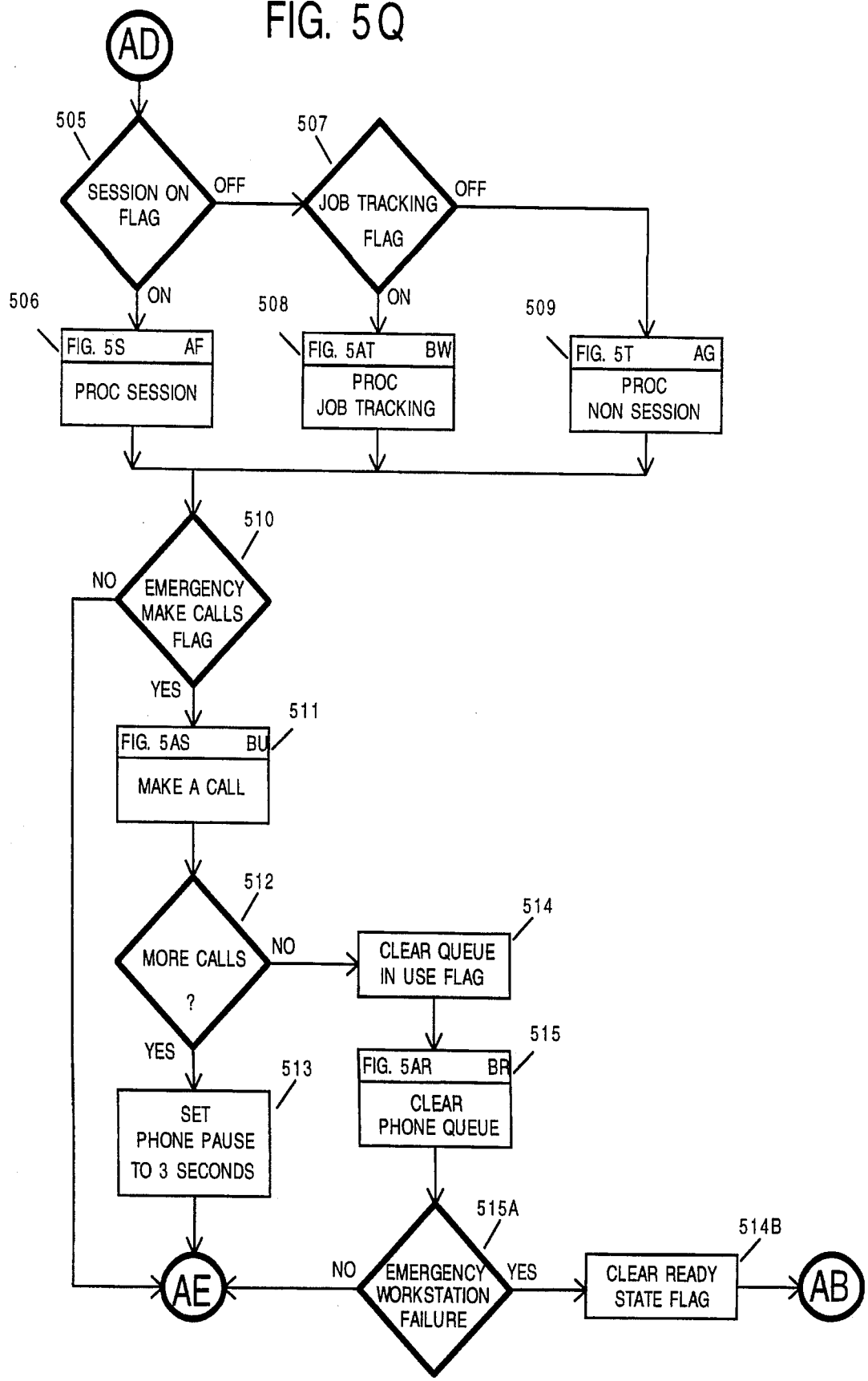

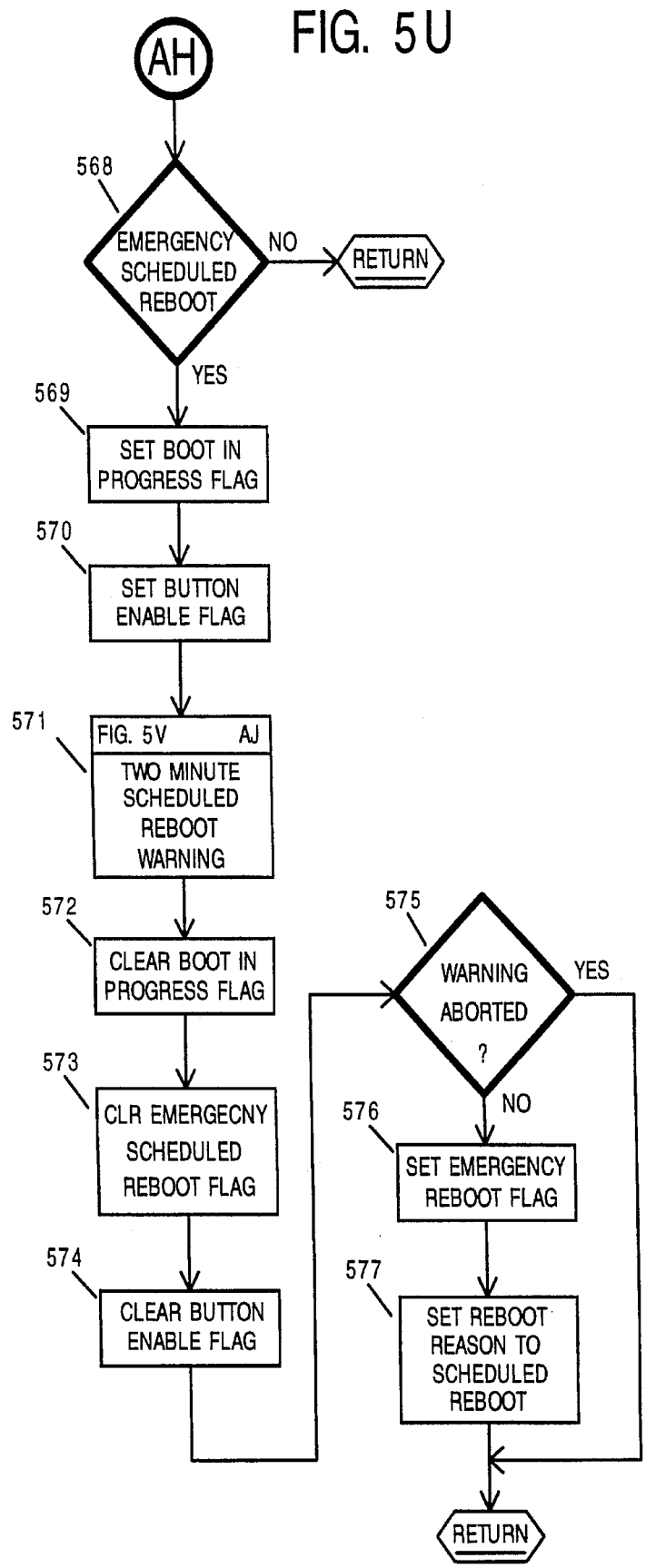

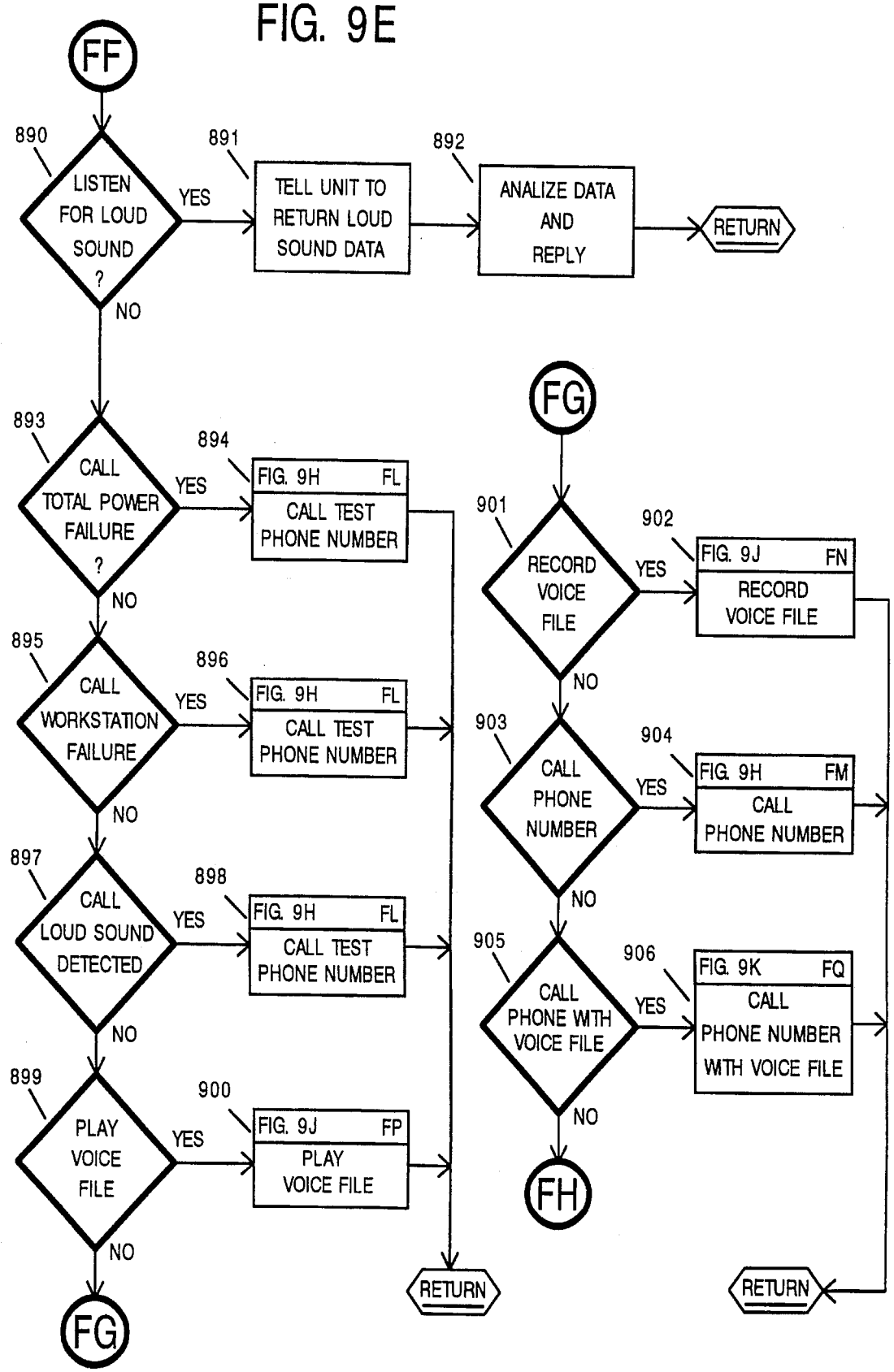

SYSTEM AND METHOD FOR MONITORING COMPUTER ENVIRONMENT AND OPERATION

A portion of this disclosure contains material in which copyright is claimed by the applicant. The applicant has no objection to the copying of this material in the course of making copies of the application file or any patents that may issue on the application, but all other rights whatsoever in the copyrighted material are reserved. statement which was inadvertently omitted from the patent application

BACKGROUND OF THE INVENTION

1. Field of the Invention

This invention relates to automated computer network monitoring, environment monitoring, and automatic telephone dialing and message transmission apparatus enabling emergency messages to be transmitted.

Millions of microprocessor based computer networks presently are in use. The term "Network" refers to one or more Work Stations connected by communications lines or cables to one or more central computers, herein referred to as "File Servers". In some File Servers magnetic data storage is often divided into segments, hereinafter referred to as "Volumes". A Network permits users to store data files in a central location to reduce the cost of file storage, eliminate the need for duplicate software systems, and permit all users of the Network to access centrally maintained, up-to-date data files. Because data files are centralized, Network users depend on reliable uninterrupted access to file servers to do their jobs. If one or more File Servers within a Network fails, most companies are literally "out of business" until processing is restored.

Most Networks operate 24 hours per day, but are rarely used more than 12 hours per day. During the period that a Network is not in use, failures can occur. Moreover, the Networks are more vulnerable to major damage due to fire, theft, water, temperature fluctuations, or employee sabotage because no one is typically accessible when the damage starts. In such events occur, the problem would not be detected until someone attempted to use the network at the start of the next business day. When the problem is finally detected, it may take several hours or days to restore normal Network processing. Had the problem been detected when it occurred, damages would be minimized and Network processing could be restored sooner, possibly before the next business day began. Accordingly, there is currently an urgent need for a device designed specifically to monitor Networks during non-business hours. Ideally, this device should be designed to be Fail Safe, activate itself automatically, when deemed appropriate by the user, and use available completer resources where possible. Further, the system should be capable of alerting persons responsible for administering the Network of any file server failures, power failures, intruders, fire, water, smoke or excessive temperature changes, or other similar events that require immediate attention.

The device may also be utilized during normal business hours to monitor computer tasks (i.e. jobs) running on a Work Station and place alert calls when a job within a task has been completed or fails.

2. Background Art

COMPAQ corporation has developed a monitoring system consisting of a 32-bit computer interface board designed to be inserted directly into a File Server. The board must be installed into the File Server and obtains its normal operating power from the File Server's internal low voltage power supply. One board is required for each File Server monitored. The system will not function in existing File Servers that do not have 32-bit EISA slots. Environmental monitoring is limited to voltage and internal temperature sensors. No provision is made for intruder, water, fire or smoke detection. Further, no provision is made to directly monitor AC power flowing into the File Server from an external source(s) so that a main AC power failure will be detected. Instead, the Compaq system monitors only DC voltage flowing to the EISA slot where the interface board is installed. Accordingly, should main AC power fail and the File Server continue to operate off of backup reserve power (e.g. battery power), no provision is made to place a power failure alert until after the reserve power and/or File Server fails.

In the Compaq monitoring system, all alert calls are placed via modem circuitry included on the board or all optional external modem using a serial interface provided on the back plate of the board. No speaker is provided on the board to facilitate call monitoring or localized announcements. Alert messages are delivered via a speech synthesizer or touch tones in the case of an alert call to a pager. No provision is made for recording or replaying user spoken voice messages.

When a call is placed by the Compaq System to a person, no audio analysis is performed to detect when a person has answered the phone call and finished speaking. Instead, after the call is placed, the system assumes someone will answer and hear a pre-recorded message requesting that a tone password be entered. This pre-recorded message is delivered as soon as the call rings, which typically results in the answering party initially receiving only part of the intended message. If the requested touch tone password is not entered and detected by the Compaq system within a specified period of time or the pre-recorded message is fully delivered before someone answers the phone, the call will be aborted and retried later. Accordingly, no alert message will be transmitted, for example, if the person called forgets the required password or the call was answered by an answering machine. Similarly, an alert call placed to a paging service will not be delivered unless a required tone is received from the paging service. No provision is made for paging services that do not use the required tone or attempt made to automatically analyze when the pre-recorded paging service voice prompt has ended, so that the required alert message may be transmitted. Finally, no provision is made in the Compaq system to relate the delivery of alert messages to a specific type of failure. Instead, the same set of alert phone numbers are called, regardless of the type of failure encountered and the number of phone numbers the system can handle is limited to 16 phone numbers.

An alarm device, referred to as SYMON, is being sold by Dataprobe Corporation (170 Coolidge Avenue Englewood, N.J.). The system requires a user supplied external monitoring systems to detect all alarm situations. The system is limited to a maximum of eight alarms. An external modem is required to relay alarm messages in digital (ASCII II) text message form only to user pagers. No provision is made for voice transmitted alert messages. Further, no provision is made for the detection of any alarm situations.

Various software-only products have been developed to monitor File Servers. One product is NetAlarm from Avanti Technology in Austin, Tex. and another product is LAN Server Watch from Brightwork Development Inc. in Tinton Falls, N.J. 07724. These products monitor the status of File Servers using software installed on one of the Work Stations connected to the File Server. This software coexists with other software running in the Work Station memory. Alert calls can be placed though a modem connected to the Work Station to a pager. No provision is made for alert calls to other than a pager. No provision is made for monitoring power, temperature, intruders, water, fire or smoke. Further, no provision is made for a failure in the Work Station used for monitoring should the Work Station's processor lock up or AC power be lost.

Various devices exist to monitor the environment and issue pre-set voice messages by placing phone calls to predefined numbers, when an alarm condition is detected. Two such products are the EnviroCom I and EnviroCom II manufactured by Best Power Technology, Inc. P.O. Box 280, Needah, Wis. 54646. These products monitor AC electrical power; temperature; loud sound levels, which presumable will be a burglar alarm, fire alarm, or smoke alarm; motion; or the presence of water. No provision by these products is made to permit the monitoring of file servers; recording of user spoken voice alert messages; logging failures detected or the results of alert calls placed; detecting the exact progress of an alert calls placed; so that an alert messages will only be delivered after someone or some device has answered the phone and finished speaking; analyzing the frequency of sound levels detected to discern the exact source of the sound level (e.g. sounds produced by a smoke alarm as opposed to those sounds produced by a fire alarm or some other non-alarm, loud sound level source). Finally, the same set: of alert phone numbers are called, regardless of the type of failure encountered and the number of phone numbers the system can handle is limited.

None of the monitoring devices discussed above make any provision to monitor the status of computer jobs being processed by a Work Station, so that alerts may be issued when the job(s) are completed or a job fails. In addition, no provision is made for more than one AC power input source or the ability to automatically switch between multiple AC input power sources should the primary source of AC input power fail, so that a constant source of AC output power can be provided and controlled to an external device, such as a computer Work Station, and multiple sources of power can be monitored directly by the device. Finally, no provision is made to control the functionality of an external device, such as a Work Station, by temporarily cutting AC power to the Work Station and forcing the Work Station to boot and initiate a predetermined procedure.

SUMMARY OF THE INVENTION

The present invention provides a stand alone Unit containing its own microprocessor designed to monitor the environment and control microprocessor based computers to which the Unit is connected. This Unit is designed for connection to a Work Station. The Unit is controlled by a micro-processor based software operating system residing in the Unit and/or software programs installed in the Work Station to which the Unit is connected. The apparatus is capable of (1) detecting if the Work Station fails; (2) monitoring an unlimited number of File Servers connected over a Local Area Network (LAN); (3) monitoring the availability of public utility power or backup reserve power; (4) switching between main public utility power and backup power sources should main power fail or main power be subsequently restored; (5) detecting the presence of loud audible sounds and discerning the type of device generating said sound by analyzing the sound produced by the device's audible siren (e.g. smoke detector, fire alarm, etc.); (6) permitting a person called to listen over the phone line to any loud sounds present during a loud sound alert call; (7) detecting excessive heat or cold; (8) detecting intruders or other alert conditions detected by external monitoring devices, such as a water sensor; (9) placing alert phone calls to pagers or individuals when alert situations are detected via a direct interface between the microprocessor and the phone line, (10) analyzing sound transmitted over the phone line when alert calls are in progress to determine why a call could not be completed; or, when a call has been successfully completed, the party called has stopped speaking, and the alert message should be delivered; (11) permitting persons alerted to remotely listen to the sound level being produced by an audible alarm siren in a case where a loud sound level has been detected; (11) recording what is spoken by the answering party when an alert message is delivered to a person; (12) monitoring the status of user jobs being processed on any microprocessor based computer to determine when the job has been completed or fails; (13) contacting via telephone and delivering user recorded or pre-recorded voice messages alert messages to an unlimited number of designated persons should a alert situation be detected; (14) detecting (via the Work Station) when the Unit has failed so that alert calls can optionally be placed to a pager using a user supplied modem; (15) permitting persons called during an alert situation to confirm that the alert call has been received by pressing a touch tone on their telephone; and (16) permitting persons called to remotely abort any pending alert calls to others from being delivered by pressing a touch tone on their telephone during the time an alert message is being delivered.

The Unit has two input AC power receptacles that are designed to obtain electrical power from an AC public utility power receptacle or an external backup power supply. Should public utility power fail, the microprocessor in the Unit would immediately switch to backup power, if present, so as to prevent any interruption in Work Station processing and permit the Unit to immediately detect that main power failed. If a sustained public utility power failure occurs for more than a specified number of seconds, alert phone calls would be placed to user designated persons indicating primary power has failed and an appropriate announcement would be made locally, using the speaker contained in the Unit. Similarly, if all external sources of power should fail, the Unit would rely on its internal rechargeable battery to deliver user designated alert calls indicating all power has failed.

One AC output power receptacle is provided on the Unit. The Work Station plugs into this receptacle to obtain AC power. When necessary, the Unit will cut power to the Work Station for several seconds forcing the Work Station to re-start (i.e. cold boot). During the boot process, a monitoring session would be initiated automatically, as discussed below. Situations that would require power to be cut in this manner are also discussed below.

Two phones jacks are included in the Unit. The first jack permits the Unit to attach to a public utility phone line. The second jack is used to pass through the phone signal to a standard, external, touch-tone telephone.

Two adapter jacks are presently provided in the Unit to provide low voltage electrical power to and receive alerts from optional intruder detection or environmental monitoring devices. Examples of monitoring devices that can be connected to these jacks include a water alarm, motion alarm, fire alarm, and/or an entrance alarm. The security devices may be temporarily disabled at any time by pressing a security (pulse style) switch, herein referred to as a "Watch Dog" switch, located on the back of the Unit.

A microphone is provided in the Unit to facilitate the capture of user recorded alert messages, that will be replayed by the Unit should a alert situation be detected. This microphone is also used to periodically listen for loud sound levels normally produced by the alarm sirens on devices such as smoke detectors, fire alarms or burglar alarms. This approach permits the Unit to detect external alarm situations without the need for an interface cable from the Unit to the detection device. The sound frequency and level produced when a loud sound level occurs is analyzed by the Unit's microprocessor to determine the probable type of device causing the alert, so that a appropriate alert call can be placed indicating the specific type of alert that has been detected. Once the alert message has been transmitted, the microphone would then be further used to permit the person contacted to listen to any sound presently being detected by the Unit.

A speaker is contained in the Unit to (1) locally notify anyone present in the area of the Unit that a alert condition has been detected or (2) to permit users to monitor calls or alert messages spoken during system testing. A volume control knob is provided on the Unit to adjust the speaker's sound level.

The internal circuitry of the Unit is presently designed to operate on 10 volts of power. Power converters and transformers installed in the Unit are provided to reduce incoming public utility power to the required voltage levels and protect the Unit from power brownouts or surges. A user replaceable fuse is also provided to further protect the electrical circuitry.

A Unit ON/OFF switch is provided to disable all monitoring functions of the Unit. This switch does not disable the ability of the Unit to pass through power to the Work Station or to prevent the internal battery contained within the Unit from recharging.

Various on/off status lights are presently provided on the front panel of the Unit, which indicate (1) the power status of the Unit's internal low voltage rechargeable battery, (2) if the Unit is receiving input main (public utility) power, (3) if the Unit is receiving input AC backup power, (4) if the Unit is in a "Ready" monitoring status, (5) if the serial linkage is working properly between the Unit and Work Station attached to the Unit, (6) if there is serial activity between the Work Station and the Unit, (7) if the Unit is about to boot the Work Station attached to the Unit, (8) if an alert call is in progress, (9) if the adapter ports are activated, and (10) if the user replaceable fuse has blown.

The Unit includes several pre-recorded voice messages stored in digital form in the Unit's Read Only Memory. These messages are used in special alert situations, herein referred to as "Fail Safe" processing, where (1) all external power supplied into the Unit has failed, (2) the Work Station attached to the Unit has failed or serial communications between the Unit and Work Station have failed, and/or (3) a loud sound level has been detected (e.g. smoke detector's siren). User specified dialing strings related to these special Fail Safe alert situations are stored in non-volatile RAM installed in the Unit capable of retaining the dialing strings in memory even if there is a total power failure. In addition, the system contains prerecorded speech for the numbers from 0 through 9, so that users who have installed more than one Unit may assign each Unit with a unique number to help isolate which Unit has issued an alert message. This pre-recorded message feature coupled with the internal battery and dialing strings stored in the Unit, permit the Unit to be virtually Fail Safe, meaning that if all power and processing support from the Work Station is lost, the Unit will still have the stand-alone capability to place alert calls to those persons designated to be notified.

Calls placed by the Unit are monitored and controlled by a micro-processor contained in the Unit, thereby eliminating the need for modem circuitry. The processor performs sophisticated call progress analysis of sound intervals to determine when a phone line has failed, the number called is busy, there is no answer to the call, the call has been successfully completed, and when party called has finished speaking. Such precise sound analysis is essential to insure that alert messages are accurately and reliably delivered, even in cases where a phone is answered by an answering machine or paging service that involves long pre-recorded messages. The microprocessor also generates the exact tones required by FCC regulations to place a phone call, thereby eliminating the need for dialing circuitry and related tone generating mechanisms in the Unit.

Except for the Fail Safe processing features discussed above, all of the Unit's monitoring actions are scheduled by the Work Station attached to the Unit via a standard serial interface cable connecting the serial port of the Work Station to a serial receptacle contained on the Unit. As mentioned, this Work Station would obtain all of its AC electrical power from the AC power output receptacle on the Unit.

The Work Station attached to the Unit could continue to be used as a normal Network Work Station. The Work Station need not be connected to a Network in cases where the apparatus is used only to monitor the status of a job running on the Work Station.

Various computer software programs provided with the Unit are installed on the Work Station to activate the system. The installation process alters the start up (i.e. AUTOEXEC.BAT) processing of the Work Station, so that each time it is booted a full monitoring session begins automatically. Since the Unit controls the flow of electrical power to the Work Station, the Unit can initiate a monitoring session whenever required by briefly cutting off power to the Work Station, thereby forcing the Work Station to boot (i.e. cold boot). A monitoring session can be ended automatically by pressing the F1 key. When the session is ended in this manner, the Work Station automatically returns to a normal processing mode. No Terminate and Stay Resident (TSR) programs related to this system are needed or reside in memory at this point. Normally, monitoring sessions are scheduled by the user to occur during non-business hours.

During the software installation process, the installer speaks alert voice messages to be used by the system into the Unit's microphone. Each spoken message is immediately digitized and stored on magnetic media within the Work Station, such as a hard disk drive. Then, the user would enter the necessary dialing strings to be called for each type of alert issued by the system. For each dialing string entered the user would specify if the voice message recorded should be spoken. Normally, the message would always be spoken, except for calls placed to a pager. Special codes are allowed in the dialing strings to permit (1) pauses in the dialing sequence; (2) instruct the Unit to suspend dialing string processing until the call has been completed; (3) require that person called confirm the receipt of the alert call by pressing a designated touch tone key on their telephone; (4) permit a person called during an alert to cancel any pending alerts calls to others by pressing a designated touch tone key on their telephone; (5) permit an alert message to be replayed more or less than 3 times, which is presently the default number of times a message is repeated. The latter feature is necessary for calls placed to businesses with automated call forwarding systems where a caller must pass though multiple levels of voice recordings to reach their intended party. In additional to voice recorded messages, text strings describing each type of alert situation are entered by the user during system installation. These text strings would be saved to a log file each time an alert situation is detected along with the time and date the situation occurred.

The installation process also permits the user to identify the specific name(s) of the File Server(s) to be monitored, the desired maximum size of the alert message log file maintained by the system, as well as the scheduled times each day the Work Station must be booted Typically, users would only want a monitoring session to begin during non-business hours. The boot times entered permit the system to automatically force the Work Station to boot at the requested time causing a monitoring session to begin automatically, as previously described. Moreover, this feature permits the Work Station to be used normally during the work day with the assurance that it will begin monitoring activities automatically after the work day has ended.

Software has been developed and provided with the system permitting changes to be made to the system configuration after the installation process is complete.

Once the installation process is complete, monitoring begins automatically whenever the Work Station is booted. The Work Station's AUTOEXEC.BAT file is used to automatically start the monitoring system.

As the first step in AUTOEXEC.BAT processing, the Network start up interface programs, supplied with the vendor's Network operating system, must be executed to attach the Work Station to any available File Server(s). Then, a software program supplied with the system is invoked in the Work Station as the next step in AUTOEXEC.BAT processing.

This program, named N911RUN, establishes and tests the serial communications linkage from the Work Station to the Unit. If this linkage cannot be established, a error message describing the nature of the problem encountered will be displayed to the Work Station's display screen. Messages used include "Unit Serial Cable Not Properly Connected" or "Unit Power Switch is Off". If a linkage cannot be established or is lost during a monitoring session, further system processing is aborted on the Work Station and optionally the Work Station can be used to deliver a digitized alert code to a designated pager via a user supplied modem accessible to the Work Station. If a linkage is established, N911RUN sends configuration information to the Unit to setup or refresh various operating parameters. This information includes the number of minutes remaining until the next scheduled boot time, dialing strings to be called in the event a Fail Safe situation is encountered by the Unit, dialing strings to be called for job status monitoring alerts and a code indicating that a monitoring session is beginning. Then, N911RUN begins a monitoring session.

N911RUN operates in a continuous monitoring loop until the F1 key is pressed to terminate processing. Each processing loop is referred to as a cycle. When the F1 key is pressed, the remainder of any AUTOEXEC.BAT file processing for the Work Station occurs permitting anyone to use the Work Station normally. At this point the N911RUN program is removed entirely from the Work Station's memory. The period from the time a monitoring processing begins until the time the F1 key is pressed is referred to as a session.

When a session begins a "STATUS REPORT" screen will appear on the Work Station in approximately one minute. The "STATUS OF THE ENVIRONMENT" section of this screen displays the results of each area monitored by system except for file servers. The "STATUS OF FILE SERVERS SECTION" displays briefly the status of each active file server and will display messages on file servers that have failed. The final section shows the "HISTORY OF PROCESSING SESSIONS". This section displays the date and time the last 15 sessions began which is a useful to insure the System is activating itself properly.

During a cycle, the Work Station requests the Unit to check each of the areas the System has been configured to monitor, once. As a test is completed and the results returned from the Unit to the Work Station, the results of the test (normally "OK") will blink on the STATUS REPORT screen on the Work Station. If a particular feature is not being monitored by the system, the message "NOT INSTALLED" will be displayed. If a alert situation is detected, an alert message will be displayed (in red or bright white) next to the applicable line item in the STATUS OF THE ENVIRONMENT SECTION. File server alert messages will appear in red or bright white (on monochrome monitors) in the STATUS OF THE FILE SERVERS SECTION. A typical monitoring cycle takes approximately a minute to complete. When a cycle is complete, the system loops back and starts the next cycle and will continue processing in this manner until the F1 key is pressed to end system monitoring processing.

A cycle consists of the following major processing steps:

A. Testing that Primary power is OK.

Testing that Primary power has been restored after a power failure and alerting anyone actually notified of the power failure that power has been restored.

C. Checking the status of any power backup system installed. A message appears only on the screen and the error log should a battery failure be detected during a session. No calls are placed as a result of a power backup failure.

D. Making sure the current temperature is within the minimum and maximum limits allowable by the user as specified during system installation or re-configuration processing.

E. Checking any devices attached to either of the system Unit's Adapter ports to insure that a problem has not been detected (e.g. an intruder, water, etc.)

F. Testing for an external loud sound level, such as produced by a smoke detector, burglar alarm or fire alarm sirens.

G. Testing that all File Server Volumes designated by the user to be monitored by the system are operational.

H. Placing applicable phone calls related to any new alert situations detected during the above processing steps and re-attempting to call anyone not contacted during the prior processing cycles because phone line busy, no answer, etc. (NOTE: the Unit's internal speaker is disabled when calls are placed during a monitoring session so that the system will operate in a silent alarm mode. This approach avoids alerting any intruders that may be present that calls are being placed by the Unit.)

When an alert situation is detected by the system, a phone call will be placed to those phone numbers designated to be called. If there is no answer to the call, the phone line fails, no speech is detected when a phone call is answered, or the phone line is busy; the system will automatically place a call to any remaining persons to be notified, log the uncompleted call, and then retry any uncompleted calls during the next processing cycle. Any uncompleted calls will also be added to the disk log file on the Work Station. If the call is completed, sound level and frequency analysis tests are performed to automatically detect when the person or device answering the call has finished speaking. Once the call is answered and someone begins speaking, whatever is spoken is recorded onto magnetic media on the Work Station (e.g. hard disk drive). This approach insures an audit trail is retained to prove the alert call was delivered. Then, the applicable digitized voice alert message is replayed (in the case of a call to a person), digitized paging dialing tones are played (in the case of a call to a paging service), or a combination of dialing tones and voice alert messages are replayed in the case of a call to an automated call forwarding telephone answering system. In cases where a call is placed to a person (as opposed to a digital device such as a pager) and the alert resulted from a loud sound level detected by the Unit (via the Unit's microphone), the sound present when the call is placed would also be transmitted to whomever or whatever answers the alert call placed. Furthermore, when a call is placed to a person, the alert message is spoken 3 times (or the number of repetitions specified by the user during configuration processing). After each message is spoken, there is a several seconds of silence, presently set to 2 seconds. If the person called presses a designated touch tone key on the telephone during this period, the call will be regarded as delivered and a tone reply will be issued by the Unit to acknowledge the call was confirmed.

All major events and alert situations detected during a monitoring session are archived to a disk log file maintained in the Work Station's directory where the software system was installed. Events logged include: when each session began; alerts that were detected; persons that were successfully contacted; and persons that could not be contacted (e.g. no answer to phone call placed). Each entry in the log has the corresponding date and time the log entry was made. The number of entries that the log will retain is specified during the configuration of the system. The system software permits contents of the log file to either be viewed on the Work Station's screen or printed.

If during a cycle, monitoring is halted for any reason (e.g. parity error, processor lockup, program failure, etc.), communications from the Work Station will cease. Should communications cease for a sustained period of time, the Unit assumes the Work Station has failed and attempts to re-establish the linkage by forcing the Work Station to boot. In this case, the BOOT WARN indicator light on the Unit will flash and the Work Station will be booted after two minutes.

The Unit causes the Work Station to boot when necessary by temporarily cutting power to the Work Station. This temporary power of period is presently set to 15 seconds. A period of 15 seconds was chosen to give any hard disk drives in the Work Station time to stop spinning before AC power was re-activated.

When a specific type of alert is detected during a session, persons scheduled to called will be contacted only once per session regarding the alert situation. If the contact cannot be completed because the phone line is busy, there is no answer to the call, etc.; the system will repeat the call until the call is completed. When the call is completed any voice recording played related to the alert situation is repeated three times with a three second delay between repetitions to insure the receiving party actually gets the message. In the case of calls resulting from a loud sound alert being detected, the three second delay would not occur. Instead, once an alert message has been transmitted, the Unit's microphone would then turned on between each repetition for 5 seconds to permit the person contacted to listen to any sound detected. Once a phone call has been completed for a given alert condition, no further calls for that alert condition will occur until a new monitoring session begins. This approach avoids repeatedly pestering the person or their family in the middle of the night regarding a given alert condition.

Whenever a monitoring session is active, the internal speaker in the Unit is disabled. The speaker is disabled intentionally to permit a "silent alarm" operating environment. Normally, no one would be present during a monitoring session, so there is no need for the speaker to be turned on. Moreover, if, for example, a alert was triggered because an intruder was attempting to cut power, steal a File Server, steal the Work Station, etc.; it would not be desirable for the Unit to alert the intruder (via) the Unit's internal speaker that alert calls are in progress. Disabling the internal speaker has no effect on the ability of the Unit to deliver any required alert messages over the phone lines.

A monitoring session continues looping through processing cycles until someone strikes the F1 key on the Work Station to abort processing. This means, for example, if processing begins on a Friday night, processing will automatically continue over a week end or longer until the monitoring session is ended. When the session is terminated, the Work Station continues it's normal boot up procedure and can be used as a normal Work Station. At this point it is assumed someone on the premises is capable of dealing with any of the problems a monitoring session is designed to detect and most of the activities performed during a session are unnecessary. As a monitoring session ends, the Unit is instructed by the monitoring session software to automatically re-enable it's internal speaker and no longer operate in a "silent alarm" mode.

Several situations cause the Unit to force new monitoring session to begin (by cutting power and forcing the Work Station to boot) as follows:

A. If an active file server monitored by the system should fail during a monitoring session, booting permits the system to confirm that a failure has occurred. This approach avoids cases where the failure was actually caused by a LAN card in the Work Station that may have merely temporarily "locked up".

B. If public utility power fails when a session is not active, booting permits the system to immediately notify all designated persons of the failure. In this case the Unit announces, through it's speaker, that the Work Station will be booted in two minutes. If someone is present, this announcement gives that person an opportunity to either prepare for the boot or abort the boot process by turning off the Unit. This approach is necessary, for example, to prevent a situation where a business day has ended, the first session has not yet been scheduled to be activated, and power fails. If nothing was done about this scenario until a monitoring session begins, it is likely the power backup system attached to the Unit would be drained of power and all designated persons would not be notified of the public utility power failure. However, designated person would be notified of the "total" power failure by the Fail Safe feature of the Unit.

C. At those times specified during the system installation or configuration that a new monitoring session should begin.

D. Whenever, the communication link between the Work Station and the Unit is interrupted during a monitoring session for a sustained period of 90 seconds or more.

This could occur if the Work Station locked up for some reason such as a parity error, communications card failure, etc.

As mentioned, whenever a monitoring session is ended by pressing the F1 key, the rest of the Work Station's AUTOEXEC.BAT file will be executed and the Work Station automatically returns to operating as a normal Work Station. The next scheduled boot time passed to the Unit at the beginning of the session controls the next time the Unit will cut power to begin another processing session. The time passed is expressed as the number of minutes remaining until the next scheduled boot. The microprocessor's timer is then used to decrement the number of minutes received until a value of zero is reached. At that point, the Unit announces through it's speaker that a schedule boot will occur in two minutes. During that two minute period the scheduled boot can be deferred by thirty minutes by pressing the Watch Dog switch located on the back of the Unit or deferred indefinitely by turning the Unit off.

The optional sound level alarm devices and devices attached to the adapter ports of the Unit are designed to fully integrate with routine monitoring sessions. In the case of adapter port alarms, the devices are designed to activate automatically whenever a monitoring session begins. Delays can be specified for the alarm system dial out process, so the first person who arrives can disarm the alarm system by either pressing the Watch Dog pulse button on the back panel of the Unit or terminating the session on the Work Station by pressing the F1 key. The Unit has been designed to listen for loud sound levels whenever the Unit has been activated, whether or not a monitoring session is in progress.

A separate and distinct capability of this invention is it's ability to monitor the status of computer tasks (i.e. jobs) running on the Work Station to which the Unit is connected. This feature is referred to herein as "Job Status Monitoring". Job Status Monitoring does not require the Work Station to be connected to a network, since monitoring activities are directed solely at tasks running on the Work Station to which the Unit is connected.

Job Status Monitoring is selectively turned off and on by using software programs supplied with the system. When a Job Status Monitoring session is active, the system monitors disk accesses to either local or network disk drives and if such accesses cease for a user specified number of seconds, power is lost, or the Work Station locks up; an alert called is placed to those persons designated by the user to be contacted. After the alert call is completed, an appropriate pre-recorded message is spoken or pager alert code delivered.

The Job Status Monitoring feature of this invention permits programs, located in the directory where the system was installed, to be activated from a batch file to monitor when a user program (job) or series of jobs is complete or if the job has failed. For example, assume a series of programs (Jobs) has to be run by the accounting department to close the books at month end. These jobs include ACCTREC, ACCTPAY, PAYROLL, and GLEDGER. Each job took anywhere from fifty minutes to two hours. All jobs had to be completed by the beginning of the next business day and any problems in closing the books had to be resolved that night. When the PAYROLL job begins someone must insert pay checks into the printer. Normally, someone in the accounting department would be paid overtime each month to observe that this entire closing process completed properly.

Job Status Monitoring eliminates the need to worry about the status of time consuming computer jobs. In this example, special programs can now be included and executed from a computer batch file used during the closing process to automatically monitor the closing process and alert one or more persons when a job step failed and/or was completed. Alternatively, the system could be instructed to only place calls if a job fails using the concept "no news is good news". An example of exactly how the batch file could be modified in a Disk Operating System (DOS) environment to let the system monitor the status of closing is as follows:

```
rem ** Begin Job Status Monitoring Session
TRAKBEG 200
rem ** Begin User Accounts Receivable Closing
TRAKSTEP 1
acctrec
rem ** Begin User Accounts Payable Closing
TRAKSTEP 2
acctpay
rem ** Call user that step 2
TRAKCALL
rem ** Now wait for user to insert paychecks in printer
pause
TRAKSTEP 3
payroll
rem ** Begin General Ledger closing
TRAKSTEP 4
gledger
TRAKCALL
TRAKEND
```

Before beginning the closing process and starting the batch file in this example, the accounting department decided that two people should be notified by the system of the status of closing. Accordingly, the system configuration software (SETUP) programs were run and the "WORK STATION JOB STATUS MONITORING" main menu option was selected. Then, two dialing strings were entered one calling the Chief Accountant's home phone and the other calling the Controller's pager. A code of @*999* was setup at the end of the pager dialing string to indicate to the controller that the system was calling the pager regarding closing status.

When the batch file is initiated, a program called TRAKBEG (located in the directory where the system was installed) must be executed to begin a job tracking session. An optional parameter may be given to TRAKBEG to set the maximum number of seconds that may occur between successive disk/network accesses. In this example, the system is being told to wait no more than 200 seconds between disk accesses. If either of these limits are exceeded, it should be assumed the application has failed and failure calls should be placed. The current system default for TRAKBEG is 300 seconds for disk accesses. Disk/network accesses for most business applications occur at least every few seconds and rarely over 1 minute apart. A default parameter of 300 seconds was selected as a conservative estimate to avoid the possibility of a false failure call. For DOS based systems, local hard or floppy disk and network disk activity is monitored by intercepting DOS interrupt 21 disk accesses services, including but not limited to sub-function 63 and 64 of this interrupt.

In this example, if the TRAKBEG disk access parameter is exceeded, a system pager call would be placed automatically to the Controller's pager with the code *999**97*1, where *97 means the job appears to have failed and *1 indicates the job failure occurred during step 1. A sample of the codes that the system adds to a pager call related to Job Status Monitoring is as follows:

| | | |
|---|---|---|
| *0* | (step#) | Issued by TRAKCALL when step successfully completed |
| *96* | (step#) | Main Power Failed |
| *97* | (step#) | Job Step Failed |
| *98* | (step#) | Work Station Failed |
| *99* | (step#) | Total Power Failed |

When the system detects a job step failure no actions are taken to interfere with normal program execution should there be a case where the application has not in fact failed. When corresponding calls are made to the Chief Accountants home, the Unit would speak an appropriate prerecorded message such as:

SYSTEM ALERT JOB STEP nn SUCCESSFULLY COMPLETED
SYSTEM ALERT JOB STEP nn MAIN POWER FAILED
SYSTEM ALERT JOB STEP nn HAS FAILED
SYSTEM ALERT JOB STEP nn WORK STATION FAILED
SYSTEM ALERT JOB STEP nn TOTAL POWER FAILURE

The nn in the above messages would be replaced by the applicable job step number.

The second system program executed in the sample batch file shown above is TRAKSTEP. This command to execute this program must always have a parameter indicating a NUMERIC step number. In this batch file the numbers 1,2,3 and 4 are used as parameters. If a alert or failure call is placed during Job Status Monitoring, step numbering will help the person called determine how far all jobs have progressed. The Job Status Monitoring system does not require that the TRAKSTEP programs be used. The default step assumed by the system when the TRAKSTEP feature is not used is step 1.

The third program used in the Job Status Monitoring system is TRAKCALL. Whenever the TRAKCALL program is run, the system places a call to everyone contained in the Job Status Monitoring call table indicating the last step number that was successfully completed. In this example the TRAKCALL program is necessary before the PAYROLL program begins processing so that someone will put the required payroll checks into the printer. When the closing process is complete, the TRAKCALL program was again used to alert both the controller and chief account that the closing process was done. If the TRAKCALL program had not been included the batch file, no calls would have placed when the closing process was complete and the Controller and chief accountant would assume that "no news is good news". This latter approach has the advantage of avoiding an unnecessary "wake up" call in the middle of the night, but may be a slightly less reliable method of assuring the closing process had been completed.

The final Job Status Monitoring system program in the batch file example is TRAKEND. This program is always run as the last step in a Job Status Tracking session. The TRAKEND program simply tells the TRAKBEG software programs that a Job tracking session is over.

A less preferred embodiment of the present invention could be used in which the Unit's circuitry is installed onto a board that would be inserted directly into an expansion slot in the Work Station. The AC power input cable used by the Work Station could be redesigned so that either (1) the positive or negative side of AC power would pass into and out of special connectors added to the back plate of the board or (2) a switch would be installed on the cord with a probe that would plugged into the back of the board to permit AC power to be either monitored or cut. Either of these alternatives would permit the board to employ a switch to temporarily break power being supplied to the Work Station where it was installed, forcing the Work Station to boot. After power was cut, the board circuitry would continue to operate off of a battery installed on the board permitting full power to be switched back on after several seconds. The back plate of the board would also contain the required phone jacks and on/off switches. A separate back plate would also be provided and attached to the board using an interface cable, which would contain the adapter ports, microphone jack, speaker volume control, speaker jacks and an adapter jack to interface with an intelligent power backup system. The status lights would be discarded under this approach. There are several reasons why this embodiment of the present invention is less preferred:

A. The system requires an intelligent power backup system in order to achieve the functionality of the present invention.

B. An excessive number of interface connectors would have to engineered into the relatively small space available on the back plates used by the board.

C. The user would be required to open up the Work Station in order to install the system.

D. Temperature monitoring would be distorted by any heat created within the Work Station.

E. An electrical shortage or failure of the Work Station could damage the board and prevent necessary alerts from being issued.

A second less preferred embodiment similar to that discussed above, could be used in which the board would force the Work Station to reset by using the board's low voltage power interface to the Work Station to briefly short out the Work Station's power supply forcing the Work Station to boot (i.e. "crow bar" approach). With this embodiment, however, electrical damage may occur to the Work Station or the hard disk drives installed therein when the power supply is shorted out.

A third less preferred embodiment of the present invention would employ a voice synthesizer as an alternative to capturing user or pre-recorded digitized speech to magnetic media. Since a microphone was already required for use with the invention in detecting sound levels this alternative was considered less desirable. A fourth less preferred embodiment of the present invention would use a parallel port for communication between the Work Station and the Unit instead of the serial port used in the preferred embodiment. Although this alternative would allow faster communications between the Unit and Work Station there are several reasons why this solution is less desirable than the use of serial communications as follows:

A. Work Stations typically have only one parallel port and this port is generally used by a printer, which would leave no port normally available for the apparatus. In contrast, two serial ports are normally present and at least one such port is typically available for the apparatus.

B. Serial port processing is more suited to communications between microprocessor controlled devices making serial processing easier to employ for the apparatus.

C. High speed communications are not needed for the apparatus to function effectively.

BRIEF DESCRIPTION OF THE DRAWINGS

The drawings consist of thirteen figures numbered 1 to 13. Figures that consist of more than one sheet contain a unique alphabetic suffix for each sheet. When a figure is referred to in it's entirety, the alphabetic suffix is omitted. A brief description of each figure is as follows:

FIGS. 5A, 5B, 5C, 5D, 5E, 5F, 5G, 5H, 5J, 5K, 5L, 5M, 5N, 5O, 5P, 5Q, 5R, 5S, 5T, 5U, 5V, 5W, 5X, 5Y, 5Z, 5AA, 5AB, 5AC, 5AD, 5AE, 5AF, 5AG, 5AH, 5AJ, 5AK, 5AL, 5AM, 5AN, 5AP, 5AQ, 5AR, 5AS, 5AT, 5AU are block diagrams of the microprocessor based software operating system controlling processing occurring in the Unit.

FIGS. 9A, 9B, 9C, 9D, 9E, 9G, 9H, 9J, 9K are block diagrams describing the software interface program that permits the Work Station to communicate with the Unit.

DESCRIPTION OF THE PREFERRED EMBODIMENT

Figure 1:
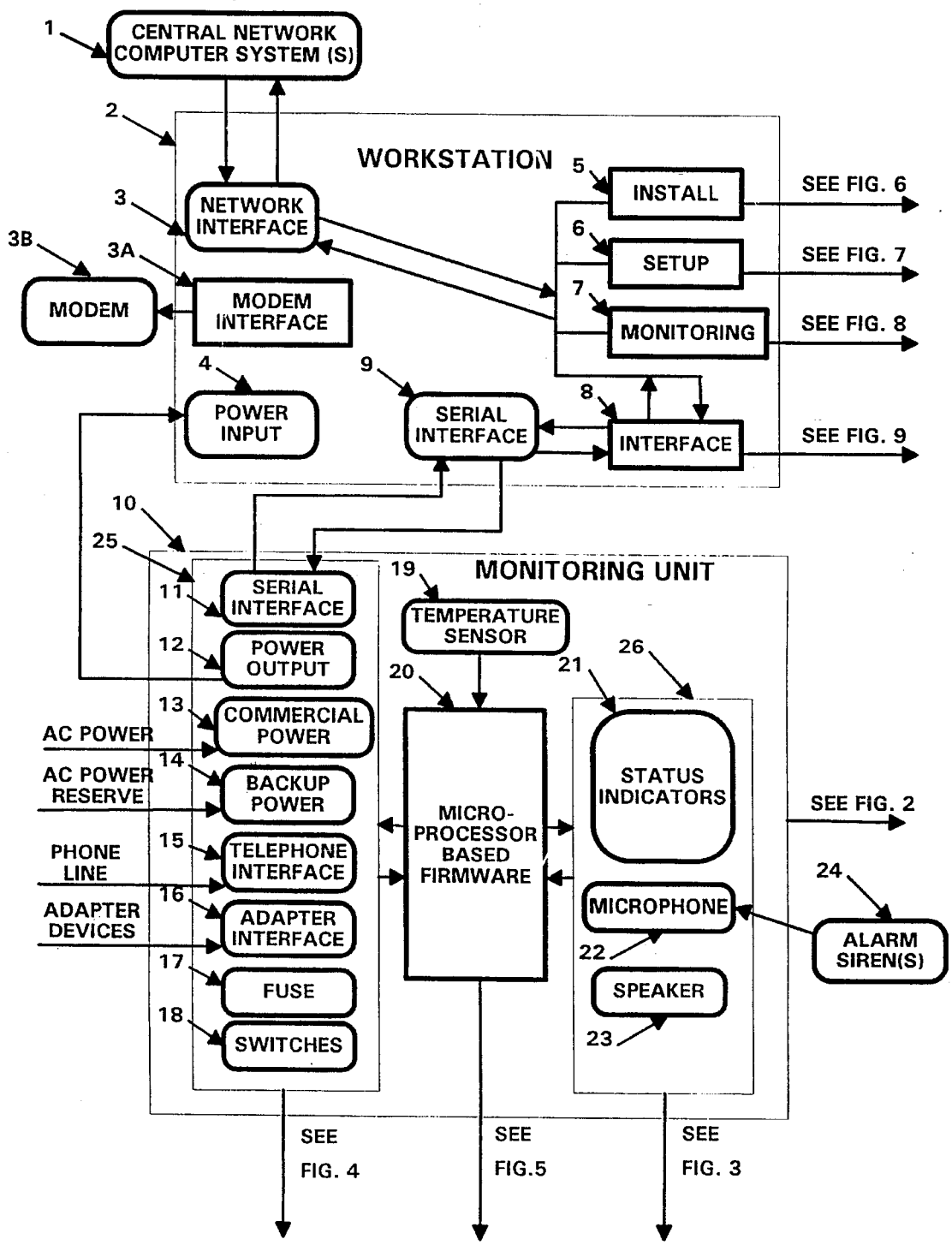
FIG. 1 is an functional overview of the invention interrelating other figures submitted.

FIG. 1 is a operational overview of the invention. Oval objects on this diagram represent physical (i.e. hardware) components of the apparatus and bold line rectangular objects represent software programs necessary to operate the invention.

Figure 6A:
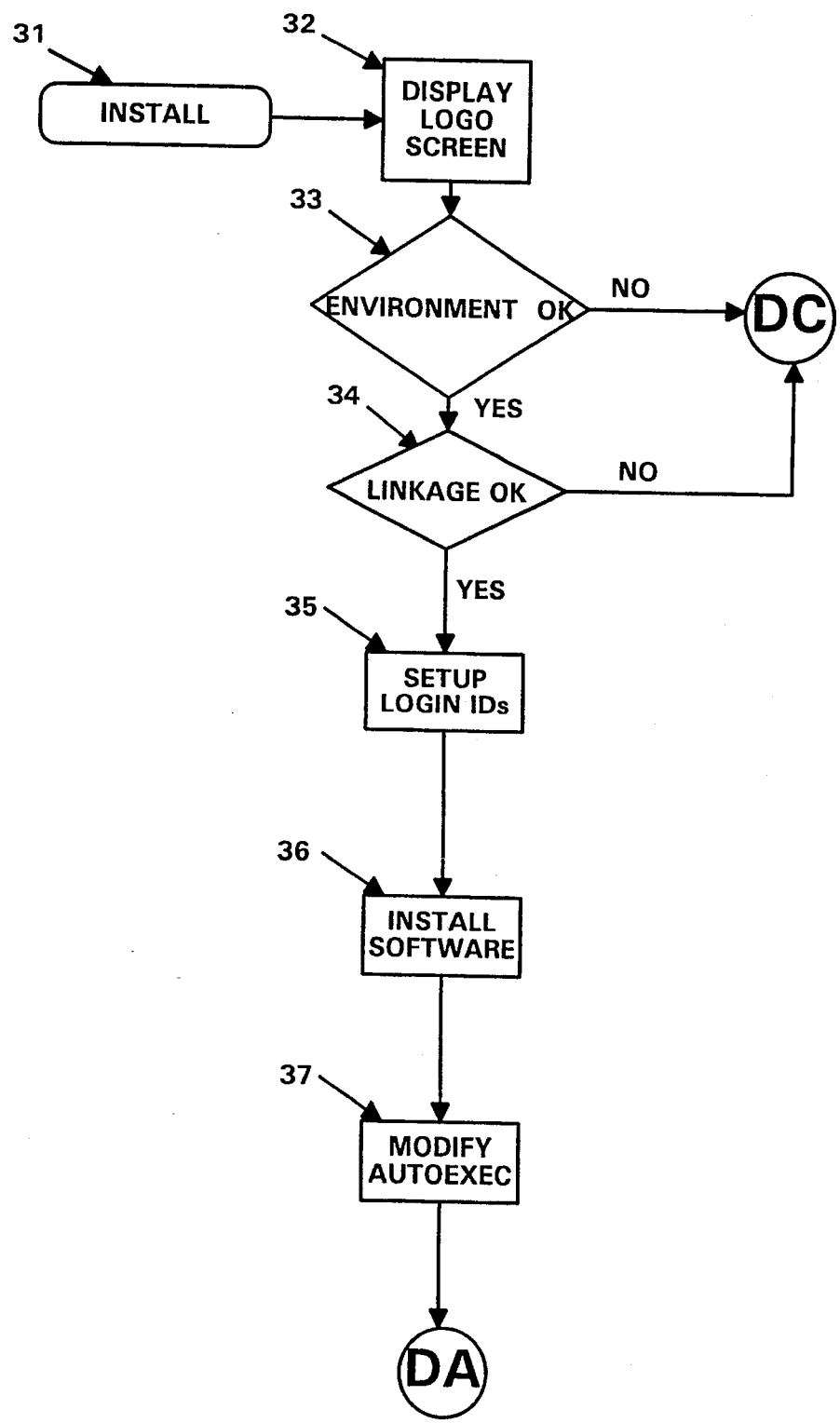
FIGS. 6A and 6B are block diagrams describing the installation procedure for the computer software programs necessary to interface the Work Station with the Unit and File Servers to be monitored.

One or more Central Network computers 1 are connected to the Work Station 2 by network communication interface boards 3 through cables transferring data to and from the Central Network Computer(s) 1, herein referred to as "File Server(s)", to the Work Station 2. Optionally, a Modem Interface program 3A may be invoked during a Monitoring 7 session to place an alert call to a pager in a case where the Work Station 2 has detected a possible failure of the Monitoring Unit 10, herein referred to as "Unit", during a monitoring session. This program is only invoked if a Hayes compatible Modem 3B has been installed in the Work Station and a phone number has been specified during system Setup 6 processing. In this case the alert call would be placed via the Hayes compatible modem 3B. An Install 5 software program developed for the apparatus is used to initially load all software programs from a floppy installation disk supplied as part of the apparatus to effect all required interfaces from the Work Station 3 to the File Servers 1 and Unit 10 for purposes of activating the apparatus. The Install 5 software is also used to initially configure and test that the apparatus is operating properly. Thereafter, the apparatus can be reconfigured, tested and various reports produced using the Setup 6 software programs provided with the apparatus. A block diagram detailing the Install 5 and Setup 6 programs is included as FIG. 6 and FIG. 7 respectively.

Once the apparatus has been configured as desired, a Monitoring 7 software program is invoked whenever the Work Station 2 is re-booted. This Monitoring 7 process is detailed in FIG. 8. A separate monitoring process occurs for a Job Status Monitoring session. This monitoring process is described in FIG. 13. A detailed example of Job Status Monitoring processing is discussed in Section 2, ("Summary Of Invention" section of this filing). All communications between the Install 5, Setup 6, and Monitoring 7 software programs and the Unit 10 are handled by a Interface program 8 developed as part of the apparatus. A detailed block diagram specifying the functions performed by the Interface program is included as FIG. 9. Communications are accomplished by a series of three digit codes that request the Unit 10 to perform a specific monitoring action and to return to the Interface program 8 a three digit code indicating the results of the action. For example a request code of 002 would request the current status of main power. A result code of 200 indicates that main power is present and a result code of 201 indicates that main power has failed. The Interface program 9 also includes the necessary software to access one of the Work Station's 2 serial ports 9 and to send and receive data to and from the serial communications port 9. Similarly, the Microprocessor Based Firmware 20 residing permanently in the Unit 10 includes the necessary software to access, send and receive data through the Serial Interface 11 of the Unit 10 to and from the Serial Interface 9 of the Work Station 2.

The Install 5, Setup 6, and Monitoring 7 programs communicate directly with each File Server 1 monitored through the Network Interface board 3 installed in the Work Station 2. Communications include sending data to the File Server(s) 1 and receiving data from the File Server(s) 1.

Figure 2:
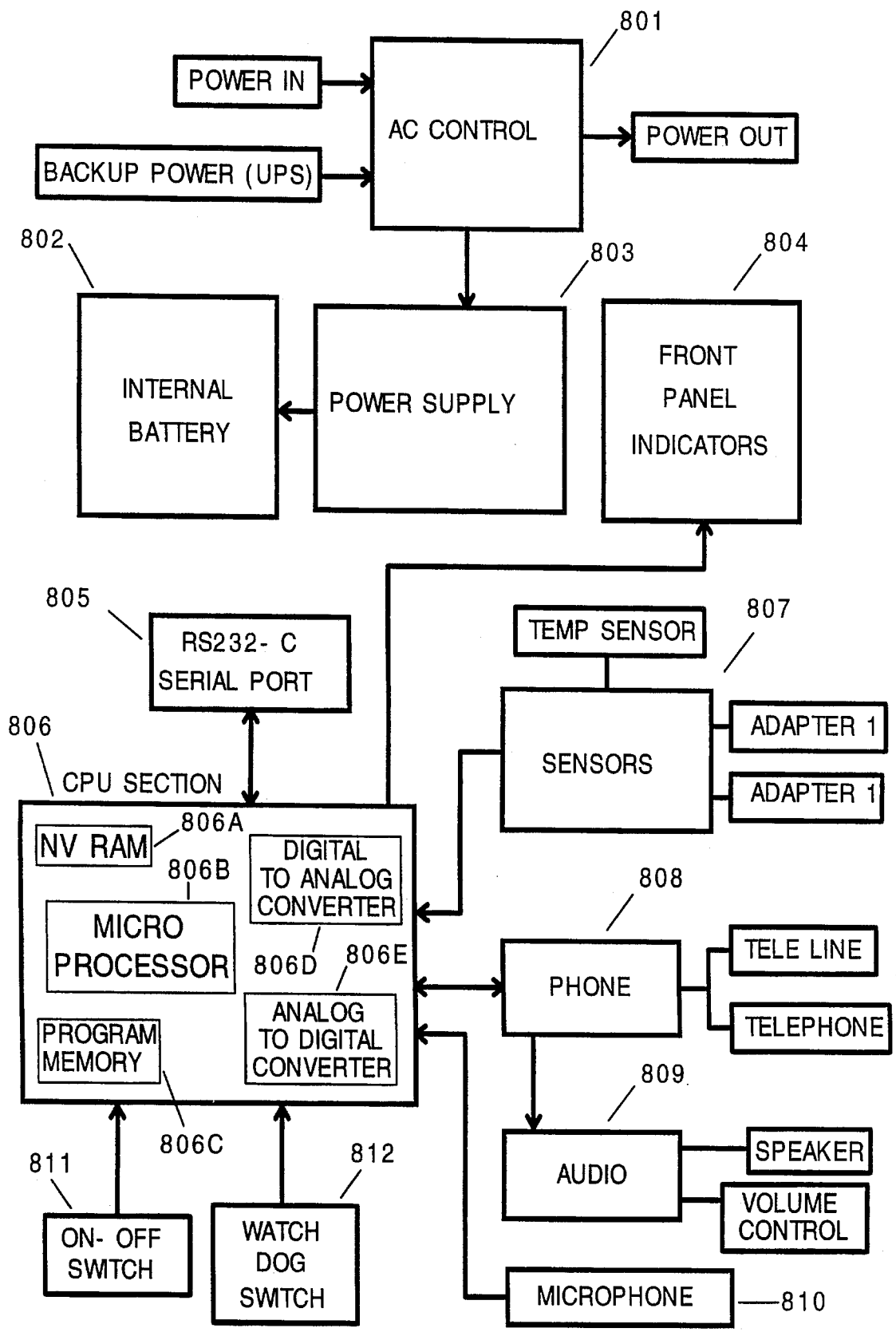
FIG. 2 is engineering diagram representing the internal circuitry of the Unit.

A more detailed diagram of the internal circuitry of the Unit 10 is shown in FIG. 2, discussed below.

An external view of the back panel of the Unit 10 is included as FIG. 4, discussed in more detail below. The back panel, as shown in FIG. 1, presently consists of several components. First, there is a Serial Interface Port 11 which is interconnected to the Work Station 2 via a serial cable attached to the Serial Interface Port 9 of the Work Station 2. Second, there is an AC Power Output receptacle 12 for supplying all AC power to the AC Power Input receptacle 4 on the Work Station 2. AC power supplied to the Power Output receptacle 12, is obtained from either the AC Commercial Power Input Receptacle 13 or the Backup Power Input Receptacle 14 under the control of the Microprocessor Based Firmware 20 residing in the Unit 10. When necessary the Microprocessor Based Firmware 20, also controls temporarily cutting off all AC Power to the Power Output Receptacle 12, thereby forcing the Work Station 2 to boot and initiate a new Monitoring session 7. Third, there is an AC Commercial Power receptacle 13 where incoming AC power would be obtained as a primary source of electrical power for the Unit 10. Fourth, there is a Backup Power receptacle 14 which is used as an ,alternate source of AC electrical power for the Unit 10 should primary power fail. Fifth, there is a telephone interface 15 with two jacks designed to accept a standard RJ-11 public utility phone line into one jack and optionally a telephone into the remaining jack. Sixth, there are two available Adapter Ports 16 to which up to two types of commercially available, external detection ("Adapter") Devices, such as motion alarm, water alarm, or entrance alarm contact switches, may be attached. An example of one such device is the Safe House motion detector sold by Radio Shack. Seventh, there is a Fuse 17 designed to protect all low voltage circuitry of the Unit 10. Finally, there are three Switches 18 on the back panel that are a Unit ON/OFF switch, a Watch Dog pulse switch, a volume control knob for the Unit's 10 internal speaker. When the ON/OFF switch is turned off, the Unit still performs two functions as long as AC power is being supplied to the Unit through the AC Commercial Power 13 receptacle. These functions are recharging the Unit's internal rechargeable battery (not shown on this Figure but installed in the Unit 10) and supplying AC power to the Power Input 4 receptacle of the Work Station 2. The Watch Dog pulse switch is depressed to (1) defer a scheduled boot for 30 minutes, when a boot warning is announced by the Unit 10; (2) disable the adapter port monitoring function of the Unit 10 during a monitoring session; (3) terminate alert calls being placed when a monitoring session is not active; and (4) cause the Unit 10 to reset all internal processing and circuits (i.e. cold boot), when the Unit's 10 ON/OFF switch is in the OFF position.

An external view of the front panel of the Unit 10 is included as FIG. 3, discussed in more detail below. This panel presently includes ten Status Indicator Lights 21 designed to reflect the internal operating status of the Unit 10; a Microphone 22 that permits the Unit to pick up spoken messages and to periodically listen for the external smoke (or other alarm device's) Alarm Siren(s) 24; and a Speaker 23 used to replay voice recorded messages or make alert announcements.

An optional, commercially available, Smoke Detector 24, such as a First Alert model no. 83R, is presently incorporated into the apparatus to detect smoke. The micro-processor based Firmware 20 periodically turns on the Microphone 22 for several seconds, then digitizes and analyzes any sound detected. If the level and frequency of any sound detected match the corresponding level and frequency of the Smoke Detector's 24 siren, which has been determined to be 3000 hertz or higher, herein referred to as a Sonalert; smoke alerts are issued by the apparatus. Similar procedures may be followed for other optional devices, such as fire alarms or burglar alarms to permit the Unit to identify different sound levels and frequencies by associating a given hertz level with the specific sound produced by each additional device used. In cases where a loud sound level cannot be precisely identified, a general loud sound level alert is issued. Whenever, a loud sound level is detected, the sound present is transmitted to the user at the time an alert call is completed.

A Temperature sensor 19 is installed in the bottom of Unit 10 over a hole drilled in the bottom of the Unit's 10 case. Mounting the Temperature Sensor 19 in this manner avoids any false temperature readings due a heat build up in the Unit 10. Current temperature data from the Temperature Sensor 19 is obtained and converted to digital form by the Micro-Processor based Firmware 20.

Processing occurring within the Micro-Processor Based Firmware 20 installed within the Unit 10 is detailed as a block diagram in FIG. 5, which is discussed in more detail below. This Micro-processor Based Firmware 20 schedules, processes and controls the activities of the Unit 10.

Referring next to FIG. 2, the internal circuitry of the Unit will be discussed in more detail. A main AC power source and optionally an AC backup power source supplies power to the Unit and the Work Station via the AC control circuit 801. This circuit contains a power selection device or relay which under microprocessor 806B control selects backup power should main power fail (providing backup power is present). This approach insures that either available source of AC power will be used to provide uninterrupted AC power to the Unit and Work Station that is plugged into the Unit's AC power output receptacle. AC Power out to the Work Station is further controlled by a circuit which can temporarily "break" AC power under microprocessor control causing the Work Station to re-boot when power is restored. The software programs developed for the apparatus automatically determine when to break power in this manner. Power is broken when the Work Station fails to communicate with the Unit for 90 seconds during a monitoring session, a user schedule boot time occurs, or main power fails when a monitoring session is not active. The AC control circuit 801 evaluates the two power sources via AC input opto-isolators and supplies their status to the microprocessor 806B.

The power supply 803 supplies a constant voltage and limited current, to charge the internal battery 802, which then powers the five volt regulator through circuitry. In front of the regulator is a current passing circuit which is a discrete model of an SCR (silicon controlled rectifier) using a pair of transistors so that when AC power is applied and a small current is introduced, the circuit turns on and will continue even after total power is lost unless turned off by the microprocessor 806B.

The indicators 804 are under control of the microprocessor 806B except for the fuse blown indicator which assumes the current that would have been flowing through an intact fuse.

The serial port 805 is converted to logic levels and supplied to the microprocessor's serial pins. Furthermore, a circuit is provided that senses a positive or negative voltage on one of the RS-232 status signals and provides this status to the microprocessor. This approach allows the apparatus to discern that either the cable is not connected, the Work Station has no power, or a hardware failure has occurred. Also, one of the RS-232 input status signals is looped back to an RS-232 output status signal permitting the Work Station Interface program to discern that the cable is connected to the Unit and the serial port assignments to be verified (i.e. to detect a serial port user assignment error or interrupt conflict).

The on-off switch 811 is only logical in nature and through a debouncing circuit supplies it's state to the CPU. The momentary "watch-dog" push button switch 812 is similarly wired and it's status is provided to the microprocessor.

The CPU 806B could be an 80C32 microprocessor which supports a serial port and has two internal timers. One timer is used for generating sampled voice signals and DTMF touch tone telephone signals and the other timer is fixed at 100 times a second rate to monitor the internal hardware status of the Unit. Also, this microprocessor presently has 256 bytes of internal RAM (Random Access Memory) and another 128 bytes of non-volatile RAM 806A which is used primarily for storing emergency phone numbers.

The CPU Section 806 contains an analog-to-digital converter 806E for recording verbal messages from the microphone 810 and sending this via the serial port to the interface program 8. In addition, this microphone 810, after amplification, goes to a circuit which detects "loud" sounds and converts these to "square" waves which are provided to the CPU so that, for example, the frequency from sonalert tones from a smoke detector can be detected. Also, this converter 806E is used to measure the current temperature using the temperature sensing thermistor 807 via the analog switch which selects what to measure.

The CPU Section 806 contains a digital to analog converter which generates telephone DTMF touch tone signals internally stored in program memory 806C or the verbal messages internally stored in program memory 806C or received from the serial port via the interface program 8 (FIG. 1). The digital to analog output is provided to the telephone circuit 808. This circuit connects, via a coupling transformer and off-hook relay, to a standard public utility telephone line using an RJ-11 connector. Also for convenience, a second RJ-11 connector is provided for an optional telephone. The signal tapped across the coupling transformer and a 600 ohm resistor (an industry standard interface) is provided to the analog-to-digital converter for recording sound from the phone and interfaces with a circuit supplying call-progress (or sound-sensed) status to the microprocessor, when phone calls are placed. The audio signal tapped at the resistor/transformer connection mentioned above is provided to the audio circuit 809, which (via volume control) is amplified before being sent to a speaker contained in the Unit. Digitized voice announcements not related to phone calls also pass through this circuit to be announced in humanly intelligible form via the speaker. As a result, the off-hook relay is DPDT (double pole—double throw) so that when on-hook, it is connected to a 600 ohm "dummy" resistor which provides the proper impedance or load so the sound heard via the speaker is comparable to the sound heard when the phone is offhook. The amplifier (speaker) circuit is controlled by the microprocessor thus allowing the speaker to be disabled during a monitoring session permitting the apparatus to operate in a "silent alarm" mode.

Two adapters are supported 807 and their statuses are provided to the CPU. The connection to these adapters provide a nominal ten volts as power. Input to these adapters are security and/or environmental monitoring devices that operate in a normally-closed condition.

More detailed electrical circuit diagrams presently employed in the Unit are contained in part 9 of the microfiche appendix. A listing the specific parts presently used in the Unit and referenced in the circuit diagrams is included in part 10 of the microfiche appendix.

Figure 3:
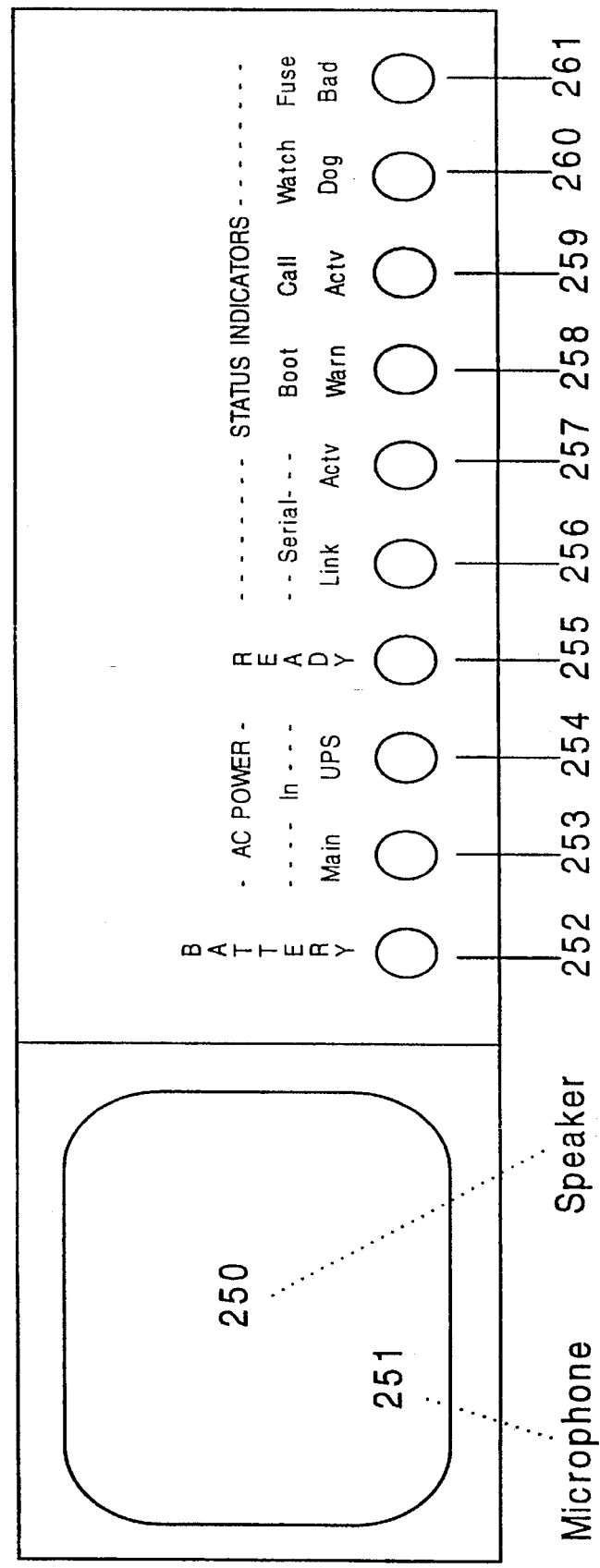
FIG. 3 is front external view of the Unit.

FIG. 3 is a block diagram detailing a frontal view of the Unit. This front panel of the Unit presently consists of a speaker 250, microphone 251 and various indicator lights 252–260. Going from left to right the left most indicator light reflects the status of the Unit's internal rechargeable battery. The next two indicator lights display the status of AC POWER coming into the Unit from a wall outlet or UPS (power backup system) and going out of the Unit to power the Work Station. The right most seven lights indicate the status of various activities that occur within the Unit.

The speaker 250 and microphone 251 presently are located on the left side of the front panel and permits (1) recording alert messages, (2) listening to a phone call placed by the Unit and (3) listening to a playback of recorded alert messages.

All ten indicator lights will be off until the ON/OFF power switch, located on the left rear side of the Unit is turned ON.

When the Unit is turned off with NO external source of power, the Unit will run using it's internal batteries and the status lights will activate, assuming the internal battery has not been drained of power. When external power is available, the Unit will automatically recharge it's internal battery as necessary.

A detailed description of the purpose of each of the ten indicator lights going from left to right is as follows:

BAT. STATUS 252—This indicator shows the current status of the Unit's internal battery. When the battery is fully charged, the light will be green. As the battery is drained of power the light will turn yellow. The light will turn red when the battery is drained of power.

AC IN MAIN 253—When this indicator is OFFs it means that the power from the wall outlet has failed; the power cable from the wall outlet to the Unit is not properly connected or making a good connection; or the power cable plugged into the Unit's POWER input receptacle on the rear panel of the Unit may be defective. When this indicator is ON, it means that power from the wall outlet is being received by the Unit.

AC IN UPS 254—When this indicator is OFF, it means an external power backup system is not in use or has failed; the power cable from the battery output to the Unit is not properly connected or making a good connection; or the power cable plugged into the Unit's BATTERY input plug on rear panel of the Unit may be defective. When this indicator is ON, it means that power from an external UPS Backup system is being supplied to the Unit.

UNIT READY 255—If this indicator light is on, the system is in a normal monitoring mode. When the Unit's power is first turned this light will be OFF and stay OFF until after a processing session has began. Thereafter, the light should always remain ON until the Unit is turned off again. When this indicator light is off, all system monitoring capabilities are disabled. During system installation processing, this light will remain OFF until the installation process is completed.

SERIAL LINK 256—If this indicator light is ON, it means that the serial cable is properly connected to the Work Station and the Work Station is turned ON (i.e. voltage is detected within the serial cable). When this light is OFF, it means either (1) the serial cable is not securely connected at both ends, (2) the Work Station is not turned ON, (3) the serial cable is defective, (4) the Work Station's serial port is defective, disabled or not configured properly (i.e. serial port interrupts conflicts with another device, such as a mouse, modem, etc.) or (6) the Unit's serial port is defective.

SERIAL ACTV 257—When flashing or ON, this light indicates that data is being sent from the Unit to the Work Station or vice versa. When OFF, this light indicates no data transmission activity is occurring between the Unit and the Work Station.

BOOT WARN 258—Whenever power fails, the Unit loses communications with the Work Station or the Unit is scheduled to boot the Work Station, this light will begin flashing. When any of these events occur, the Unit waits for 2 minutes before actually cutting power to the Work Station to force the Work Station to boot. During this period, this light will flash; and, if a monitoring session is not active, the Unit will announce through it's speaker system that Work Station will be booted. This approach gives any user on the Work Station ample time to save any open files before the Work Station is booted.

CALL ACTV 259—When a phone call is being placed by the Unit, this light remains ON until the call has been completed and the Unit hangs up the phone. When this light is off, no phone calls are in progress.

WATCH DOG 260—When the Watch Dog light is ON, the Unit's adapter ports have been enabled and alert calls will be placed should an alert be detected by a device attached to either adapter port. The first person arriving at the office would normally depress the Watch Dog pulse button located on the back of the Unit to disable the adapter ports (in cases where intruder detection devices are plugged into either adapter port) before alert calls are placed. When this pulse button is depressed the Watch Dog light will turn OFF. The Watch Dog light will also be turned OFF by pressing the F1 key to end a monitoring session. If the intruder detection options of the System has been installed, this indicator light serves as a reminder that the system is active. This is important, because the first person who arrives at the office on a work day will be treated as an intruder unless the Watch Dog pulse switch is depressed upon arrival.

FUSE BAD 261—If this indicator light is ON, it means the fuse on the rear panel of the Unit needs to be replaced. The fuse is accessible by unscrewing the fuse cap. The fuse presently used is a 5 amp slow blow fuse. If this indicator light is OFF, the fuse is OK.

Figure 4:
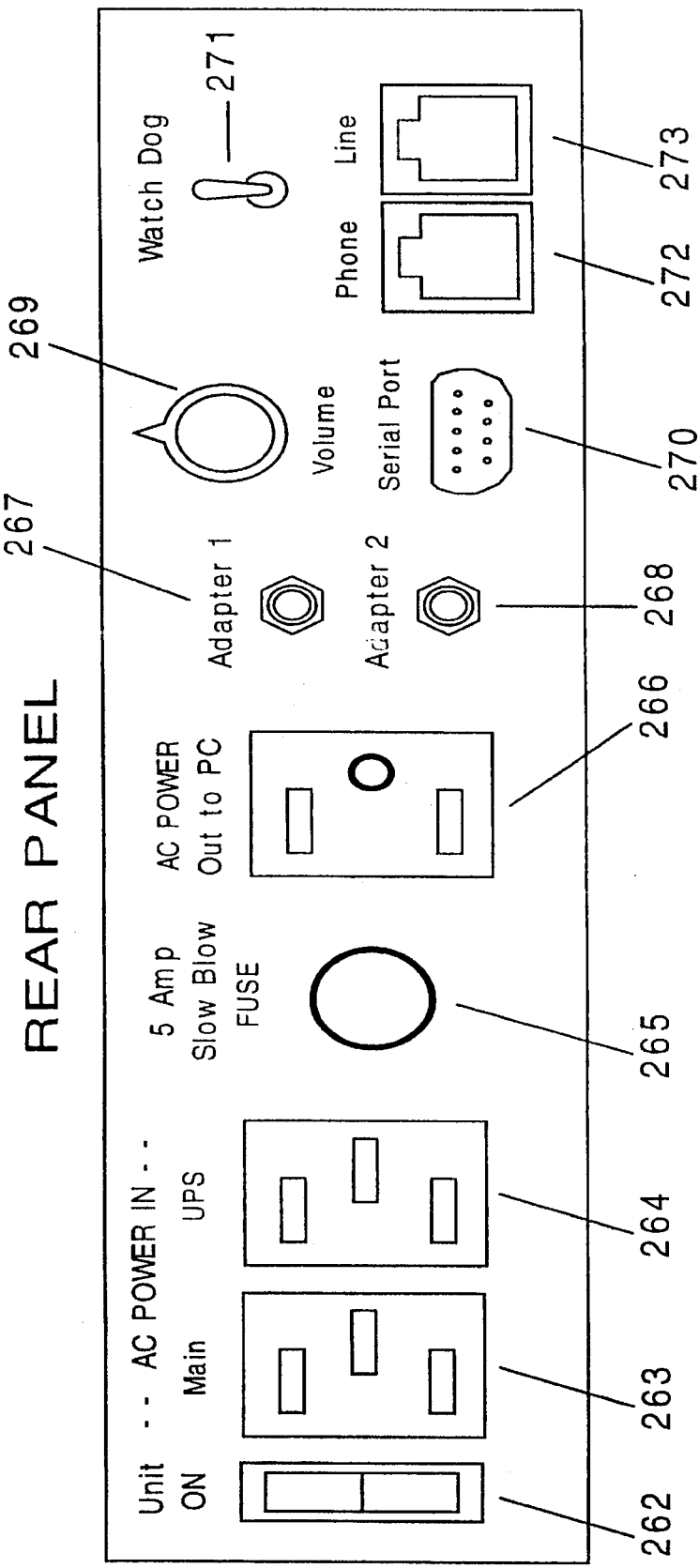
FIG. 4 is a rear external view of the Unit.

FIG. 4 is a block diagram detailing a rear view of the Unit. The rear panel of the Unit presently contains the power receptacles, telephone cable jacks, 9 pin serial port, speaker volume control, fuse, adapter ports and ON/OFF switches. A detailed description of each item on the back panel going from left to right is as follows:

UNIT ON 262—When this switch is pushed in at the top, the Unit will be activated. Otherwise, the Unit will be deactivated. (NOTE: The Unit will still supply power to the Work Station even when the Unit has been deactivated.) when the Unit is being installed or moved, the ON/OFF switch should always be in the off position to avoid draining the internal battery of power.

AC POWER IN MAIN 263—One of the two power cables supplied with the apparatus should be plugged into this receptacle. The other end of the power cable must be then plugged into a commercial power electrical power outlet.

AC POWER IN UPS 264—The second power cable supplied with the Unit should be plugged into this receptacle. Then, the other end of this cable should be plugged into an AC backup power system (UPS). If no AC power backup system is available, then this cable should not be installed.

5 AMP FUSE 265—A user serviceable 5 amp, slow blow, fuse protects the Unit.

AC POWER OUT TO PC 266—The end of the power cable used to supply power to the Work Station where the Unit is connected must be plugged into this receptacle.

ADAPTER #1 /ADAPTER #2 267 & 268—These two ports permit optional commercially available monitoring devices to be connected to the Unit, such as a Safe House motion detector or entrance alarm devices available, from Radio Shack. Both Ports are identical allowing up to two devices to be added to the system. If only one feature is added, either adapter port may be used when activating the feature.

VOLUME KNOB 269—This knob is used to adjust the Unit's speaker volume.

SERIAL PORT 270—One end of the serial cable supplied with the Unit must be plugged into this port and the other end should be plugged into an available serial port on the Work Station. A serial adapter plug is supplied, if necessary to connect the cable into the Work Station's serial port.

WATCH DOG SWITCH 271—When this pulse switch is depressed during a monitoring session both adapter ports on the rear panel will be disabled for the remainder of the monitoring session. As previously mentioned, these adapter ports are used to interface with optional external devices such as door alarms or motion detection devices. If no security monitoring features have been added to the adapter ports, depressing this pulse switch will have no effect. Otherwise, anytime a monitoring session begins, the adapter ports will be monitored automatically and remain active until either this pulse switch is depressed or the session is ended by pressing the F1 function key.

This switch can also be used for four other purposes that have nothing to do with either adapter port. First, when the Unit announces through it's speaker that a scheduled boot is about to occur, this switch can be depressed to defer the schedule boot from occurring for 30 additional minutes. If more that a 30 minute delay is required, the switch can be depressed again when the Unit re-announces the boot warning (after 30 minutes have passed). Second, if the Unit should ever lock-up or operate incorrectly, the Unit can be turned OFF and this button depressed to reset the Unit back to a normal operating mode. When this procedure is followed, the Unit's ready light will be turned OFF. Third, if a Fail Safe alert condition is detected while a monitoring session is not active, this button can be pressed to immediately discard any uncompleted alert calls, meaning someone is aware of the alert and no further alert notifications are necessary. Finally, when a loud sound is detected (e.g. a smoke alarm siren) while a monitoring session is not active, this switch can be pressed to disable loud sound alert calls, after the loud sound detected message is announced through the Unit's internal speaker (during a two minute warning period).

PHONE/LINE 272 & 273—One end of the telephone cable supplied with the Unit should be plugged into the "Line" jack and then the other end plugged into a standard telephone company outlet. If necessary, a standard telephone may then be plugged into the remaining "Phone" jack. The telephone jacks have surge protection and is electrically isolated from all other circuitry so as to comply with FCC part 68 regulations.

FIG. 5 is a block diagram of the Unit's operating system that is stored in the Unit's memory, presently consisting of a read-only EPROM. A copy of the actual operating system assembler source code presently used by the apparatus is contained in the microfiche appendix, Part 1.

This figure plus FIGS. 6 to 13 follow standard computer software flow chart conventions familiar to any person skilled in the trade. A circle block indicates the processing flow is branching to or from a different location within the figure (i.e. an off-page or on-page connector. This branch may occur to another sheet within the figure or to a different location on the same sheet. The letters contained within the circle are unique for each possible branching path taken. In some cases multiple branches may be made within the figure to a single location within a figure. A rectangular block is sometimes divided into two sections as shown in block 506 on FIG. 5Q. This format is used to indicate a sub-routine is being called and, when the sub-routine is complete, processing resumes at back at the next block on the block diagram. In this case the upper rectangular section of the block contains the figure number (left side of the rectangle)

and alphabetic identification (right side of the rectangle) referring to the identification inside the circle where the sub-routine block diagram begins. A rectangular block which is not divided, as illustrated by block 301 on FIG. 5A indicates a specific process is being performed. A diamond shaped box, as illustrated by block 304 on FIG. 5A, indicates a YES or NO decision must be made. A oval shaped block indicates a program or routine is beginning and a hexagon shaped block indicates a program or routine is ending.

Figure 5A:
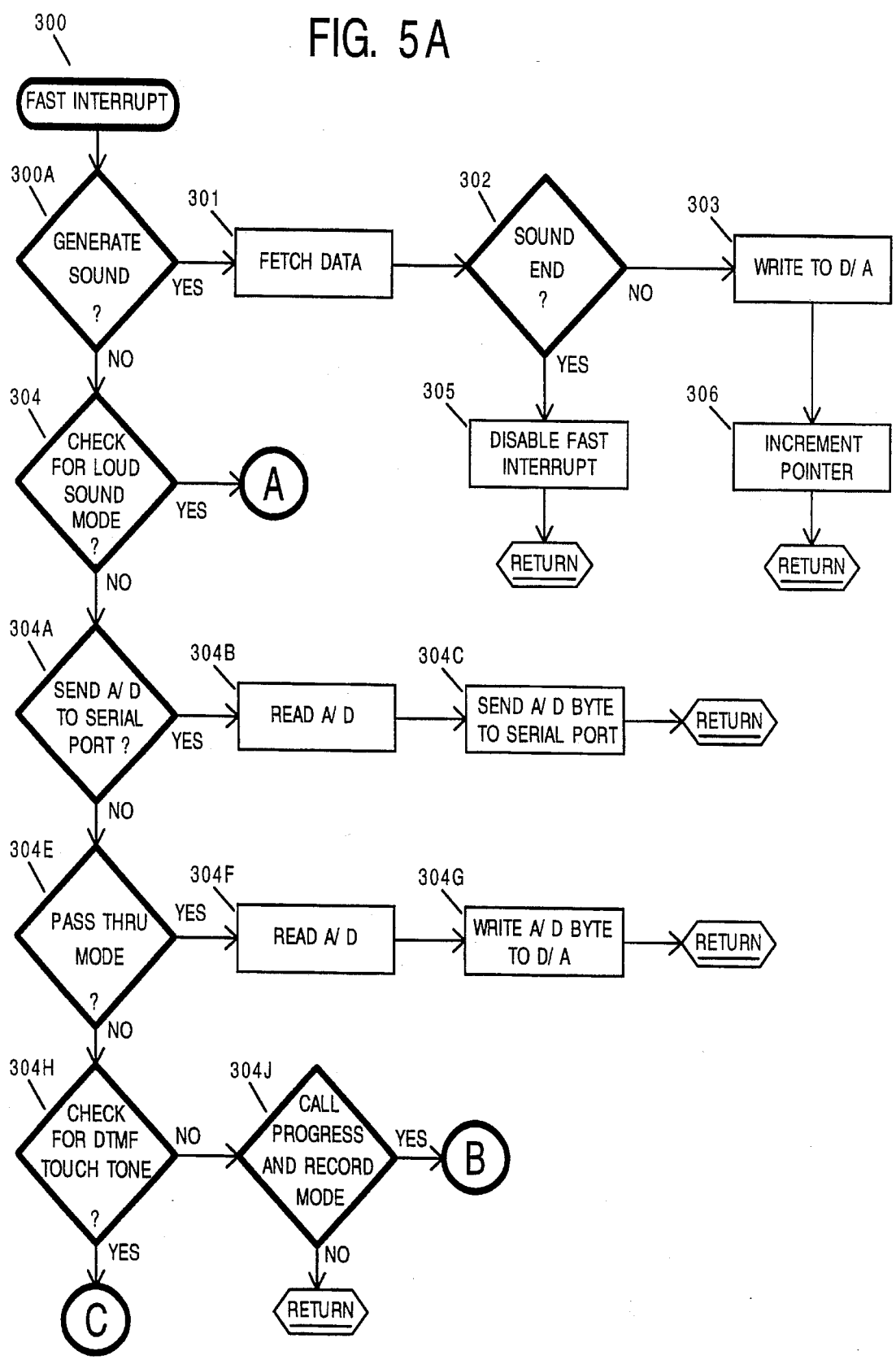

The Unit's operating system block diagram begins on FIG. 5A at block 300. The program source code for the Unit's operating system is written in assembly language. This operating system is comprised of several parts. There are three interrupt routines consisting of a Fast-Interrupt, a Slow-Interrupt, and a RS-232 Serial-Interrupt routine. Also, there is the Main-Loop routine, which is the main processing routine, and various other sub-routines which services commands received via the serial port and other conditions which occur.

Figure 5B:
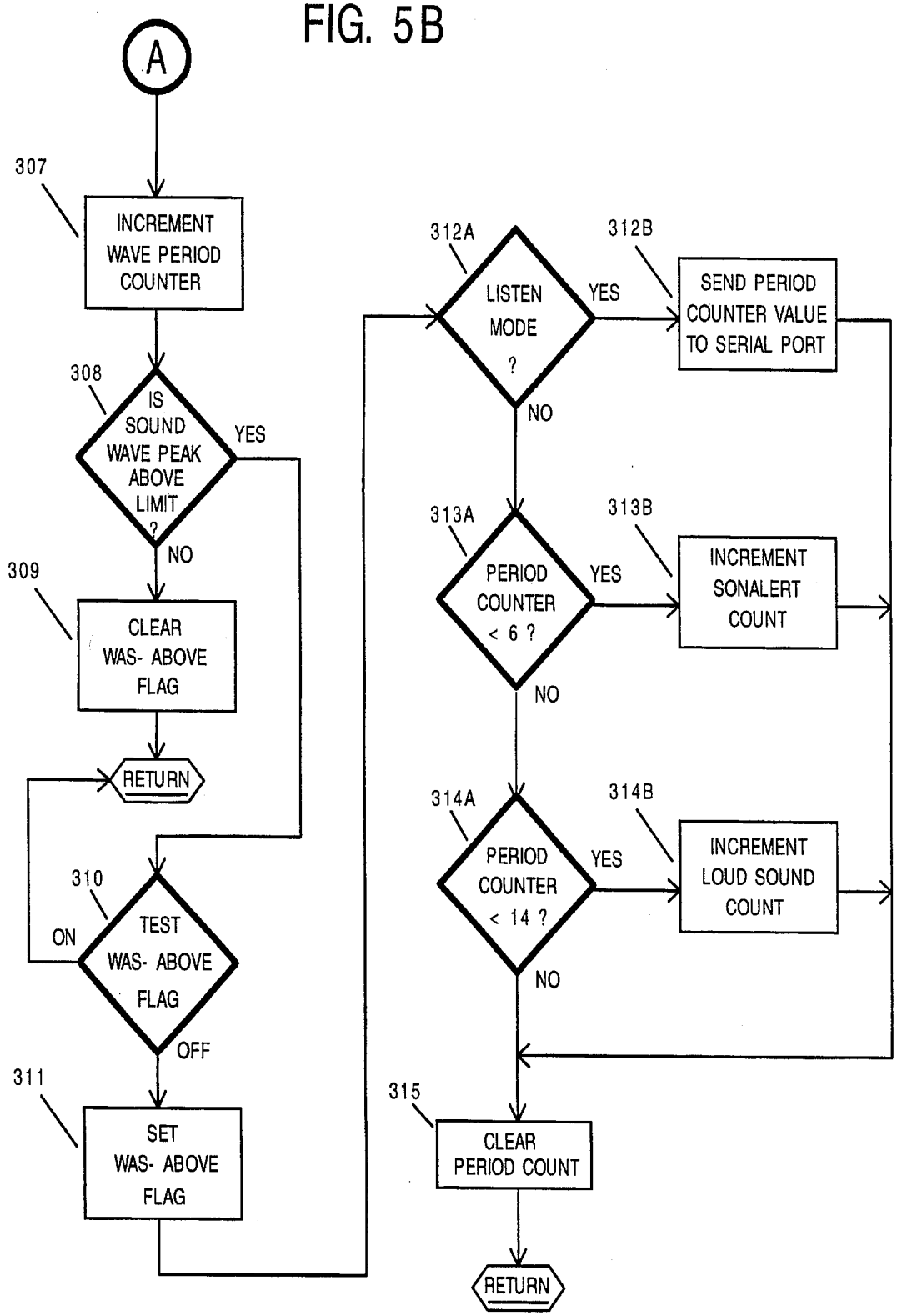
Figure 5C:
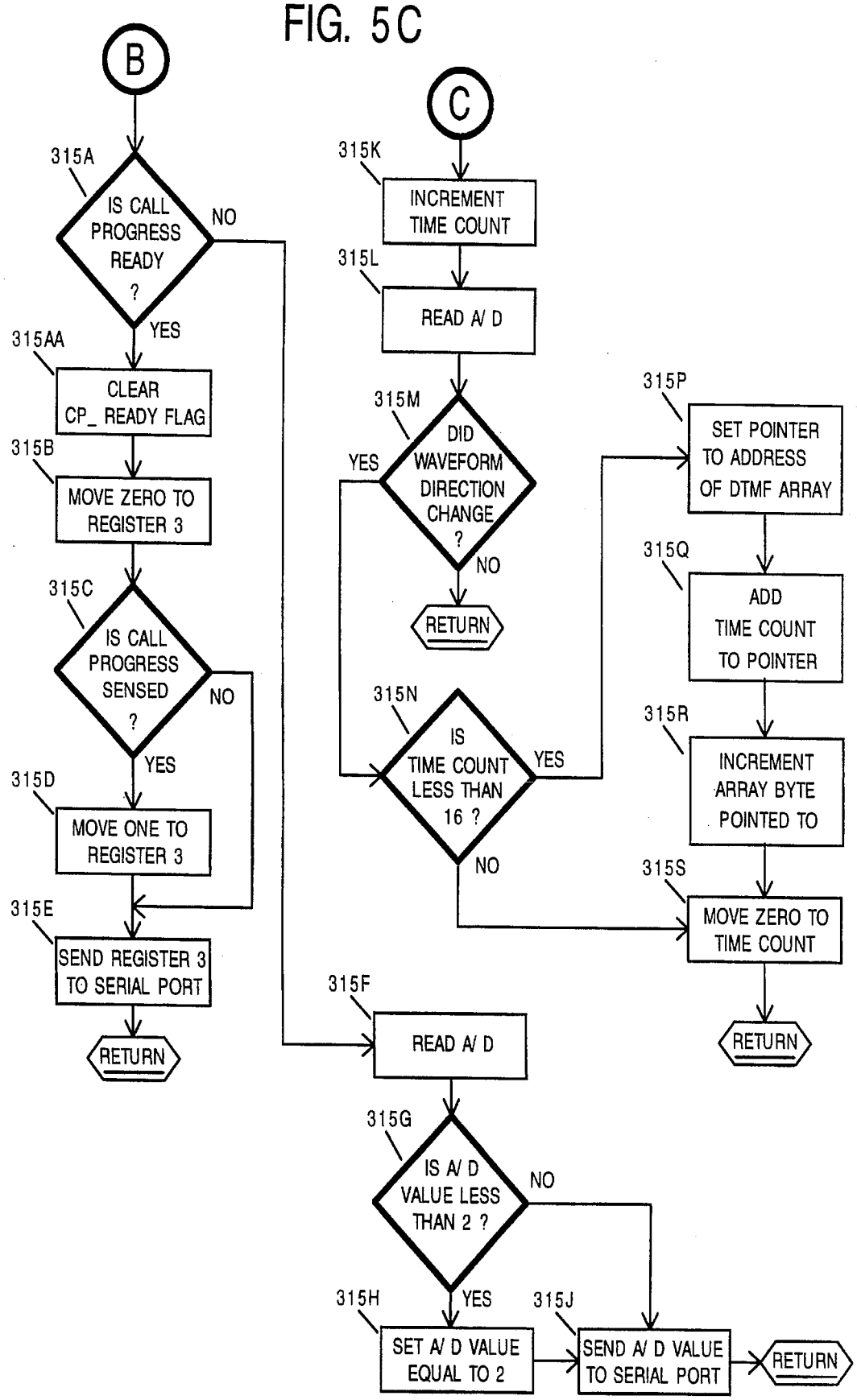
Figure 5D:
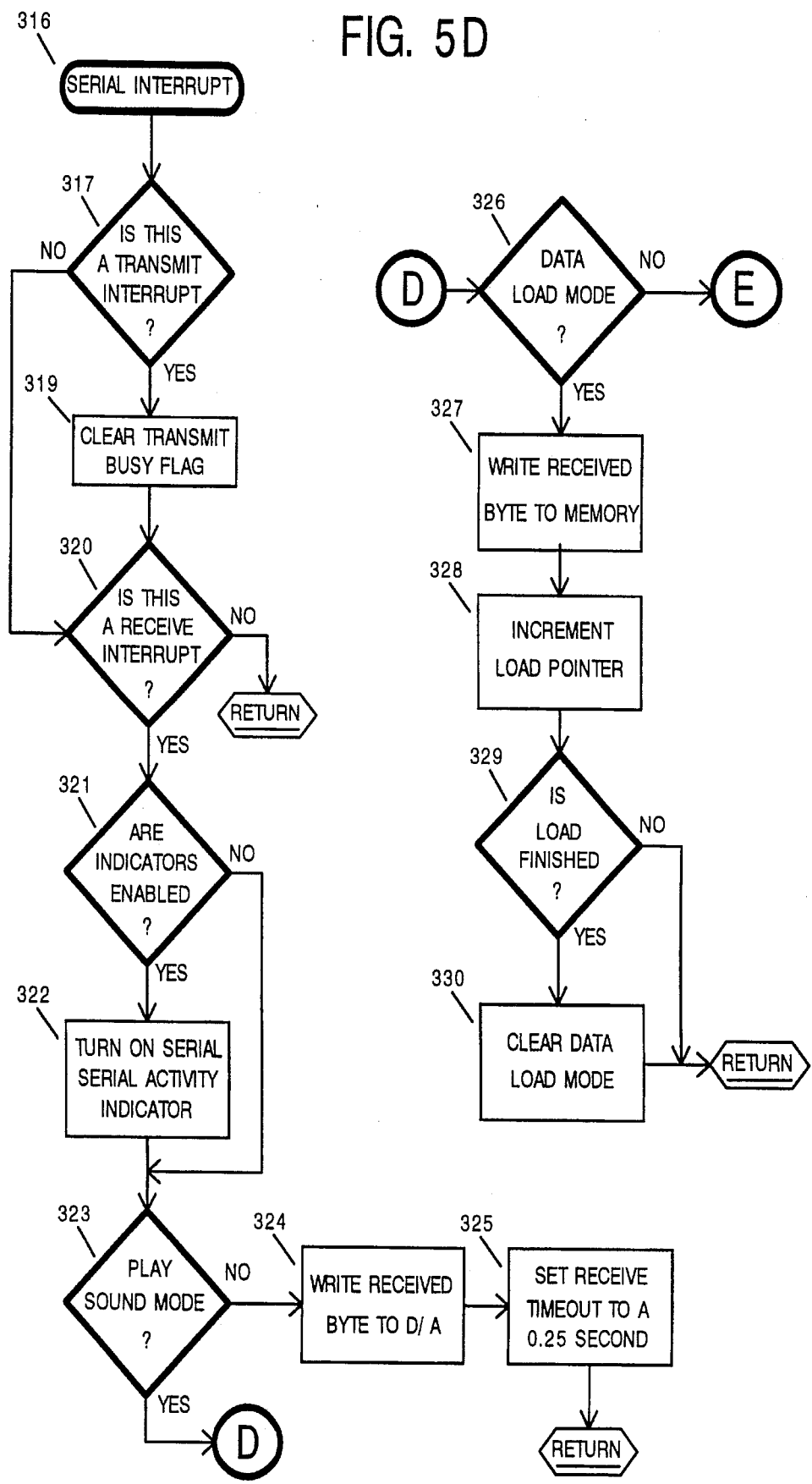
Figure 5E:
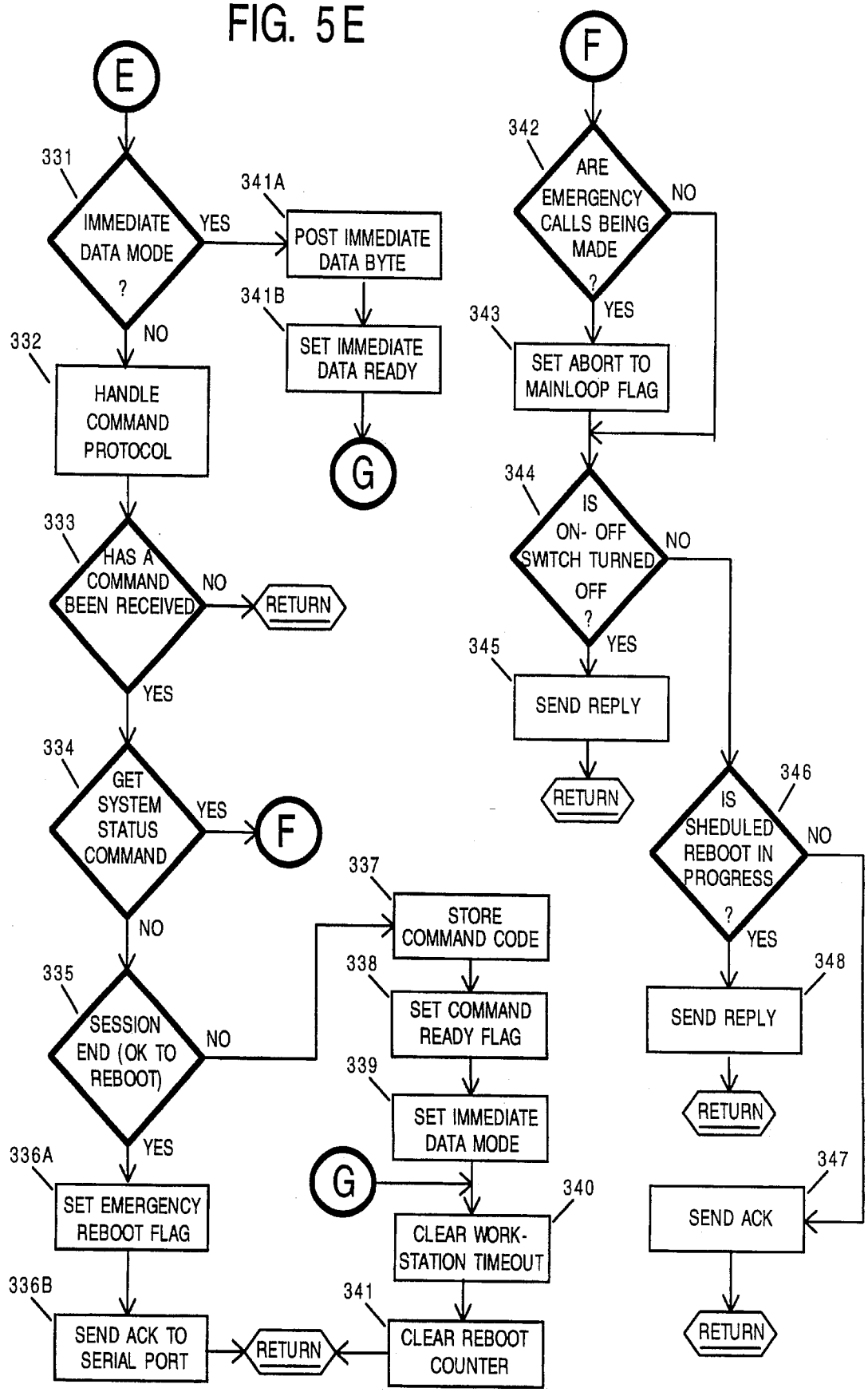

The Fast-Interrupt routine, detailed on FIGS. 5A to 5C, is responsible for generating sound and for monitoring sound. This is presently the 80C32's timer number 0 interrupt. Sound sampling occurs 12,800 times a second for sound monitoring. Sound generation occurs either 12,800 times a second for DTMF touch tone generation or 5,760 times a second for generating voice. When service is needed from the Fast-Interrupt routine, the Main-Loop routine (beginning on FIG. 5P) sets the necessary flags and data pointers indicative of the action to be taken and enables the Fast-Interrupt routine.

The fast interrupt begins at block 300. Initially, the Fast-Interrupt routine determines if Sound-Generation mode is requested 300A, which occurs when a Fail Safe prerecorded alert message needs to be spoken. If it is a Sound-Generation mode, a sound data byte is fetched from memory 301. This byte is tested 302 for an end of sound value (hex FF) meaning the alert message being spoken is complete. If it is an end of sound value, then the interrupt is disabled (turned off) 305 and processing exits from the Fast-Interrupt routine. Otherwise, the byte is output to the Digital-To-Analog converter 303, the sound data pointer is incremented 306 to point at the next data byte, and processing temporarily exits from the Fast-Interrupt routine to continue other task processing and automatically returns at the specified frequency until the message to be spoken is completed.

If it is not Sound-Generation mode 300A, the Fast-Interrupt routine checks the Loud-Sound-Detection-Mode flag 304 to determine if sound monitoring should occur. If this flag is off, processing continues at block 304A to check the next status flag. Otherwise, the routine samples sound via the Unit's microphone to determine if the sound present at that instant is above a fixed decibel level possibly indicative of a external alarm siren as set forth on FIG. 5B. A counter is updated for each sample taken 307, which tallies the number of samples occurring during one sound fluctuation. The relative frequency of the sound is derived from the number of samples tallied. A continuous high decibel sound typical of a fire, burglar or other alarm siren presently set to a value of 900 hertz or higher is herein referred to as a "loud sound". A known loud sound pattern produced over a sustained period of time, such as the sound produced by the specific smoke detector designated for use with the apparatus, is herein referred to as a "sonalert". An unknown loud sound pattern produced over a sustained period of time, which appears to be indicative of some form of fire, burglar or other alarm siren, is herein referred to as "loud sound" alert.

If a sound sample does not exceed an upper decibel threshold 308, the Was-Above flag is cleared. This flag keeps track of the previous state of sound to determine how frequently the sound level exceeds the upper limit. After this flag is cleared 309, processing exits from the Fast-Interrupt routine until the next Fast-Interrupt cycle. If the sound sample exceeds the upper limit 308 and, during the last cycle the sound sample also exceeded the upper decibel level 310, then processing exits from this routine until the next Fast-Interrupt cycle. Otherwise, the sound sampled has just crossed over the loud sound threshold, the Was-Above flag is set accordingly 311, and now it is time to examine the number of samples tallied since the last cross over occurred.

If the Interface program 8 has invoked this interrupt 312A, the tallied period count is returned to the Work Station via the serial port to the Interface program 312B. Then, the period count is cleared 315 to begin tallying for the next cross over period and processing exits from this routine until the next Fast-Interrupt cycle.

If the value contained in the period counter is less than 6 313A, this indicates a frequency of greater than 2500 hertz, which corresponds to the known sonalert for the specific smoke alarm siren, supplied with the apparatus. As a result, the counter for the smoke alarm is incremented 313B. If at the conclusion of the overall sampling session, which is currently set to 5 seconds, this counter represents over 90% of the total periods occurring 534A; smoke alerts are issued 534B by the Unit. Then, the period count is cleared 315 to begin tallying for the next cross over period and then processing exits from this routine until the next Fast-Interrupt cycle.

If the value contained in the period counter is 14 or greater 314A, it indicates a frequency of less than 900 hertz, which is not a loud sound. Then, the period count is cleared 315 to begin tallying for the next cross over period and then processing exits from this routine until the next Fast-Interrupt cycle.

If the value contained in the period counter is less than 14 314A, it indicates a frequency of greater than 900 hertz, which corresponds to a loud sound. As a result, the counter for the loud sound is incremented 314B. (Note: If at the conclusion of the overall sampling session, which is currently set to 5 seconds, this counter represents over 90% of the total periods occurring; then loud sound alerts are issued by the Unit, as set forth in blocks 535A and 535B of the Mainloop Routine). Next, the period count is cleared 315 to begin tallying for the next cross over period, and processing exits from the Fast-Interrupt routine until the next Fast-Interrupt cycle.

If the Loud-Sound-Detection-Mode flag is off 304, a send A/D to serial port flag is checked 304A. If this flag is set, it means that digitized sound data has been received via the Unit's microphone, which needs to be sent to the Work Station for storage on magnetic media with the Work Station. This digitized sound is captured from the microphone input 304B and each digitized sound byte received is sent to the Work Station via the serial port 304C. Then, processing exits from the Fast-Interrupt routine until the next Fast-Interrupt cycle.

If the A/D to serial port flag is not set 304A, a Pass-Thru flag is then tested 304E. If this flag is set, it means that a loud sound alert call has been placed and any sound present in the area where the Unit is installed must be passed from the Unit's microphone out directly to the telephone line so the person being alerted can listen to any sounds that are present during the alert call. The digitized sound is captured from the microphone input 304F then passed through to the phone line 304G. Then, processing exits from the Fast-Interrupt routine until the next Fast-Interrupt cycle.

If the Pass-thru flag is not set 304E, a Check-DTMFT-one flag is then tested 304H. If this flag is set, it means that any sound received over the phone line during the silence period between when alert messages are repeated needs to be captured and tested to determine if the person called has pressed and held a specific touch tone on their telephone, indicating that the call has been confirmed. Currently, the specific touch tone key used to confirm a call is an "*". To accomplish this process, a time counter 315K is incremented each time the Fast-Interrupt routine is invoked (i.e. 12800 times per second). Then any sound present is digitized 315L and compared to prior value present during the previous Fast-Interrupt cycle. If a sound direction flag indicates that the sound wave pattern has been increasing in value and the current value is greater than or equal to the previous value, then the waveform direction has not changed. Similarly, if a sound direction flag indicates that the sound wave pattern has been decreasing in value and the current value is less than or equal to the previous value, then the waveform direction has not changed. If either of these two conditions are met 315M, the time count is Set to zero 315S, then processing exits from the Fast-Interrupt routine until the next Fast-Interrupt cycle. Otherwise, the frequency of the changes is represented by the value in the time count accumulator. If the count is 16 or more, it is outside of the DTMF touch tone frequency range 315N and processing exits from the Fast-Interrupt routine until the next Fast-Interrupt cycle. Otherwise, one of 16 accumulators is located based on the time count 315P & 315Q, then this accumulator is then increment by 1 315R. An accumulator is also maintained to count up the number of changes that have occurred during an 1/10 of a second time interval. The specific values that are accumulated in the array during this 1/10 of a second interval are compared with a specific set of values expected that are indicative of an "*" touch tone sound. This comparison is done at block 704C in the Call-Phone Routine on FIG. 5AJ and block 677 of the Service Command routine starting on FIG. 5Z. Then, the time count is set to zero 315S, then processing exits from the Fast-Interrupt routine until the next Fast-Interrupt cycle. (Note: An alternative to this process (i.e. blocks 304H, 315K–315S) would be to incorporate a DTMF decoder chip (such as the MT8870 integrated circuit chip) on the Unit's circuit board.)

If the Check-DTMF-Tone is not set 304H, a Call Progress flag is then tested 304J. If this flag is not set, it means there are no tasks for the Fast-Interrupt routine to perform and processing exits from the Fast Interrupt routine until the next Fast-Interrupt cycle.

If this flag is set 304J, it means that an alert call has been placed and whatever sound is detected on the phone line must be digitized and returned to the Work Station for ultimate storage on magnetic media directly accessible to the Work Station, for purposes of recording whatever is spoken when a call is answered, as an audit trail to confirm the call was completed. Multiplexed with this sound data transmitted is call progress data which indicates whether sound is present or not. This call progress data is analyzed by the Work Station to determine the status of the call.

If the Check-DTMF-Tone is set 304J, the CP-Ready Flag is checked 315A. If Call Progress is available for transmission (as set at blocks 403 & 404), the CP-Ready flag is cleared 315AA and register 3 is set to zero as a default value 315B. If sound has been sensed on the phone line 315C (i.e. the CP-ON Flag is on), the register value is set to 1 315D. Otherwise, the register is left at it's default value 0. Then, the value in the register is transmitted to the Work Station 315E and processing exits from the Fast Interrupt routine until the next Fast-Interrupt cycle.

If the CP-Ready Flag is not set 315A, a byte of digitized sound data occurring on the phone line is read 315F. If the A/D value is less than 2 315G, the value is set to 2 315H to avoid being confused with 0 & 1 values reserved for call progress. This approach results in undetectable sound distortion and minimizes the amount of data needed to be transferred to the serial port to accomplish both call progress monitoring and sound recording data in a single data stream. Then, the digitized sound byte is sent to the serial port 315J and processing exits from the Fast Interrupts routine until the next Fast-Interrupt cycle.

The Serial-Interrupt (starting on FIG. 5D on block 316) communicates with the Work Station's Interface 8 program via a serial cable at a data transfer rate presently set to 56,700 baud. This routine is activated whenever a serial byte is received or the transmission of a byte is completed. This routine handles data sent from the Work Station including command protocols; digitized sound data; and data to be stored in the Unit's memory. Also, this routine supports a sound recording mode, where a voice alert message is spoken into the Unit's microphone, digitized, then sent to the Work Station via the serial port.

Initially, the Serial Interrupt routine tests whether a transmit buffer empty condition caused the interrupt 317. If so, the Transmit-Busy flag is cleared 319 indicating the port is ready to send another byte. This flag is set whenever any routine in Main-Loop processing sends a byte to the Work Station.

Then, the Serial-Interrupt tests to determine if a received character generated the interrupt 320. If a received character did not generate the interrupt, the processing exits from the Serial-Interrupt routine. Otherwise, if the light indicators are enabled 321, the serial activity indicator light is turned on 322. Normally, all light indicators are enabled except when the Unit is first turned on and all indicator lights are being sequentially tested.

Next, the routine determines which general category of data is being received from the serial port. There are four categories (i.e. modes) of data that can be received, namely digitized sound data (Play-Sound), data to be loaded in memory (Data-Load), Immediate-Data or Protocol-Data mode. Initially, a Protocol-Data mode is assumed and when complete and verified, the protocol data packet contains a valid command. This command is processed by the Main-Loop routine and is used as the basis for setting specific data modes, as well as other processing actions taken.

First, the Play-Sound mode 323 is tested. If the most recent command received has caused the Play-Sound mode to be set, the received byte is digitized sound data to be converted to audible form. Accordingly, it is written directly to the Digital-To-Analog converter 324, then a quarter second timeout is set 325 and processing exits from the Serial-Interrupt routine. (The Slow-Interrupt routine decrements this timeout 353 and should it reach zero 354, then the Play-Sound mode is terminated 355, meaning the sound data stream for the message has completed).

Second, the Data-Load mode 326 is tested. If the most recent command received has caused the Data-Load mode to be set, then the received byte is written to internal memory 327 and then the load pointer is incremented 328 to permit a block of data received to be processed. If the ending address is reached 329, indicating that all data for this block is loaded, then the Data-Load mode is terminated 330 and processing exits from the Serial-Interrupt routine. This process would be used, for example, to load a Fail Safe phone number into the Unit's non-volatile RAM.

Third, the Immediate-Data mode is tested 331. This mode handles one or two data bytes that accompany certain command as opposed to a block of data handled by the Data-Load mode discussed above. An example of an immediate command would be setting the number of delay seconds applicable to an adapter port where the immediate data following the command would be one byte containing the number of delay seconds. This mode is enabled whenever a command is received as the default mode so as to prevent the data from being treated as command protocol. After the command is processed, this mode is cleared in Main-Loop so that the system is ready for additional command protocol. When this mode is enabled, the data byte is stored for further processing 341A. Then, the Immediate-Data-Ready flag is set to alert the command processor that data related to a command has been received 341B; the Work Station timeout is cleared 340, indicating the Work Station linkage is OK; the reboot counter is cleared 341 indicating that no reboot attempts have occurred since the last time data was received from the Work Station; then processing exits from the Serial-Interrupt routine.

Finally, at this point in Serial-Interrupt routine processing, the data received must be a command protocol 332. The command dialogue consists of a multi-byte protocol. Without revealing actual byte values, each command processed must have the following sequence occur. First a Command-Start-1 byte is received whereby a Ready-1 byte is sent back. Then a Command-Start-2 byte is received whereby a Ready-2 byte is sent back. Then, the Command byte is received and echoed back to the Work Station. Then, a Command-Go byte is received at which point the command protocol is successful and a valid command has been received. If this sequence is not received then a NAK is sent back and the process repeated.

If a command has not yet been fully received 333, processing exits from the Serial-Interrupt routine until another byte is received.

If a command is correctly received 333, then immediate commands are checked for a system status command. If the command is Get-System-Status (e.g. status of on/off switch or scheduled boot in progress) 334 and emergency calls are being made 342, then the Abort-To-Mainloop flag is set 343. This flag will cause any phone call in progress to terminate. Then, if the Unit's on-off switch is off 344, this status is sent 345 to the Work Station and processing exits from the Serial-Interrupt routine. If a scheduled boot is in effect 346, then this status is sent 348 to the Work Station and processing exits from the Serial-Interrupt routine. Otherwise an Acknowledge-byte is sent 347 and processing exits from the Serial-Interrupt routine.

If a system status command is not received 334 and the command is session-end 335, indicating the end of a Work Station monitoring session, the Emergency-Boot flag is set 336A, an Acknowledge-byte is sent back 336B, and processing exits from the Serial-Interrupt routine. If the command is not a session end, the command code is stored 337, the Command-Ready flag is set 338, the Immediate-Data mode is set 339, the Work Station timeout is cleared 340, the boot counter is cleared 341, and processing exits from the Serial-Interrupt routine.

Figure 5F:
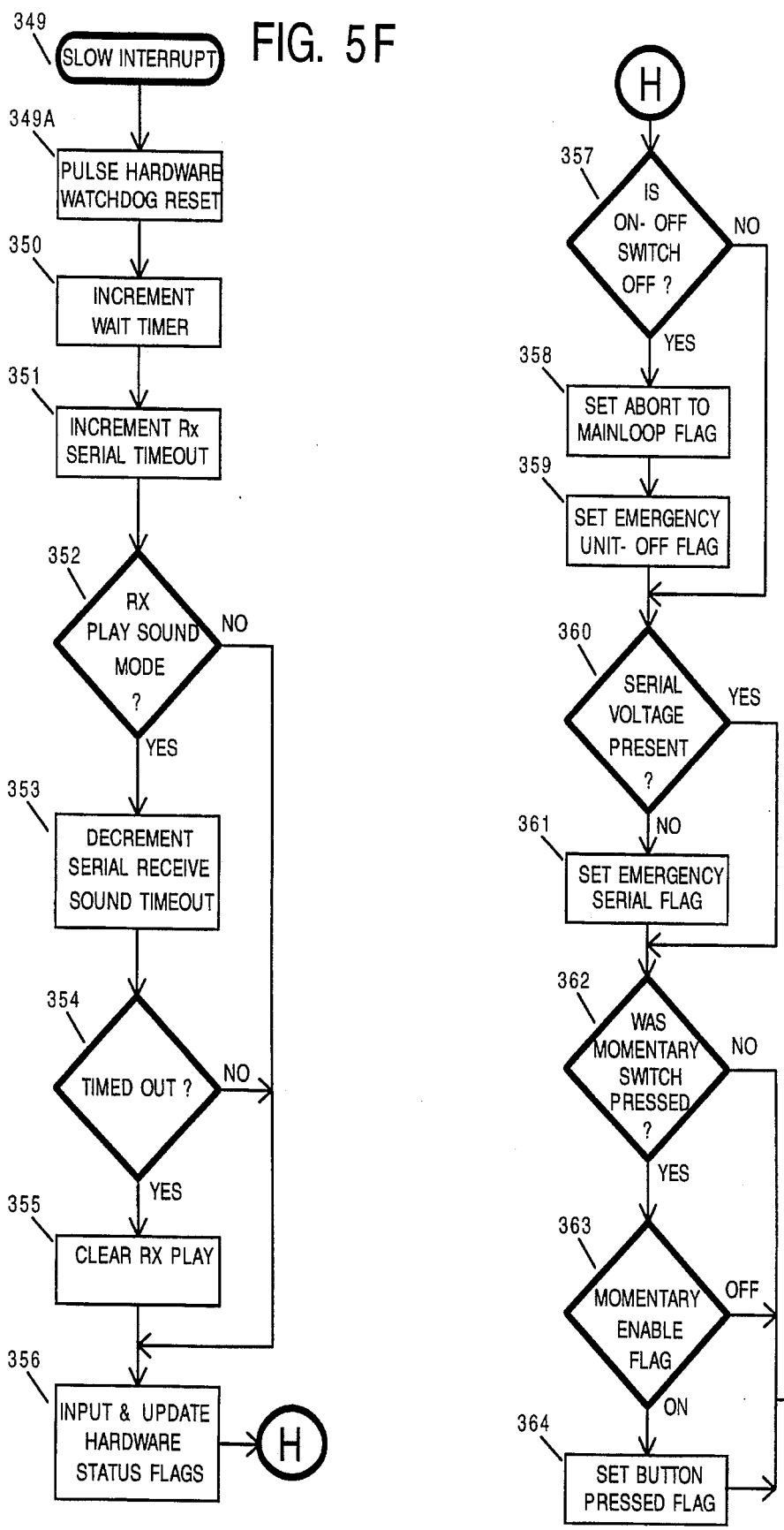
Figure 5G:
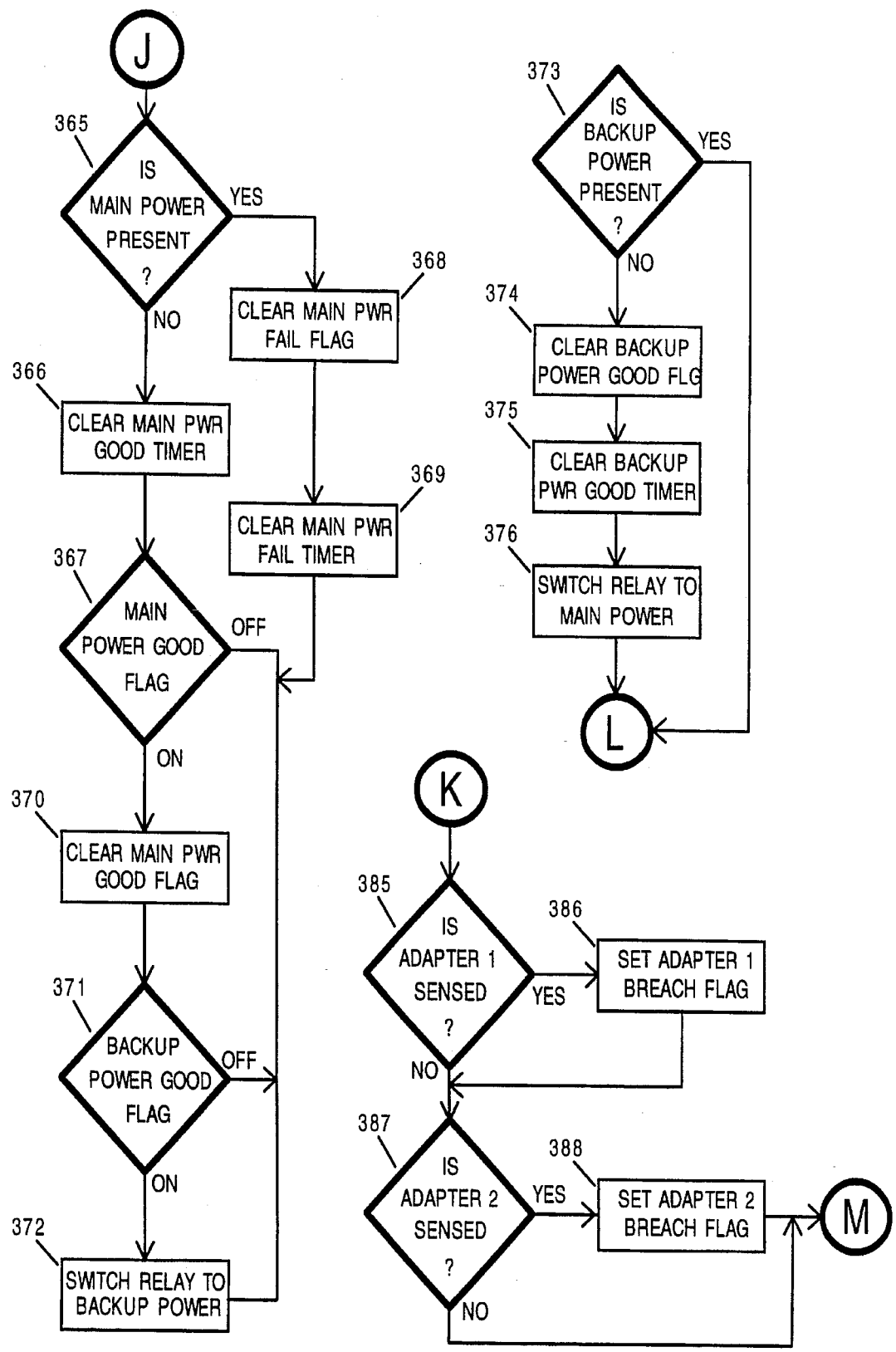
Figure 5H:
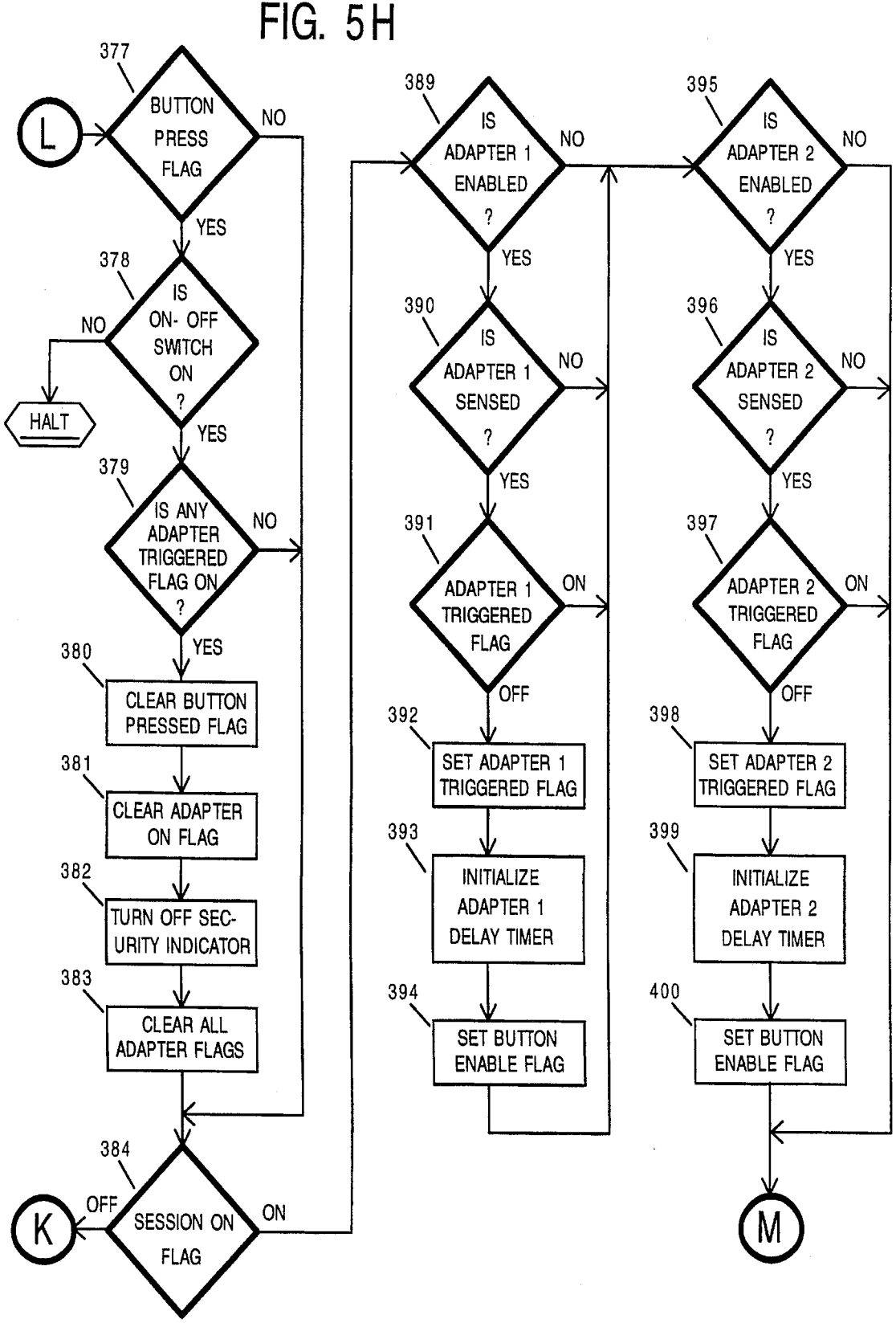
Figure 5J:
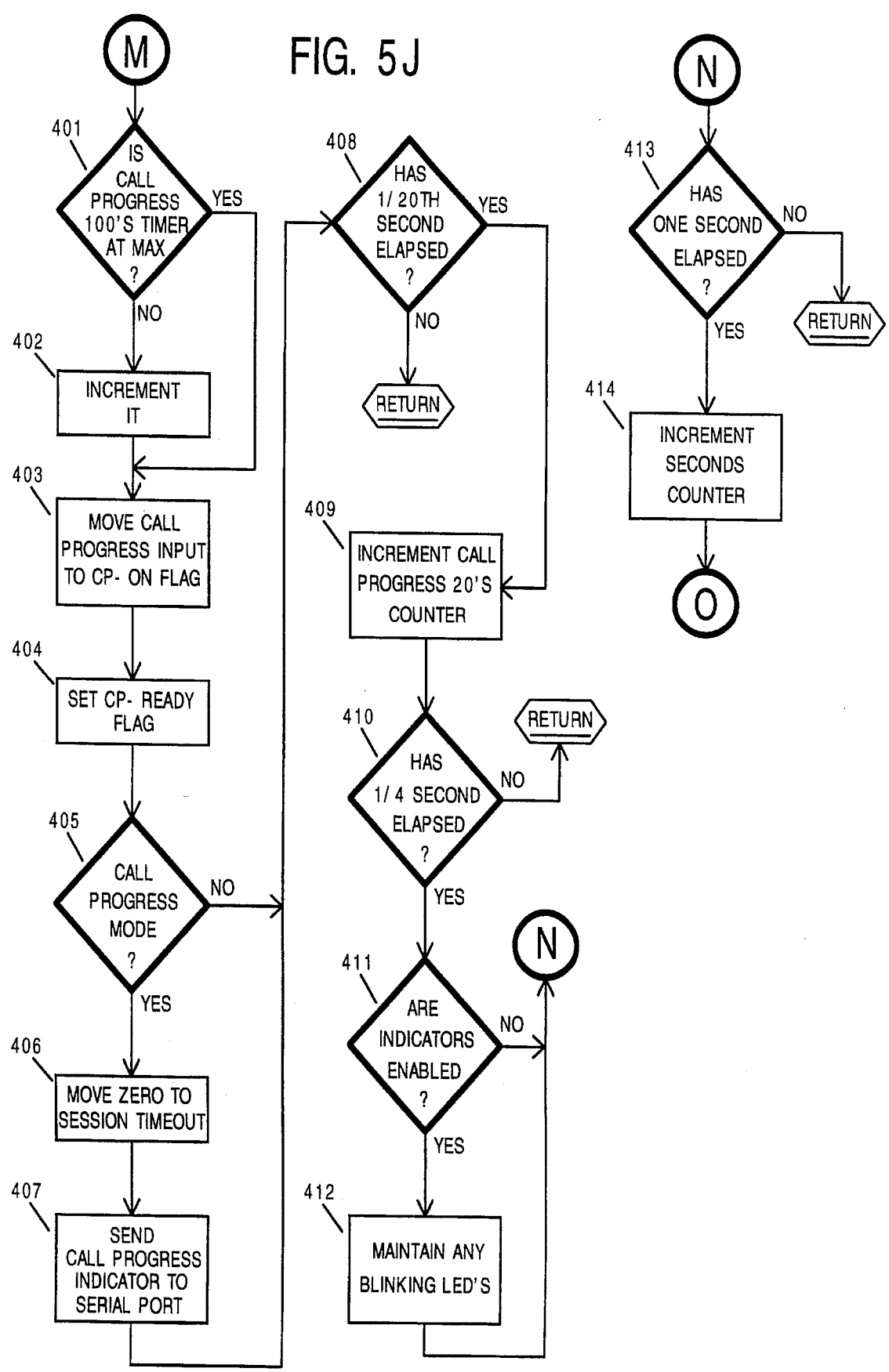
Figure 5K:
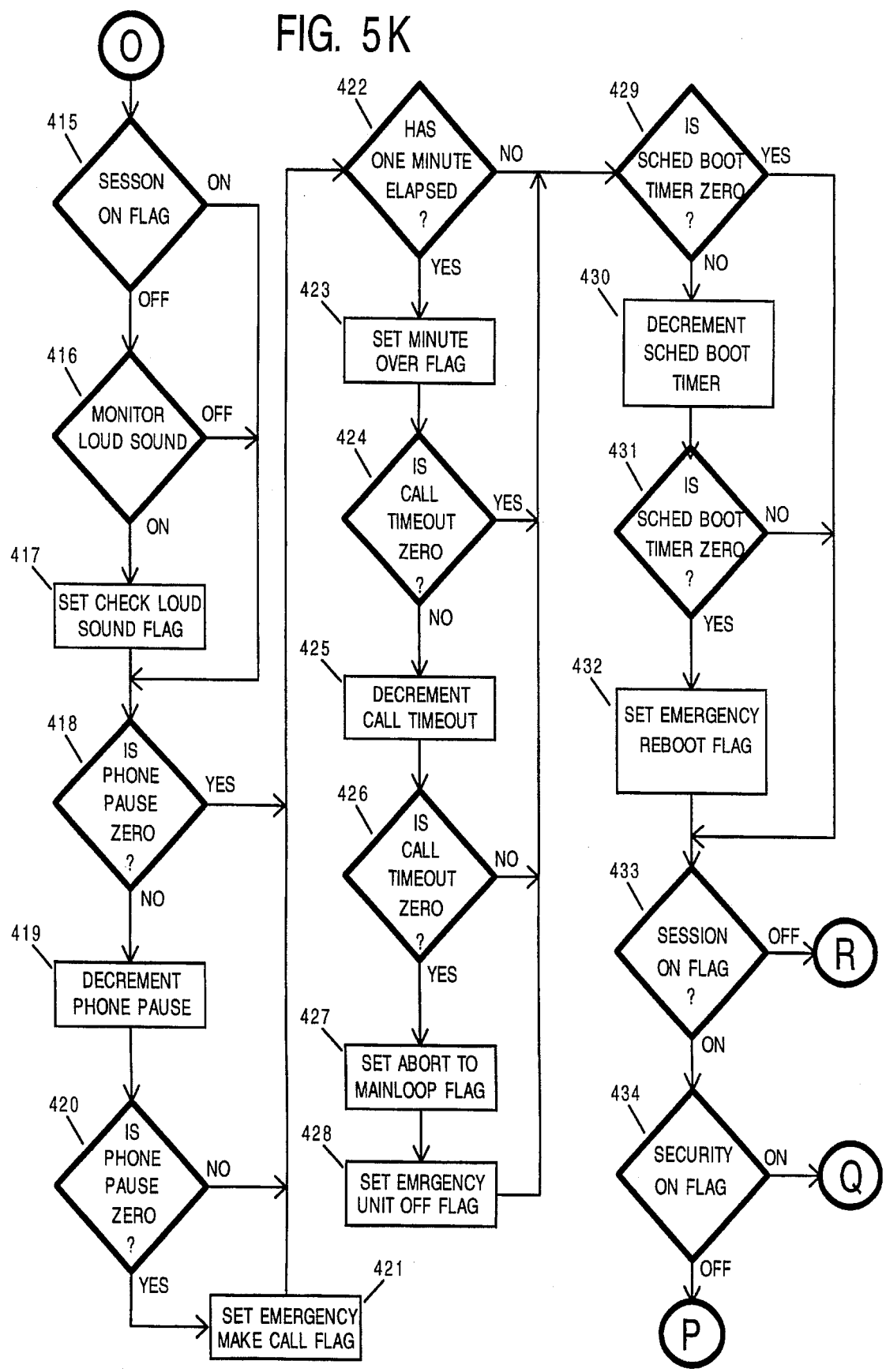
Figure 5L:
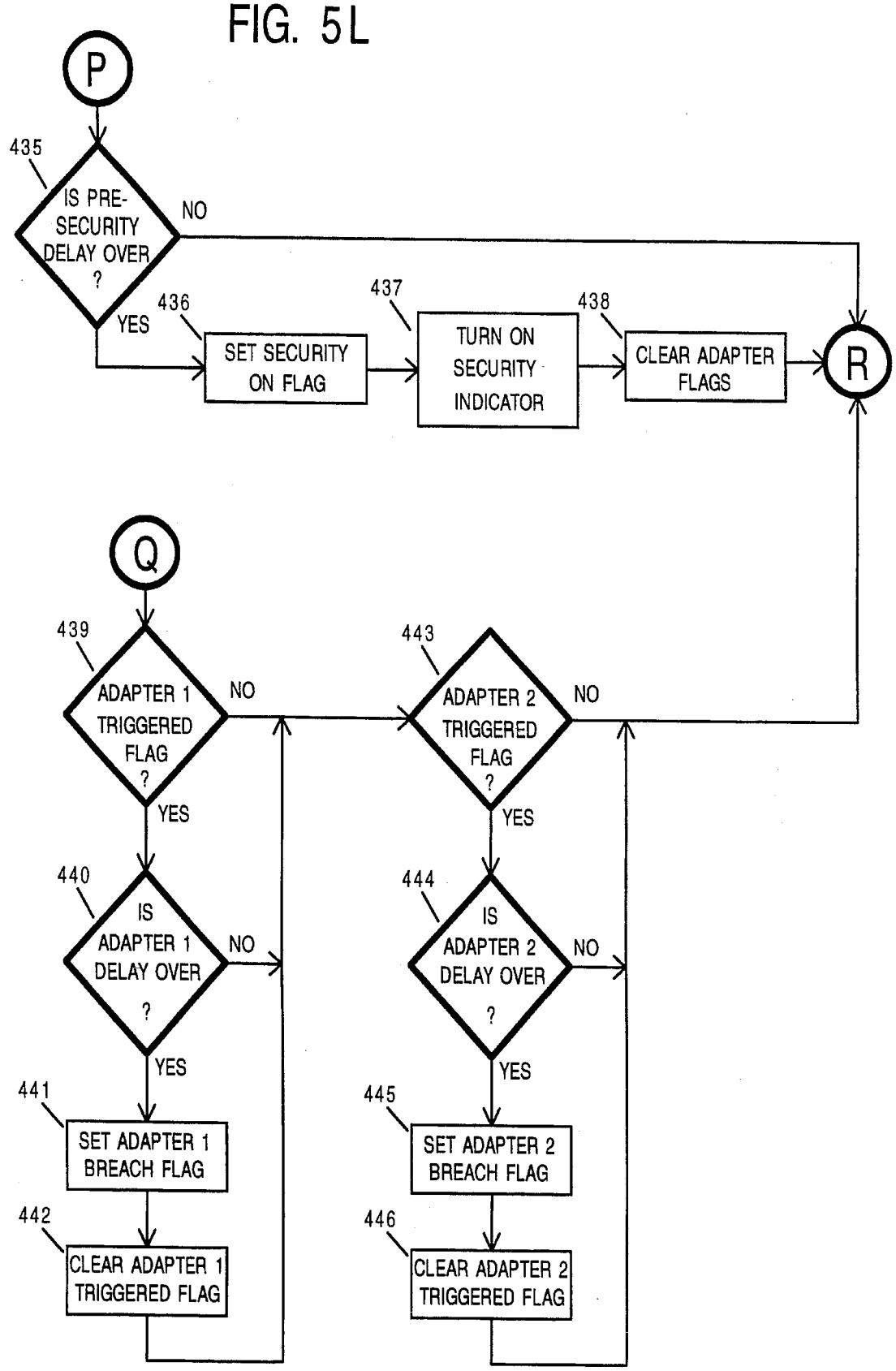
Figure 5M:
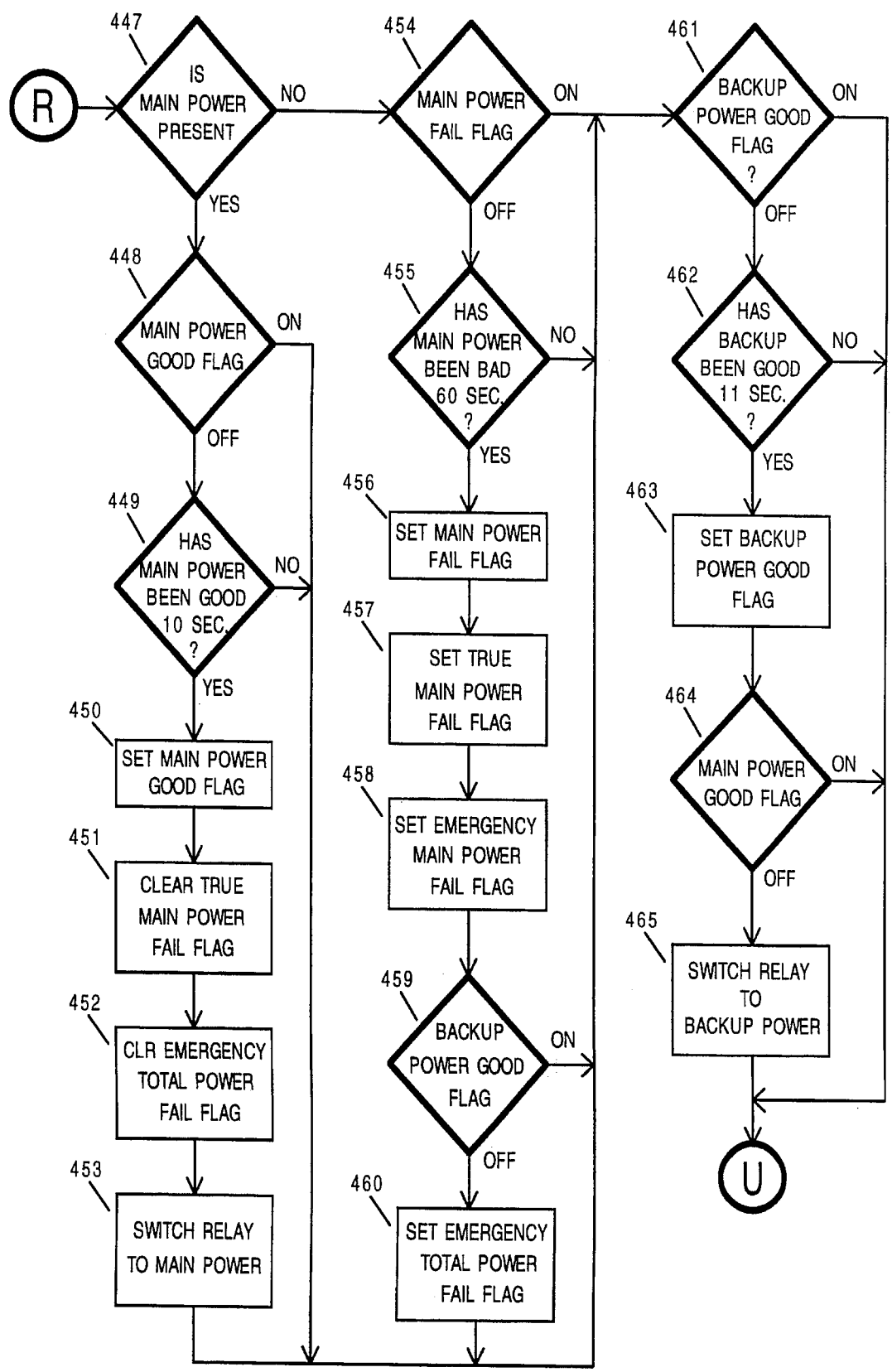
Figure 5N:
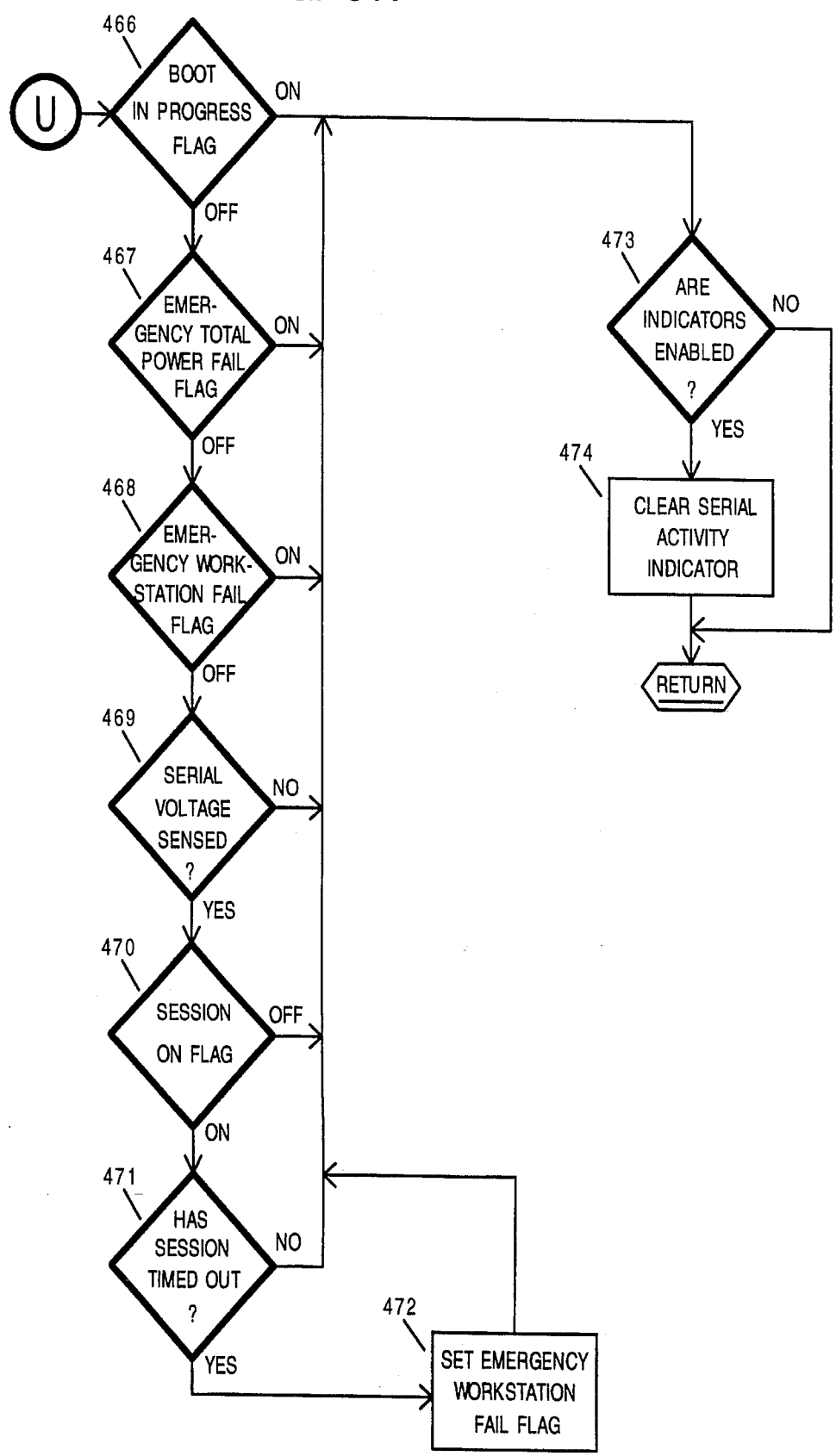

The Slow-Interrupt starting on FIG. 5F at block 349, is the 80C32's timer 2 interrupt and occurs at a fixed rate of 100 times a second. This interrupt is responsible for maintaining various system software timers; checking timeouts; monitoring hardware status circuit signals from AC power sources, adapters, switches, etc.; updating system status flags; and setting the Unit's front panel light indicators.

As the first processing step, this interrupt toggles the hardware reset circuit to prevent a reset 349A. If this toggling does not occur for a period currently set to 0.25 seconds, then the Unit is malfunctioning and the microprocessor will be automatically reset by the hardware circuit.

Then, a wait timer is incremented 350 which is used in timing various processing activities such as the two second delay in hanging up the phone. Next, the serial receive timeout is updated 351. If the serial receive Play-Sound mode is on 352, then this timeout is decremented 353 and should it reach zero 354 then the Play-Sound mode is terminated 355, indicating the message to be spoken is complete. If the serial receive Play-Sound mode is off 352, then processing continues at block 356. Hardware status signals, such as the status of AC power, are then input and their corresponding flags are set 356. Then, if the Unit's on-off power switch is off 357, the Abort-To-Mainloop flag is set 358 and the Emergency-Unit-off flag is set 359. (NOTE: limited processing still occurs within the Unit even when the Unit's on/off switch is in the off position). If the Unit's on-off power switch is on 357, then processing continues at block 360.

Next, if RS-232 serial voltage is not sensed 360, then the Emergency-Serial flag is set 361. Otherwise processing continues at block 362. If the momentary Watch Dog switch 18 is pressed 362 and the Momentary-Enable flag is on 363, then the Button-Pressed flag is set 364. Otherwise, processing continues at block 365.

If main power is present 365, then the Main-Power-Fail flag 368 and Timer flag 369 are cleared. Otherwise, when main power is not present the main power good timer is cleared 366. If the Main-Power Good flag is on 367 meaning main power has Just failed, the Main-Power-Good flag is cleared 370 and, if backup power is present 371, the power selection relay is turned on to switch to backup power 372.

If backup power is present 373, processing continues at block 377. If backup power is not present 373, the Backup-Power-Good flag is cleared 374, the backup power timer is reset 375, and the switch power selection relay is switched back to main power 376.

Figure 50:
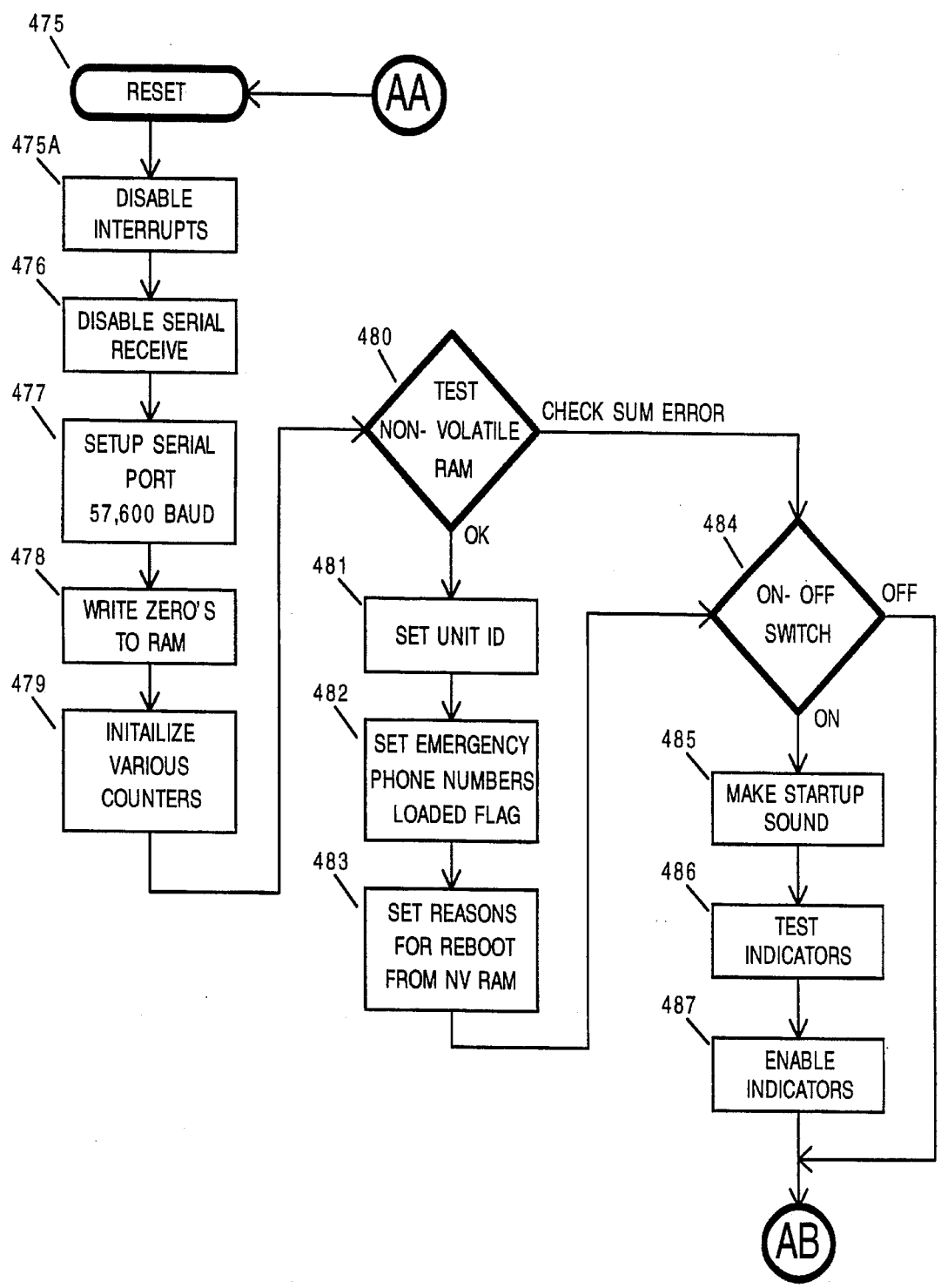

If the Button-Pressed flag is on 377 while the on-off switch is off 378, then processing halts and the hardware circuitry resets the microprocessor and performs the Reset sub-routine (see FIG. 50 starting at block 475). Otherwise, when the Button-Pressed flag is on and any adapter flags are on 379, indicating the adapter monitoring system is active, then the button pressed condition will clear the Button-Pressed flag 380, adapter mode 381, Watch Dog indicator light 382 and all adapter flags 383, which in effect disables all adapter monitoring. If the Button-Pressed flag is off 377 or the adapter flags are off 379, then processing continues at block 384.

Next, both adapter statuses are monitored, If the Monitoring-Session flag 384 indicates a monitoring session is not active, then Adapter-Breach flags directly reflect that adapter inputs 385, 386, 387, and 388 have triggered when a breach flag is on, the device attached to the adapter has detected an alert (i.e. breach) condition. This process permits testing of the adapter ports. Processing then continues at block 401.

Otherwise, if the Monitoring-Session flag is on 384; a device is installed on adapter 1 389; the device has detected an alert condition 390; and the Adapter-Triggered flag is off 391, meaning the device has just detected the alert condition; then the Triggered-Flag is set 392, the delay before alarm timer is initialized 393, and the Button-Enable flag is set 394, allowing the momentary button to clear the alert condition. Then, the same process is performed for adapter 2 in blocks 395–400.

Next, the call progress 100's timer is maintained. If it not at maximum 401, then it is incremented 402. This allows for 2.55 second maximum with 0.01 second resolution for call progress determination, as discussed in more detail in the Get-Call-Progress sub-routine beginning on FIG. 5AN. Then, the Call-Progress-On flag (i.e. CP-On flag) is updated from the call progress input 403 and the Call-Progress-Ready flag set 404. If call progress monitoring is in effect 405, the session timeout timer 406 is set to zero and the call-progress-on (or off) status is sent to the serial port 407. This permits the Interface program running on the Work Station 2 to monitor the progress of telephone calls placed by the Unit.

Next, the 1/20th second timer is tested 408. If 1/20th second has not elapsed, then processing exits from the Slow-Interrupt routine. Otherwise, processing continues at a 20 times per second rate and the call-progress 20's timer is updated 409. This timer allows call progress timing of a maximum of 12.75 seconds and is presently used for 5 and 10 second call progress timeouts.

Then, a quarter second timer is tested 410. If a quarter second has not elapsed, then processing exits from the Slow-Interrupt routine. Otherwise, if indicators are enabled 411, then any indicators which are set to blink (e.g. boot warning indicator) are turned on and off for a quarter second 412.

Next, a one second timer is checked 413. If one second has not elapsed, then processing exits from the Slow-Interrupt routine. Otherwise, a separate one second timer is updated 414, which is used for system delays.

Then, if a monitoring session is not active, as indicated by the Session-On flag 415, and automatic smoke (and other loud level sound) detection is enabled 416, a Loud-Sound flag is set 417. This will cause the Main-Loop routine to "listen" for 1/12th second for a sonalert signal or other loud sound level.

Next, if the phone pause timer (the pause between phone calls presently set to three seconds) is not zero 418, it is decremented 419 and, should it become zero 420, then the Make-Emergency-Alert-Call flag is set 421. This delay insures the phone system has ample time to clear the phone line and permits the Main-Loop routine (beginning at FIG. 5P) to continue processing during the pause period.

A 60 second timer is then updated and checked. If a minute has not elapsed 422, processing continues at block 429. Otherwise, a Minute-Over flag is set 423. This flag is used to announce two minute verbal alerts through the Unit's speaker.

Then, if the call-timeout timer (the maximum time for making a call when total AC power is lost and the system is running from the internal battery) is zero 424 (and thus inactive), processing continues at block 429. Otherwise, the call-timeout counter is decremented 425. If the timer has reached zero 426, then the Abort-To-Main-Loop flag is set 427, as well as the Emergency-Unit-Off flag 428, which will cause the Main-Loop routine to disconnect the battery from the Unit. (Note: Regardless of whether one minute has elapsed or not, interrupt code processing continues at once a second.) Otherwise, processing continues at block 429.

If the scheduled boot timer is not zero 429, then the timer is decremented 430. Otherwise, processing continues at block 431. If the scheduled boot time is zero 431, the Emergency-Boot flag is set 432, which will cause the Main-Loop routine to initiate scheduled reboot processing. Otherwise, processing continues at block 433.

If a monitoring session is not active 433 (flag off), processing continues at block 447. Otherwise, if the Security flag is on 434, and the adapter user specified monitoring delay period is over 435; then adapter port monitoring is activated. In this situation, the Security flag 436 is set, the adapter indicator is turned on 437, and all adapter flags are reset 438. If the Security flag is off 434, the Adapter-Triggered flag is on 439, and the delay is over 440; then the Breach flag is set 441 and the Triggered flag 442 is cleared. Then, the same procedure is performed for adapter 2, as shown in blocks 443 through 446.

At this point in Slow-Interrupt processing, AC power testing is initiated. If main power is present 447 and the Main-Power-Good flag is on 448, main power is considered good, so processing continues at block 461. If the Main-Power-Good Flag is off 448, but power has not been present for a sustained period of time 449, main power is not yet considered good and processing continues at 461. Otherwise, power has just been on long enough (e.g. 10 seconds) to be considered good. This approach is designed to prevent erratic power toggling in unstable power situations. If main power has been just restored for required period of time 449, the Main-Power-Good flag is set on 450, the True-Power-Fail flag is cleared 451, the Emergency-Total-Power-Fail flag is cleared 452, and then the power selection relay is switched to main power 453, and processing continues at 461. The Main-Power Good flag reflects any situation where the Unit is relying on main power as the source of AC power. The True-Power-Fail flag reflects when alerts should be issued after main power has failed or been restored for a sustained period of time. So, for example, in a case where a brief power failure occurs, the Power-Good flag would be off, but the True-Power-Fail flag would remain off (i.e. unaffected).

If main power is not present 447, the Main-Power-Fail flag is off 454, and main power has been off for a sustained period 455, currently set to 60 seconds, then the Main-Power-Fail flag 456, the True-Power-Fail flag 457, and the Emergency-Main-Power-Fail flag 458 are set. If backup power is not present 459, then the Emergency-Total-Power-Fail flag is set 460. In either event, processing continues at block 461. When set, any emergency flag causes Main-Loop to act on the emergency situation detected and then clear the related emergency flag.

If the Main-Power-Fail flag is on 454 or main power has not failed for more than a sustained period (e.g. 60 seconds) 455, it means the alert status of main power has not changed and processing continues at block 461.

At 461, the existence of a backup power source is determined by checking the Backup-Power-Good flag. If the Backup-Power-Good flag is on 461, it means backup AC power is present and processing continues at 466. If backup power has not been good for more than 10 seconds 462, backup power is considered unavailable and processing continues at 466. Otherwise, if the Backup-Power-Good flag is off 461, but has just been made available for a sustained period of time 462, currently set to 11 seconds, then the Backup-Power Good flag is set on 463, so that backup power can be used when needed. If the Main-Power-Good flag is not on 464, then the power selection relay is switched to backup power 465 because backup power is now needed. Normally, backup AC power is installed when the Unit is installed and switching occurs immediately when main power fails, as described in blocks 371 and 372; as opposed to installing backup power after main power has failed, as described in blocks 462–465.

At this point in Slow-Interrupt processing, the Work Station timeout is tested to determine if the Work Station may have failed. This test is only performed if there is not a boot in process 466, not a total power failure 467, not a Work Station failure 468, not a serial voltage loss 469; and a monitoring session is active 470. Then, if the Unit has not received a command from the Work Station for a sustained period of time, currently set to 90 seconds 471; then the Emergency-Work-Station-Fail flag is set 472.

The final step in Slow-Interrupt processing is to test if the front panel indicator lights are enabled 473 and if so, clear the serial activity indicator 474. This approach causes the serial activity indicator light on the front panel to flash as bytes are received during Serial-Interrupt processing.

The Unit Reset sub-routine beginning on FIG. 5O at block 475 is invoked when a hardware reset occurs or when the on-off switch is turned from off to on. (Note: limited processing still occurs within the Unit even when the Unit is turned off, as long as AC power is being supplied into the Unit.) This reset code first disables all interrupts 475A and the 80C32 serial reception hardware 476. It then sets up the serial port 477 to a baud rate presently set at 57600. Then 80C32 RAM is initialized 478 and certain timing counters are set 479 such as the 20 times a second, 4 times a second, and once a second counters. Then, non-volatile ram (which primarily holds emergency phone numbers) is checked for validity 480 by comparing the numeric byte value of data contents of non-volatile to a pre-set check sum. If the check sum is not valid, processing continues at block 484. If the check sum is valid, then the Unit number is loaded 481 and the Emergency-Phone Numbers flag is set 482. Also, the reasons for booting (stored in non-volatile ram) is set 483. If the on-off switch is off 484, Main Loop routine processing begins at 488. If the on-off switch is on 484, the Unit beeps 485 and the indicators go through a test cycle 486 to allow users to visually check that the indicator lights on the front panel of the Unit are working properly and then the indicators are enabled to reflect the actual status 487. Control then passes to the Main Loop routine 488.

The Main-Loop routine (beginning on FIG. 5P at block 488) is the main process which is constantly executing to service processing requests and other emergency conditions which occur. Main-Loop first clears the Abort-To-Mainloop flag 488A and the Boot-In-Progress flag 489. The Abort-To-Mainloop flag is checked by various routines and, if set, causes the routine to abort and return to the start of Main-Loop processing. This flag is set, for example, if the Unit's on/off switch is turned off.

Then, if the Emergency-Unit-Off flag is set 490, indicating that the on-off switch is off, it waits for the switch to be turned on 491 and then executes the Reset sub-routine (FIG. 5O, beginning at block 475).

Otherwise, when the Unit's on/off switch is on, Main-Loop tests to determine if a command has been received 492 and if so, calls a Service Command Sub-routine 493 (FIG. 5Z at connector AS) which services commands, after which it clears the Immediate-Data-Mode flag 494, Measures the battery voltage and updates the battery indicator 494A.

If the Emergency-Total-Power (lost) flag is not set 495 and the Ready-State flag is not set 496A, it means the Unit is not ready to process alerts, so various emergency flags that may be set by the Slow-Interrupt routine are cleared, as well as the reboot reason code, and processing loops back to 490 waiting for a monitoring session to begin. In this case, the Unit has just been turned on and has not been initialized for processing by the Work Station attached to the Unit.

When the Emergency-Total-Power (lost) flag is set 495, it means the Unit is running off its internal battery and must make automatic alert phone calls for a limited period of time (using power from the Unit's internal battery) without any processing support from the Work Station. If the Unit is not in a ready state 496B, the Unit turns itself off 504 to conserve battery power. Otherwise, a maximum time is set 498 for phone calls to be made and a total-power-fail-code is set as the reason for booting 499 (when power is restored) and this code is saved in nonvolatile RAM 500. The total power failure message is then added to the queue 501 using the Add to Queue sub-routine (FIG. 5AR at connector BQ), then alert calls are made 502,503 using the Make A Call sub-routine (FIG. 5AS at connector BU. (Note: When the timeout is reached (currently set to 20 minutes), no phone numbers are loaded in non-volatile ram, or all phone calls to be placed have been successfully completed; the Make-a-call sub-routine 502 will return a flag indicating there are no more calls, after which the Unit turns itself off 504 to prevent it's internal battery from completely discharging).

Whenever an alert situation(s) is encountered by Main-Loop requiring calls to be placed by the Unit, without support from the Work Station, the alert calls are attempted once for the alert that has occurred. Any uncompleted calls are stored in a queue to retry again during the next Main-Loop cycle. This approach insures that processing is not locked up by continually attempting to complete any uncompleted phone call.

If the Ready-State flag is on 496A, then the Unit will process other emergency conditions (besides total power failures). Different sub-routines are executed depending on whether a monitoring session is active 505, 506 (Proc Session, FIG. 5S at connector AF) or job tracking is active 507, 508 (Proc Job Tracking, FIG. 5AT at connector BW). If neither a monitoring session or job status tracking session is active, then a Non-Session sub-routine 509 is processed (FIG. 5T at connector AG.) Then, if the Emergency-Make-Call flag is set 510 the next phone number in the uncompleted call queue will be called 511 using the Make A Call sub-routine (FIG. 5AS at connector BU.).

If there are no more calls to be made 512, then the phone queue is cleared 514. Then, the Clear-Phone-Queue sub-routine (FIG. 5AR at connector BR) is invoked 515. Next, the Emergency-Work-Station-Failure flag is tested 515A. If the flag is set, it means the Work Station has failed during a monitoring session and could not be re-activated after three boot attempts by the Unit. Accordingly, no further monitoring will occur 514B by the Unit until the serial linkage is re-established and another monitoring session is initiated and processing loops back to beginning of the Mainloop Routine 488. Otherwise, processing continues at block 516.

If the Make-A-Call sub-routine 511 returns that there are more calls pending 512, the phone-pause timer is set for 3 seconds 513 to insure the phone system is given ample time to go on-hook before another call is attempted.

If the smoke or loud sound level flags are set (see blocks 534B and 535B) 516 and a monitoring session is not active 517, an applicable verbal announcement is made via the Unit's speaker 518. Then, the smoke alert/loud sound level dialing strings will be added to the phone queue via invoking the Add-To-Phone-Queue sub-routine 522.

Next, the emergency smoke/loud sound alert flags are cleared 523 and processing continues at 524.

If a monitoring session is active 517, smoke detection or other loud sound level detection processing by the Unit occurs only when a smoke detection (i.e. loud sound level) request is received from the Work Station. So, the emergency smoke/loud sound alert flags are cleared 523 and processing continues at 524.

The Emergency-Boot flag is then tested 524. If this flag is set, emergency flags will be cleared 525, power to the Work Station will be cut briefly 526 and then processing will loop back to the beginning of the Main-Loop routine 488.

If the Emergency-Boot flag is off 524, the Emergency-Work-Station-Failure flag is tested 527. If the flag is set 527, then this message is added to the phone queue 528 using the Add to Phone Queue (FIG. 5AR connector BQ) and processing loops back to the Main-Loop routine 488.

If the Emergency-Work-Station-Fail flag is off 527, a monitoring session is not active 530, a loud sound level (e.g. smoke) has not yet been detected 532, and a telephone call is not in progress 531; then the Unit listens for a sonalert of a smoke detector 533 or other loud sound level using the Unit's internal microphone 22. If a loud sound level is detected, the microprocessor analyzes the sound detected to determine which device (e.g. smoke detector) has been detected. If the Sonalert is detected 534A or Loud Sound detected 534B, then the respective Emergency flags are set at 534B or 535B. Next, processing loops back to the Main-Loop routine 488.

Figure 5P:
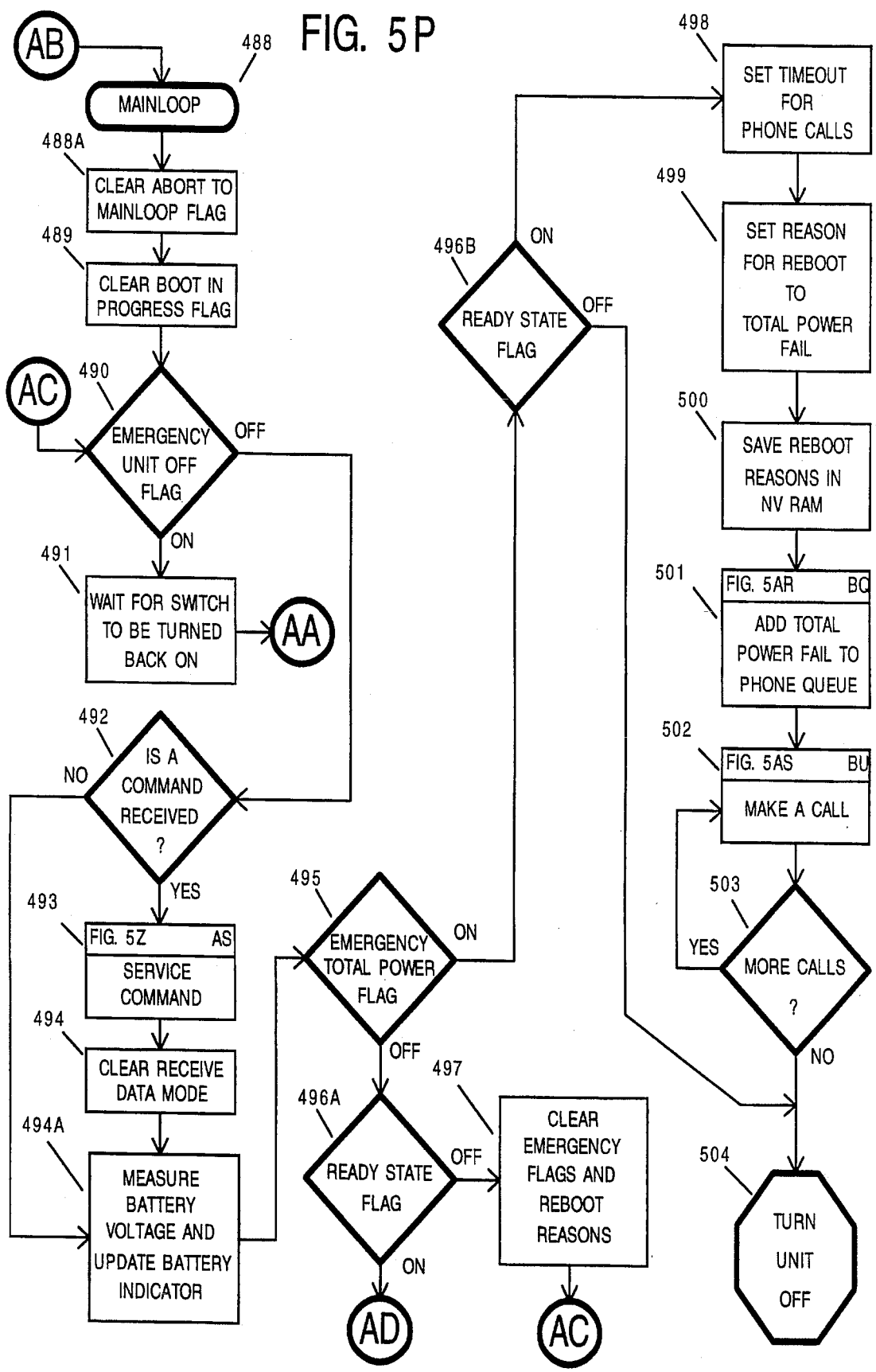
Figure 5R:
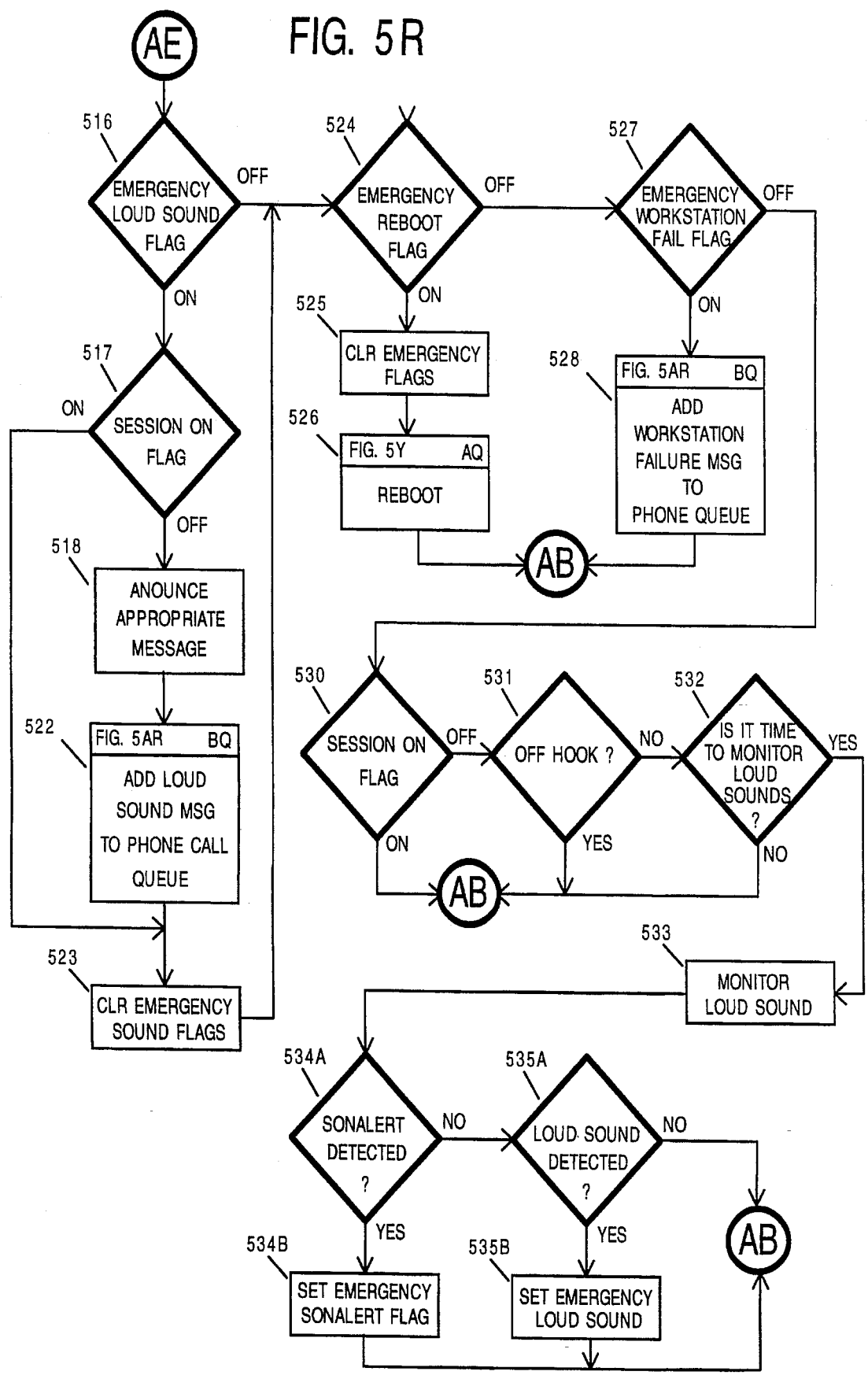
Figure 5S:
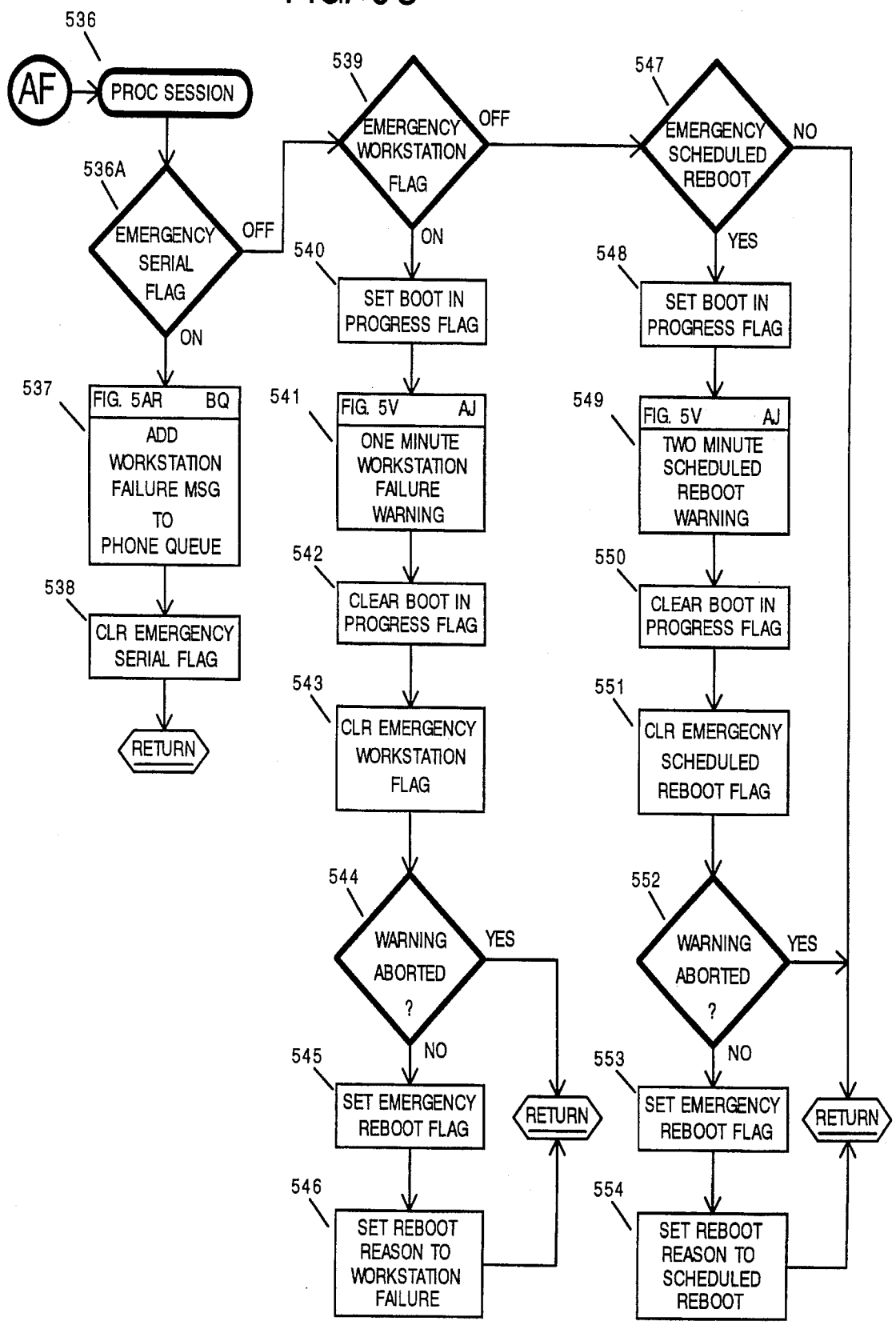
Figure 5T:
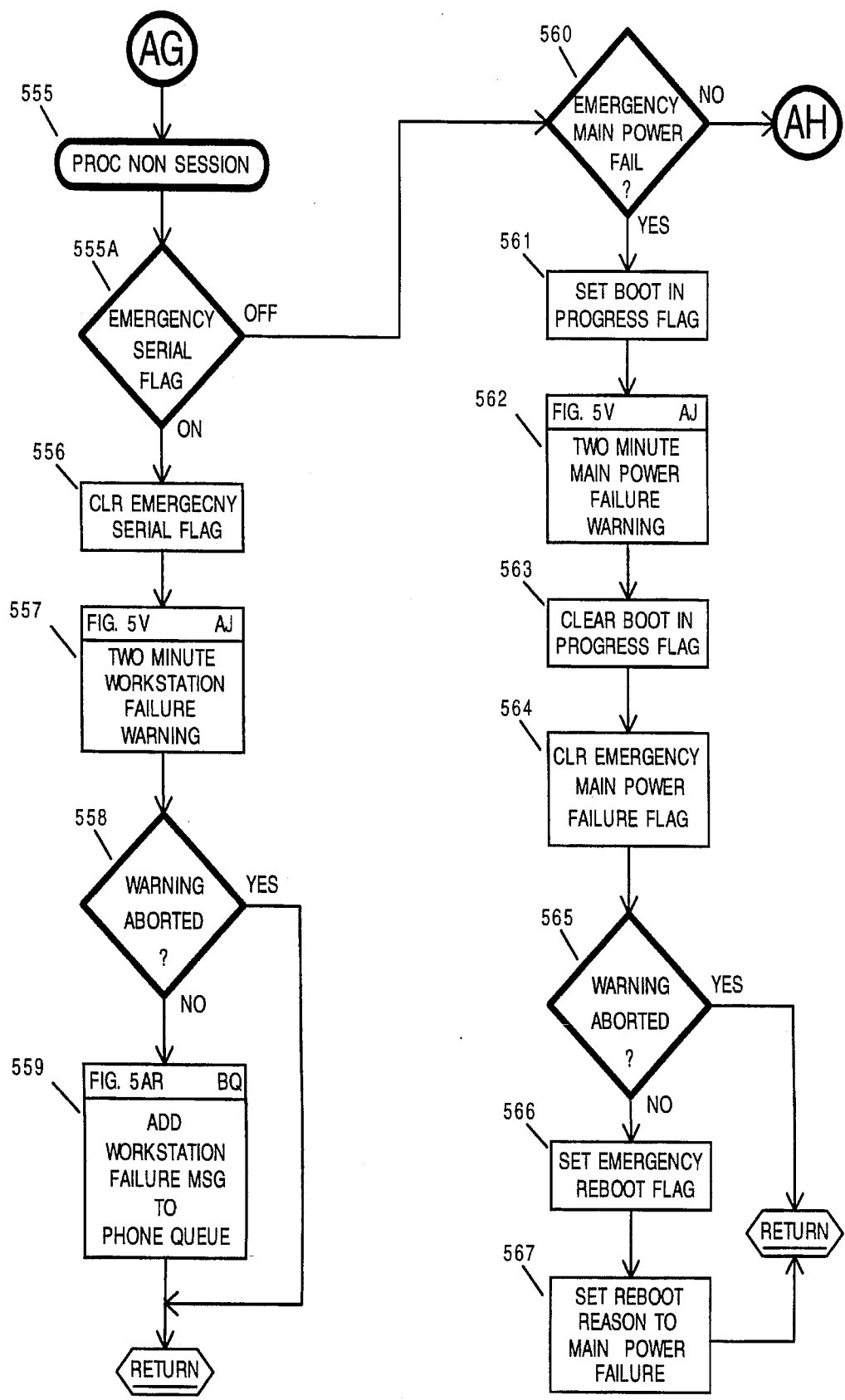

FIG. 5S, details the Proc-Session sub-routine. This sub-routine handles three emergency alert situations when a Work Station monitoring session 8 is active. A main power failure emergency condition is handled by the Work Station's Monitoring program 8, when a monitoring session is active.

First, if the Emergency-Serial flag is set 536A, indicating that no voltage is sensed on the serial port, then the Work Station failure alert message code is added to the phone queue 537 using the Add to Phone Queue subroutine (FIG. 5AR connector BQ), the Emergency-Serial flag is cleared 538, and Proc Session sub-routine processing returns to the calling program.

Second, if the Emergency-Work Station flag is set 539, indicating that no serial activity has occurred for a sustained period of time currently set to 90 seconds (meaning the monitoring session appears to be locked-up), then a boot sequence is started. This sequence begins by setting the Boot-In-Progress flag on 540 and executing the one minute Work Station failure Do-Warning sub-routine 541 (described beginning on FIG. 5V connector AJ). Next, the Boot-In-Progress flag 542 and the Emergency-Work Station Flag 543 are cleared. Then, if the warning was not aborted 544 (by the reception of a command from the Work Station); the Emergency-Boot-Flag 545 is set on, the reason code for the boot (i.e. Work Station failure) is stored in non-volatile RAM 546, and sub-routine processing returns to the calling program.

Figure 5V:
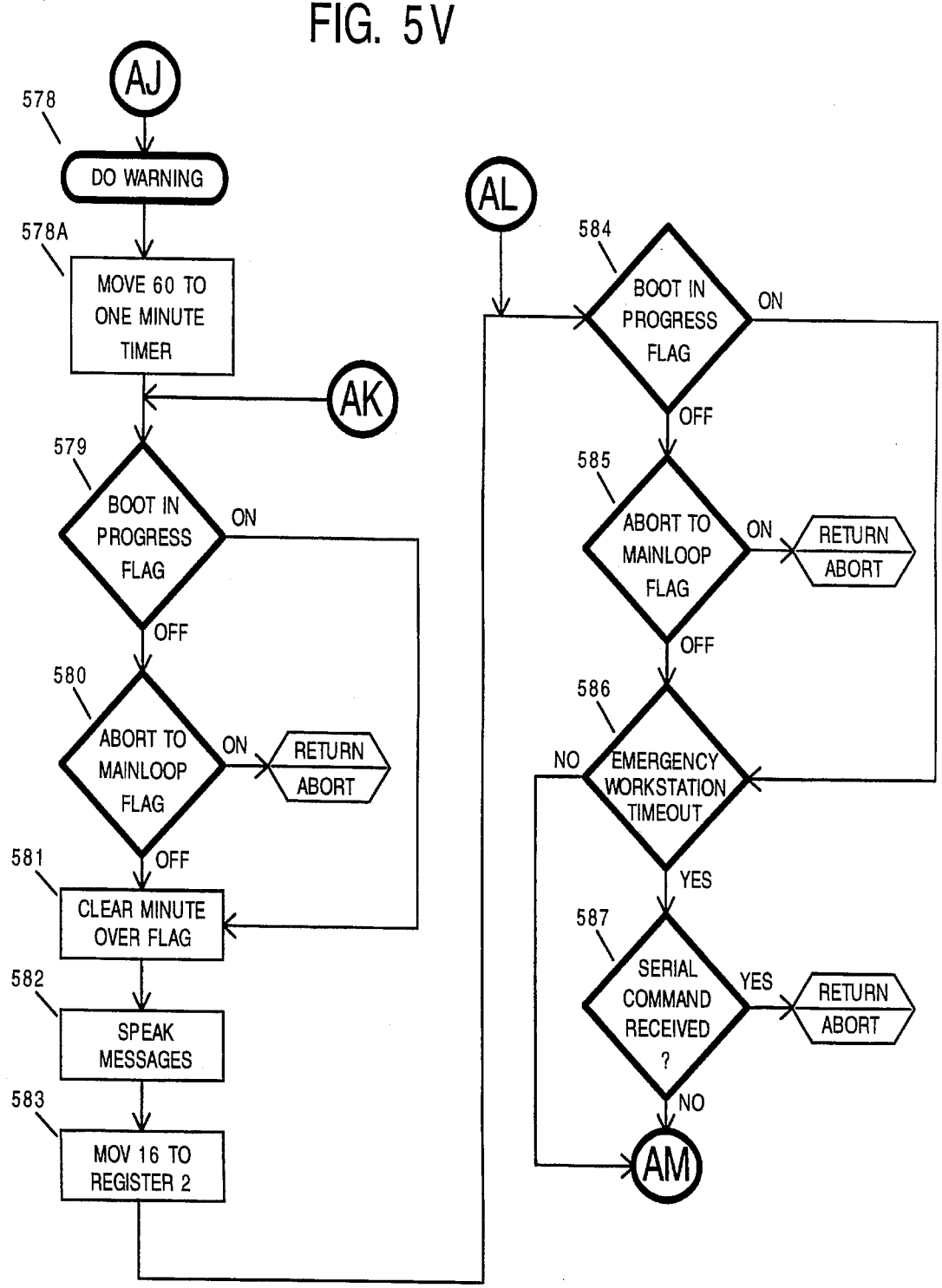
Figure 5W:
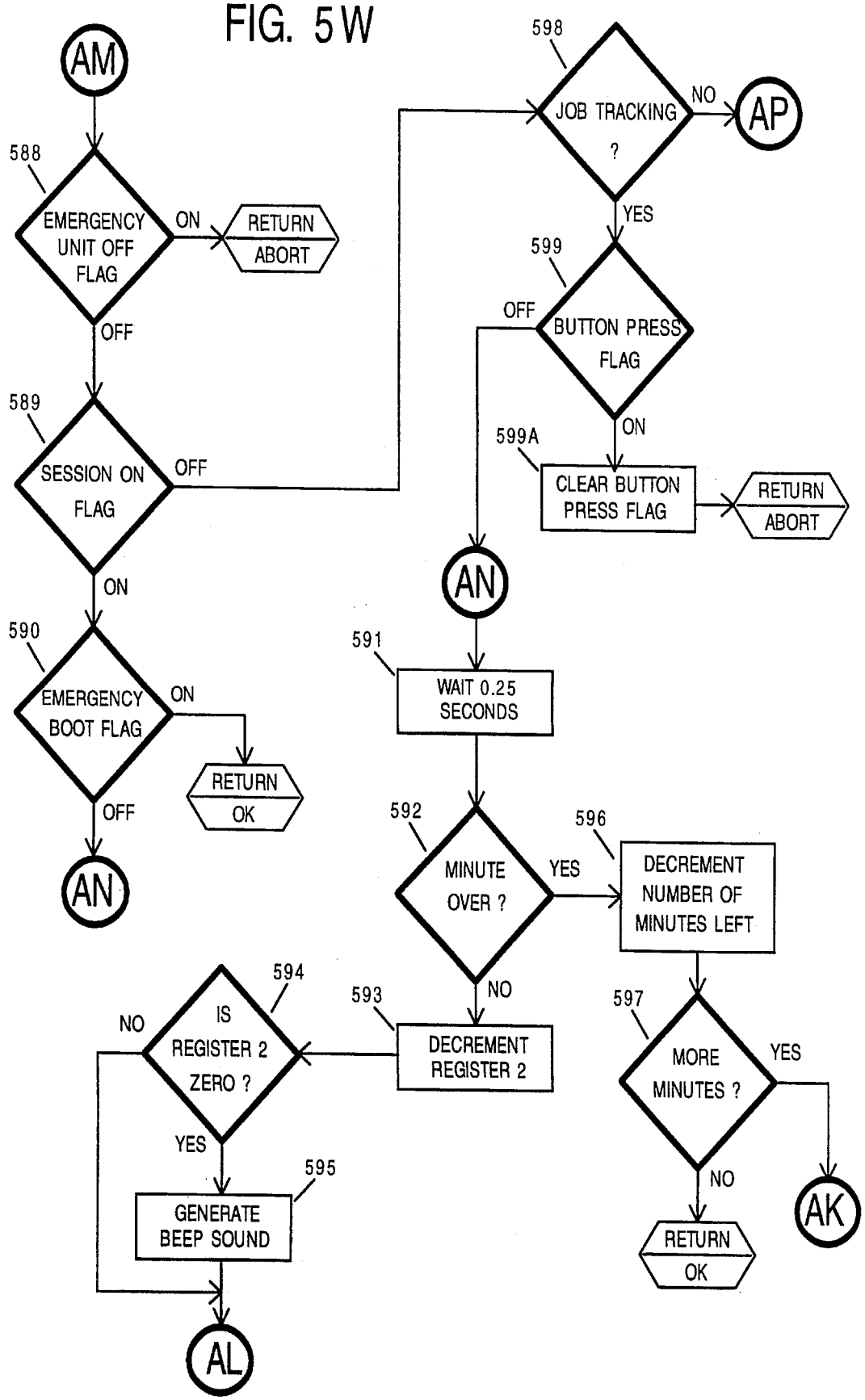
Figure 5X:
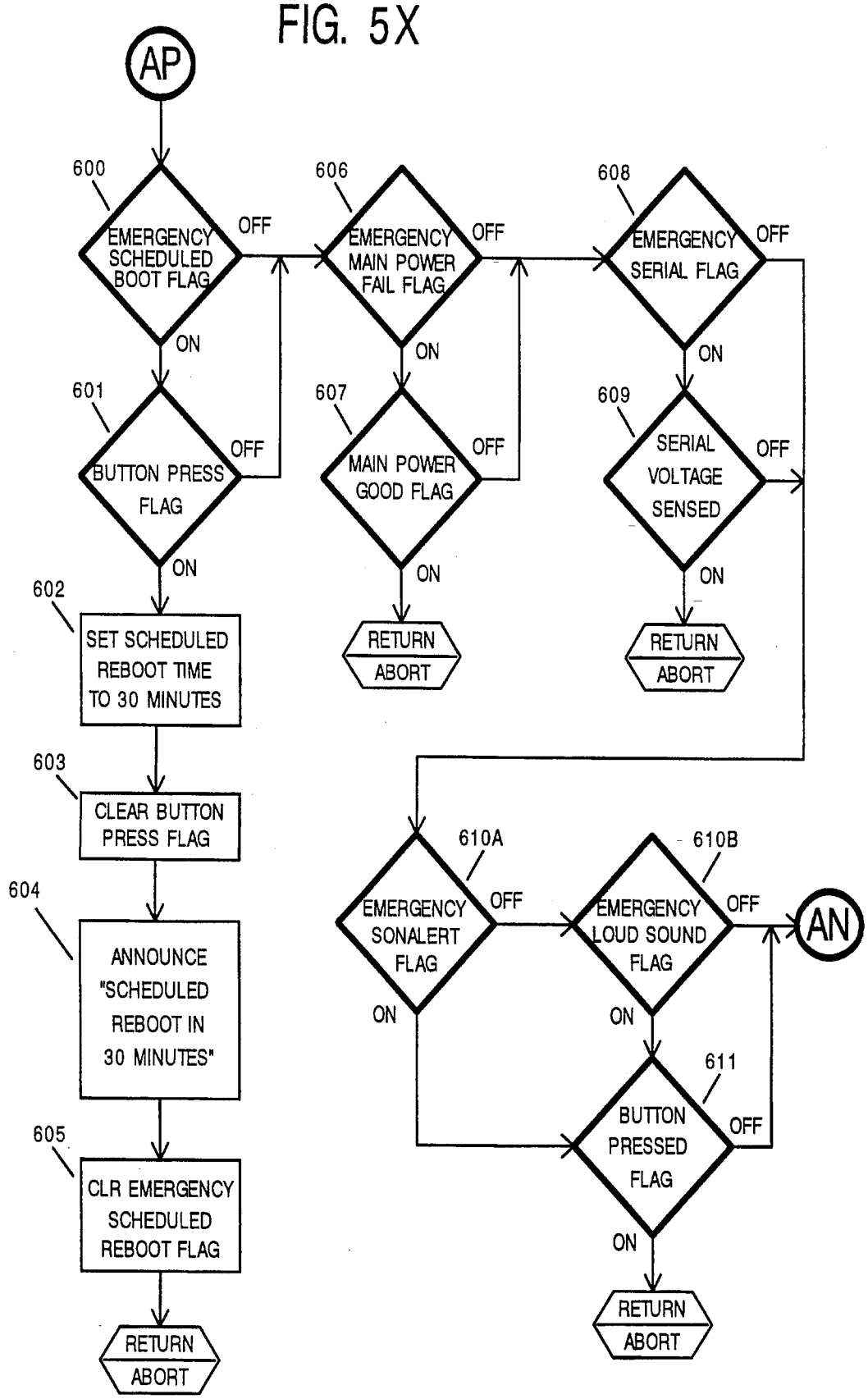

Third, if it is now time for a scheduled boot to occur 547, then the Boot-In-Progress flag 548 is set and a two minute non-verbal, flashing boot indicator light warning 549 is initiated using the Do Warning sub-routine at FIG. 5V connector AJ. Next, the Boot-In-Progress flag 550 and the Scheduled-Boot flag 551 are cleared. If the warning was deferred 552 (by the Watch Dog push button being pressed), thirty minutes are added to the scheduled boot time and the boot is deferred. Otherwise, the Emergency-Boot flag is set on 553 and the reason code for the boot 554 (i.e. scheduled boot) is stored in non-volatile RAM, and processing returns to block 506.

The Proc-Non-Session sub-routine begins on FIG. 5T at block 555 handles certain emergency flags in similar fashion as the Proc-Session sub-routine FIG. 5S block 536. Processing for this sub-routine occurs only when a Work Station monitoring session 8 is not active.

First, if the Emergency-Serial flag is set 555, indicating that no voltage is sensed on the serial port, the Emergency-Serial flag is cleared 556, a two minute Work Station failure announcement is made through the Unit's speaker 557 using the Do Warning sub-routine at FIG. 5V connector AJ. If voltage is not restored within the two minute period 558, then the Work Station failure alert message code is added to the phone queue 559 using the Add to Phone Queue sub-routine at FIG. 5AR connector BQ. Then, processing returns to the calling program.

Second, if the Emergency-Serial flag is not set 555, Emergency-Main-Power-Fail flag is tested 560. If the flag is not set, processing continues at block 568. Otherwise, a boot sequence is started. This sequence begins by setting the Boot-In-Progress flag on 561 and executing a two minute main power failure warning 562, using the Do-Warning sub-routine at FIG. 5V connector AJ. Next, the Boot-In-Progress flag 563 and the Emergency-Main-Power-Failure flag 564 are cleared. Then, if the warning was not aborted 565 (by the restoration or main power); the Emergency-Boot-Flag 566 is set on, the reason code for the boot 567 (i.e. main power failure) is stored in nonvolatile RAM, and processing returns to the calling program.

Third, the Emergency-Scheduled-Reboot is tested 568. If a scheduled reboot it not due to occur 568, processing returns to the calling program. Otherwise, it is now time for a scheduled boot to occur 568, then the Boot-In-Progress flag 569 is set, the Button Enable Flag is set 570, and a two minute verbal warning 571 is initiated using the Do Warning sub-routine at FIG. 5V connector AJ. Next, the Boot-In-Progress 572, the Scheduled-Boot 573, and Watch-Dog-Button Enable 574 flags are cleared. If the warning was aborted 575 (by the Watch Dog push button being pressed), thirty minutes are added to the scheduled boot time and the boot is deferred. Otherwise, the Emergency-Boot flag is set on 576 and the reason code for the reboot 577 (i.e. scheduled boot) is stored in non-volatile RAM, and processing returns to the calling program.

The Do Warning sub-routine begins on FIG. 5V beginning at block 578 handles the one or two minute verbal boot warning period. Depending on certain conditions the boot process can be aborted.

First, a 60 representing seconds is moved to the one minute timer 578A, which is used to schedule verbal announcements through the Unit's speaker once per minute for two minutes. If the Boot-In-Progress flag is not set 579 (meaning the present warning to be processed is not related to a re-boot) and the Abort-To-Mainloop flag is set 580 (meaning the interrupt sub-routine wants further processing in this sub-routine aborted so that the Main-Loop routine can service an interrupt request), then processing for this sub-routine ends and control returns to the processing block that called this sub-routine. Otherwise, the Abort to Main-Loop flag status will be ignored, if a re-boot is in progress because the reboot should not be interrupted.

Next, the Minute-Over flag is cleared 581, the specified verbal message is generated 582 and a 16 (which represents a quarter of a second) is moved to a counter 583 (i.e. the microprocessor working register 2 is the nominal choice here). Then, the Boot-In-Progress flag 584 is retested again and, if off, the Abort-To-Mainloop flag is tested again 585 and, if this flag is on, processing ends and ABORT is returned to the calling program. Otherwise, if the Emergency-Work-Station-Timeout flag is set 586 and a command has been received 587, which indicates communications have just been restored to the Work Station, then this sub-routine ends and returns ABORT to the calling program. If the Unit's on-off switch has been turned off 588, the sub-routine also ends and returns ABORT to the calling program. If a Work Station monitoring session is active 589 and the Emergency-Boot-Flag is set 590, then this sub-routine ends and returns OK to the calling program. This is caused by receiving a session-end (OK to boot) command handled by the serial receive interrupt; and, although the warning may not have lasted the full two minutes, it returns as if it had, thus causing an immediate boot. Otherwise, if the Emergency-Boot flag is off 590, then the sub-routine pauses for one quarter second 591 and checks the Minute-Over flag 592. If not over, the number of quarter seconds left is decremented 593; and, if zero 594, it means that four seconds have passed and a beep is generated 595 and sent to the Unit's internal speaker. Then, processing loops back to block 584.

If a minute is up 592, then the number of minutes left 596 is decremented; and, if zero 597, this sub-routine ends and returns OK to the calling program. Otherwise, processing loops back to 579 to announce another verbal warning and one final minute's worth of periodic beeps are issued before a boot occurs.

If, during this boot warning period, a Work Station monitoring session is not active 589, the Job-Tracking flag is tested to see if job status tracking is active 598. If Job Status tracking is not active processing continues at block 600. If Job Status Tracking is active, it means an announcement is being made through the speaker that calls are about to occur as a result of a work station failure during a job status tracking session. If at this time the Watch Dog button is pressed 599, the Button Pressed flag is cleared 599A and processing ends returning ABORT to the calling program. Otherwise, the audible warnings continue as previously described above for blocks 591 to 597.

If a job status monitoring session is not active 598, a scheduled boot is in effect 600, and the Watch Dog push button is pressed 601, then the scheduled boot time is deferred for 30 minutes 602, the Watch-Dog-Button-Pressed flag is cleared 603, a verbal message 604 is announced through the Unit's speaker that the boot has been deferred, the Scheduled-Boot-Flag is cleared 605 and processing for the sub-routine ends returning ABORT to the calling program.

If a scheduled boot is not in effect 600 or the Watch Dog button is not pressed 601, then the Emergency-Main-Power-Fail flag is checked 606. If this flag is on and main power is good 607 then this sub-routine ends returning ABORT to the calling program. Otherwise, the Emergency-Serial flag (no voltage sensed) is tested 608; and, if serial voltage is sensed 609, then sub-routine processing ends and ABORT is returned to the calling program.

If the Emergency Serial Flag is off 608, a loud sound level has been detected 610A/610B and the Watch Dog button is pressed 611, then processing for this sub-routine ends and ABORT is returned to the calling program. Otherwise, processing loops back to block 591 to continue with the pending boot.

Figure 5Y:
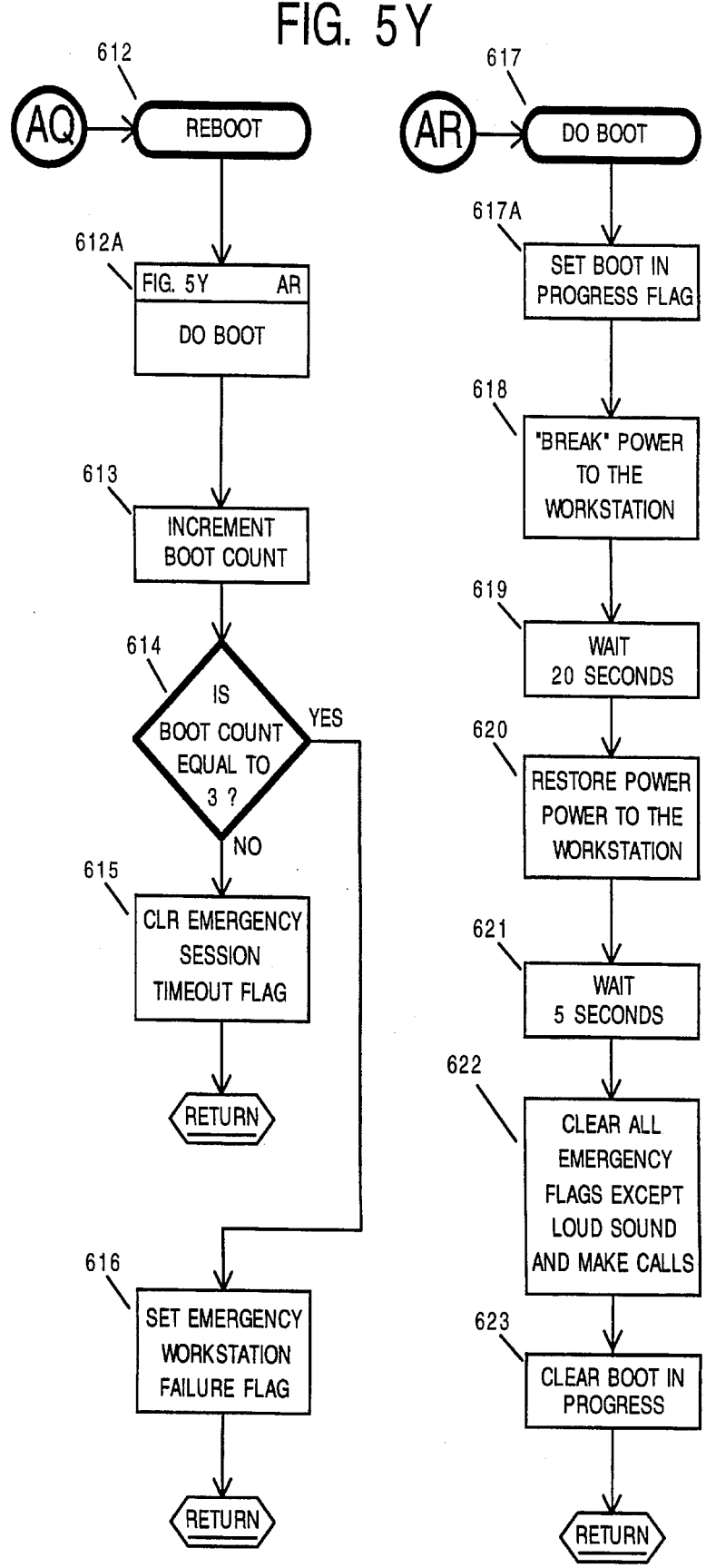

The Boot sub-routine begins on FIG. 5Y at block 612, Processing begins by calling the Do-Boot sub-routine 612A at block 617. The boot counter is incremented 613 after each call. If three boot attempts have been made 614 without successfully linking with the Work Station, then the Work-Station-Failure flag 616 is set on and no further attempts to automatically establish a linkage are made. Otherwise the Session-Timeout flag is cleared. 615 and processing for the Boot sub-routine ends and returns to the calling program.

The actual boot process (Do-Boot Sub-routine) begins at block 617. Processing begins by setting the Boot-In-Progress flag 617. Then, this sub-routine causes power to be removed from the Work Station 618 for twenty seconds 619 and then restores power 620. The sub-routine then waits seconds 621, clears emergency flags 622, and clears the Boot-In-Progress flag 623. Then processing for the subroutine ends and returns to the calling program.

Figure 5Z:
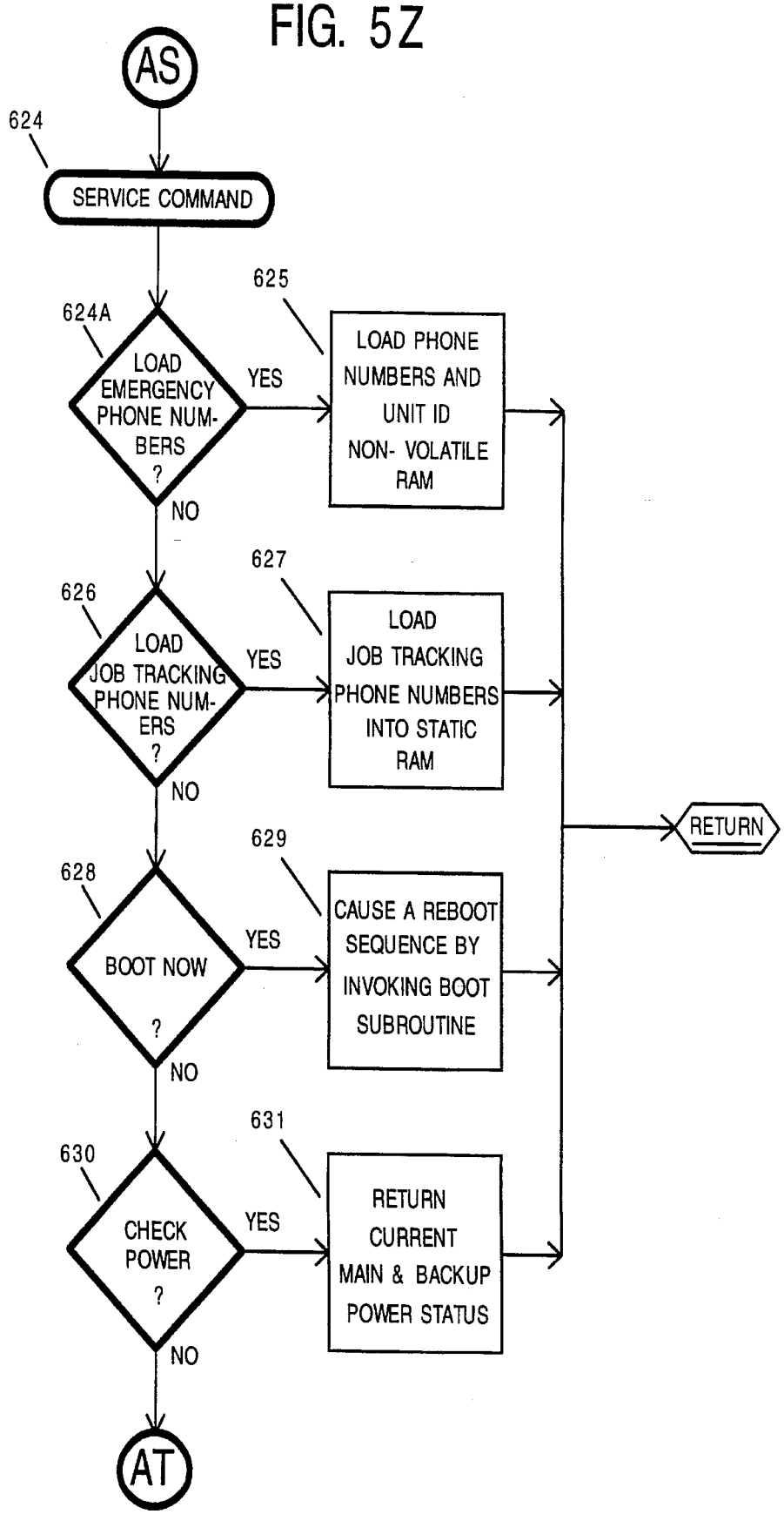
Figure 5A:
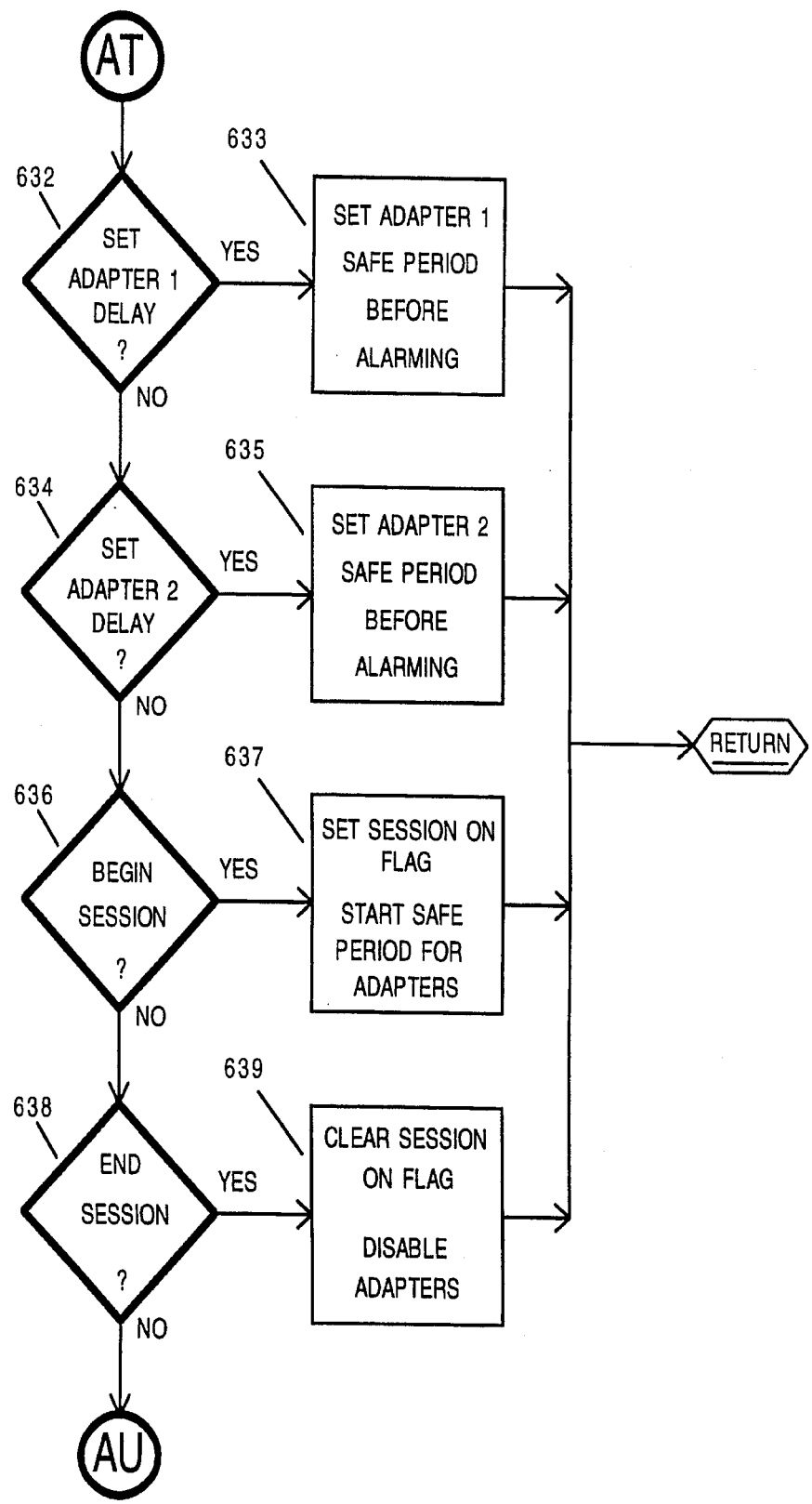
Figure 5A:
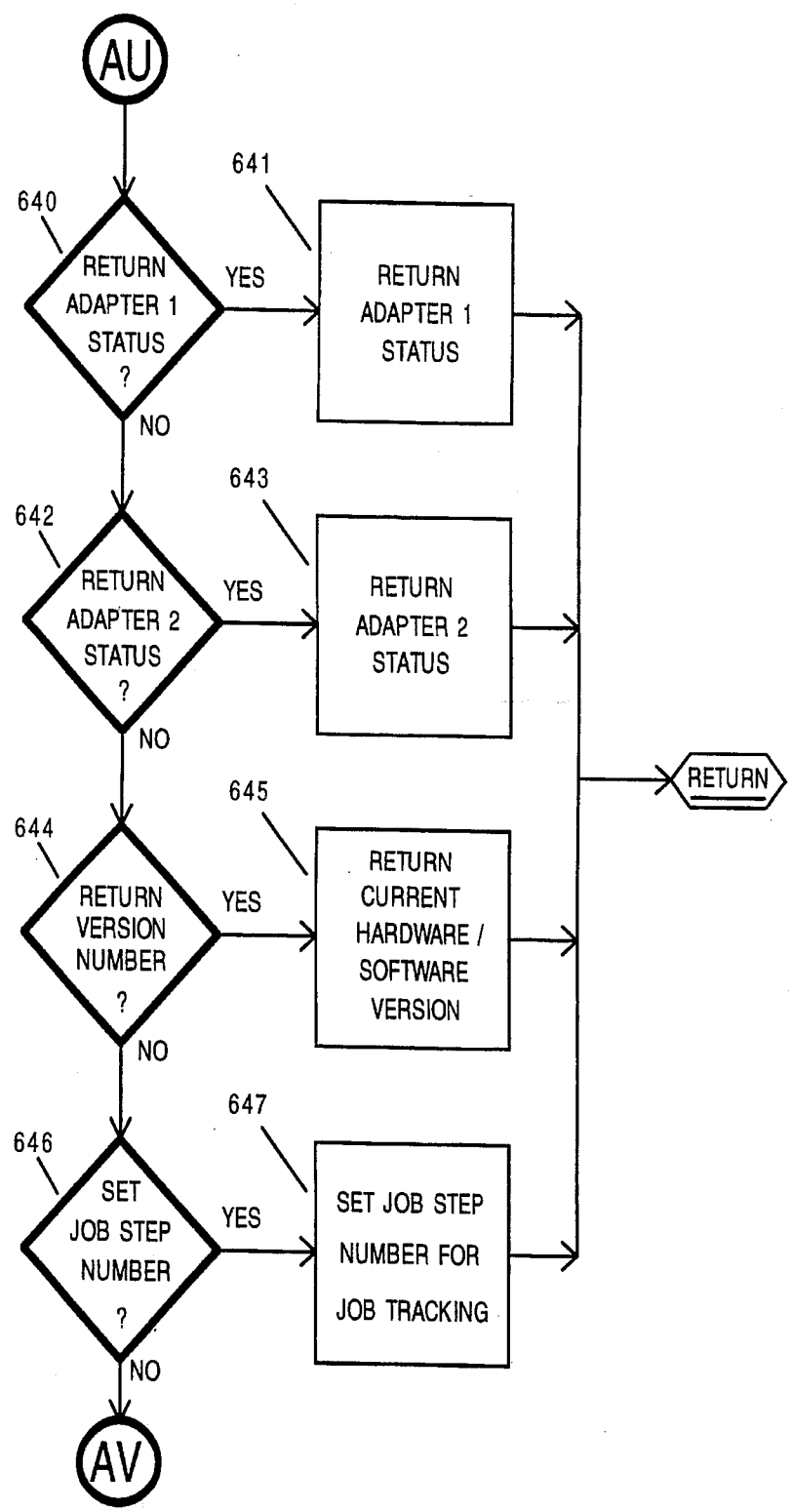
Figure 5A:
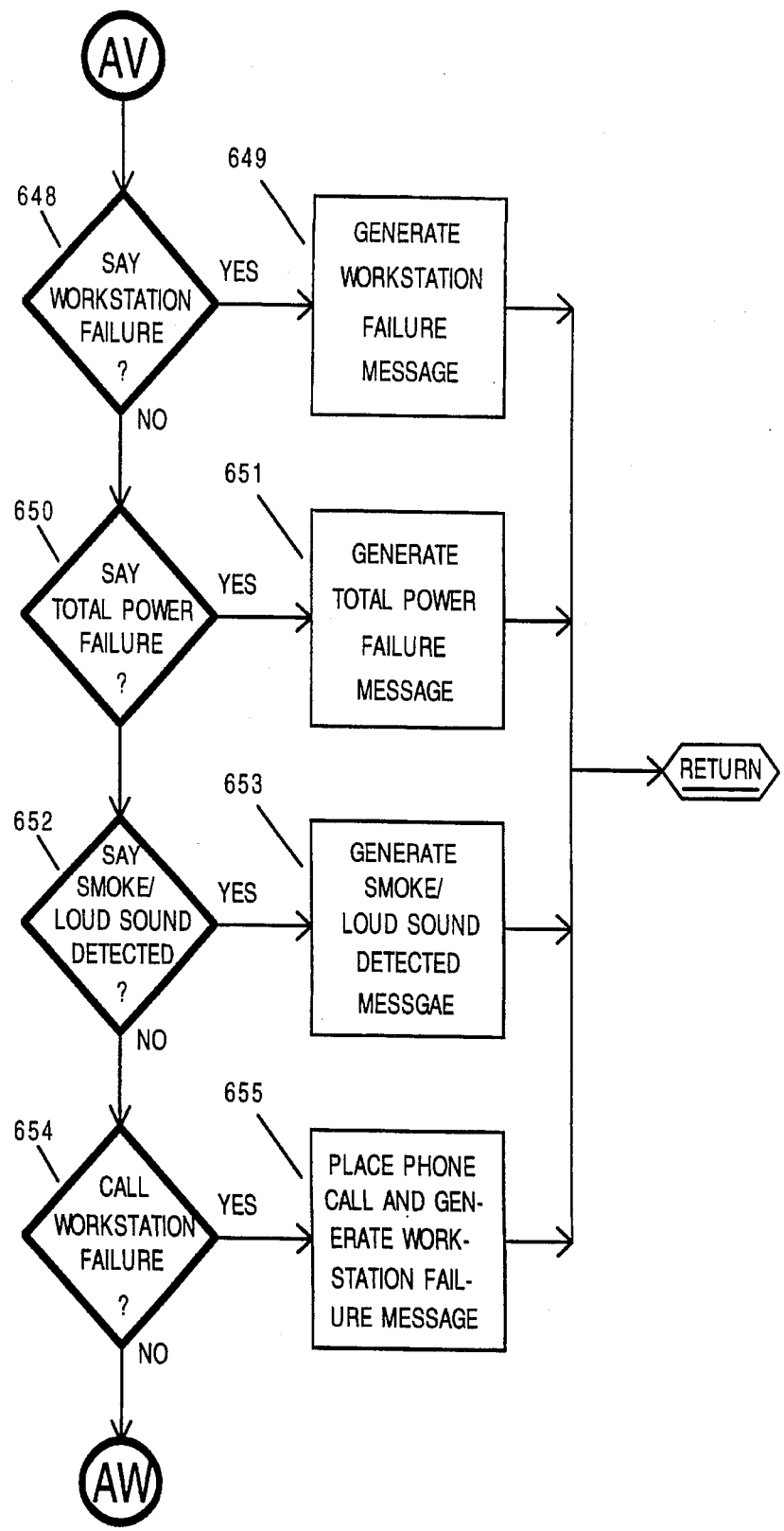
Figure 5A:
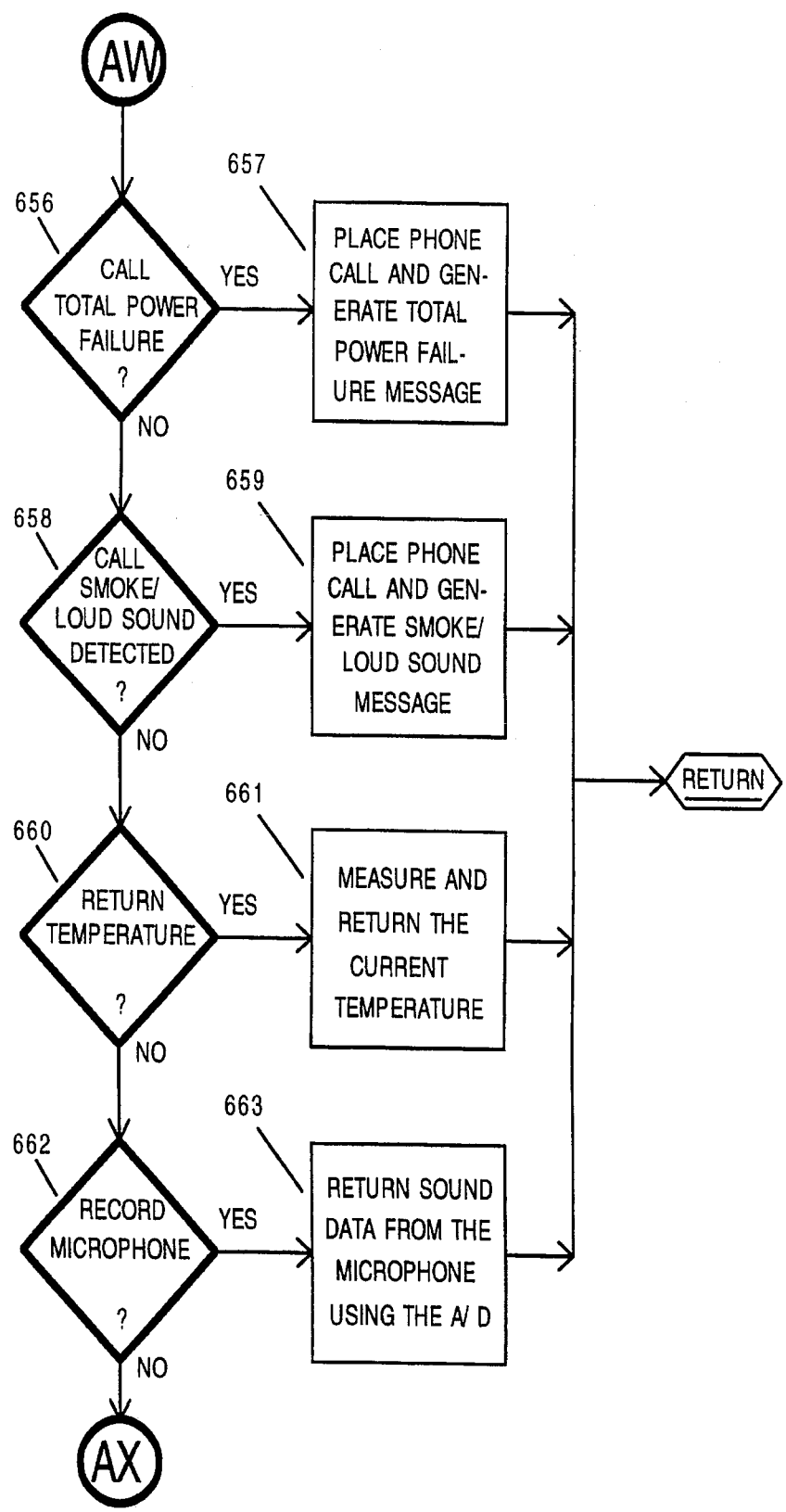
Figure 5A:
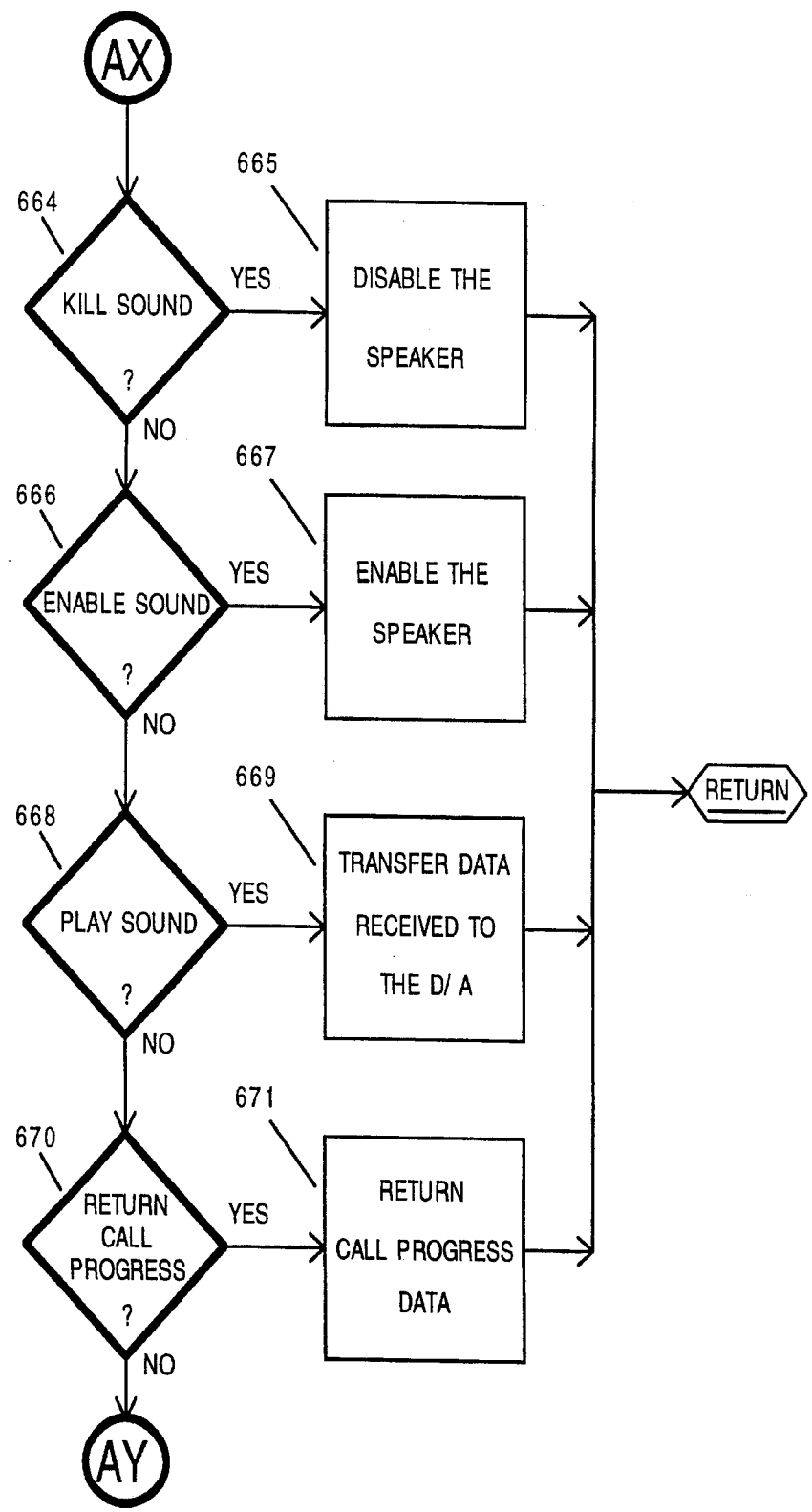
Figure 5A:
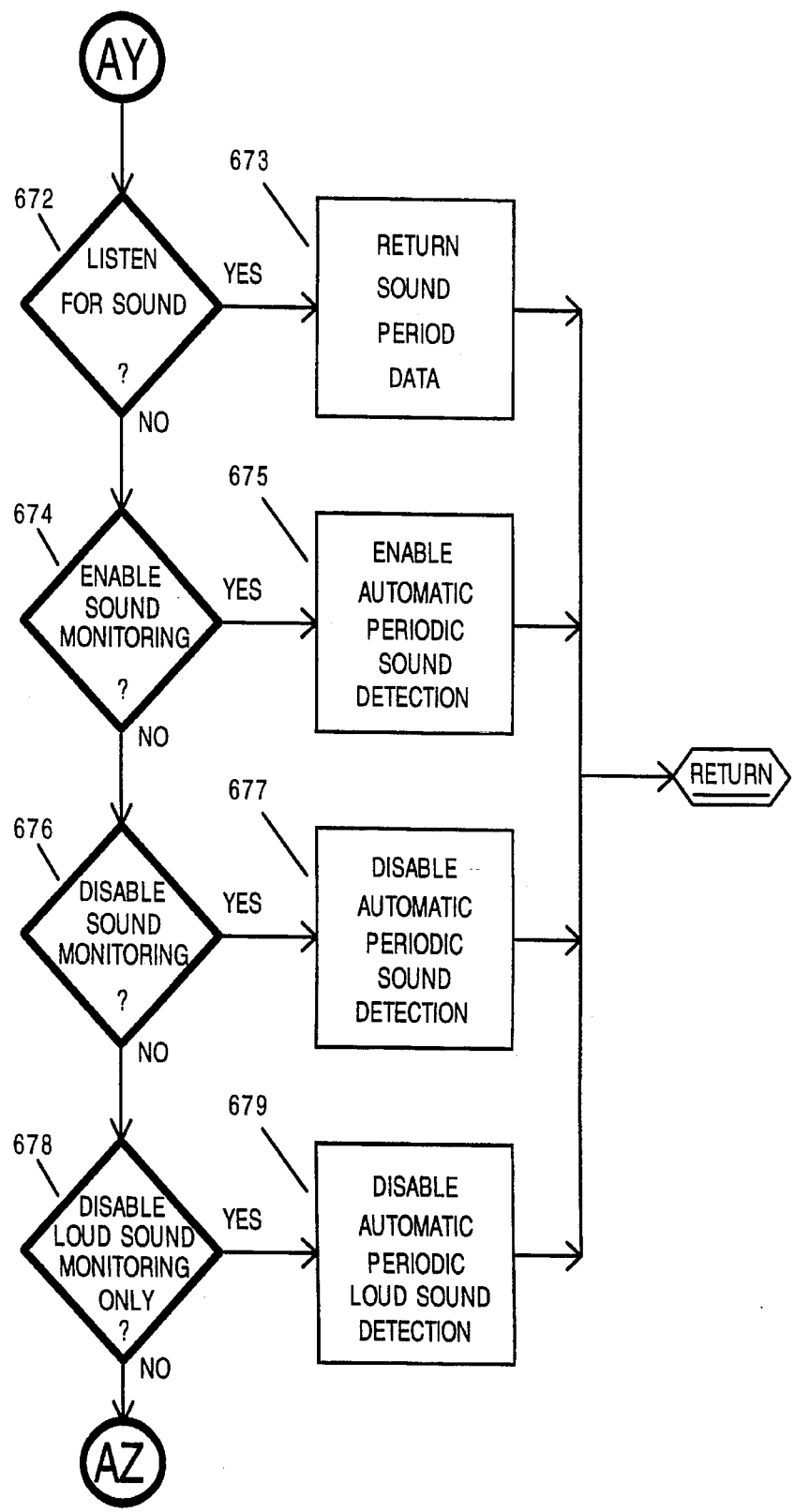
Figure 5A:
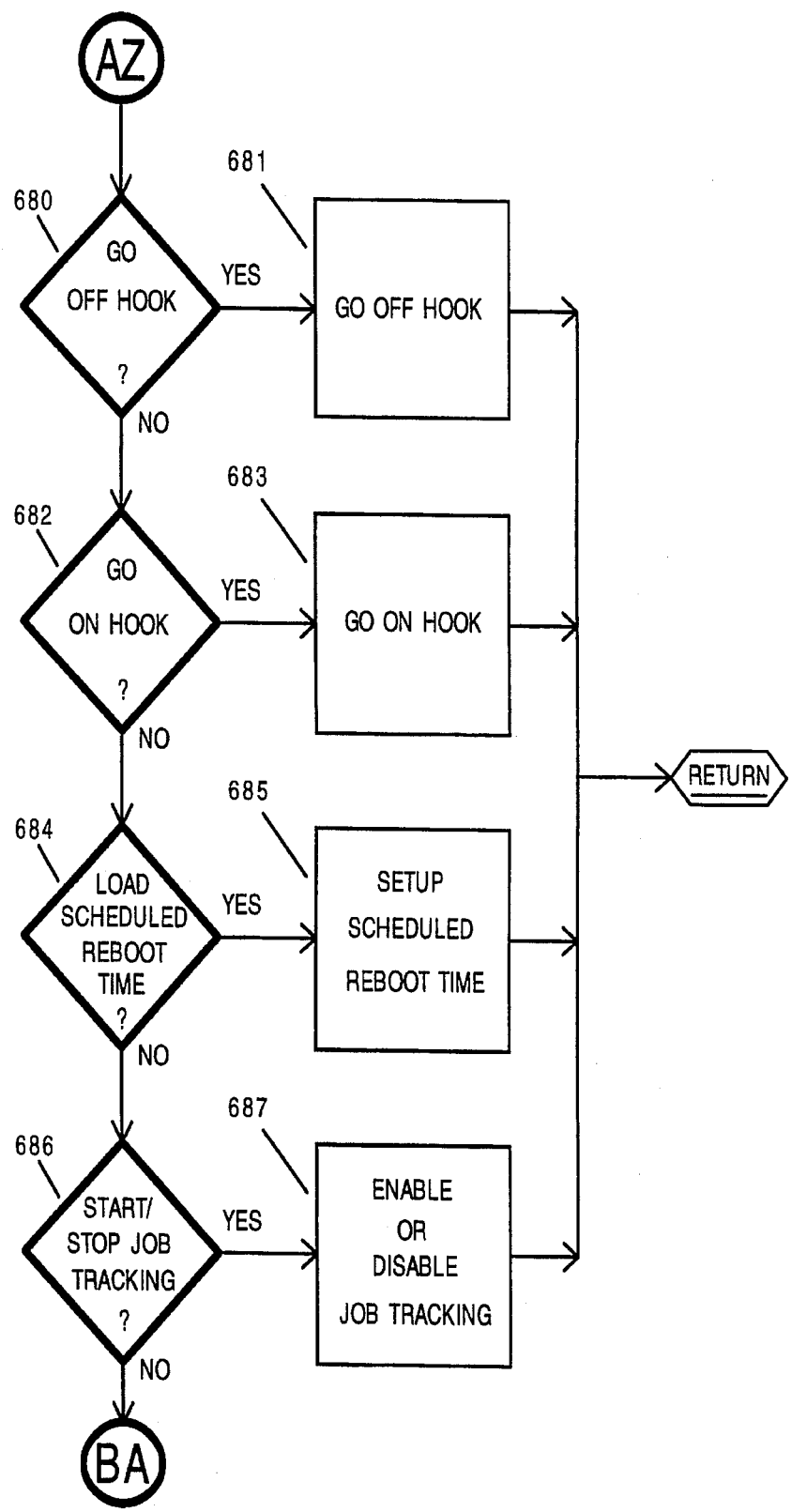
Figure 5A:
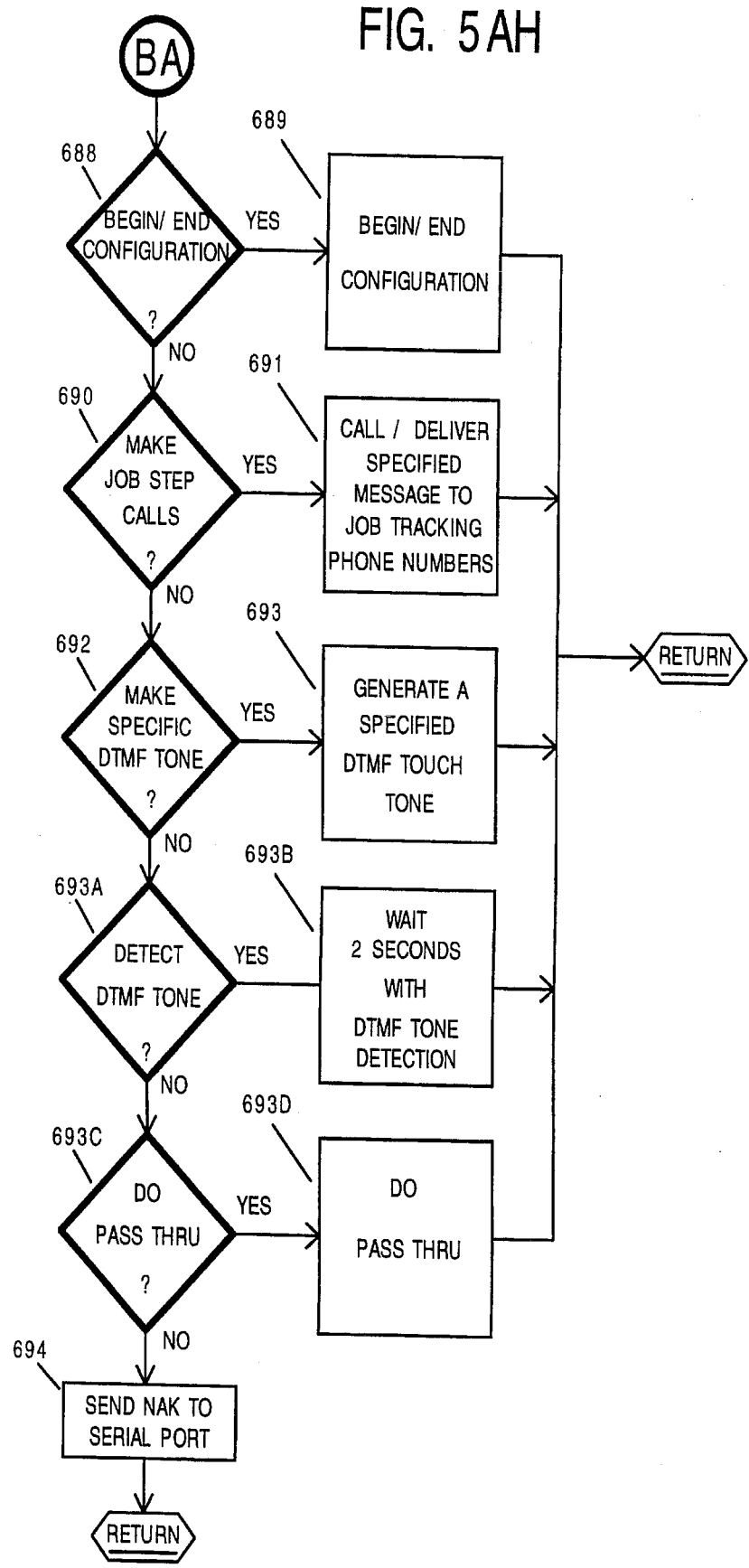
Figure 5A:
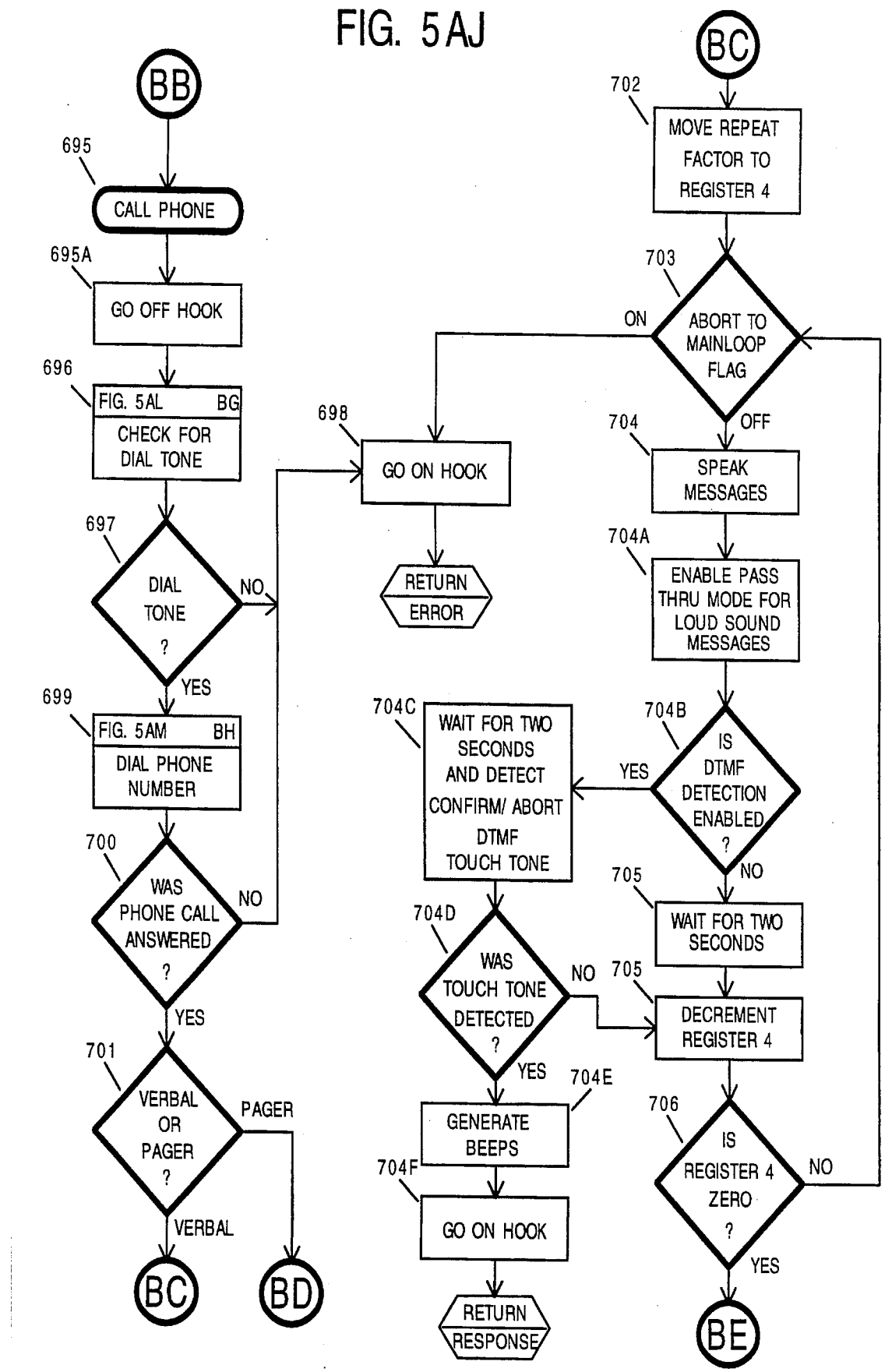
Figure 5A:
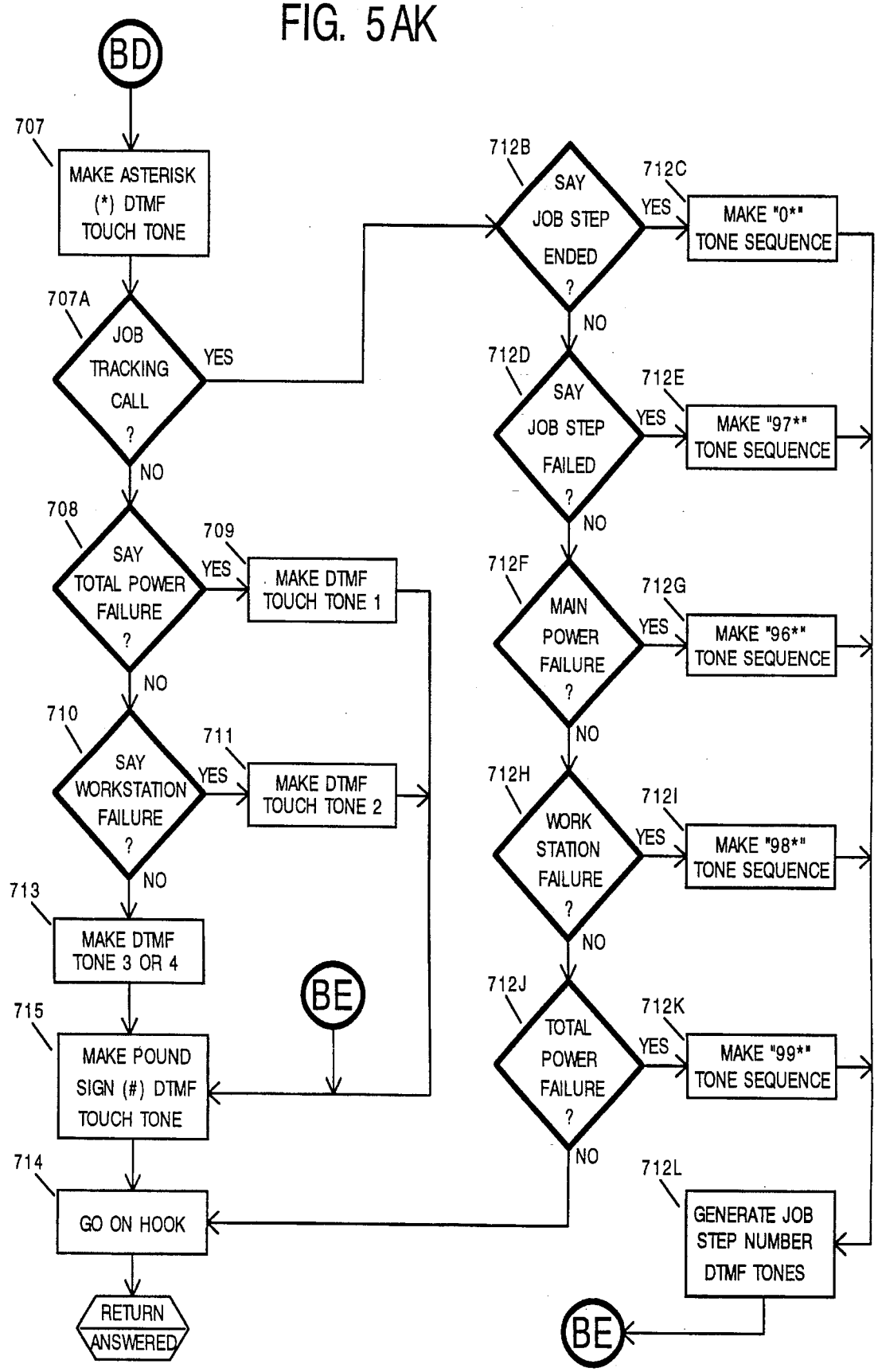
Figure 5A:
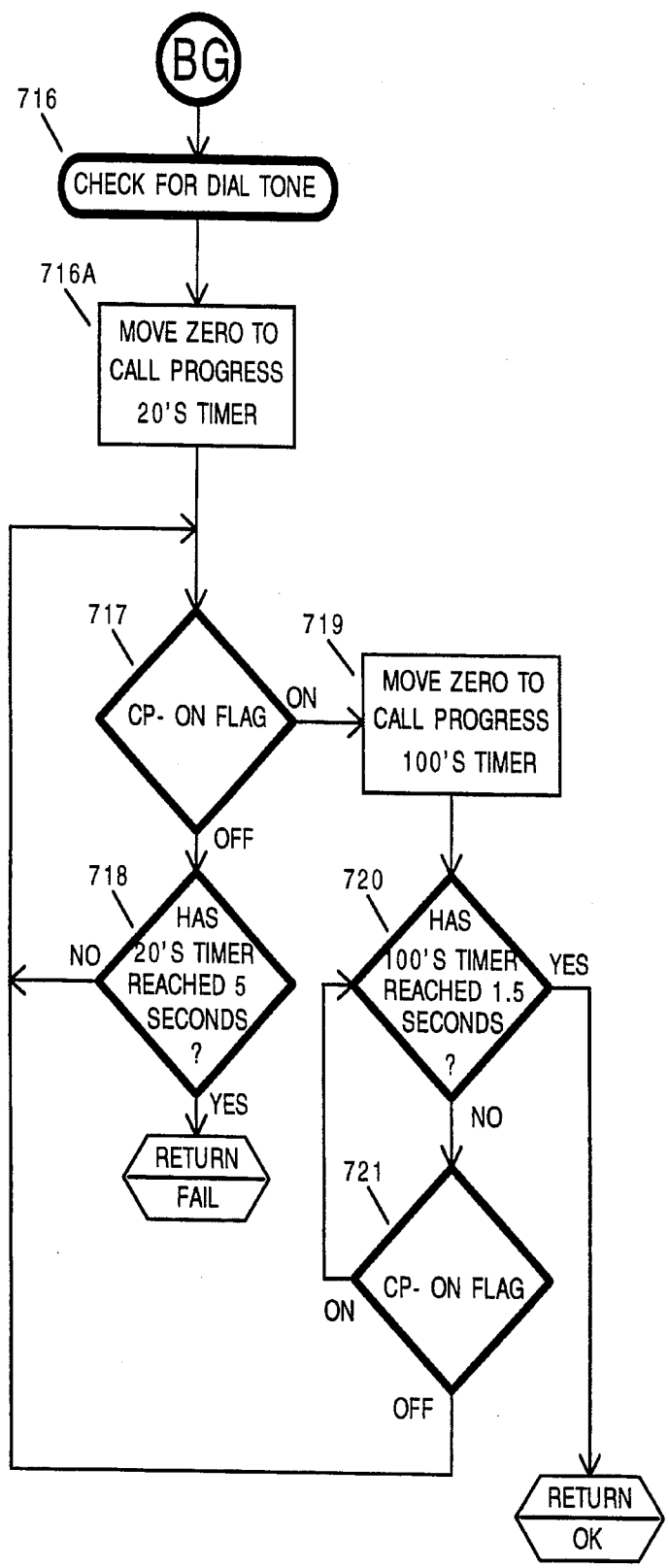
Figure 5A:
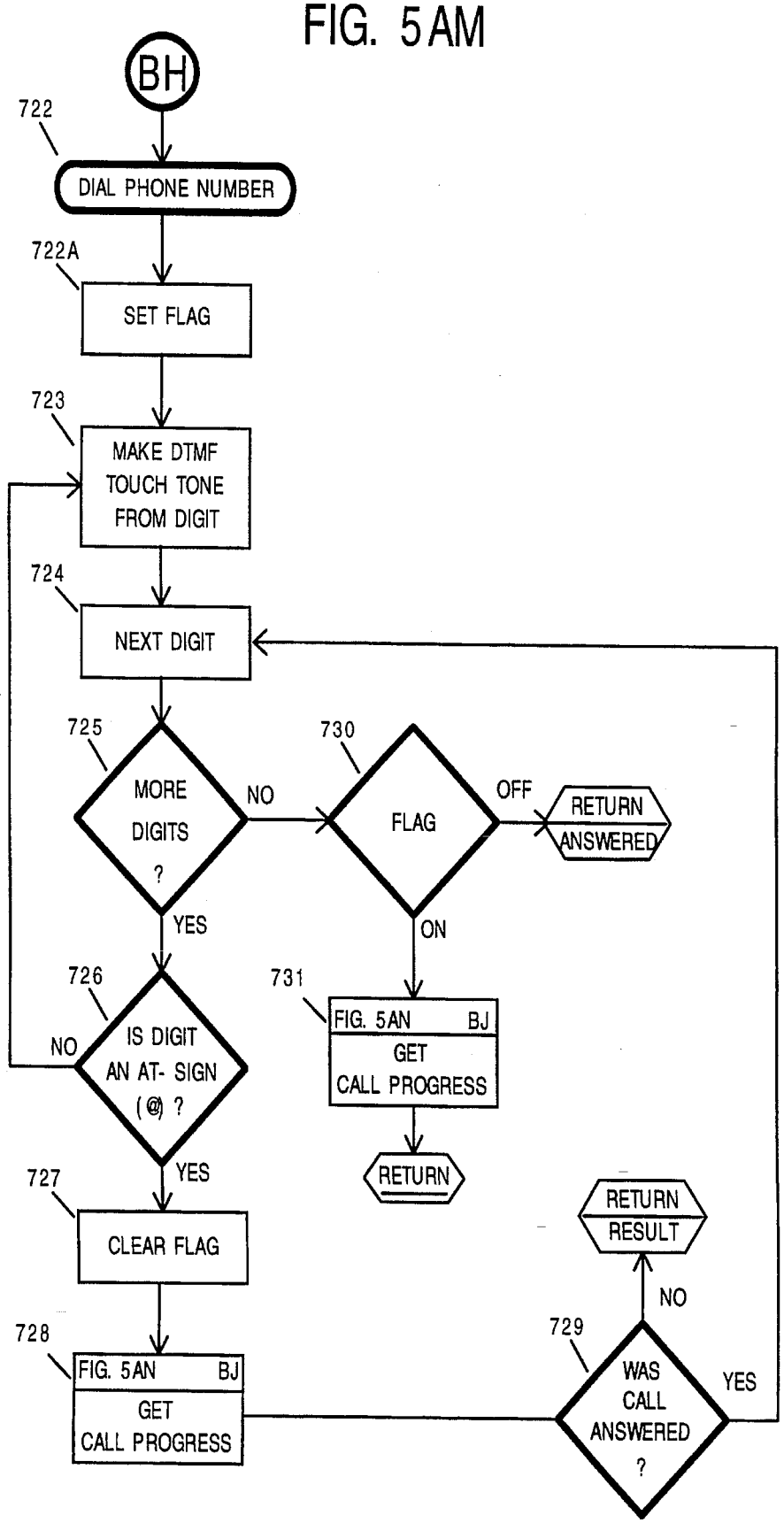
Figure 5A:
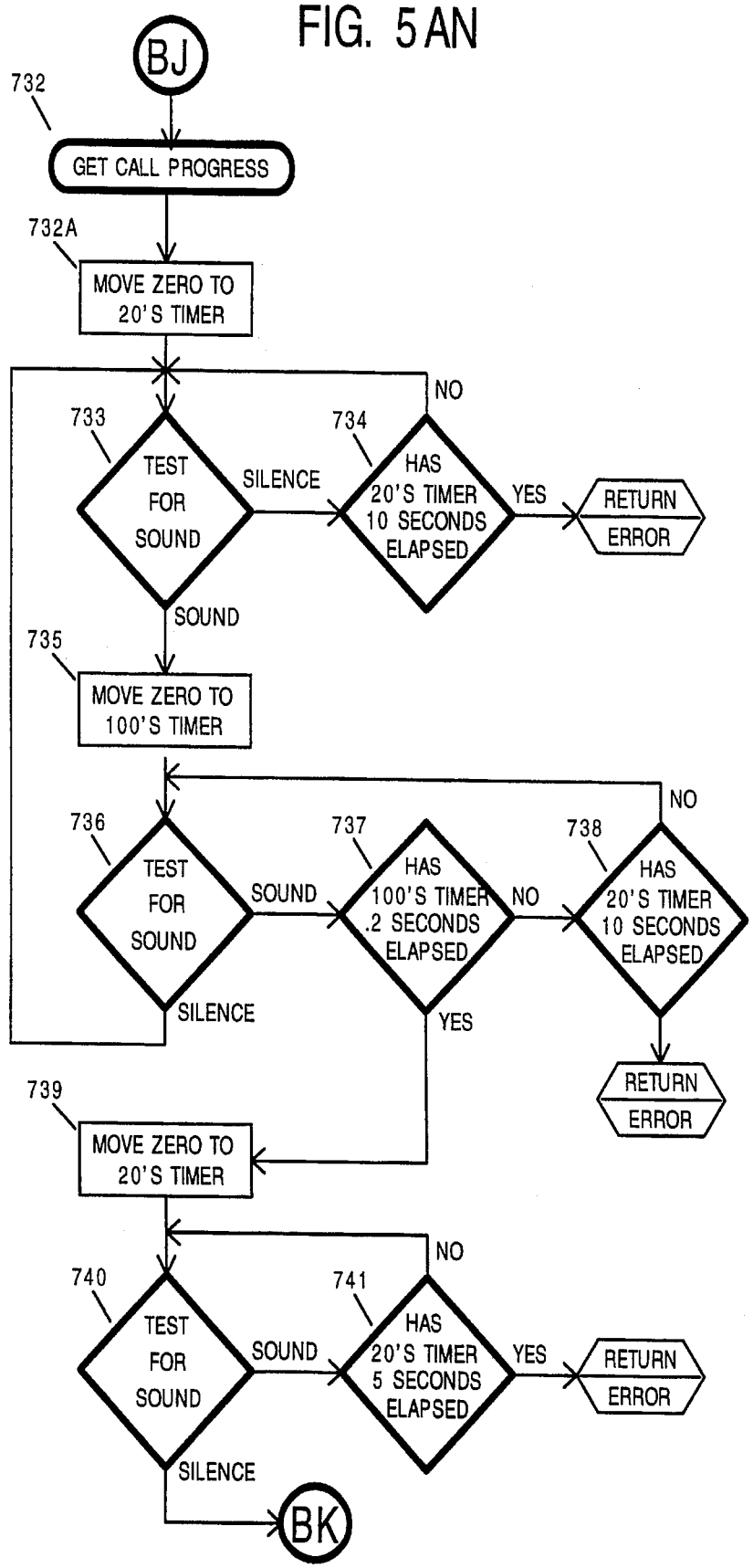
Figure 5A:
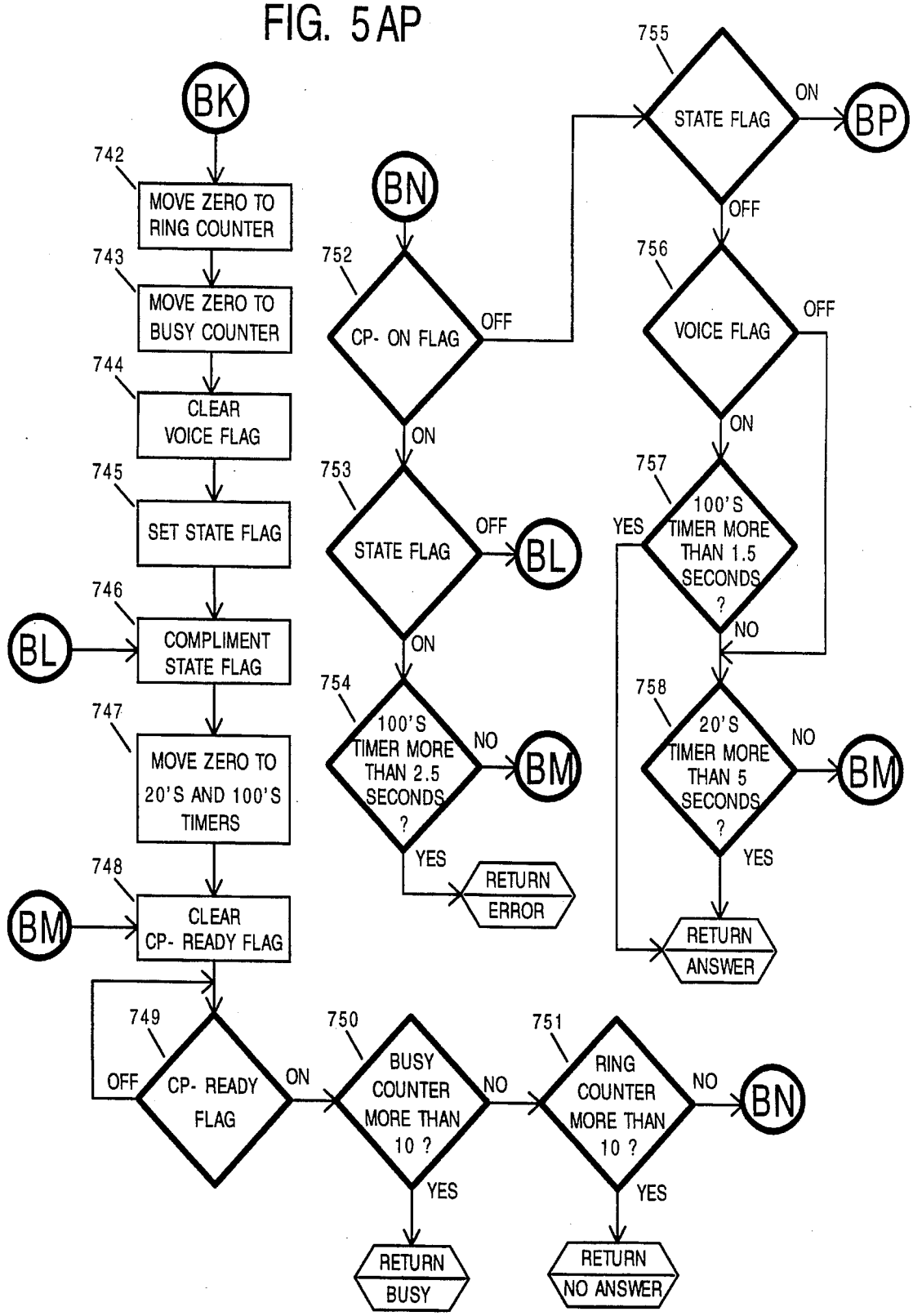
Figure 5A:
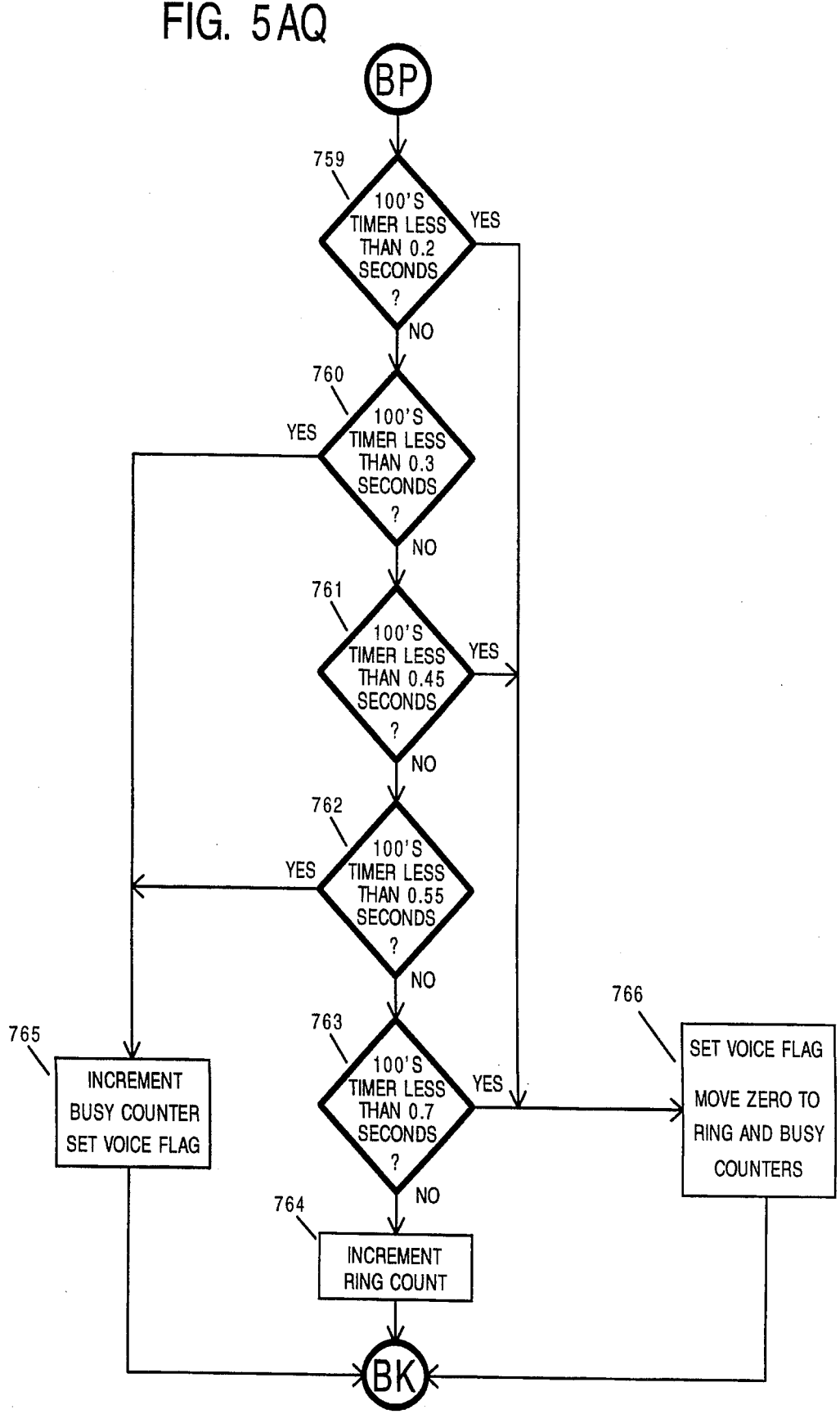
Figure 5A:
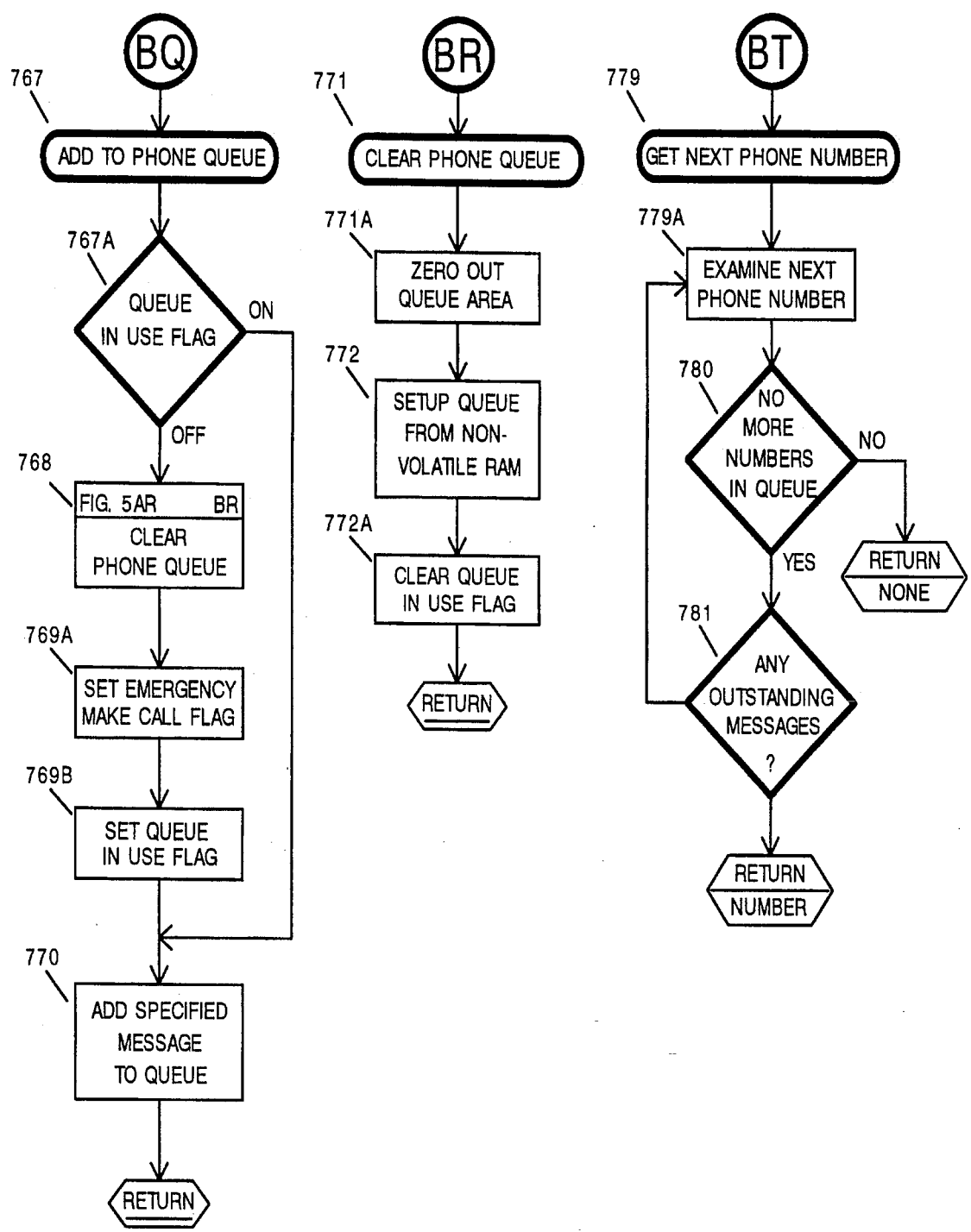
Figure 5A:
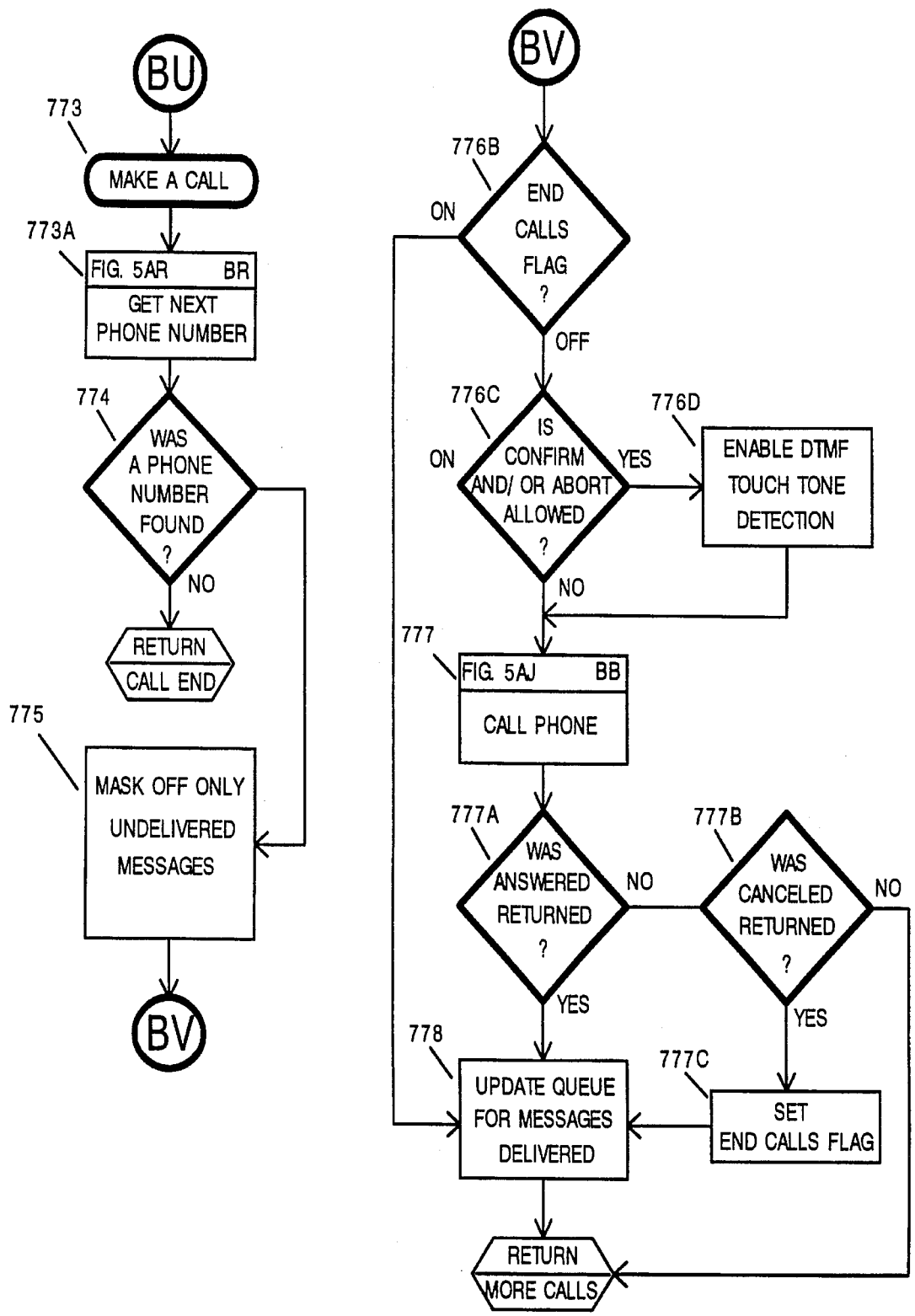
Figure 5A:
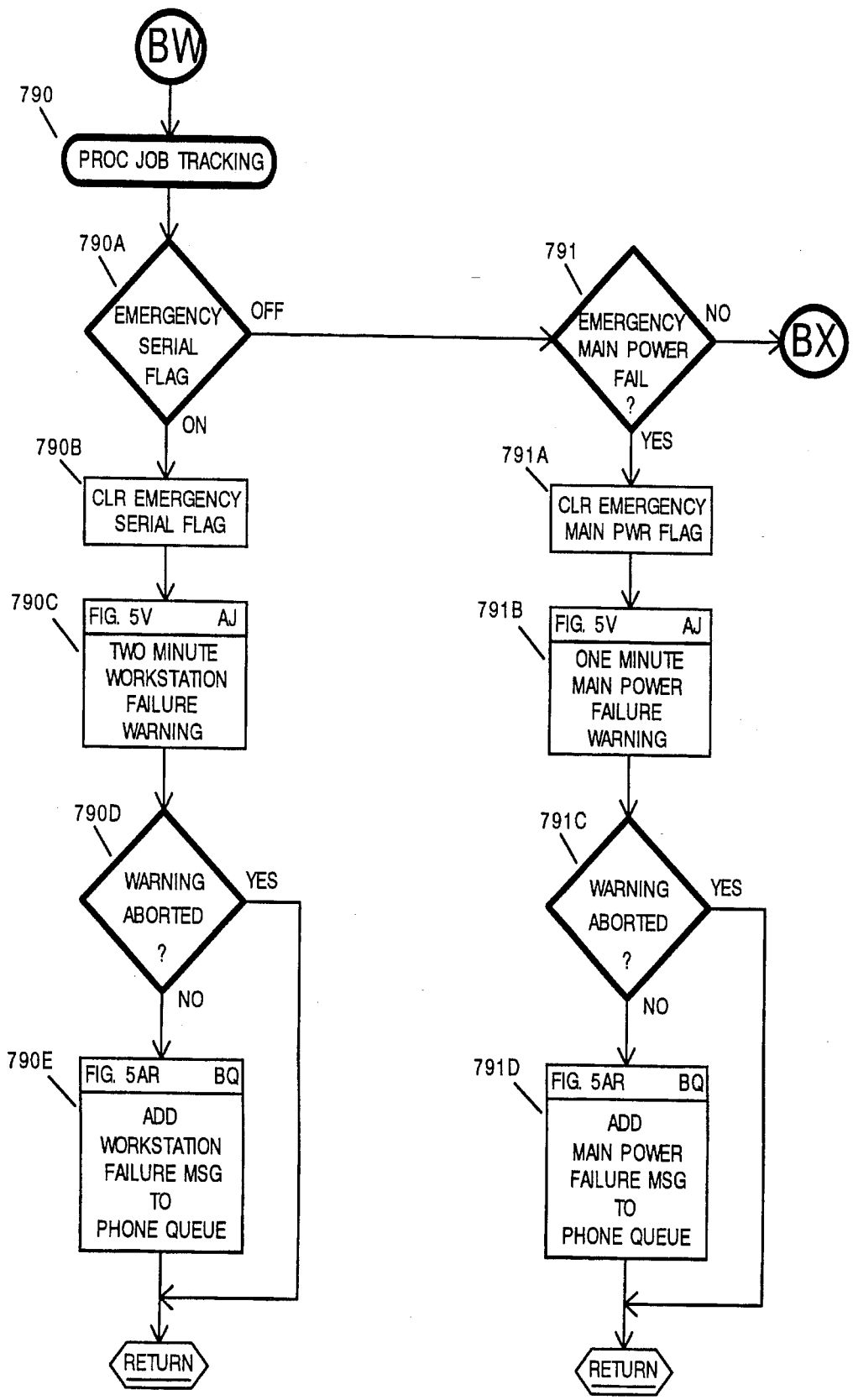
Figure 5A:
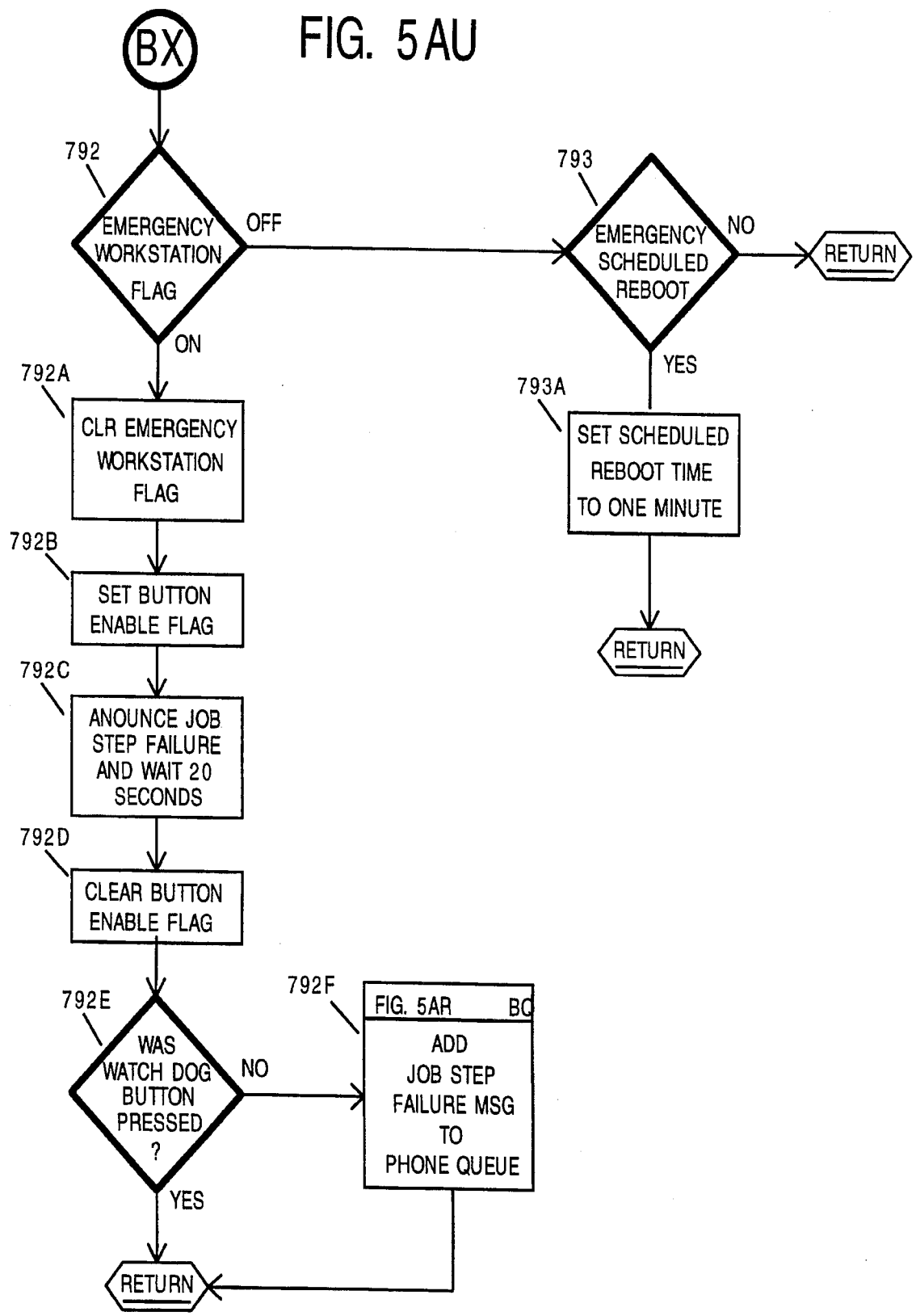

The Service-Command sub-routine begins at FIG. 5Z at block 624. This sub-routine determines which Work Station command is requested (624, 626, . . . 692) and then processes the command (625, 627, . . . 693). A list of action codes processed by the Interface program 8 and serviced as commands by the Unit is contained under the narrative for FIG. 9. Also, FIG. 9 contains a list of possible Results Codes returned by the Unit after an Action Code is processed. If the Work Station's command is not recognized by the Unit, then a NAK is sent to the serial port 694.

If the command request is to load emergency (Fail Safe) phone numbers 624, the first data received from the Work Station will be a one digit ID number used to identify the Unit from other Units. After this number is received by the Unit and stored in non-volatile RAM 625, the Fail Safe phone dialing strings are sent in fixed thirty character segments to the Unit for storage in non-volatile RAM. Presently, up to five Fail Safe dialing strings can be stored in non-volatile RAM. Non-volatile RAM was chosen to store the Unit ID and Fail Safe Dialing strings, so that this data would be preserved in the Unit even in the event all external and internal power to the Unit was lost.

If the command request is to load Job Status Tracking phone numbers 626, each dialing strings sent will be loaded into the Unit's static RAM 627. Each dialing string is sent as a fixed thirty character segment. Presently, up to three dialing strings can be stored in Unit's available static RAM.

If the command request is to re-boot the Work Station by cutting power 628 and a monitoring session is not active, the Emergency- Scheduled-Reboot sub-routine is processed 629 beginning at block 568. This sub-routine issues a verbal reboot warning announcement through the Unit's speaker over a two minute period. If the reboot is not aborted or deferred by the user, as previously discussed, power to the Work Station is temporarily cut after two minutes. If a monitoring session is active, no verbal boot warnings are issued (except the Boot Warn indicator light 258 will flash on and off), and power is temporarily cut to the Work Station after two minutes. If the command request is to check either the status of main power or battery backup power 630, the Unit checks the current status of the requested AC power input line and returns a result code to the Unit indicating the status 631.

If the command request is to set either the Adapter Port 1 632 or Adapter Port 2 634 delay, the Work Station sends a numeric value to the Unit indicating the number of seconds (up to 999 seconds) the user has specified that the Unit should wait before placing an alert calls after a device attached to the applicable adapter port has detected an alert situation. The number of seconds received for each Adapter port is stored in the Unit's non-volatile RAM (633 & 635).

If the command request indicates that a Monitoring session has just began 636 or ended 638, the Monitoring-Session flag is set accordingly 637 & 639. This flag is used to enable and disable Adapter port monitoring. The Adapter ports are presently enabled one minute after the beginning of a session, which gives anyone present time to leave the premises before any security monitoring devices attached to the Adapter ports are activated.

If the command request is to return the status of Adapter port 1 640 or port 2 642, the applicable port is checked for an alarm situation and the results of the test returned (641 & 643) to the Work Station. Each time the test is performed, the Alarm flag is reset to a no alarm condition.

If the command request is to obtain the current version number 644, the current hardware revision number related to the current production version of the Unit is returned to the Work Station's Interface program 645. The version number is a two digit number ranging from 01 to 49.

If the command request is to update the currently active job step number 646, the Work Station follows the command sent with a two digit job step number indicating the current Job Status Monitoring job step number that is being run on the Work Station. This step number is then stored in the Unit's static RAM 647.

If the command request is to speak one of the prerecorded alert messages stored in the Unit related to either, a Work Station Failure Alert 648, a Total Power Failure Alert 650, or Smoke/Loud Sound Alerts 652, the desired message is spoken through the Unit's speaker at 649, 651, or 653, respectively.

If the command request is to place a test Fail Safe call then speak one of the pre-recorded alert messages stored in the Unit related to either a Work Station Failure Alert 654, a Total Power Failure Alert 656, or Smoke/Loud Sound Alerts 658; the Work Station follows the applicable command sent with the dialing string to be called. Once the requested call is completed, the desired message is spoken through the phone line and the Unit's speaker at 655, 657, or 659 respectively. (Note: normally Fail Safe calls are placed solely by the Unit using dialing strings previously stored in the Unit by commands discussed in block 624. Dialing strings are passed to the Unit in this case, merely to indicate the specific Fail Safe dialing string that should be used to test the Unit is functioning properly.)

If the command request is to obtain the current temperature 660, the Unit accesses it internal thermistor and returns the current temperature back to the Work Station 661.

If the command request is to record a spoken message via the Unit's microphone 662, the Unit activates it's internal microphone, collects and digitizes any sounds detected and returns the digitized sounds to the Work Station as they are being collected 663.

If the command request is to turn off the Unit's internal speaker 664, the Unit sets a flag to disable the speaker 665. The speaker would normally be disabled in this fashion at the beginning of a monitoring session, so as to not alert any intruders that alert calls are being placed.

If the command request is to turn on the Unit's internal speaker 666, the Unit sets a flag to enable the speaker 667. The speaker would normally be enabled in this fashion at the end of a monitoring session or whenever the Unit is reset.

If the command request is to play back a user recorded voice alert message 668, the desired recorded message stored in digitized form is retrieved from the magnetic storage on the Work Station and transferred to the Work Station following the command request. As the data is being transferred, it is converted back to sound by the Unit and played through the Unit's speaker and/or telephone line 669 in humanly intelligible audible form.

If the command request is to place a phone call 670, the command request is followed by the applicable phone number dialing digits that the Unit should call. After the call is placed by the Unit, the Unit returns digitized sound data from the phone line so that the progress of the call can be monitored by the Work Station's Interface program 671 by analyzing the level and frequency of the data received.

If the command request is to listen for sound, such as that produced by a smoke detector's siren 672, the Unit turns on it's internal microphone for several seconds then digitizes and returns any sound detected to the Work Station's Interface program 673 to permit the sound level to be analyzed by the Interface program for a possible audible alarm condition. This command request is periodically send to the Unit during a monitoring session and during system testing during Setup or Install processing.

If the command request is to enable periodic sound alert monitoring, such as the sound produced by a smoke detector's siren or other alarm system 674, the Unit starts to use it's internal firmware software to periodically automatically activate it's internal microphone for several seconds and analyze any sound detected for a possible audible alarm condition 675. This command is sent to the Unit after a monitoring session has ended to permit the Unit to periodically monitor sounds on a stand-alone basis.

If the command request is to disable sound monitoring 676, the Unit disables all periodic sound detection processing 677 (i.e. the Sound flag is set off) until a sound enable command is received as discussed above at blocks 674 and 675. This command results from a configuration change made by the user during Setup or Configuration processing.

If the command request is to disable loud sound monitoring 678, the Unit disables only periodic loud sound detection processing 679 and continues to monitor for Sonalerts from known devices, such the smoke detector provided with the apparatus (i.e. the Loud-Sound flag is set off) until a sound enable command is received as discussed above at blocks 674 and 675. This command results from a configuration change made by the user during Setup or Configuration processing.

If the command request is to go off hook on the telephone line 680, the Unit opens up the phone line in preparation for a call being placed 681. If the command request is to go on hook 682, the Unit closes the phone line (i.e. hangs up) which normally occurs after a call has been placed 683.

If the command request is to load the next schedule reboot time 684, the command request is followed by up to four numeric digits indicating the number of minutes remaining until the next time power should be temporarily cut to the Work Station by the Unit forcing the Work Station to boot 685. A clock timer in the Unit is used to decrement the number of minutes received. When the remaining minutes equal zero, a the scheduled reboot is invoked by the Unit.

If the command request is to start or end Job Status Monitoring 686, the flag in the Unit indicating Job Status Monitoring is active is turned On or OFF respectively 687. When a Job Status monitoring session is active, the Unit expects to receive serial data activity from the Work Station at least once every ninety seconds, or the Unit assumes the Work Station and currently active job has failed, and the Unit will automatically place Job Status alert calls.

If the command request is to start or end a system configuration session 688, a flag in the Unit indicating a configuration session is active is turned ON or OFF respectively 689. This flag must be set to permit the Unit to discern test alerts occurring during a configuration session from actual alerts, since different alert processing procedures may occur during testing.

If the command request is to make Job Status Monitoring alert calls 690, the Work Station has detected that a job step being monitored has failed and alert calls need to be placed by the Unit. The Unit places all required alert calls using the dialing strings and active job step number stored in the Unit's static RAM then delivers the pre-set job status alert message when a call has been completed 691.

If the command request is to process a specific dial tone 692, the command is followed by the digitized dial tone to converted to sound by the Unit and transferred out over the phone and/or the Units internal speaker 693. This approach permits the Work Station's Interface program to control the dialing of alert phone numbers.

If the command request is to Wait For a touch tone 692A, the Check-DTMF flag is set 692B which will cause the Fast-Interrupt routine to begin to analyze if a specify tone is present on the phone line, indicating an alert call has been confirmed by the person answering the alert call (during the period of silence occurring between each repetition of an alert message delivered).

If the command request is to pass through any telephone sound present on the phone line when an alert call is placed 692C, the Pass-Thru flag will be set on 692D which will cause the Fast-Interrupt routine to begin to pass through the sound occurring after an alert call is placed to the Work Station.

When any of the above commands are received by the Unit, processing ends normally when the command request has been satisfied and a result code indicating what happened when the command was executed is returned to the Interface program in the Work Station. If the command request could not be identified, the Unit returns a NAK indicating the command was not recognized 694.

The process of calling a phone number is detailed in the Call Phone sub-routine starting on FIG. 5AJ beginning at block 695. Processing begins by taking the phone line off hook (i.e. switch open) 695A so that a call can be placed. The Check-For-Dial Tone sub-routine (FIG. 5AL at connector BG is then called to confirm the presence of a dial tone 696.

If there is no dial tone 697 (i.e. a fail is returned after test 718), then the phone is reset to an on hook status (i.e. switch closed) 698 and an ERROR status, indicating a phone line failure, is returned to the calling routine. Otherwise, the phone number is dialed 699 using the Dial-Number and Get Call Progress subroutines (FIG. 5AM, connector BH. If the call is not answered 700, the phone line is reset to an on hook status 698 and an ERROR status, indicating there was no answer, is returned to the calling program and processing for the sub-routine ends.

If a call is placed to a person 701, several special characters may be specified by the user within the dialing string to activate several optional features. If the dialing string contains an "&" symbol, the number of times that the call is repeated can be changed from the current default of three repetitions to a higher number of repetitions is desired by the user. The specific number of repetitions desired follows immediately after the "&" in the dialing string and ends with an "&" character (e.g. &10& means 10 repetitions). If the dialing string contains a "!" symbol; then, should the user press a touch tone after the call is answered, the call will be considered answered and any other pending alert calls will be discarded. In this case, the person answering the alert is in effect telling the system not to be concerned about any pending alerts messages. If the dialing string contains a "!" symbol, the call is considered answered, but a touch tone is not detected; then the call will be treated as delivered, but pending alert messages will not be discarded. If the dialing string contains the symbol "%", then the call will not be considered delivered unless a touch tone response from the person called is detected.

If the call is to a person requiring a spoken message 701, a counter is set (i.e. register 4) to contain the number of times the alert message will be repeated 702. If the alert dialing string does not specify the desired number of repetitions using the "&" characters as discussed above, then the present default of three repetitions will be assumed. Then, the Abort-To-Mainloop flag is checked at 703 to determine if any event has occurred, such as someone turning off the Unit that would cause calls to be aborted and this sub-routine to be terminated. If this flag is set, the phone is reset to an on hook status 698, processing for the sub-routine ends and a call aborted ERROR code returned to the calling program. Next, 704 causes the digitally recorded alert message to be spoken in a humanly intelligible form. Then, if the alert call was placed as a result of a loud sound detected, the Pass-Thru flag is enabled 704A to instruct the Fast-Interrupt routine to pass through whatever sounds are detected by the Unit's microphone to the person answering the call. Presently, 5 seconds of sound is passed through in this manner.

If the dialing string called contains an "!" or a "%" character, the DTMF-Detection flag will enabled. If this flag is enabled 704B, the Unit listens for two second during the several seconds of silence between message repetitions for a designated touch tone to be pressed by the person answering the call 704C. If during this sampling period, a specified touch tone is detected (entered by the person answering the alert call) 704D, several audible beeps are send to the phone lille by the Unit to acknowledge the tone has been detected, processing for this sub-routine ends, and RESPONSE is returned to the calling program. Otherwise, if the required touch tone was not detected 704D or the DTMF-Detection flag was not enabled 704B, the Unit waits, for several seconds 705 and then decrements the message repetition counter 705. If the message repetition counter is zero, the phone is placed on hook 714, processing for the sub-routine ends, and ANSWERED is returned to the calling program. If the message repetition counter has not yet reached zero 706, processing loops back to block 703 to repeat the message delivery process again.

If a call is placed to an automated paging service 701 several additional code dialing digits are entered into the phone line after the call is complete and any user generated codes are transmitted to the paging service. First, an asterisk touch tone is generated to identify the start of the Unit's alert error type code 707. If the alert call is to a Fail safe dialing string stored in non-volatile RAM processing continues at block 708. If the alert call is being placed as a result of a total power failure 708, a touch tone is generated representing the number 1 is then sent to the paging service 709, a pound sign (#) is generated and sent to the paging service 715, the telephone is placed back on hook 714, processing for this routine ends, and ANSWERED is returned to the calling program. If the alert call is being placed as a result of a Work Station failure 710, a touch tone is generated representing the number 2 is then sent to the paging service 711, a pound sign (#) is generated and sent to the paging service 715, the telephone is placed back on hook 714, processing for this routine ends, and ANSWERED is returned to the calling program. If the Fail Safe alert call is being placed as a result of a either a total power failure 708 or a work station failure 710, the call must be as a result of a loud sound detected. In this case a touch tone is generated representing the number 3, if the loud sound is identified as a son-alert, or 4, if the loud sound could not be specifically identified. Then, the applicable tone is sent to the paging service 713, a pound sign (#) is generated and sent to the paging service 715 and the telephone is placed back on hook 714. Then, processing for this routine ends, and ANSWERED is returned to the calling program.

If the call is not being placed as a result of a job tracking monitoring session 707A, processing continues at block 712B. If the call is as a result of a job step ending 712B, the touch tone sequence "*0*" is transmitted to the paging service 712C. If the call is as a result of a job step failing 712D, the touch tone sequence "*97*" is transmitted to the paging service 712E. If the call is as a result of a main power failing 712F, the touch tone sequence "*96*" is transmitted to the paging service 712G. If the call is as a result of a Work Station failure 712H, the touch tone sequence "*98*" is transmitted to the paging service 712I. If the call is as a result of a Work Station failure 712J, the touch tone sequence "*99*" is transmitted to the paging service 712K. Next, DTMF tones corresponding to the job step number active when the call was placed to the paging service are generated and transmitted to the paging service 712L. If no job step has been specified for the current step in progress, the default code (i.e. "*1*") will be transmitted. If all jobs steps are done by the time the call is placed, the code "*0*" will be transmitted.

After the necessary job status tracking paging codes have been transmitted to the paging service, a pound sign (#) is generated and sent to the paging service 715, the telephone is placed back on hook 714, processing for this routine ends, and ANSWERED is returned to the calling program.

The process of checking for a dial tone is detailed in the Check For Dial Tone sub-routine starting on FIG. 5AL beginning at block 716. This sub-routine resets the call progress timer 716A and waits up to five seconds 717 & 718 for 1.5 seconds of continuous sound (i.e. the CP-On-Flag remains on for 1.5 seconds), as determined by the Slow-Interrupt routine which constantly updates the CP-On-Flag based on the presence of sound on the phone line 719 to 721. If the 100's timer reaches 1.5 seconds of continuous sound 720, a dial tone is presumed to be detected, processing for the routine ends, and "OK" is returned to the calling program. However, if the 20's timer reaches 5 seconds without detecting a condition of at least 1.5 seconds of continuous sound 718, it is assumed a dial tone was not detected, processing for the routine ends and FAIL is returned to the calling program.

The process of dialing a phone number is detailed in the Dial Phone Number sub-routine on FIG. 5AM beginning at block 722. This sub-routine begins by setting a Temporary flag 722A which is used to indicate when a phone number has not yet been fully dialed. Then, the Unit generates a touch tone dialing digit 723 using digitally stored touch tone wave forms in program memory via the Fast-Interrupt routine. (Note: DTMF telephone touch tone wave forms samples were generated by writing a software Utility incorporating floating point math algorithms). Then, this sub-routine tests for any remaining digits to be dialed 724. If there are no more digits 725 and the Temporary flag is not set 730, the sub-routine will end and return an answered code to the calling program. If the Temporary flag is set 730, then the Get Call Progress sub-routine is invoked (see FIG. 5AN connector BJ) 731 which returns the status of the call, processing for this routine ends and returns to the calling program. If the flag is not set, processing for the routine ends and ANSWERED is returned to the calling program.

If there are more digits to be processed 725, and the current digit is not an at-sign '@' 726, then this subroutine loops back to 723 to dial the next digit. However, if it is an at-sign (meaning the dialing digits necessary to complete the call have been dialed), then the Temporary flag is cleared 727 and the Get-Call-Progress sub-routine 728 is invoked (see FIG. 5AN connector BJ). If the call is answered 729, this sub-routine loops back to block 724 to process any remaining dialing digits, which represents the desired alert code, an automated switchboard phone extension, etc. that user wants to have delivered after the call is answered. In cases where a call is made to an automated switch board where multiple levels of prerecorded voice messages are announced and touch tones must be entered during (or after) each level's pre-recorded message; multiple '@' symbols and commas (which cause a 2 second pause per comma enter to occur) can be entered as part of the dialing string causing this routine play the required touch tones when necessary and wait until the appropriate point in the voice message system to deliver the alert message. When there are no more digits remaining 725, the sub-routine will end and return an answered code to the calling program. (Note: at this point the temporary flag will have been set to off in block 727.)

The Get Call Progress sub-routine (FIG. 5AN, beginning at block 732) employs the Unit's stand alone processing capabilities to monitor the status of a Fail Safe calls after the phone number has been dialed.

The rules for call progress determination are as follows. The first sound detected is discarded, which is normally the first phone ring. The routine waits up to ten seconds for this initial sound. A minimum pulse of sound (between 0.1 and 0.2 seconds) is needed so that line clicks and static are ignored. If no initial minimum pulse of sound is detected, the phone call is treated as incomplete. But, if this initial minimum pulse of sound is detected, the system waits during the 10 seconds period for the initial sound to end. If the initial sound does not stop by the end of the 10 second period, the call is treated as uncompleted. This may occur, for example, if the telephone system dropped the call and the telephone system returned to a dial tone.

Once an acceptable initial sound has been discarded, sound "presence" or "silence", is timed and continually tested against set specific limits. There are two counters and a flag associated with this algorithm: a "busy" counter, a "ring" counter and a Voice-Detected flag.

If "sound present" falls between 0.2 and 0.3 seconds (for 0.25 second reorder tone) or 0.45 and 0.55 seconds (for 0.5 second busy tone), then sound present can be narrowed down to either a busy signal or a human voice. Accordingly, the busy counter is incremented and a Voice flag is set. If "sound present" is greater than 0.7 seconds, then the ring counter is incremented. Otherwise, should sound present not satisfy one of these criterion, then voice is considered detected and the busy and ring counters are zeroed out.

If the busy counter reaches a value of ten then the call status is "busy" and the algorithm terminates. (Note: busy signals never have a 0.5 second period of silence)

If the ring counter reaches a value of ten then the call status is "no answer" and the algorithm terminates.

For "silence", if voice is considered detected and silence reaches 1.5 seconds then the call is considered answered. If voice is not considered detected and there is 5 continuous seconds of silence, the call is considered answered. This means that after one or more rings occurred, the phone was answered but no speech was detected.

If sound is continuously present for 5 seconds, then the call is considered incomplete and the algorithm terminates. This could occur if the person answering the phone hangs up immediately and a dial tone returns.

If the algorithm continues for one minute without a determination, then the call is treated as incomplete. This could occur if sustained, erratic, high static noise levels exists on the phone line or the party answering does not stops speaking.

As discussed in the narrative for block 900, when a call is considered answered, any sound made during the first few seconds after the call is first considered answered is digitized and recorded by the Unit then stored in the Work Station as an audit trail to prove the call was completed. Normally, the word "Hello" spoken by the person answering an alert call is recorded via this procedure.

The Get Call Progress sub-routine block diagram begins by setting the call progress 20's timer 732A to zero. Then, the CP-On flag is checked 733 to determine if sound is being detected. The Cp-On flag is updated by the Slow-Interrupt routine and when set indicates sound is present on the telephone line. Then, the sub-routine waits for up to 10 seconds for sound 734, which would occur when a ring or busy sound occurs. If no sound detected, then subroutine processing ends and ERROR is returned to the calling program. For example, this error would occur if the phone system fails to recognize all touch tones dialed, the phone number dialed was set up by the user to have less than the required number of digits, or the person called happens to pick up the call before a ring was acknowledged and does not speak. Otherwise, the call progress 100's timer is set to zero 735 and blocks 736, 737, and 738 evaluates all sound received over a 10 second interval for a sound 0.2 seconds or greater in duration.

If sound is detected with a duration of less than 0.2 seconds 737, then it is assumed that the sound detected was merely static or other line noise and is ignored. When the ten second timeout is reached 738, then the phone call is treated as uncompleted sub-routine processing ends and ERROR is returned to the calling program.

If the sound was on for more than 0.2 seconds 737 during the interval, then processing 739, 740, and 741 waits for up to five seconds for the sound to stop. If the sound does not stop for five seconds 741, then the phone call is treated as uncompleted, sub-routine processing ends and ERROR is returned to the calling program (normally this means there is excessive noise on the line after a call is initiated, but before it is answered, or the call was terminated or not placed causing a dial tone to be present).

If the sound does stop before five seconds is reached 740, the first sound detected is discarded, the ring counter 742 and the busy counter 743 is set to zero and the Voice flag is cleared 744. Then, a State flag (which reflects the previous state of sound detected) is set 745, so that it will be cleared at 746 to start with a "no sound" condition, so that the duration of silence can be timed. Next, the call progress 100's and 20's timers are set to zero 747, the Call-Progress-Ready flag 748 is cleared and processing wait for the Call-Progress-Ready flag to be set 749. This flag is set 100 times a second by the Slow-Interrupt routine. When the Ready flag is set 749 the busy 750 and ring 751 counters are checked. If either one equals 10, indicating 10 successive busy or answer signal patterns were detected by this sub-routine, then sub-routine processing ends and returns either a "BUSY" or "NO ANSWER", as appropriate, to the calling program. (Note: busy and ring counters are incremented as a result of processing occurring at blocks 759–765). Otherwise, if there is sound 752, but the State flag is off 753 (meaning there has been a transition from silence to sound), then processing loops back to 746 where the State flag is complimented and a fresh cycle begins. If there is sound 752, the State flag is on 753, and more than 5 seconds have elapsed 754, then the call is treated as uncompleted, sub-routine processing ends, and ERROR is returned to the calling program voice. If less than 5 seconds have elapsed, processing loops back to block 748.

If there is no sound 752, the State flag is off 755, the Voice flag is set 756 and the sound has been off for 1.5 seconds 757 or there has been no sound for 0.5 seconds 758, then sub-routine processing ends and ANSWER is returned to the calling program.

If there has been no sound 752 and the State flag is on 755, this means sound has been on for a short period and just stopped. The duration of this sound is now tested. If it less than 0.2 seconds 759 it is voice and whatever is spoken is recorded. If it less than 0.3 seconds 760, than it is taken as busy and the busy counter is incremented 765. If it is less than 0.45 seconds 761 then it is voice and whatever is spoken is recorded by setting the Voice Flag on 766. If it less than 0.55 seconds 762 then it is taken as busy and the busy counter is incremented 765. If it less than 0.7 seconds 763 then it is voice and whatever is spoken is recorded by setting the Voice flag 766. Otherwise, the sound must be ring, the ring counter is incremented 764. In any case processing loops back to 746. For busy, the busy counter is incremented and the Voice flag is set 765. For voice, the Voice flag is set and the ring and busy counters are zeroed out 766.

FIG. 5AR details various phone sub-routines which deal with queue processing. The Add-To-Phone-Queue sub-routine begins at 767 and manages the queue of Fail Safe error conditions that need to be delivered and causes alert processing to be initiated. Multiple error conditions can accumulate in the queue. After a call is considered answered, all outstanding undelivered alerts are delivered to whomever or whatever answers the call. Then, the queue entry for the party called is updated to reflect the delivery of the message(s). Thus, each message is only delivered once.

If the queue is not in use 767A, the queue is initialized 768 by the Clear-Phone-Queue sub-routine (blocks 771 to 772A), the Emergency-Make-Call flag is set 769A (the flag that starts the actual phone calls), and the Queue-In-Use flag is set 769B. Then, the message is added to the queue 770. If the queue in use flag is already on 767A, indicating other messages are being processed, the new alert message code is added to the queue 770. Next, processing for the routine ends and returns to the calling program.

The Clear Phone Queue sub-routine begins at 771. This routine clears out the queue for any pending calls whenever a new Fail Safe alert condition occurs and one or more calls from a previous alert are pending. This approach is necessary to insure that the new alert message code is added to any pending alerts and the pending call table includes all persons scheduled to be notified of a Fail Safe alert situation. Processing begins by clearing the queue area 771A. Then, the queue of pending calls is rebuilt using all Fail Safe dialing strings contained in non-volatile RAM 772. Finally, the Queue-In-Use flag is set off indicating that Fail Safe alert calls are pending. Next, processing for the routine ends and returns to the calling program.

The Get-Next-Phone number sub-routine begins at block 779. This sub-routine begins by examining the next phone number in the queue 779. If all phone numbers have been called and messages queued delivered 780, then processing for the sub-routine returns a NONE indicating that no more calls need to be processed. Otherwise, if the phone number examined has undelivered messages 781 then processing for the sub-routine returns the next NUMBER to the calling program. Otherwise, processing loops back to 779 to examine the next phone number.

Once a message is queued by this method, phone calls will be started and will continue until (1) all messages (including subsequently added messages) are delivered, (2) pending alert calls are aborted by a person called hitting a designated touch tone (e.g. "*") between alert messages, or (3) until the phone call timeout is reached (i.e. during a total power failure), which will set the Abort-To-Main flag.

The Make-A-Call sub-routine begins at block 773. The sub-routine begins by getting the next phone number via the Get-Next-Phone-Number 773A sub-routine (FIG. 5AR connector BT). If no more phone numbers are available 774 (i.e. NONE was returned), processing for this sub-routine ends and the sub-routine returns CALL END to the calling program. Otherwise, the sub-routine scans the message queue for the phone number found for any undelivered messages 775. (Note: each phone number has a queue array containing all possible types of alert message codes and the delivery status of each code. Possible statuses are (1) undelivered, (2) previously delivered or (3) pending delivery. A given alert message is only delivered once and cannot be delivered again until after another monitoring is initiated. When a monitoring session begins all array entries are set to an undelivered status. If more than one message is pending delivery when a call is placed, all pending alerts will be concatenated when the alert call is answered.) Next, the End-Calls flag is tested 776B to determine if any pending undelivered messages should be discarded. This flag is set if either someone presses the Watch Dog button while alert calls are in progress or someone presses the required touch tone (e.g. "*") to abort any pending calls when an alert message is being delivered to them over the phone. If the flag is set 776A; any pending undelivered messages are changed to a delivered status 778 and the sub-routine ends returning MORE CALLS to the calling program (i.e. processing continues to loop in this manner until all pending calls are flagged as delivered).

If the End-Calls flag is not set, the dialing string is scanned to determine if any "%" or "!" exist. If either of these characters are found 776C, the alert call must be monitored to determine if the person called presses a specified touch tone during the period of silence between alert messages 776D. If the call must be monitored for the presence of a touch tone 776C, the DTMF-Tone flag is enabled and processing continues at block 777.

Next, the alert call is placed using the Call Phone sub-routine 777 located at FIG. AJ connector BB. If ANSWER is returned from the Call Phone sub-routine, the message queue is updated for the delivered message(s) 778, processing for this sub-routine ends, and MORE CALLS is returned to the calling program. Otherwise, if CANCEL is returned (meaning all pending calls should be aborted) 777B, the End-Calls flag is set 777C and the Queue updated reflect the current call was delivered 778. Next, processing for this sub-routine ends, and MORE CALLS is returned to the calling program.

The Proc-Job-Tracking sub-routine begins at block 790. This routine sets the appropriate failure message code should a Fail Safe condition occur during a job status monitoring session.

The sub-routine begins by testing if the Emergency-Serial flag has been set 790A indicating the work station has failed. If this flag is set 790A, the flag is cleared 790B and the Do-Warning sub-routine is invoked 790C (see FIG. 5V, connector AJ) to announce the Work Station failure two minute warning through the Unit's speaker. If ABORT is returned from the Do-Warning sub-routine 790D, processing for this sub-routine ends. Otherwise, the Add-To-Phone-Queue sub-routine is invoked 790E at FIG. AR connector BQ and processing for this sub-routine ends.

If the Emergency-Serial flag has not been set 790A, the Emergency-Main-Power-Fail flag is tested 791. If this flag has been set 791, indicating that main power has failed, the flag is cleared 791A and the Do-Warning subroutine is invoked 791B (see FIG. 5V, connector AJ) to announce the Main Power failure one minute warning through the Unit's speaker. If ABORT is returned from the Do-Warning sub-routine 791C, processing for this sub-routine ends. Otherwise, the Add-To-Phone-Queue sub-routine is invoked 791D at FIG. AR connector BQ and processing for this sub-routine ends.

If the Emergency-Main-Power flag has not been set 791, the Emergency-Workstation flag is tested 792. If this flag has been set 792, it indicates that the Unit has not received notification from the Work Station's Job Status Tracking TSR program that disk I/O has occurred for longer than the specified period of time (which means the job step being tracked is considered failed). In this case, the flag is cleared 792A; the Button Enable flag is set 792B; and the Do-Warning sub-routine is invoked 792C (see FIG. 5V, connector AJ) to announce the Job Step failure warning through the Unit's speaker. After a 20 second wait period, 792C processing returns from the Do-Warning sub-routine and the Button-Enable flag is cleared. If the Watch Dog button was pressed during the 20 second period 792E, processing for the routine ends. Otherwise, the Add-To-Phone-Queue sub-routine is invoked 791D at FIG. AR connector BQ to add the Job Step failure code to the message queue and processing for this sub-routine ends.

If the Emergency-Workstation-Flag is not set 792, the Emergency-Scheduled-Reboot flag is tested 793. This flag is set when a scheduled reboot is about to occur, so that a normal monitoring session can begin. If a scheduled reboot occurs during the time a job status monitoring session is active, the scheduled reboot will be continually differed after the job status tracking session has ended 793A and processing for this routine ends. If the Emergency-Scheduled Reboot Flag is not set processing for this routine ends.

Figure 6B:
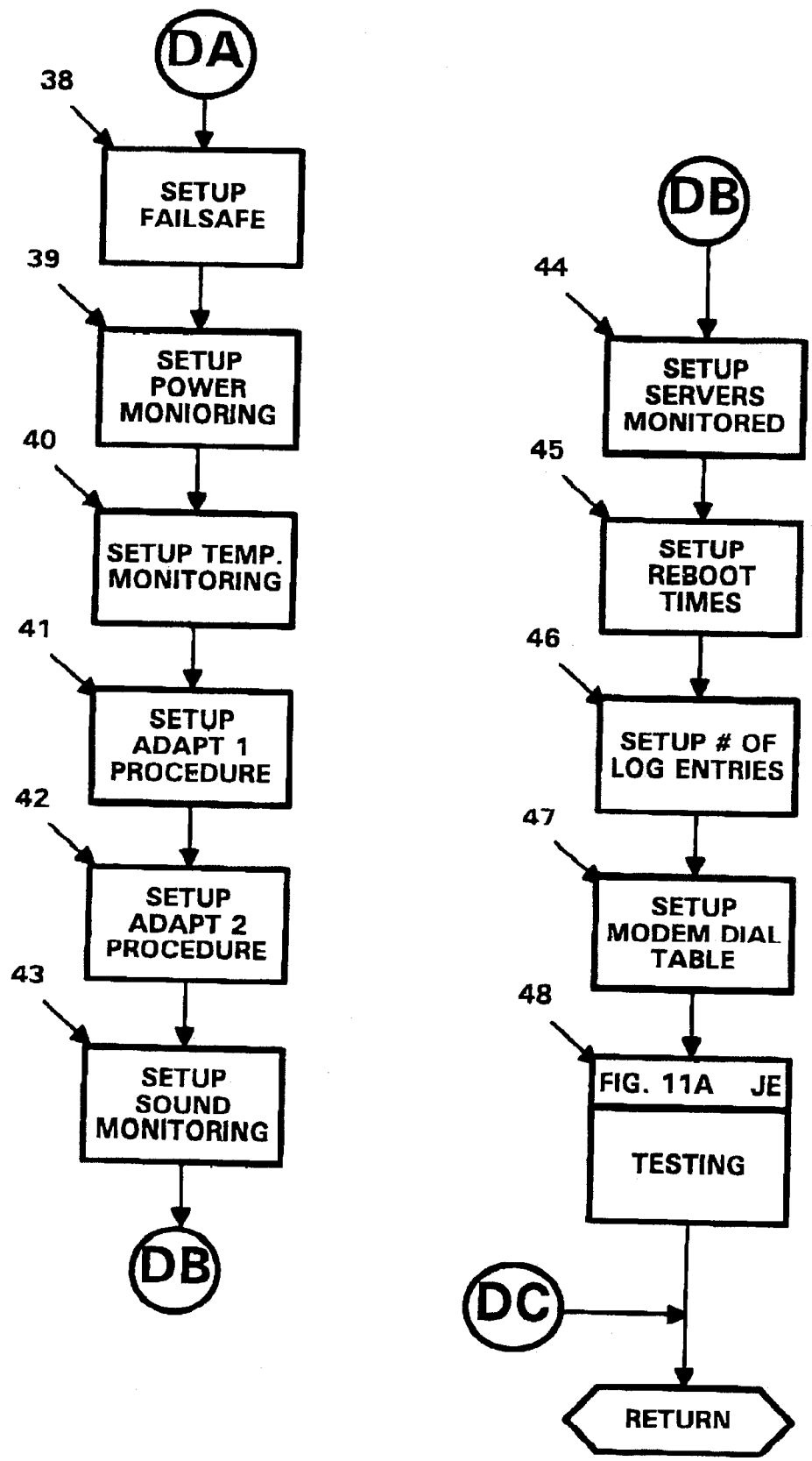

FIG. 6 describes how the software required to interface the Work Station 2 with the Unit 10 is installed. The actual program source code required to (1) Install all of the application software on the Work Station (FIG. 6), Setup the Work Station's after the Software is installed (FIG. 7), Re-configure the Work Station's monitoring system setting as required (FIG. 10), Test the system (FIG. 11), and produce System Reports is presently written in Clipper (DBase) language. The top level Clipper program name required to implement all of the above referenced figures is N911.PRG. The program source code is heavily commented to explain exactly what processing is occurring. Calls are made from clipper programs to several utility programs written in Microsoft C.

The Install program is invoked by executing the INSTALL.BAT file. Processing begins on FIG. 6A block 31. First, a product logo is displayed on the Work Station's screen 32. Then, the operating environment of the Work Station is tested 33 to insure that (1) sufficient available low memory existing to run the installation system on the Work Station; (2) the user is installing the software directly from the installation floppy diskette provided; and (3) the user is attached to at least one File Server 1 and has supervisory privileges. If any of these tests fail, Install processing will end and an applicable error message will be displayed on the Work Stations's screen. Otherwise, the linkage is tested 34 between the Work Station and the Unit 10. Each of the four possible serial ports on the Work Station (i.e. COM1 through COM4) is tested to determine if the linkage can be established 34. If the linkage cannot be completed after these tests, an error message is displayed and the user is given the option to retry the test, after rechecking the Unit 10 is turned on and the serial cable is properly connected between the Work Station (block 9) and the Unit (block 11). If the user elects not to retry the test or all available serial interrupts are in use by other devices, Install processing ends. Otherwise, if the linkage has been successfully completed 34, the system requests the user to enter a network login ID to be used by the system to access each network file server to be monitored by the system. When the login ID is entered, the system automatically sets up the ID on all active servers and server volumes 35, assigning the ID the minimum access rights needed to monitor the servers and automatically setting up a directory on each volume, using the login ID as the directory name.

Next, the Install program requests the installer to specify the local drive and directory where the software necessary to interface the Work Station to the Unit should be installed 36. The install program confirms that a valid directory has been specified and copies the software from the installation diskette provided to the specified drive and directory. If the software has been previously installed to the specified drive and directory, the user is given the option to either abort further processing or install the software to a different drive or directory.

After all necessary software has been copied to the specified drive and directory 36, the Install program scans the Work Station's AUTOEXEC.BAT to identify which modifications are necessary to insure that a monitoring session begins automatically 37. Using the AUTOEXEC.BAT file in this manner would be obvious to anyone skilled in the trade. If an AUTOEXEC.BAT file does not exist, one would be created and the necessary commands inserted by the Install program required to attach to the File Server(s), then begin a monitoring session. If the AUTOEXEC.BAT exists, any commands used to attach to the File Server(s) would be re-arranged to the top of the AUTOEXEC.BAT file, then instructions inserted to begin a monitoring session and then logout of the File Server(s), immediately after a monitoring session has ended. In any case where the instructions required to attach to the File Server(s) cannot be located, the installer would be prompted to input the directory storage location of these commands into the Work Station.

Next, the Install program requires the configuration and testing of the software just installed. First, the configuration process consists of establishing a table of all fail safe alert phone numbers and a Unit ID 38. Then, text messages, and digitized voice messages are setup for each type of alert situation that is currently detected during a monitoring session including AC main power monitoring 39, temperature monitoring 40, adapter 1 monitoring 41, adapter 2 monitoring 42, sound monitoring 43 and File Server monitoring 44. Next, the Setup process requires the entry of (1) the scheduled boot times, needed to automatically activate monitoring sessions on a daily basis 45, (2) the maximum size of the monitoring session log file 46, and (3) a dialing string to be call via an optional modem attached to the work station to be called, if the Unit should fail during a monitoring session 47. This Install process for blocks 38–47 uses the same program logic discussed in detail in the narrative for Configuration processing (FIG. 10 at blocks 102, 104, 106, 108, 110, 112, 125, 127, 129 and 129B respectively). Once all of these steps have been completed, a Testing is initiated 48 to permit system testing to insure that the entire apparatus just installed is functioning correctly. The Testing sub-routine begins on FIG. 11A at block 140. This routine invokes 12 different tests, as set forth and discussed as part of the narrative for FIG. 11. Once the installer is satisfied that all tests have been successfully completed, Install processing ends and the Unit is ready to initiate monitoring sessions (see FIG. 8A at block 200) when requested to do so by the Work Station.

Once the software required to interface the Work Station 2 with the Unit 10 is installed (FIG. 6), Setup programs provided with the apparatus can be executed to (1) re-configure the software system installed, (2) test the operations of the apparatus, (3) print out system log or configuration reports or (4) update the Job Status alert phone call table in preparation for a Job Status Monitoring session. A block diagram detailing the software menuing process required to access these major segments of Setup processing is provided as FIG. 7.

Figure 7A:
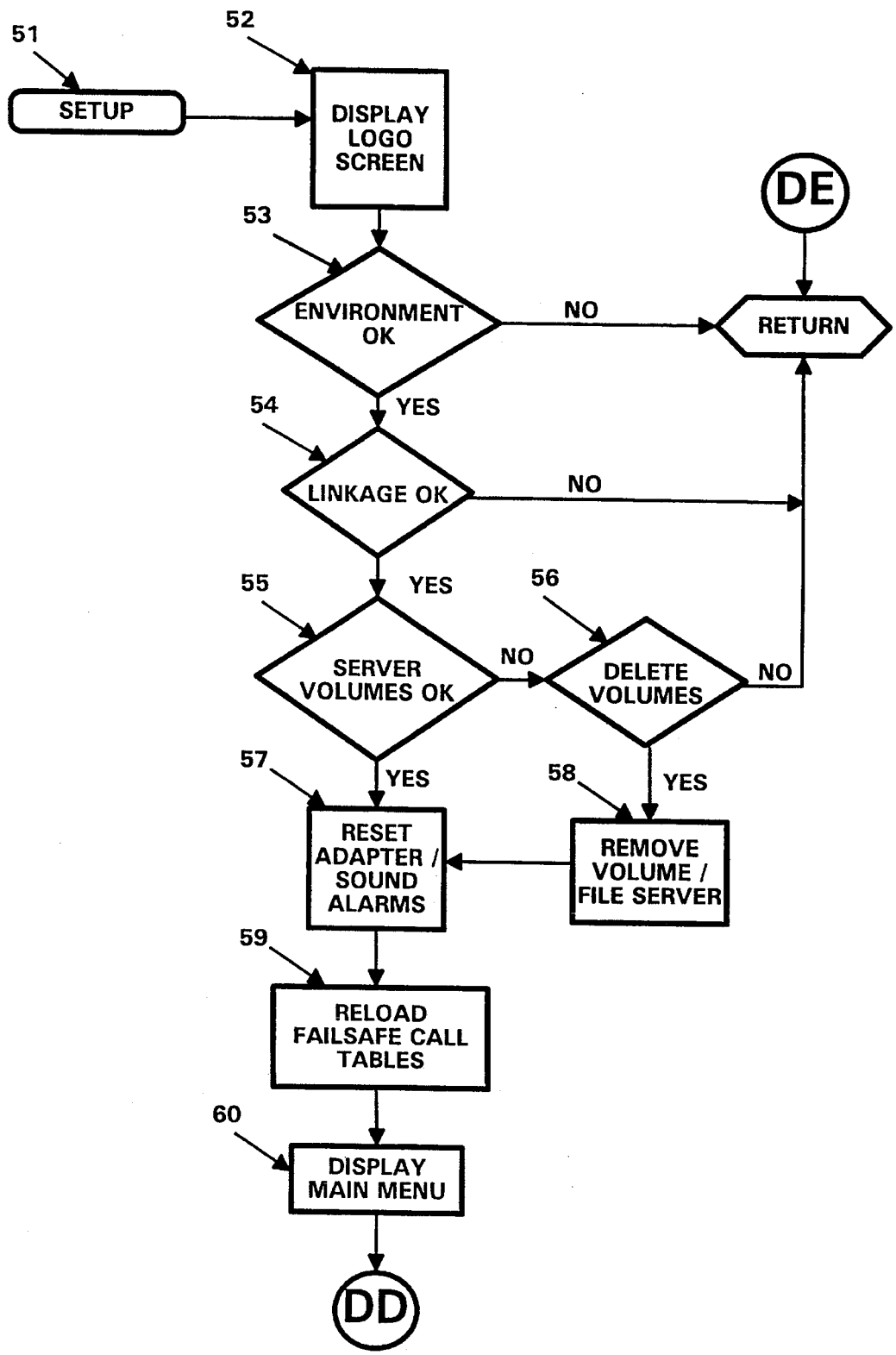
FIGS. 7A and 7B are block diagrams describing the overall software menu process necessary to setup the invention to the user's requirements and test the apparatus is functioning properly.
Figure 7B:
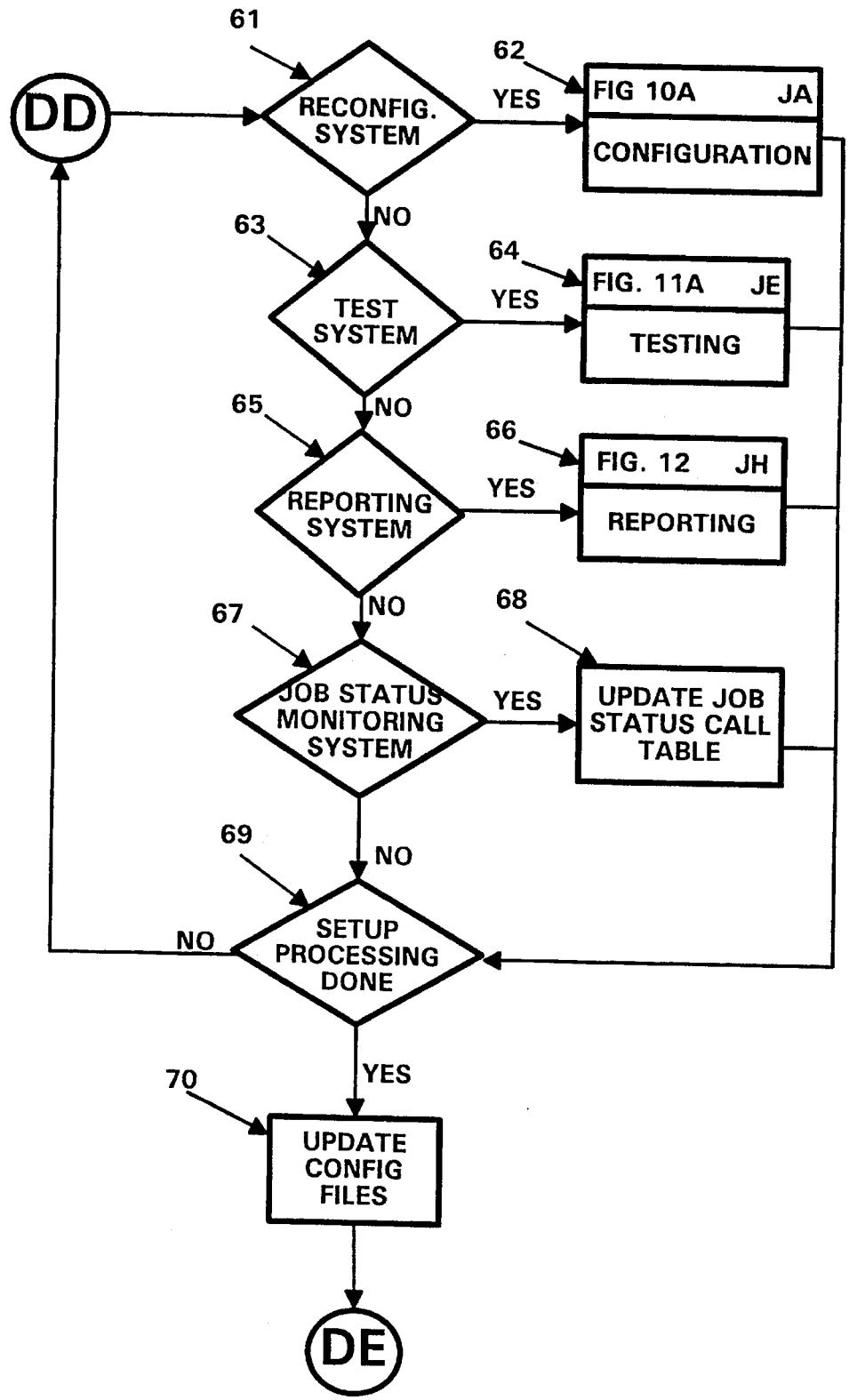

As shown in FIG. 7A, Setup processing begins at block 51. First, a software logo is displayed 52, the Work Station's environment is checked 53, and the linkage between the Work Station and the Unit is tested 54. The software routines executed for this processing use the same logic described for FIG. 6A under block diagram numbers 32, 33, and 34 respectively. If a problem is detected during any of these program start up tests, Setup processing is ends. Also, processing is terminated if the Setup program cannot access any of the of the File Server(s) that it was previously configured to monitor 55 and the user does not want to remove the missing File Server from the monitoring process 56. In this case the user would be required to determine why the File Server was unaccessible and restore access before re-starting Setup processing. If the user chooses to remove a File Server that is unaccessible from the list of File Servers monitored 56, all alert configuration information for the unaccessible File Server(s) would be automatically purged from the system configuration 58 and Setup processing would continue.

Next, Setup processing would send a command to the Unit to reset both adapter ports and the loud sound alert status indicator(s) to an off (i.e. non-alert status) 57 in preparation for possible testing of these devices during Setup processing. Then, all alert phone number dialing strings related to Fail Safe calls or Job Status Monitoring in effect as of the last Setup processing session would be sent to the Unit 59. The Unit would then refresh nonvolatile RAM memory using these dialing strings. This refresh approach insure that any corrupt or lost dialing strings stored in the Unit will be corrected automatically each time Setup processing is initiated. After this process is complete, a Main Menu of possible Setup processing in options is displayed on the Work Stations's screen 60.

The first menu option presented permits the monitoring system to be reconfigured 61. When selected, a Configuration subroutine is invoked and another menu of possible Re-configuration processing options is displayed 62. A block diagram of detailing these menu options and the associated processing steps performed is shown beginning on FIG. 10A at block 100 connector JA.

The second menu option presented permits the current configuration and other features of the apparatus to be tested 63. When selected, another menu of possible testing options is displayed 64. A block diagram detailing these menu options and the associated processing steps performed is shown beginning on FIG. 11A at block 140 at connector JE.

The third menu option presented permits current configuration to be listed to print or the contents of the monitoring log file to be displayed on the Work Station's screen or listed to print 65. This menu option also permits whatever is spoken when an alert call is last answered to be replayed. A block diagram detailing these menu options is shown on FIG. 12 beginning at block 180 connector JH.

The fourth menu option 67 presented permits the Job Status Monitoring alert phone call table to be updated 68. The numbers contained in this table are called when a job running on the Work Station scheduled to be monitored is aborted and/or completed.

Processing associated with the Job Status call table is identical to all other types of alert call table processing, except the number of phone dialing stings that may be entered is presently limited to three dialing strings.

The final menu option 69 presented permits exiting from Setup processing program. If this menu option is selected, the system configuration files stored on the Work Station are updated 70, then the Setup program is terminated. Otherwise, another menu option may be selected for processing and Setup processing continues at connector DD.

Once the apparatus has been configured as desired, a Monitoring session begins (see FIG. 8A beginning at block 200) whenever the Work Station 2 is booted. A block diagram indicating the processing occurring within the Work Station during a monitoring session is set forth in FIG. 8. The Clipper program (i.e. program N911RUN.PRG) source code presently used to process a monitoring session. The source code for the Microsoft C program presently used to at block 226A to permit the Work Station to place a call (via an option modem attached to the Work Station) should the Unit fail.

Figure 8A:
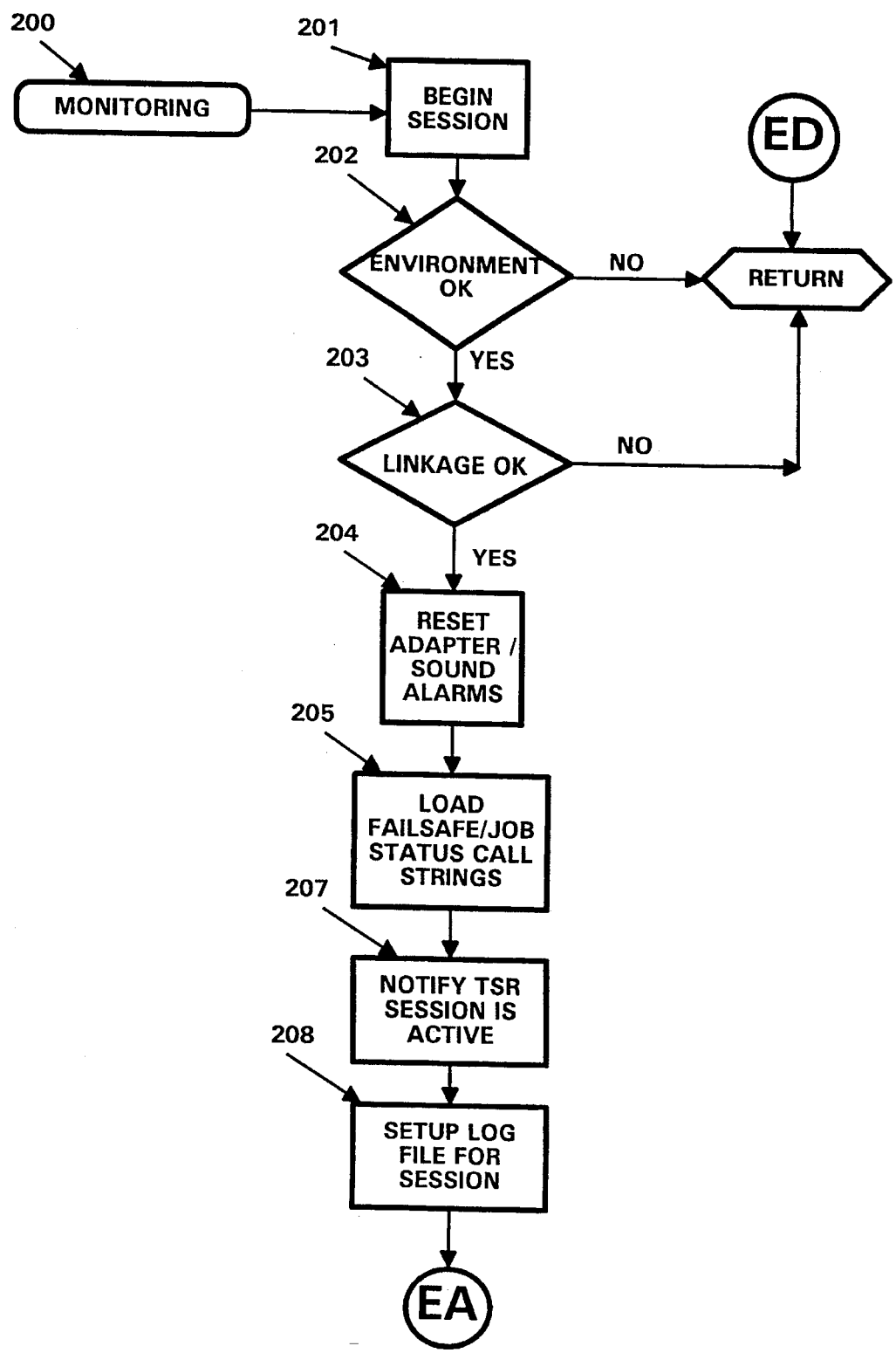
FIGS. 8A, 8B and 8C are block diagrams describing the software operating in the Work Station that controls processing during a monitoring session.
Figure 8B:
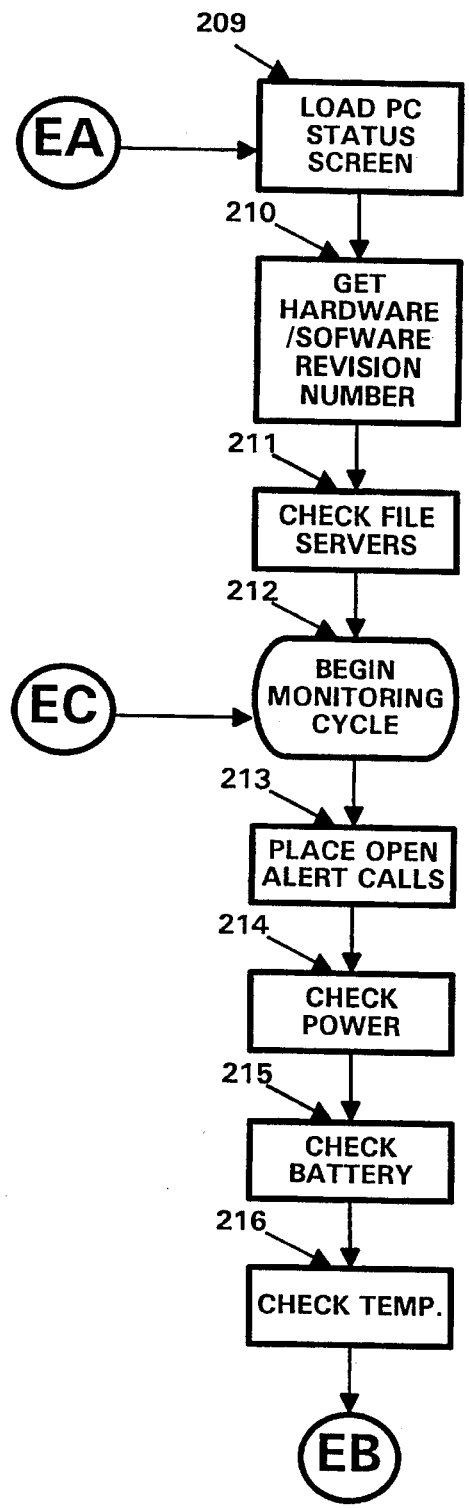
Figure 8C:
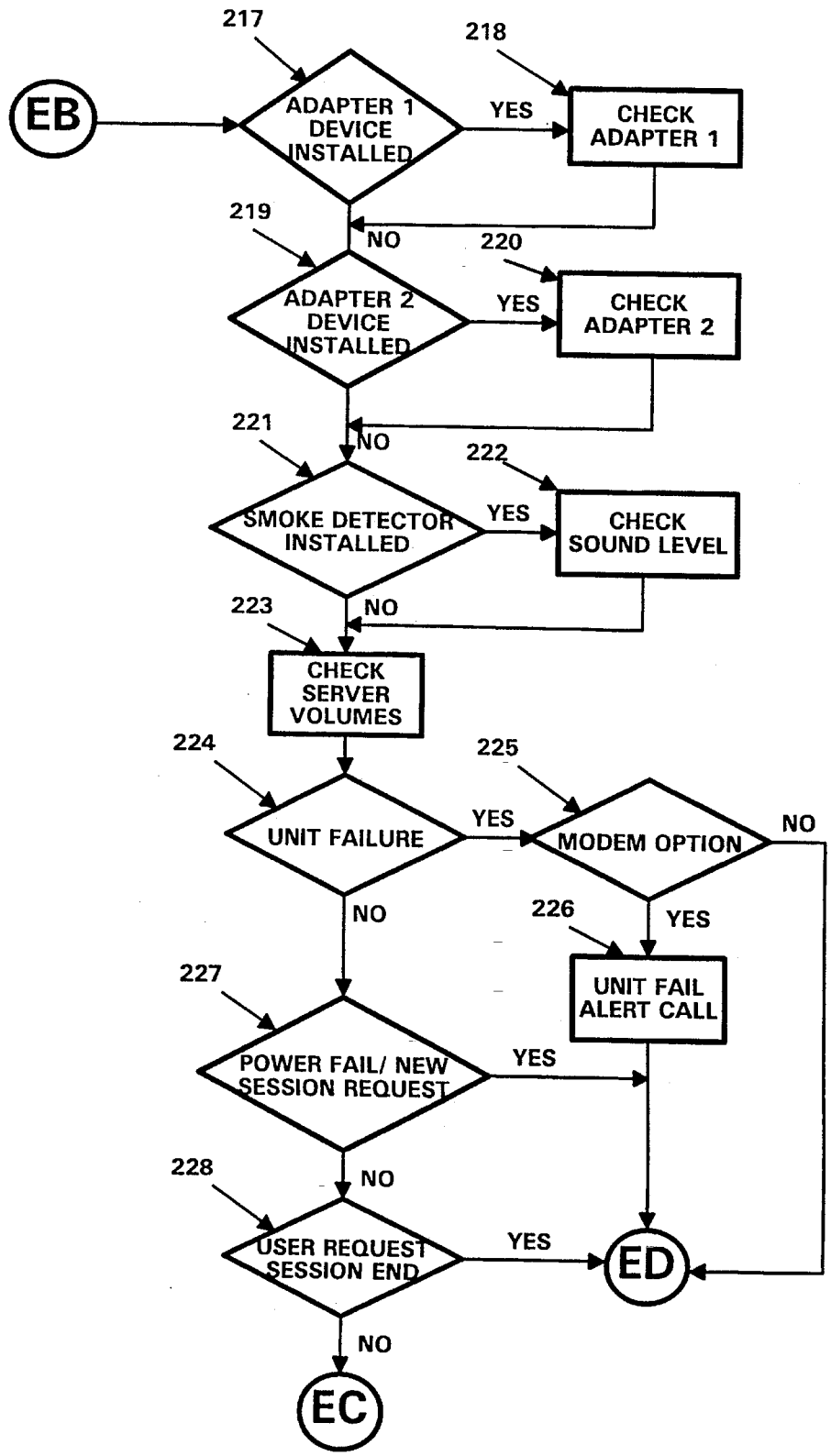

As shown starting on FIG. 8A at block 200, Monitoring processing begins 201 by checking the Work Station's Environment 202 and the serial linkage between the Work Station and the Unit 203. The software routines executed for this processing use the same logic described in the narrative for FIG. 6 under block diagram numbers 33 and 34 respectively. If a problem is detected during any of these program start up tests, the Monitoring process is terminated.

Next, the Monitoring process sends a command to the Unit 10 to reset both adapter ports and the loud sound alert status indicator to an off (i.e. non-alert status) 204 in preparation for testing of these devices during a Monitoring session. Then, all alert phone dialing strings related to Fail Safe calls or Job Status Monitoring in effect as of the last Setup processing session would be sent to the Unit 205. The Unit would then refresh nonvolatile ram memory using these dialing strings. This refresh approach insures that any corrupt or lost dialing strings stored in the Unit will be corrected automatically each time a monitoring session is initiated.

Then, the Monitoring process would notify the Unit 10 that a monitoring session had just been activated 207. This message causes the Unit to (1) disable it's internal speaker to operate in a silent alarm mode, (2) disable booting the Work Station via cutting battery reserve power should main power fail, (3) disable regularly scheduled loud sound level detection tests (i.e. such tests will be made only when instructed to do so during the Monitoring process), and (4) expect constant communication from the Work Station at least once every ninety seconds..

Next, the Monitoring process would update the session log file 208 for the new session by appending an entry to the log indicating when the session began and purging any the oldest log entries in a case where the number of log entries exceeded the user specified limit setup during system configuration processing.

A status screen would then be formatted and displayed 209 on the Work Station's CRT screen to permit the results of each monitoring test to be displayed immediately after the test had been completed. Then, the Monitoring process would display to the screen it's software revision number and request and display the hardware revision number supplied from the Unit 210.

After the Monitoring screen display is complete, the Monitoring process checks the status of any File Server(s) 1 that the apparatus has been configured to monitor 211. This test involves invoking network operating system commands that will cause an active file server to be accessed. As each File Server is tested the name of the File Server being tested is displayed on the status screen. If an failure is detected, meaning the server could not be accessed, the message text related to the failure(s) is displayed. Otherwise, a status of OK is displayed.

At this point initialization processing for a session is complete, and the Monitoring process begins a continuous monitoring loop beginning at block 212 (cycle) until someone presses the F1 Key on the Work Station's keyboard. The first step in a monitoring cycle is to notify the Unit 10 to place each open alert phone call that has been identified during the previous processing cycle or has not be completed 213. If the Unit indicates a particular phone call requested cannot be completed because there is no answer, the phone line is not-working, the line is busy or there is a mechanical failure, further attempts to re-try the call are delayed until the next processing cycle begins. If the phone call is completed successfully, no further attempts are made to re-contact the parties called related to a specific failure that has occurred. In the case of a power failure, any uncompleted calls related to the power failure will be aborted, if power is restored. In addition alert calls will be placed to anyone, notified of the power failure that power has been restored. The log file is updated as to the results of any phone alerts that have been placed. If the results of placing a particular phone call are the same as a preceding cycle (.e.g. the phone line of the person contacted was busy and is still busy), no additional repetitive entries will be placed in the log. Each phone call to be placed has a code indicating the appropriate voice message that should be replayed once the phone call has been completed to a person.

After any required alert calls have been placed, the Monitoring process sends a request to the Unit 10, to return the status of main commercial power coming into the Unit 214. If power has just failed (i.e. since the last cycle was completed) for a sustained period of one minute, the power failure alert message is displayed on the status screen of the Work Station, the power failure text message is written to the log file, and the persons designated to be notified of the power failure are added to the master list of alert calls to process at the beginning of the next processing cycle. If power had failed prior to the current cycle and is still not present, no further action is taken in this processing step. If power just has been restored for a sustained period of at least 20 seconds since the last processing cycle, then a power restored text message is written to the log file, anyone not yet contacted related to the power failure is taken off of the master list of alert calls to process at the beginning of the next cycle, an alert message indicating that power has been restored is added to the list of calls to process at the start of the next cycle (for anyone previously alerted that a power failure has occurred). Finally, if power has not failed during the last cycle and is still present, the phrase "OK" is flashed on the status screen for several seconds after the test is completed.

Once the main power test has been competed 214, the Monitoring process instructs the Unit to check the status of the AC backup power system 215. If the backup system was operable during the last processing cycle but has now failed, a backup power failure text message is written to the Work Station's status screen and the log file. Alert calls are not placed when the backup power system has failed, since this type of failure is considered non critical as long as main power is present.

Next, the Monitoring process instructs the Unit to determine the current temperature 216. If the temperature exceeds the user established upper or lower temperature limits, the applicable temperature alert message is displayed on the status screen of the Work Station, the applicable temperature alert text message is written to the log file, and the persons schedule to be notified of an excessive temperature situation are added to the master list of alert calls to process at the beginning of the next processing cycle. If the temperature limits were exceeded prior to the current cycle, no further action is taken in this processing step. No more than one temperature alert call will be placed to a person during a monitoring session.

Then, if optional devices have been attached to either adapter port of the Unit 217 & 219, the Monitoring process instructs the Unit to check if either of the devices attached to adapter 1 and/or adapter 2 have detected an alert condition 218 & 220. If an alert condition has been detected for the first time during a processing session and the delay specified during system configuration has been exceeded, the applicable alert message is displayed on the status screen of the Work Station, the applicable alert text message is written to the log file, and the persons schedule to be notified of the alert are addeld to the master list of alert calls to process at the beginning of the next processing cycle. If an alert for the adapter port was detected prior to the current cycle, no further action is taken in this processing step. No more than one alert call per adapter port will be placed to a person during a monitoring session. When an adapter port alert is detected, the Unit waits for the user specified number of seconds before notifying the Work Station that an alert has been detected in response to the Work Station's request. This approach was taken to give the first person arriving at the site, a grace period to disable any intruder detection device installed before alert calls are placed.

Then, if an optional smoke detection device or other sound based alert device has been acquired and installed 221, the Monitoring process instructs the Unit to use it's microphone to listen for the audible sound level and frequency produced by the external smoke detector's siren (i.e. sonalert) or any other loud sound level condition over a sustained period of time presently set to 2 seconds 222.

If a loud sound level has been detected for the first time during a processing session, the sound level is analyzed and an applicable alert message is displayed on the status screen of the Work Station; the text message is written to the log file; and the person(s) scheduled to be notified of the presence of a loud sound level are contacted (from the master list of alert calls to process) at the beginning of the next processing cycle. If a loud sound level has been detected prior to the current cycle within the same monitoring session, no further action is taken in this processing step. No more than one loud sound level alert call will be placed to a person during a monitoring session. Alerts for loud sounds that are know, such as the sound of the sonalert used by the smoke detector supplied for the Unit, will be specified during the delivery of the alert message. Unknown loud sounds detected, will be specified merely as "LOUD SOUND DETECTED" during the alert message delivery process.

Next, the monitoring process tests the status of each File Server 1 scheduled to be monitored 223. If a failure is detected, the applicable File Server failure alert message is displayed on the status screen of the Work Station, the applicable File Server alert text message is written to the log file, and the persons schedule to be notified of an File Server failure are added to the master list of alert calls to process at the beginning of the next processing cycle. If the specific File Server failure was detected prior to the current cycle, no further action is taken in this processing step. No more than one alert call will be placed for a specific File Server failure to a person during a monitoring session.

If, during a Monitoring session, the Work Station can no longer communication with the Unit 224, the Monitoring process checks if the optional modem alert call feature has been installed 225. If the feature has been installed, a call is placed to the number designated to be called 226 (via a modem connected to the Work Station) during Install or Setup processing, as previously discussed. Then, Monitoring processing ends.

If, during a Monitoring session, there is a total power failure, or a new Monitoring session is scheduled to begin automatically via a user specified boot time (set up during system configuration processing) 227; the monitoring session will be terminated.

If, during a monitoring cycle, someone presses the F1 key on the Work Station's keyboard 228, the monitoring session will be terminated and the Work Station will return to a normal operating mode.

Otherwise, processing loops back to block 212 to begin another Monitoring cycle (connector EC).

FIG. 9 contains the block diagram for the Work Station interface program 8, which handles all communications between the Work Station and Unit. This sub-routine is called by the Install 5, Setup 6, and Monitoring 7 software programs operating in the Work Station, to configure, test and obtain status information from the Unit. Commands sent by the interface program to the Unit are processed by the Unit as discussed in the narrative for FIG. 5, for blocks 624–694. A data file containing one or more records is created by the calling programs 6, 7, and 8 immediately prior to calling the Interface program. The first record will always contain a three digit ACTION code in the first three digits of the record indicating the type of service requested as follows:

| CODE | Action Requested | REF |
|---|---|---|
| 001 | Return the Current Temperature | 845–847 |
| 002 | Return the Status of Power | 848–850 |
| 003 | Return Status Of Battery | 851–853 |
| 004 | Cut power to Work Station | 854–656 |
| 005 | Place Phone Call Using Dial String Only | 903–904 |
| 008 | Return Status of Adapter port 1 | 857–859 |
| 009 | Return Status of Adapter port 2 | 860–862 |
| 010 | Begin Voice Recording for a message | 901–902 |
| 020 | Playback Voice Message recording | 899–900 |
| 021 | Dial out Playback Pre-Set Work Station Fail | 893–894 |
| 022 | Dial out Playback Pre-Set Total power Fail | 895–896 |
| 023 | Dial out Playback Pre-Set Smoke Alert | 897–898 |
| 075 | Dial out Playback Pre-Set Loud Sound Alert | 897–898 |
| 024 | Playback Pre-Set total power failure alert | 863–865 |
| 025 | Playback Pre-Set Work Station failure alert | 866–868 |
| 026 | Playback Pre-Set Smoke Detected Alert | 869–871 |
| 076 | Playback Pre-Set Loud Sound Detected Alert | 869–871 |
| 027 | Place Call Using Recorded Speech | 905–906 |
| 028 | Set Unit ID/Fail Safe Dial strings | 872–874 |
| 030 | N911RUN Processing DONE - OK to cut power | 887–889 |
| 040 | Load Boot Time Table | 878–880 |
| 050 | Work Station Monitoring session activated | 881–883 |
| 051 | Work Station Monitoring session ended | 884–886 |
| 060 | Begin Configuration Session | 907A–907B |
| 061 | End Configuration Session | 907C–907D |
| 070 | Listen for Loud Sound Level | 890–892 |
| 071 | Enable Loud Sound Detection VIA Unit | 907E–907F |
| 072 | Alert Delay in Seconds ADAPTER 1 Alarm | 907L–907M |
| 073 | Alert Delay in Seconds ADAPTER 2 Alarm | 907N–907P |
| 074 | Disable All Sound Detection VIA Unit | 907G–907H |
| 080 | Disable Only Loud Sound Detection VIA Unit | 907J–907K |
| 090 | Get Hardware/Software Version Numbers | 907Q–907R |

The second record will contain the dialing string for code 005. For code 028, the second record will contain the Unit ID number (i.e. 1–9). For codes 010 and 020, the second record will contain the file name from which the recording should be stored or played back. For codes 021, 022, 023 or 075; the second record contains a speak code (i.e. Y or N) followed by the dialing string to be called. For code 027, the second record contains the dialing string to be called. For code 040, the second record will contains the number of minutes from the present time that the next boot should occur. A value of "**" means that this boot feature should be disabled. Otherwise, the number of minutes to the next boot will be between 0005–1440. For codes 072 and 073, the second record contains the delay in seconds for Adapter Ports 1 and 2** before an alert is issued.

For code 027 the third record will contain the file name of the recording to be played once the dial string is complete. For code 028 the third and subsequent records contain the Fail Safe dialing strings (one dialing string per record).

Once a service request has been processed by the interface routine 8, a three digit result code will be returned from the interface program to the calling program as follows:

| ACTION CODE | RESULT CODE | RESULT CODE DESCRIPTION |
|---|---|---|
| 001 | <TEMP> | Current temperature as three numeric Digits (eg 080 = eighty degrees). A code of 000 indicates thermistor failure. |
| 002 | 200 | Power is OK |
| 001 | 201 | Power Has failed |
| 003 | 300 | Battery is OK |
| 004 | 301 | Battery Not Present or has failed |
| 005/027 | 401 | Power was not cut |
|  | 500 | Call was Completed |
|  | 501 | Line was Busy |
|  | 502 | No answer to call after 10 rings |
|  | 503 | Phone line not working, connected, or off hook |
|  | 504 | Call Dialing Error |
|  | 505 | Call Completed -Discard Pending Alerts |
|  | 506 | Call Completed -But no required tone |
| 008 | 800 | Adapter port 1 -ok |
|  | 801 | Adapter port 1 -failure detected |
| 009 | 900 | Adapter port 2 -ok |
|  | 901 | Adapter port 2 -failure detected |
| 010 | 910 | OK beginning to record |
|  | 911 | Recorder failure |
|  | 912 | Speak Louder |
| 020/021/022 023/024/025 026 | 920 | OK message replayed |
| 020/021 022/027 | 921 | Failure in replaying the message |
| 023/024 025/026/027 | 922 | Failure in placing the call |
| 027 | 927 | OK message sent |
| 028 | 928 | OK message processed |
|  | 929 | Error Loading Failsafe Table |
| 030 | 930 | OK Message received |
| 050 | 950 | OK boot by user |
|  | 952 | OK boot due to power failure |
|  | 953 | OK boot due to Work Station Failure |
|  | 954 | OK But reboot due to Scheduled Reboot |
| 051 | 951 | OK Message Received |
| 060 | 960 | OK Configuration Session began |
| 061 | 961 | OK Configuration Session Ended |
| 070 | 970 | Loud sound level not detected |
|  | 971 | Smoke was detected |
|  | 975 | Loud Sound detected |
| 071 | 972 | Sound detection enabled |
| 074 | 973 | Sound detection disabled |
| 080 | 973 | Loud Sound Only Disabled |
| 090 | 850–899 | Hardware revision number returned |
| ALL | 994 | Speech file open error |
| ALL | 995 | Unknown code received |
| ALL | 996 | Power is about to be Cut |
| ALL | 997 | Unit's on/off switch set to off |
| ALL | 998 | Serial Cable not connected properly |
| ALL | 999 | Unit self test failed - repair unit |

Figure 9A:
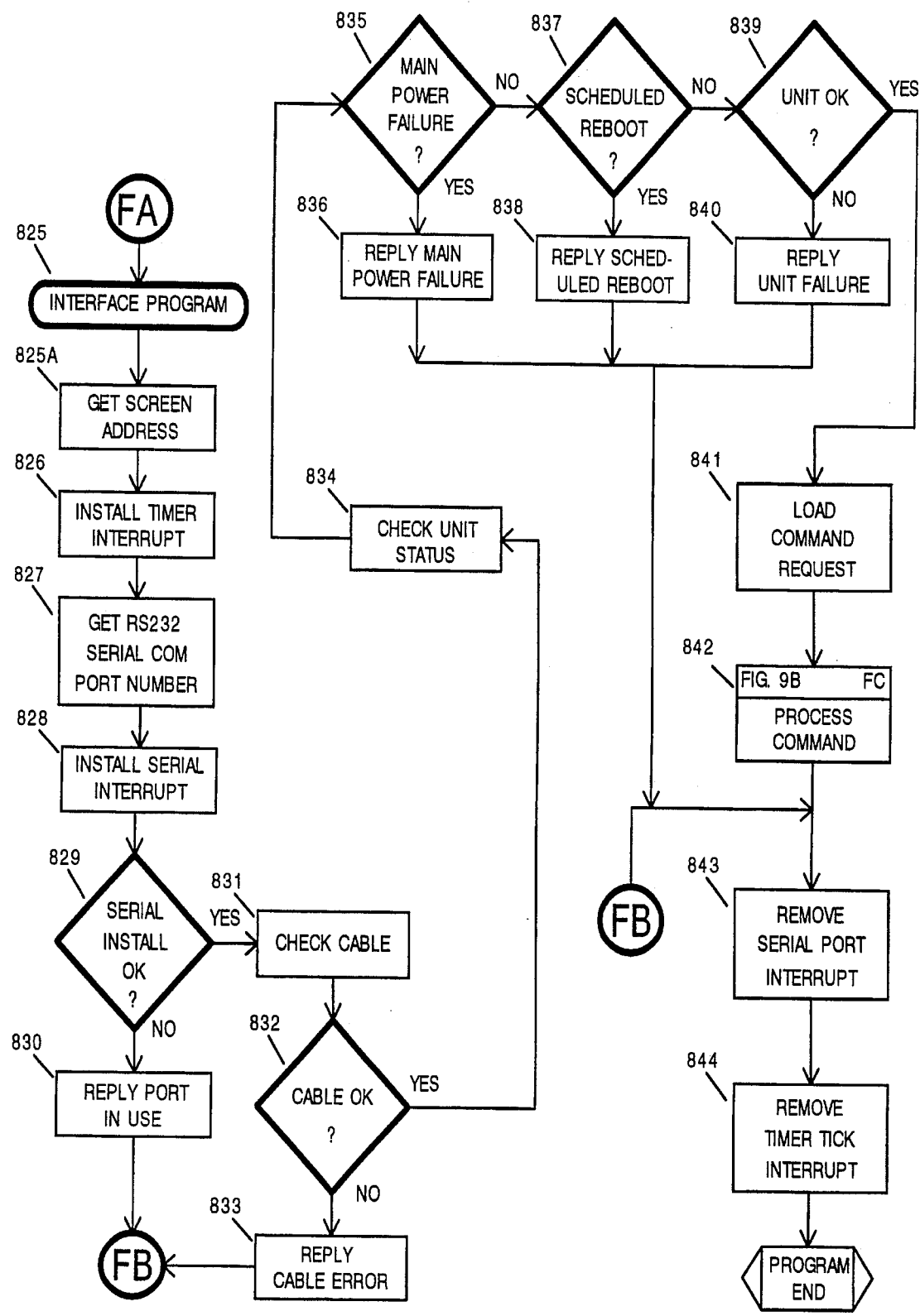

The Block diagram FIG. 9 begins at block 825 on FIG. 9A. This program is temporarily invoked by the install 6, Setup 7, and Monitoring 8 programs operating on the Work Station 2, each time it is necessary for the these programs to interface with the Unit (i.e. to receive data from or pass data to the Unit via the serial port). The program name for the Interface program is N911POLL.EXE and a copy of the Microsoft C program source code presently used.

Initially, the starting address of the Work Station video screen is determined 825A, so that a "speak now. . ." message can be displayed. This address differs for color or monochrome modes. Then, a timer interrupt handler is installed 826. This interrupt routine simply increments a counter allowing the program to have pauses and timeouts.

Then, the RS232 serial port number is acquired from a file named N911COM.DAT 827 and the serial interrupt routine is installed 828. During this install process, the port is checked 829 to see if it's interrupt is currently being used by another process running on the Work Station. If it is, then a "port in use" 830 code is returned to calling program. Otherwise, if the serial port is successfully installed 829, the cable connection is then checked 831. (The device's cable connector is wired so that an RS0232 input status signal is looped back to an output status line thus allowing the interface program to detect that the cable is connected.) If the cable is not connected 832, then a "cable error" code is returned to the calling program 833. Otherwise, a check-unit-status command is sent to the Unit 834 via the serial port of the Work Station. This command will cause the Unit to return one of several replies. If a main power failure 835 has occurred, then a main power failure reply 836 is returned to the calling process. If a scheduled boot is in effect 37, then a scheduled boot in progress reply is issued 838. If the Unit replies "OK" 839 to a request for service, then processing continues at block 841. If the Unit does not respond or responds incorrectly 839, then a "Unit Failure" code 840 is returned by the Interface program to the calling program. If a main power failure, scheduled reboot, or Unit failure occurs, the serial port 843 and timer tick 844 interrupts are removed, processing for the interface program ends, and control is returned to the calling program.

Otherwise, the command code from the calling process is retrieved 841 and the sub-routine which processes the command is invoked 842 (see FIG. 5B connector FC). After this (or any error or reply encountered above), the subprogram ends by de-installing the serial port interrupt 843 and the timer interrupt 844. Then, the serial port 843 and timer tick 844 interrupts are removed, processing for the interface program ends, and control is returned to the calling program.

Figure 9B:
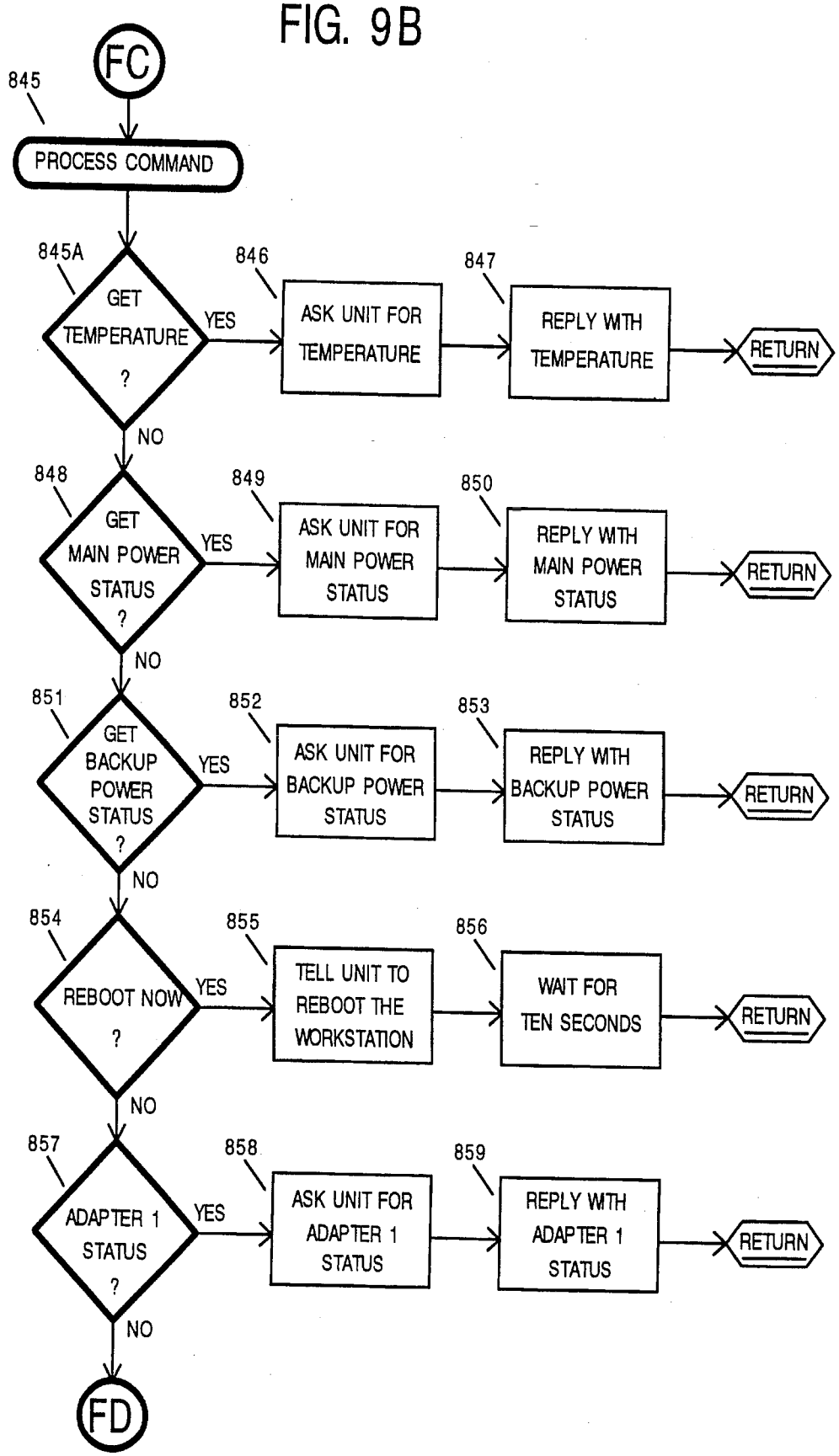
Figure 9C:
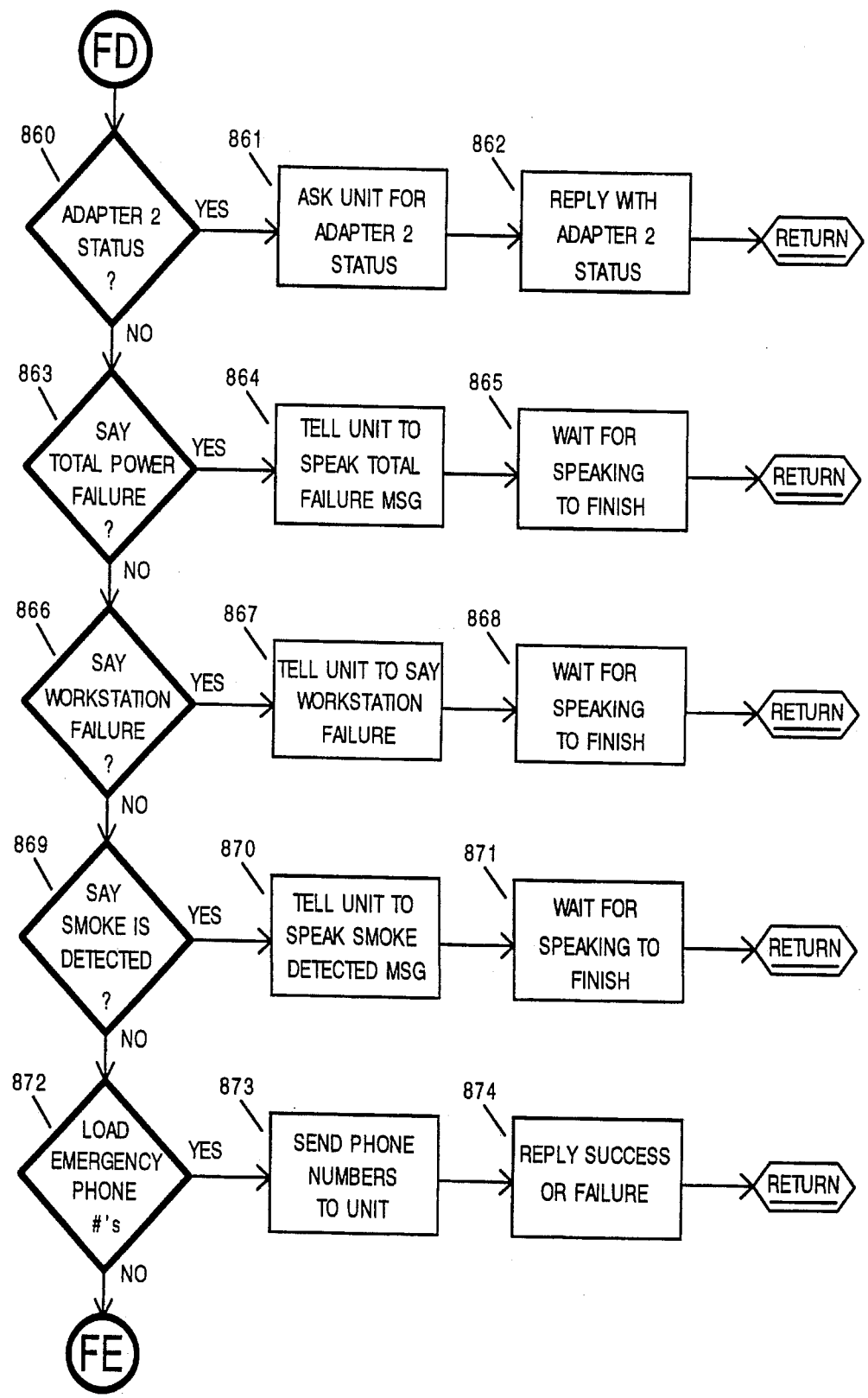
Figure 9D:
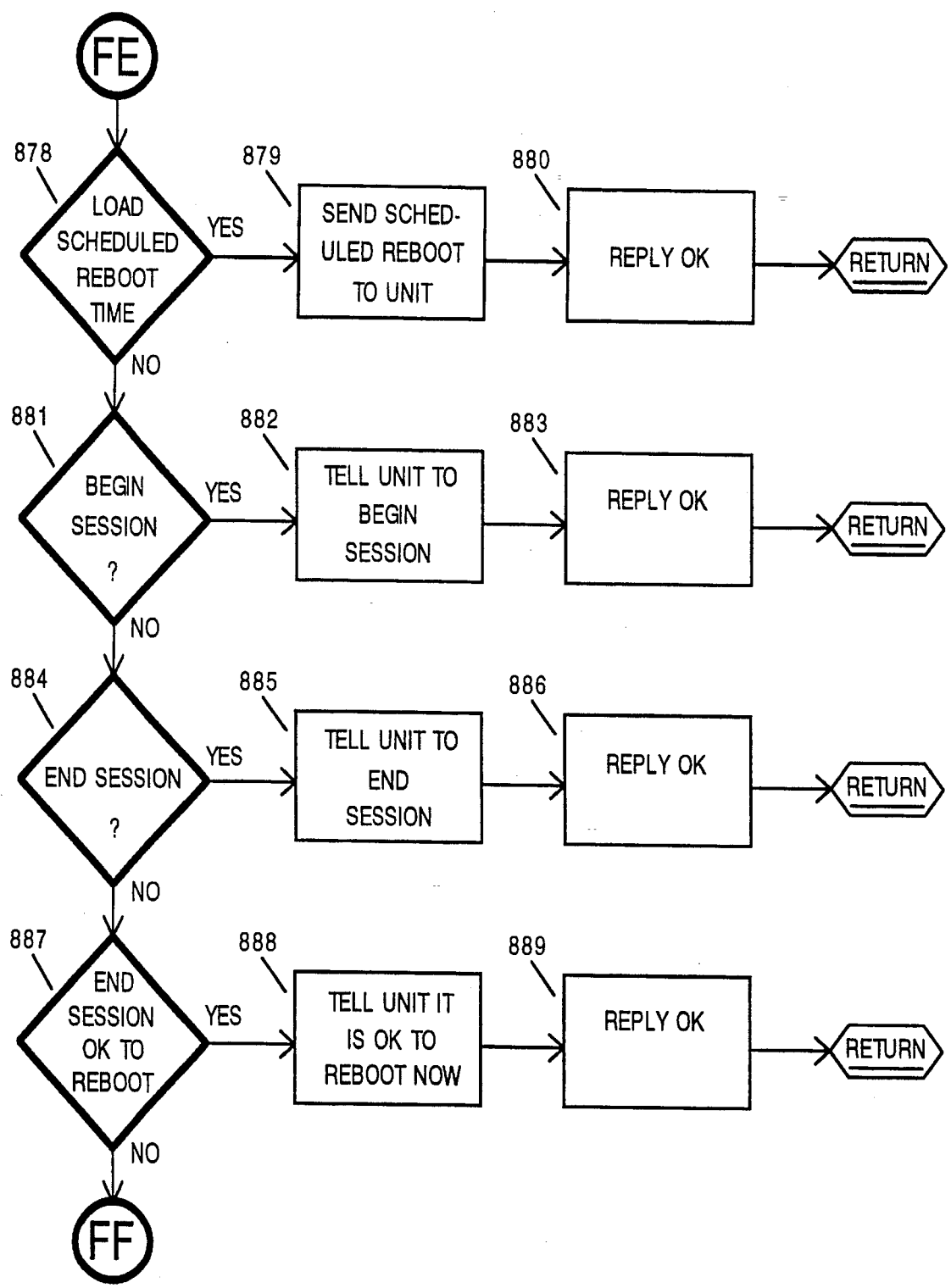
Figure 9G:
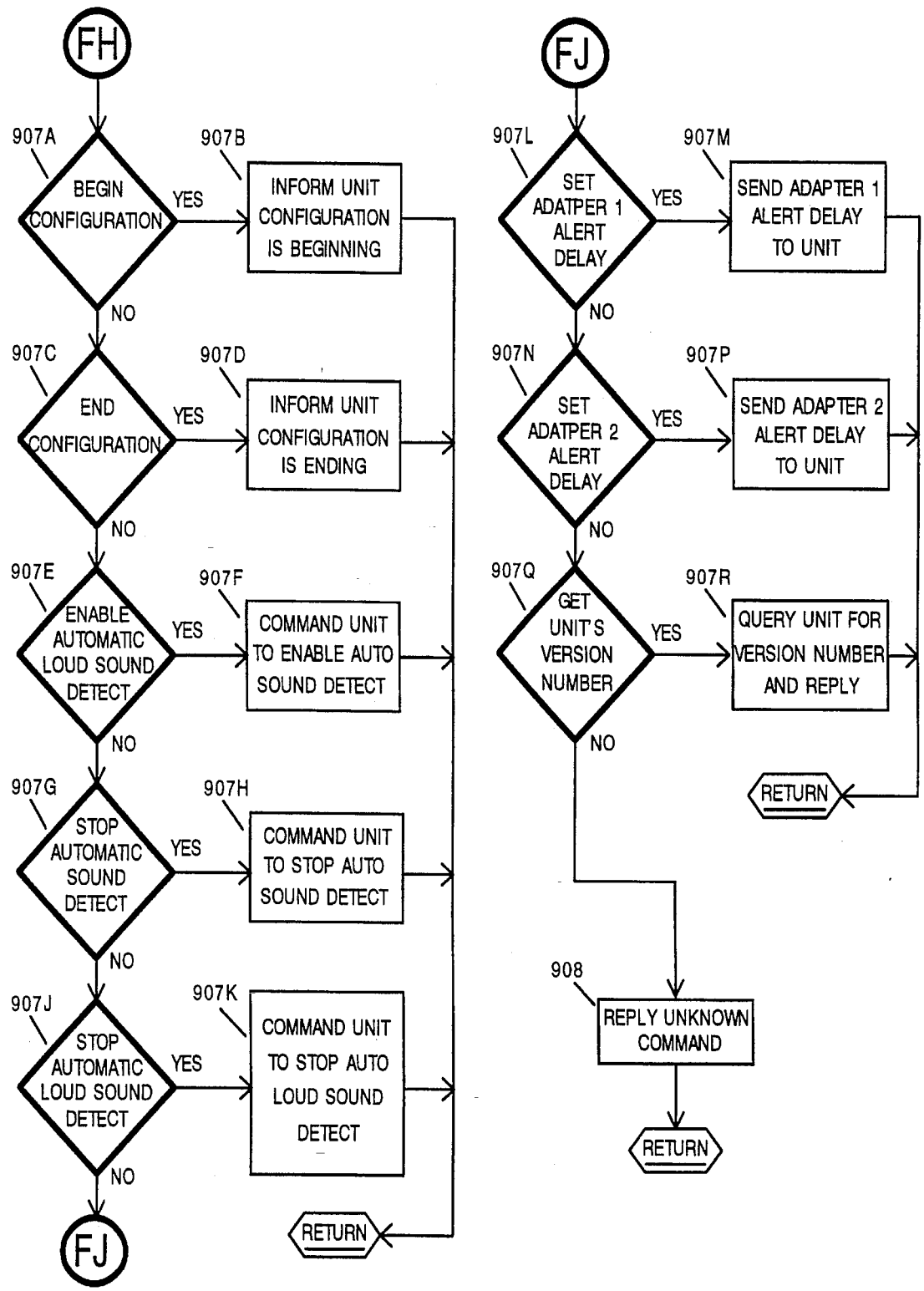

The sub-routine which processes commands from the calling program starts on FIG. 9B at block 845. A list of the specific "Action Codes" received is discussed above. Initially, this sub-routine determines which action are requested (845, 848, 851, etc.) and then sends one or more commands and/or data (846, 849, 852, etc.) to the Unit. Processing performed by the Unit when a command is received is discussed in FIG. 5 blocks 624–694. When a response is received from the Unit, a "Result Code" (847, 850, 853, etc.) is returned to the calling program. The commands: get temperature 845, get main 848 and backup 851 power statuses, get adapter 857, 860 statuses are self explanatory. For the "Re-boot Now" command 854, after instructing the Unit to remove power from the Work Station 855, the interface program goes into a wait state until power is actually cut 856 to the Work Station. This approach insures all Work Station disk file accesses are suspended when power is cut by the Unit.

Three commands 863, 866, 869 permit testing of the pre-recorded messages in the Unit. In each case a command is sent to the Unit 864, 867, 870. When the message is finished being "spoken", the Unit should return a response. At that time the interface program will then reply to the calling process with the appropriate Result Code 865, 868, 871. If a response is not received within a specified time, the interface program will respond to the calling program with an appropriate failure Result Code.

The load-emergency-phone-numbers command 872 loads 873 one or more phone numbers into the Unit's non-volatile RAM. A checksum value is appended to the phone numbers and the Unit will responds according to the correctness of the checksum at which point a corresponding reply 874 is returned to the calling process.

The next scheduled boot time 878 is sent to the Unit 879 expressed as the number of minutes until the next scheduled boot should occur. When received by the Unit, a timer is set to the designated number of minutes. When this timer reaches zero scheduled boot processing is initiated. The Unit confirms the receipt of the scheduled boot time after the timer has be set 880.

When a monitoring session begins an indicative action code is sent to the interface program by the Monitoring program 7. Then, the command begin-session 881 is sent to the Unit 882 and acknowledged 883. When the session ends a similar procedure is followed and an end-session command is sent and acknowledged 884, 885, 886. When a scheduled boot is about to occur and the Monitoring program 7 is active, the calling process, suspends disk accesses and then sends a session-end/OK-to-boot command 887, 888, 889.

When an action code is sent requesting the Unit to listen for loud sound levels, the interface program forwards a listen-for-sound 890 command to the Unit and the Unit returns zero or more period measurements, which occur during a twelfth of a second, to the interface program 891. This is analyzed for sonalert detection 892 and an appropriate Result Code is returned to the calling process. If over 100 values are collected and over 90 percent are low enough in value (thus high enough in frequency), then sonalert is considered detected. Should no loud sound be detected, the Unit will return no data, so that the higher the sound frequency present the more samples will be present. This approach is practical because it allows for the reverberation and self interference of sonalert sound as it reflects upon walls and ceiling to finally arrive at the Unit's microphone different from audible sound detected by the human ear.

Four different Action Codes (i.e codes 021, 022, 023 and 075) test the Unit's ability to dial out and deliver Fail Safe pre-recorded messages. The Fail Safe procedures tested are total-power-lost 894, Work Station failure 896, Smoke detected or other Loud Sound detected 897. Each of these procedures 894, 896, 898 invoke the Call-Test-Number sub-routine on FIG. 9H connector FL. The Interface sub-routine sends the specific request code for the desired alert message along with the alert phone number (supplied by the program calling the Interface program) to the Unit 909A. Then, the Interface program waits for the Unit to place the call and return the call-status (answered, busy, etc.) 909B. This status is then returned to the calling program using an appropriate Result Code.

Figure 9H:
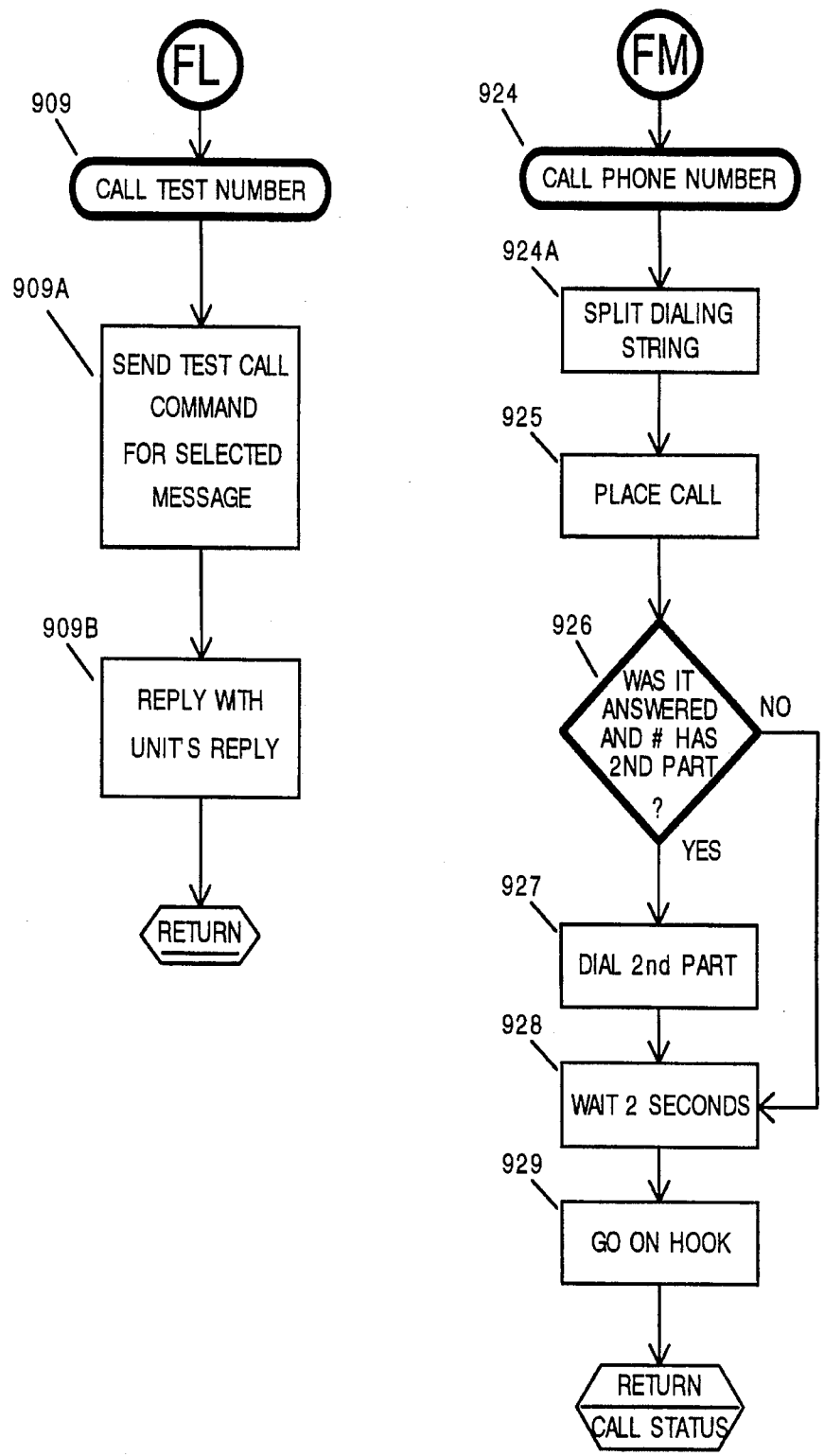
Figure 9J:
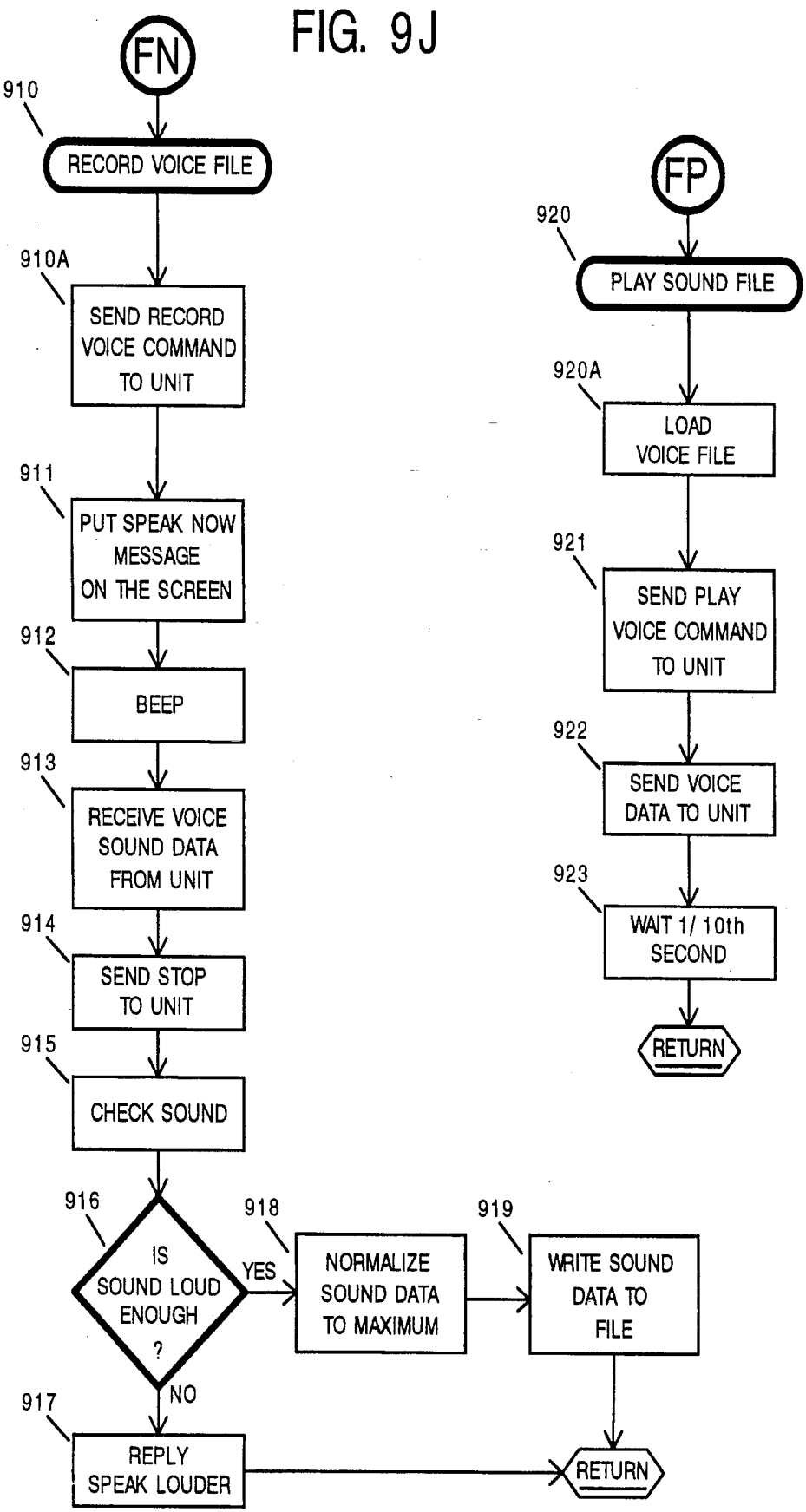

The play-voice-file Action Code 899 causes the command along with the digitized voice data (loaded from a specified file) to be sent to the Unit 900 and the play-sound-file sub-routine on FIG. 9J connector FP to be invoked. This action code is used to listen to either a user recorded alert voice message or voice data recorded from the person answering an alert call when the last alert call was delivered. In the latter case, when an alert call is answered, the first several seconds of sound detected on the phone line is digitized and recorded by the Unit, then stored in the Work Station using the phone number dialed as the storage file name. This approach allows whatever is spoken (e.g. "Hello") when an alert call is delivered to be retained as an audit trail to prove an alert call was delivered. Presently, only the voice data recorded for the last alert call placed to a particular phone number is retained as an audit trail.

The record-voice-file Action Code 901 causes a corresponding command to be sent to the Unit 902 and receives digitized sound data from the Unit via the record-sound-file sub-routine on FIG. 9J, connector FN. This digitized sound data, if valid, is then saved to a specified file by the Interface program.

Call-phone-number 903 uses the Call-Phone sub-routine (FIG. 9H, connector FM) to call a phone number 904.

Call-phone-number-with voice 905 uses the Call-With Voice-File sub-routine (FIG. 9K connector FQ) 906 to call a phone number, play a voice file, when the call is answered and then pause for several seconds. The process of delivering the alert message is repeated three times unless overridden by the user including a higher number of repetitions using the "&" character as part of the dialing string, as previously discussed.

Note that for 904 and 906, the Interface program does dialing digit by digit and processes the call progress detection. Similar processing capabilities also exist within the Unit's operating system to handle Fail Safe alert situations.

The begin 907A configuration action code notifies the Unit 907B that the Install 6 or Setup 7 programs have been activated in the Work Station so that the Unit can set a flag indicating configuration processing is in progress. When processing is complete for either of these programs, an end 907C configuration action command is sent to the Unit 907D, so the flag can be cleared. This flag is used by the Unit to temporarily disable automatic, periodic, AC power and loud sound monitoring when either the Install or Setup programs are active. This approach avoids situations where test alerts conducted by the user during system testing may confuse the Unit into activating actual alert processing.

The enable loud sound detection 907E action code is sent to the Unit 907F only during system testing and monitoring session processing to instruct the Unit to turn on it's internal microphone and begin listening and returning digitized data to the Work Station on any sound detected, so that this data can be analyzed by the Work Station for a possible loud sound alert situation. Listening by the Unit for both son-alerts and other loud sound ceases when a stop automatic loud sound 907G action command (code 074) is received by the Unit 907H. Listening by the Unit for just other loud sound ceases when a stop automatic sound 907J action command (code 080) is received by the Unit 907K.

The set Adapter 1 delay 907L and set Adapter 2 delay 907N action codes are used to send the number of seconds 907M/907P, the Unit should wait before placing an alert call after an alert situation has been detected on the adapter port.

The get Unit's revision number 907Q action code request the Unit to provide the current hardware release number for the Unit 907R set in the microprocessor based firmware 20 of the Unit when the Unit was produced.

If the command is not recognized, then an "unknown command" Result code is returned 908 to the calling process.

Various sub-routines called by the Interface program begin at block 909 on FIG. 9h. The Call-Test Number subroutine begins at block 909 of FIG. 9H. This sub-routine sends a command to the Unit accompanied by a phone dialing string to be called for a selected Fail Safe alert message 909A. When this command is received by the Unit, the alert call is placed by the Unit's operating system and microprocessor on a stand-alone basis to simulate an actual Fail Safe situation. This routine would only be invoked to test the Unit is operating properly. When processing for the alert call is complete, the Unit would return a reply to the Interface program indicating the results of the alert call (i.e. busy, no answer, etc.) 909B. Then, processing for this sub-routine ends.

The Call-Phone-Number sub-routine begins at block 924 of FIG. 9H. This sub-routine checks the phone number (supplied by the calling process) for an at-sign '@' 924A and, if found, splits the phone number into two numbers. The at-sign indicates that the numbers that precede the assign are to be dialed then the remaining numbers are to be dialed only after the call has been answered and the person answering the call has stopped speaking. If there is no at-sign, then there no second part is created. The call is placed and, if it is answered and a second part exists, 926 then it is dialed 927. If required, an alert message is then spoken and repeated three times (or more if the "&" characters are included in the dialing string). Then, processing waits for 2 seconds 928 and hangs-up 929. Finally, processing for the sub-routine ends and returns the Call Status to the calling program.

The Record Voice File sub-routine begins at block 910 of FIG. 9J. Record-voice-file sends the command to the Unit 910A, puts the "speak now.." message on the Work Station's screen 911, and then makes the Work Station beep 912 to prompt a user to begin speaking a voice alert message. It then accumulates sound data into memory 913 and sends a "stop" command to the Unit 914. This stops the sound data stream. The sound data is then checked for a minimum level 915 and, if the sound does not exceed this level (i.e. is not "loud" enough) 916, a "speak louder" code 917 is returned to the calling process. Otherwise, the sampled digitized sound data is adjusted via software to maximum loudness 918 and then written to a specified file 919. Then, processing for the sub-routine ends and processing returns to the calling program.

The Play Sound File sub-routine begins at block 920 of FIG. 9J. The Play-sound-file routine loads a specified file into memory 920A. After sending a play-sound command 921 to the Unit, the routine sends the digitized sound data 922. Then, this routine waits 1/10th of a second 923 (which exceed the timeout for the Unit's play-sound-mode and thus ends play-mode). Processing then returns to the calling program.

Figure 9K:
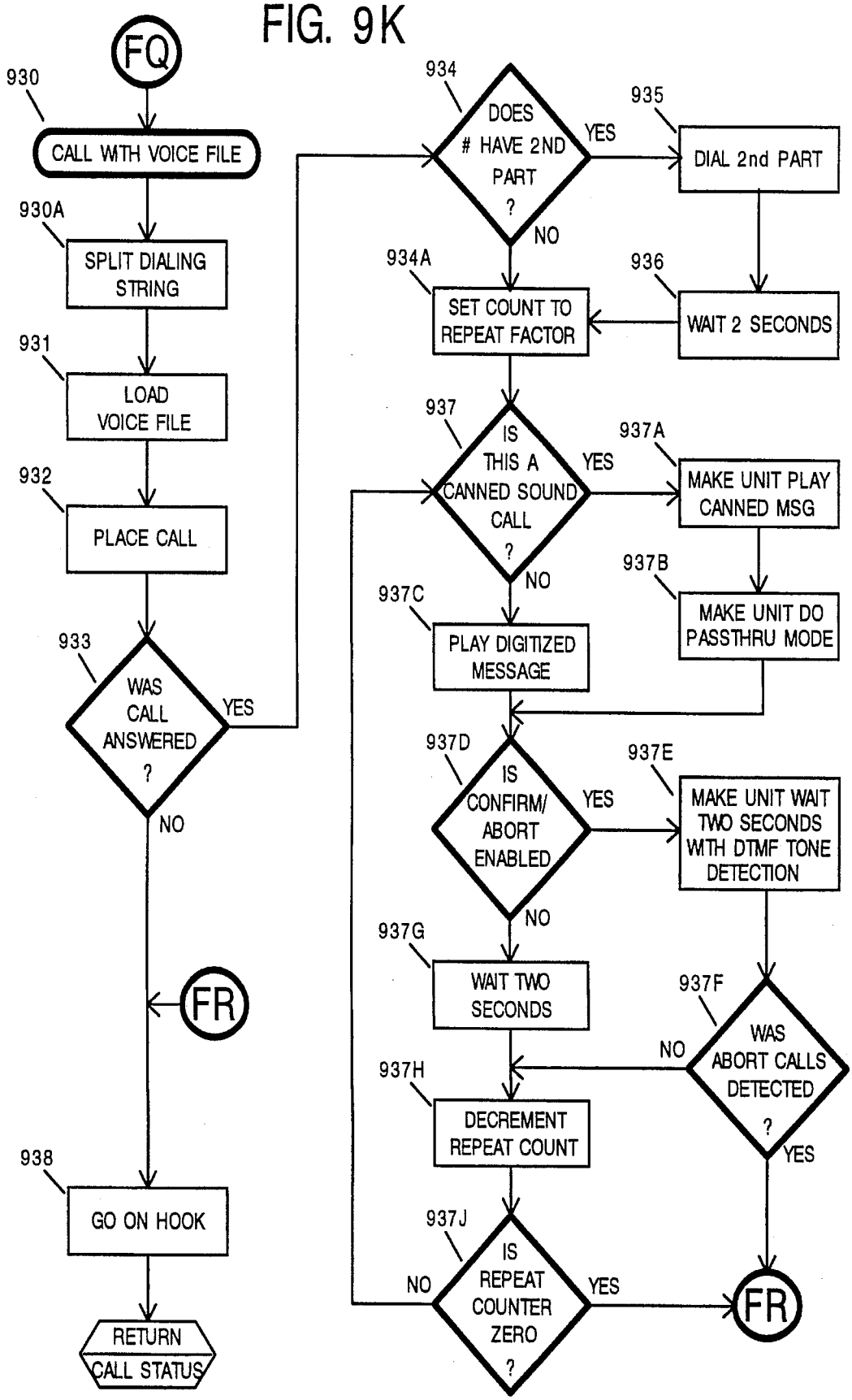
Figure 10A:
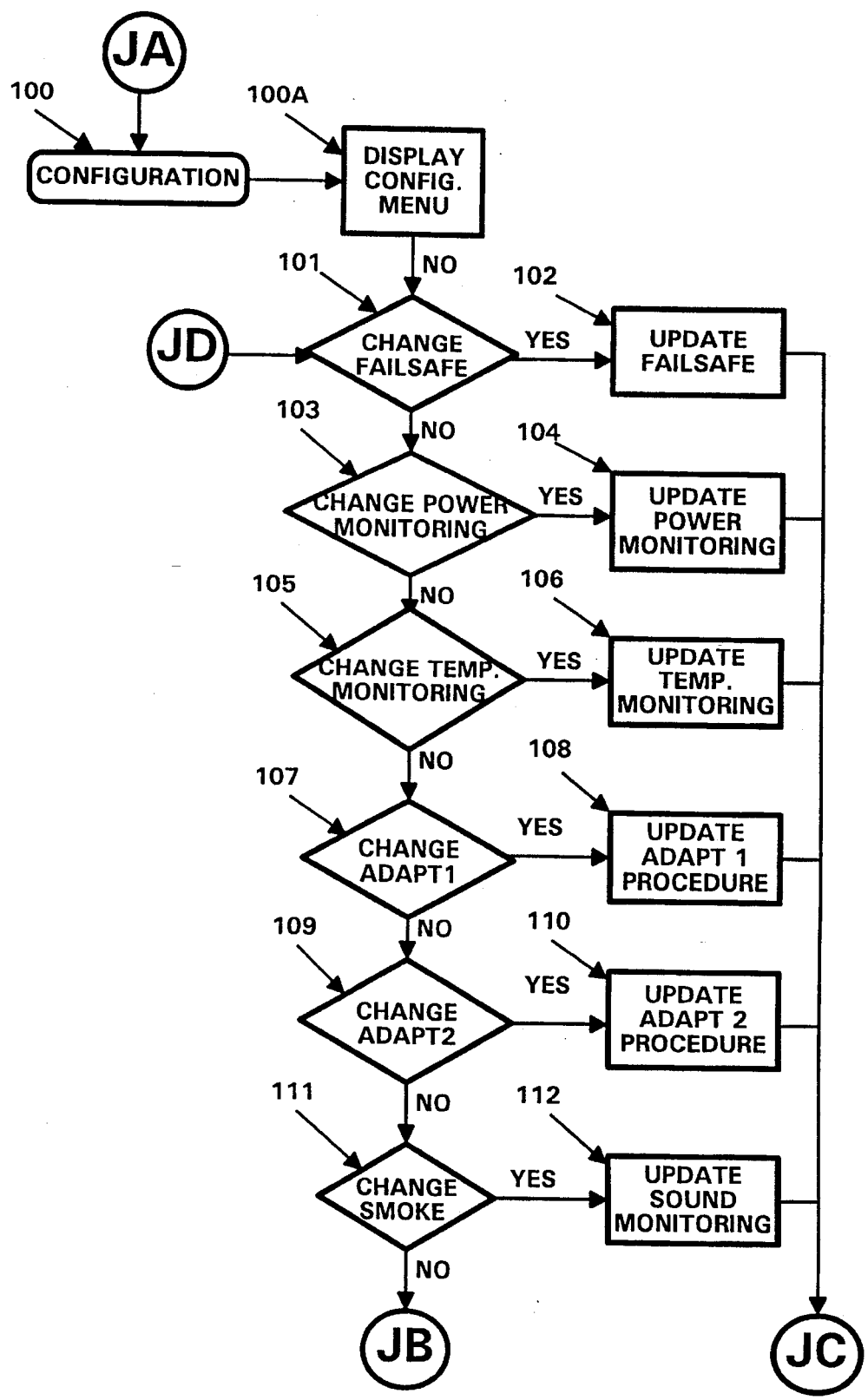
FIGS. 10A and 10B are block diagrams describing the software programs executed by the user to install or reconfigure the invention.
Figure 10B:
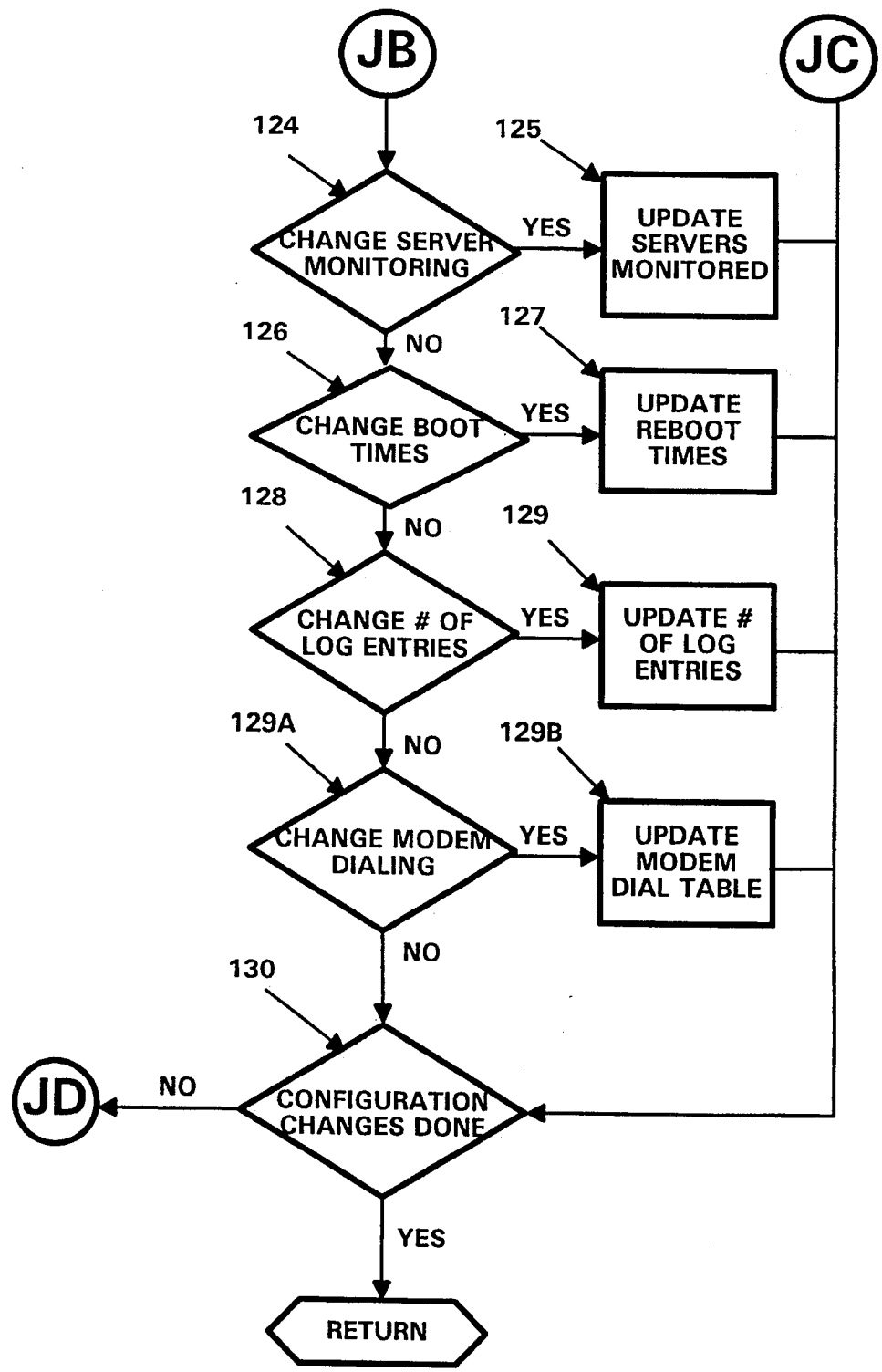

The Call-with-voice sub-routine begins at block 930 on FIG. 9K. This sub-routine splits the dialing string 930A (as explained above) and loads a specified voice file 931. Then, the call is placed 932 and, if it was not answered 933, goes on hook 938, returns the call-status to the calling program, and terminates processing. Otherwise, if the call was answered 933 and the dial string has a second part 934, the second part is dialed 935 and the subroutine waits for 2 seconds 936 to handle cases where a telephone switch needs a few seconds to make a connection. Next, the dial string is scanned for the presence of a pair of "&" characters. If these characters exist, the number between the "&" characters is used as the number of times an alert message will be repeated 934A after a call is answered. Otherwise, the alert message will be repeated three times 934A. If the call involves one of the pre-set voice recordings stored in the Unit 937, such as the smoke detected or loud sound alert messages, this sub-routine requests the Unit to play the applicable digitized voice recording 937A from the location where it is stored in the Unit 937B. Otherwise, the sub-routine passes a digitized user recorded alert message file stored on the Work Station to the Unit for playback 937C.

If the dialing string being processed contains a "!" and/or "%" character 937D, this sub-routine monitors and sound present between alert messages 937E to see if the person answering the phone call has pressed a designated touch tone, presently set to the "*" key 937F. If this key is pressed, the call status is set to either call confirmed (if the dialing string contains a "%" character and does not contain a "!" character) or abort any other pending alert calls (if the dialing string contains a "!" character), then the phone line is placed on hook 938, and processing return to the calling program with the applicable status of the call. Otherwise, the message repeat counter is reduced by 1 937H. If the counter is now zero 937J, the phone line is placed on hook 938, and processing return to the calling program with indicating the status of the call is no answer. If the counter is not zero, processing loops back to block 937 to repeat the message delivery process again.

If the dialing string being processed does not contain a "!" or "%" character 937D, the sub-routine waits for 2 seconds between message repetitions 937G then the message repeat counter is reduced by 1 937H. If the counter is now zero 937J, the phone line is placed on hook 938, and processing return to the calling program with indicating the status of the call is no answer. If the counter is not zero, processing loops back to block 937 to repeat the message delivery process again.

When a call is made (936 and 932 referenced above), the interface program first requests the Unit to go offhook. It then requests the Unit to send back call progress information, and waits for five seconds for at least 1.5 seconds of sound (dial tone). If not detected an error in placing call message code is returned to the calling program. If a dial tone is detected, then the specified dialing string or number is called by commanding the Unit to generate specific DTMF touch tones, one by one. Then, call progress information is again requested from the Unit, analyzed, and the call status determined.

Significant processing occurs within the Work Station's Interface program to monitor a phone call placed while it is in progress. First, after the phone digits are dialed, the program waits up to ten seconds for a minimum pulse of sound (between 0.1 and 0.2 seconds). If not found, meaning a dial tone was not detected or the connection is bad, the phone call is aborted and treated as an error in placing the call. Otherwise, sound "present" or "silence", is timed and continually tested against certain limits. There are two counters and a flag associated with this algorithm, namely a "busy" counter, a "ring" counter and a Voice-Detected flag.

If "sound present" falls between 0.2 and 0.3 seconds (for 0.25 second reorder tone) or 0.45 and 0.55 seconds (for 0.5 second busy tone) then the busy counter is incremented and also voice is considered detected. Alternatively, if "sound present" is greater than 0.7 seconds, then the ring counter is incremented. Otherwise, should "sound present" not satisfy one of these two preceding conditions, then voice is considered detected and the busy and ring counters are zeroed out.

If the busy counter reaches a value of ten then the call status is "busy" and the algorithm terminates.

If the ring counter reaches a value of ten then the call status is "no answer" and the algorithm terminates.

For "silence", if voice is considered detected and silence reaches 1.5 seconds, then the call is considered answered. However, the phone busy signal also sets the Voice-Detected flag, but busy tones will continue. So, busy is isolated because there will be no silence for 1.5 seconds—and the busy counter will reach ten and terminate this algorithm with a busy status.

Now, if sound is detected or silence for 5 seconds, then call status is "error" and the algorithm terminates.

If the algorithm continues for one minute without a determination, then the algorithm terminates with an "error" status.

As previously in the narrative for block 900, when a call is considered answered, any sound made during the first few seconds after the call is first considered answered is digitized and recorded by the Unit and stored in the Work Station as an audit trail to prove the call was completed. Normally, the word "Hello" spoken by the person answering an alert call is recorded via this procedure.

Note that when the Unit places phone calls on it's own, the above call progress determination is achieved solely by the Unit's processor as described more fully in FIG. 5.

FIG. 10 is a sub-routine block diagram detailing the menu options available to permit a user of the apparatus to reconfigure system processing procedures. This block diagram details the processing steps performed in FIG. 7B block 62. Eleven menu options are presented by this software program. When one of these menu options is selected processing occurs as follows:

1. CHANGE FAIL SAFE 101: When this menu option is selected, a software program 102, SWSFAIL, is invoked which requests (1) the key entry of the phone dialing strings to be called should a Fail Safe situation occur; (2) a code of Y or N indicating whether or not the pre-recorded message stored in the Unit related to the failure should be spoken after the call is completed; and (3) a Unit ID number from 1 to 9, indicating which of the Units has detected the problem for situations where more than one Unit has been purchased. Unlike procedures for other areas monitored (except the optional external sound based alarm devices), the pre-recorded messages spoken when either of these special failures occur is pre-programmed into the Unit 10 and cannot be changed by a user.

When the call table screen appears on the Work Station during this and subsequent configuration steps, multiple dialing strings can be entered to permit more than one person to be contacted when a failure occurs. For failures that occur during this step, the software program presently does not permit more than 5 dialing strings to be entered, since these phone numbers must be stored in the limited amount of memory available in the Unit. A similar limit of 3 dialing strings applies to Job Status Monitoring. For all other areas monitored by the system, there is no limit to the number of call table entries that may be specified for a given type of failure.

The bottom of the call table entry screen, displays various function keys and the up and down arrow keys that may be used when making call table entries. If a mistake is made entering a dialing string during call table processing, the F3 key may be used to delete the call table line item. The UP and DOWN arrow keys are used to navigate through any item entered and the F2 key is used to end call table processing for power failures. Processing cannot be terminated using the F1 key while call table processing is occurring. The use of the function keys as described in this paragraph apply to all call table processing discussed in subsequent Blocks of FIG. 10.

Each dialing strings entered can presently be up to 30 characters. For every dialing string entered, a code of Y (Yes) or N (no) must be entered to indicate whether or not the message entered should be spoken by the Unit 10 to the person answering the call. If Y is entered, whenever a failure occurs the Unit will speak a prerecorded message, as previously described above. For all other configuration steps, the desired alert voice message must be spoken into the Unit. If a speak code of N is entered, no message will be spoken by the Unit. An N would be entered in cases where a call is being placed to a pager, where only the dialing string is necessary to alert the person called as to the exact nature of the problem detected.

Commas can be inserted into a dialing string as many times as necessary. Each comma causes a two second delay in the dialing sequence. Also, a "@" character can be used in the dialing sequence to cause the dialing string to pause until a call is answered and the answering party stops speaking. In the case of call placed to a pager, the @ symbol should always be placed after the paging service's phone number and before the code indicating the exact type of failure that has occurred. This approach insures that the Unit waits for the paging system's pre-recorded message to complete before the code portion of the dialing string is played back. For some paging systems,, commas may be needed in addition to the @ symbol, if there is a long pause in the paging system's pre-recorded message. In the case of calls made directly to persons, where a message will be spoken, there is no need to end the dialing string with the @ symbol, because the Unit automatically waits until the call is answered and the person answering the phone stops speaking before a the applicable failure message is replayed. In addition, the message recorded for a failure will be repeated three times to insure the person answering the phone or a phone answering machine receives the full message.

If a call is placed to a person, several special characters may be specified by the user within the dialing string to activate several optional features. If the dialing string contains an "&" symbol, the number of times that the call is repeated can be changed from the current default of three repetitions to a higher number of repetitions is desired by the user. The specific number of repetitions desired follows immediately after the "&" in the dialing string and ends with an "&" character (e.g. &10& means 10 repetitions). This feature is useful in insuring a message is delivered in canes where a call is made to an automated answering system, where multiple dialing sequences or long voice message delays are required to reach an intended party. If the dialing string contains a "!" symbol; then, should the user press a touch tone after the call is answered, the call will be considered answered and any other pending alert calls will be discarded. In this case, the person answering the alert is in effect telling the system not to be concerned about any pending alerts messages. If the dialing string contains a "!" symbol, the call is considered answered, but a touch tone is not detected; then the call will be treated as delivered, but pending alert messages will not be discarded. If the dialing string contains the symbol "%", then the call will not be considered delivered unless a touch tone response from the person called is detected.

A dash may also be used as part of the character string, but will be ignored by the for dialing purposes. Only numbers, commas, dashes, one "@" character, and "&", "!", "%", "*" or "#" characters are allowed in any dialing string entered.

Both the comma and "@" character will be useful in assuring any phone call made by the Unit is properly completed. When dialing out through a switch board which requires a 9 to be entered before a phone number, a comma is be entered after the initial 9 in the dialing string. For example, if a call is being placed to a pager, the dialing string 9,344-1234@111 will cause the Unit to dial a 9, wait two seconds for a dial tone; dial the phone number 344-1234; wait for an answer and for anyone answering the phone to stop speaking; and then dial the digits 111, which is a code the owner of the pager will receive on their pager indicating to them that the Unit has detected that the temperature is too hot. In this example, 111 is one of many possible codes that can be setup during configuration processing to indicate the nature of the problem detected by the Unit. If a phone call was being placed to a person and the speech option was in effect, the example dialing string would be 9,344-1234. In this case the Unit would dial the number, wait for an answer and the answering party to stop speaking, then speak the prerecorded message indicating that power has failed.

2. CHANGE POWER MONITORING 103: When this menu option is selected, a software program, SPOWCHK, 102 is invoked to permit the main power failure/power restore text messages and alert call table to be updated. (This type of power failure is different from a TOTAL power failure discussed menu option 1 above; because, in this case, the Work Station is still operating using an external AC power backup system.)

Once the desired message text has been entered, corresponding voice messages must be spoken then recorded on to magnetic storage media (e.g. hard disk) in the Work Station. These user recorded voice messages will be played back by the Unit to any person called when a power failure occurs or power is restored after a power failure. Voice recordings are digitized when the apparatus prompts someone to speak into the microphone installed on the left side of the front panel of the Unit. As the person speaks, their voice is digitized by the Unit and transferred via the serial interface for storage on magnetic media installed in the Work Station.

Alert voice recordings permit each failure to be described in the user's own words. When, for example, a power failure occurs; the recorded message stored for a power failure is replayed after a emergency call has been completed by the Unit.

After a message is recorded, the SPOWERCK software program gives the user the option to replay and listen to the message, then re-record the message, if necessary, until the message recorded is satisfactory. Should less than 50 kb of storage space remain on the magnetic media where voice recordings are stored, a warning message appears before a message is recorded indicating that there may not be sufficient space available to store the message.

When a message recording begins, the SPOWERCK software will beep to prompt the user to begin speaking. After a message is recorded, the software will cause a beep to occur again indicating the recording has stopped.

After a power failure voice alert message has been satisfactorily recorded following the above procedures, the SPOWERCK program follows the same procedure to record a power restore message.

Once power failure/restore messages have been entered and voice recordings completed, the SPOWERCK program requests the entry of all dialing strings (e.g. phone numbers) to be called when main power fails is restored after a sustained power failure. The procedures for entering dialing strings was previously discussed in detail under the narrative for block 102 above.

3. CHANGE TEMPERATURE MONITORING 105: When this menu option is selected, a software program, STEMPCK, 106 is invoked to permit temperature limits to be set, text messages for excessive temperature situations to be entered or changed and the alert call table for excessive temperature conditions to be updated. STEMPCK will request the entry of the maximum and minimum temperatures in fahrenheit permitted in the area where the Unit is installed.

Once the temperature error log messages are entered, the STEMPCK program requests the creation of voice recorded alerts should either the upper or lower temperature limits be exceeded. The steps followed to make alert voice recordings was previously discussed in detail under the narrative for block 104 above.

After both temperature limit voice messages have been recorded, the STEMPCK program will permit the entry of any dialing strings to be called in cases where either temperature limit is exceeded. The procedures for entering dialing strings was previously discussed in detail under the narrative for block 102 above.

4. CHANGE ADAPT 1 107: When this menu option is selected, a software program, SADAPT1, 108 is invoked to activate or deactivate an optional external monitoring device, such as a water detection, motion detection or entrance alarm system, connected to Adapter Port 1 of the Unit.

When any device is added to Adapter 1 of the Unit, the SADAPT1 program 108 requests the desired number of seconds the Unit should wait before placing alert calls. When a security device is installed, a delay is of 10 seconds or longer is normally used so that unnecessary alert calls are not made when the first person arrives at the office for a day. Without a delay, the Unit would treat this person as an intruder and immediately begin placing unnecessary alert calls. The delay value entered gives the first person arriving time to disable the intruder detection system, by pushing the Watch Dog switch located on the rear panel of the Unit. (NOTE: when a monitoring session begins, adapter port monitoring will be re-enabled automatically, two minutes after the monitoring session begins.) These delays are not necessary if other than intruder detection devices are installed on the adapter port.

Next, the SADAPT1 program requests the default error LOG text associated with the feature to be entered or modified, if required. When this message has been modified as desired, the SADAPT1 program will require an alert voice message be recorded that would be appropriate to the feature being installed. Normally, the voice message recorded would use the same words contained in the error message text just entered for this feature.

Once the appropriate intruder detection log message is entered, the SADAPT1 program requests the creation of voice recorded alerts should an intruder be detected by the device connected to Adapter 1. The steps followed to make alert voice recordings was previously discussed in detail under the narrative for block 104 above.

After the intruder alert voice message has been recorded, the SADAPT1 program will permit the entry of any dialing strings to be called in cases where an intruder is detected. The procedures for entering dialing strings was previously discussed in detail under the narrative for block 102 above.

After a device has been installed on Adapter 1 of the Unit it can be removed simply by selecting this menu option again and answering "Y" to the prompt made by the SADAPT1 program requesting if the device should be removed.

5. CHANGE ADAPT 2 109: When this menu option is selected, a software program, SADAPT2, 110 is invoked to activate or deactivate an external monitoring device, such as a motion detection or entrance alarm system, connected to Adapter Port 1 of the Unit. Processing that occurs to add a monitoring device to Adapter 2, it identical to the procedure described under block 108 above for Adapter 1.

6. CHANGE SMOKE 111: When this menu option is selected, a software program, SSMOKE, 112 is invoked to activate or deactivate the loud sound level detection feature of the apparatus. When this feature is activated, the alert message text is standard and cannot be changed. Also, the alert voice messages used when alert calls are placed is pre-recorded and stored within the Unit's Read Only Memory when the Unit is assembled. Accordingly, the only processing required to activate the sound monitoring feature is to permit the entry of any dialing strings to be called in cases where loud sound levels are detected for a' sustained period of time. The procedures for entering dialing strings was previously discussed in detail under the narrative for block 102 above.

7. CHANGE SERVER MONITORING 124: When this menu option is selected, a software program, SETUPCAL, 125 is invoked to update the specific File Server(s) that will be monitored by the apparatus. Some File Servers are further divided into volumes. In such cases the system permits monitoring to be performed at the volume level. A process similar to the dialing string entry procedure previously discussed in detail under the narrative for block 102 above is used for the addition, change or deletion of a File Server to be monitored, along with an associated error message, dialing string and Y or N speech code. SETUPCAL processing permits the same File Server/Volume to be entered more than once to allow multiple persons to be contacted should a particular File Server/Volume fail. There is not enough space on the Work Station's data entry screen to permit the message associated with each line item displayed, so a pop-up window is used to enter the associated message after other data for a line item has been entered.

Each time a new line item is added to the call table or the error message for a line item is accessed (by pressing the F4 key), SETUPCAL will allow the user to record or change the voice recordings associated with the line item that are played should the File Server/Volume fails. The steps followed to make alert voice recordings was previously discussed in detail under the narrative for block 104 above.

When a new File Server/Volume to be monitored is entered, the SETUPCAL program verifies that the File Server/Volume exists by attempting to log into the File Server using the special login ID setup for the system during configuration processing. If the SETUPCAL program finds that the File Server/Volume does not exist on the current LAN Network, the line item will be rejected and an appropriate error message will be displayed. If the File Server exists but the SETUPCAL program finds that the Work Station is not attached to the File Server with the necessary access rights, the SETUPCAL program will request the entry of a login name and password to the File Server that will grant the SETUPCAL program the required supervisor rights needed. The SETUPCAL program will continue to reject the line item until an acceptable login ID and password are entered or the line item is deleted.

In some cases a File Server(s) may consist of multiple Volumes. In such cases, the apparatus is capable of monitoring the File Servers at the volume level and one or more call table entry may be made for each Volume that exists on a particular File Server.

8. CHANGE BOOT TIMES 126: When this menu option is selected, a software program, SCUTPOW, 127 is invoked to update the scheduled times the Unit 10 will boot the Work Station each day so that a monitoring session can begin automatically. The SCUTPOW program permits the entry of up to 8 times per day that the Unit will force the Work Station 2 to which it is connected to boot. The times are entered in military format (example: an entry of 18:00 indicates 6:00 PM). One time is typically entered which occurs as soon as possible after the time no one will be using the Work Station at the end of the work day.

9. CHANGE # OF LOG ENTRIES 128: When this menu option is selected, a software program, SN911LOG 129 is invoked to update the maximum number of monitoring log entries that may be permitted. This file resides on magnetic storage media within the Work Station and contains one 80 character record for each major event that occurs during a monitoring session. Examples of events that would be recorded in this log include, the start of a new monitoring session, the detection of a failure, successfully placing a phone call to someone after a failure occurs, and so forth. Each log entry has the time, date, and up to a 65 character message.

When the limit specified is exceeded, the oldest records on file exceeding the specified limit will be automatically purged at the start of a monitoring session. To avoid constantly purging the file after each new event is added, purging does not occur until the limit specified exceed by 25 entries.

10. CHANGE MODEM DIALING 129A: When this menu option is selected, a software program, SMODEM 129B is invoked. If the Work Station has a modem, this program permits the designation of the serial communications port to which the modem is attached and a paging dialing string to be called in the event the Work Station can no longer communicate with the Unit during a Monitoring session. This information is used during a Monitoring session to invoke the MODEM.EXE program to allow the Work Station to place an alert call when it appears that the Unit has failed.

11. CONFIGURATION CHANGES DONE 130: When this menu option is selected, the user is returned back to the main Setup menu at block 62 on FIG. 7B. Re-configuration processing will continue until this menu option is selected looping back to block 101 via connector JD.

Figure 11A:
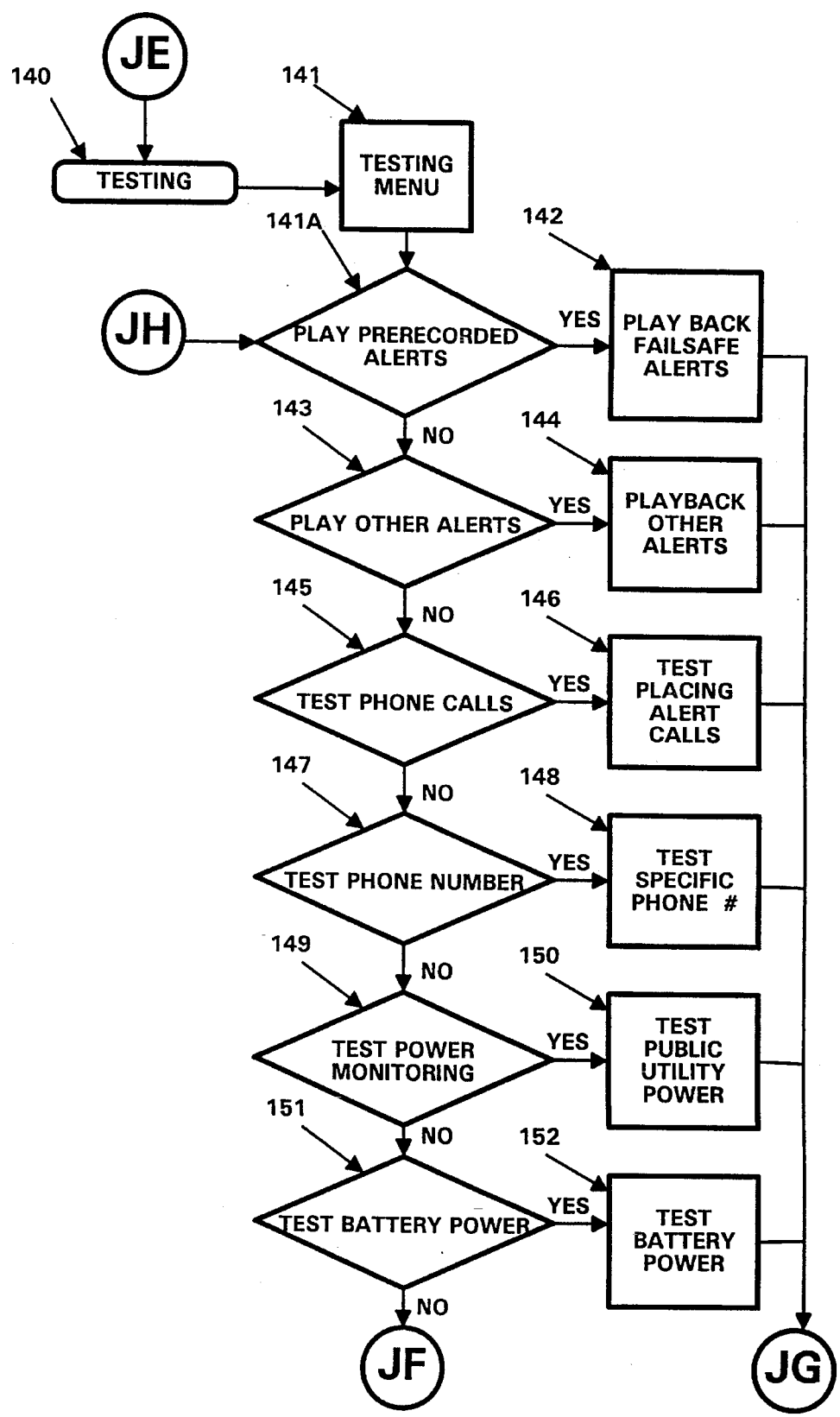
FIGS. 11A and 11B are block diagrams describing the software programs executed by the user to test the system is operating properly.
Figure 11B:
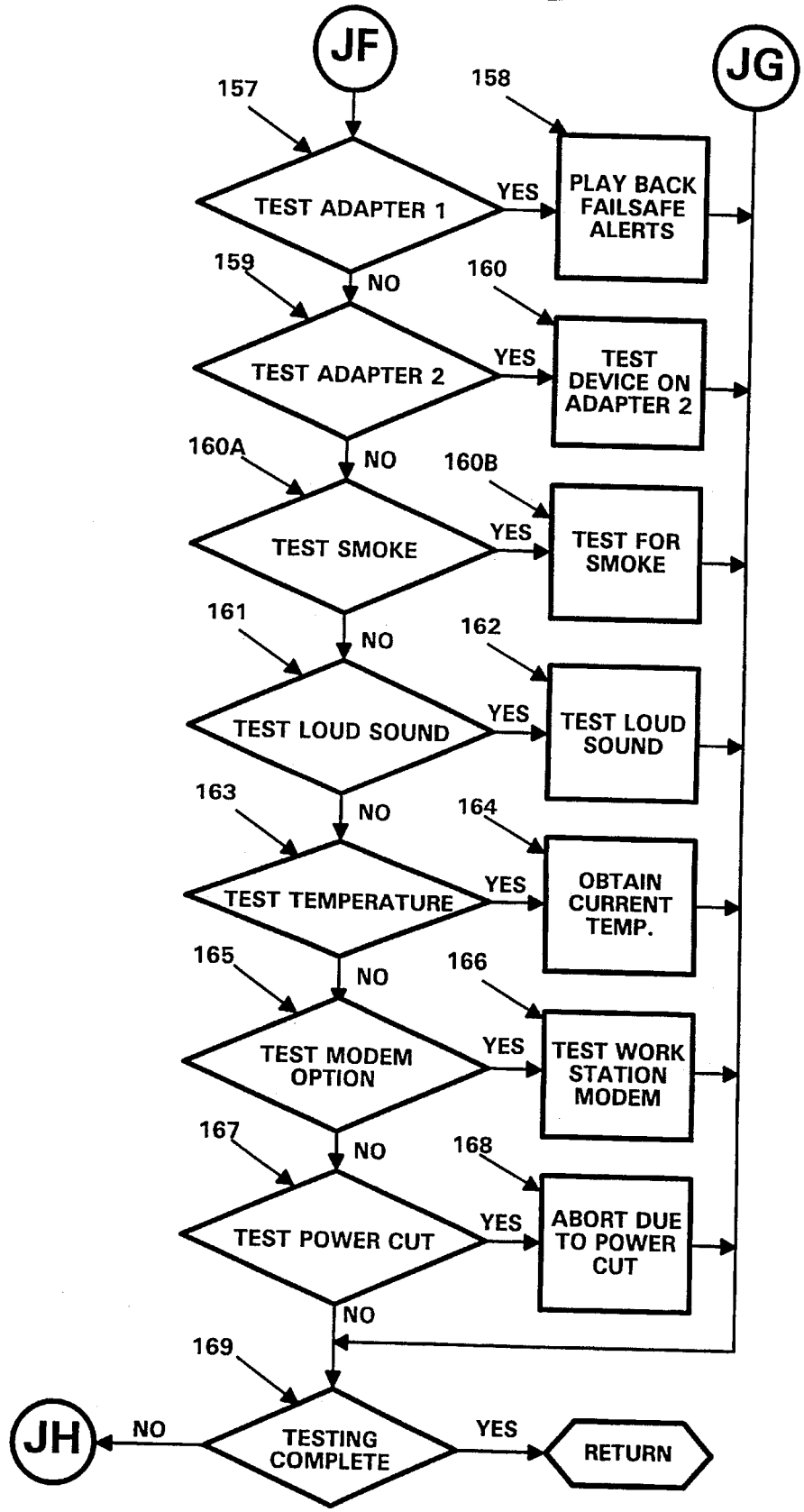

FIG. 11 is a block diagram detailing the software menu options presented to permit testing of the apparatus. This block diagram begins at block 140 on FIG. 11A and details the processing steps performed in FIG. 7 block 64. Processing begins by displaying a menu of testing options 141. Fourteen menu options are presented by this software program, N911TEST. When one of these menu options is selected processing occurs as follows:

1. PLAY PRE-RECORDED ALERTS 141A—When this menu option is selected, a software program, STSTFAIL 142 is invoked to permit placing phone calls using each Fail Safe dialing string entered into the system's call table. Each dialing string is displayed in numerical sequence so that a test call can be placed using each string. Changes may be made to the dialing strings during testing when inaccuracies are detected. For a test call placed to a person where an alert message must be spoken, one of the pre-recorded messages will be replayed once the test call has been completed. The pre-recorded messages played will be rotated for each dialing string until all pre-recorded messages are replayed.

The procedures used to test Fail Safe calls appear to duplicate the same testing procedures conducted under the "PLAY OTHER ALERTS" 143 discussed below. This duplication is necessary. Fail Safe calls are made using different software routines located in the Unit's 10 operating system, as opposed to other type of failures detected which rely on programs operating on the Work Station 2 for call processing.

2. PLAY OTHER ALERTS 143—When this menu option is selected, a software program, STSTTALK, 144 is invoked to permit using the speaker in the Unit 10 to test all of the pre-recorded messages made during system configuration processing. When the STSTTALK program is invoked another menu appears that permits replaying recorded messages by type of failure (e.g. Power Failure Message, Power Restore Message, Temperature Too Hot, etc). Menu options can be re-selected as often as desired. When this phase of testing is complete, the "Exit Back To Main Menu" option is selected to return to the Main Testing Menu 64.

3. TEST PHONE CALLS 145—When this menu option is selected, a software program, STSTCALL, 146 is invoked to permit placing phone calls using each unique dialing string entered into the system call tables (except any unique strings used for Fail Safe failures, as previously discussed for block 142). Each unique dialing string is displayed in numerical sequence so that a test call can be placed using each possible string. Changes can be made to the strings during testing when inaccuracies are detected by the User. When a change is made, all identical dialing strings on file are also automatically changed, except any Fail Safe dialing strings. These tests will insure that the person being called can be reached and the dialing feature of the system works properly. For a test call placed to a person, where the system has been instructed to speak the message, one of the recorded messages on file for this dialing string will be spoken by the Unit after the test call has been completed.

4. TEST PHONE NUMBER 147—When this menu option is selected, a software program, STSTCAL1, 148 is invoked to permit any dialing string to be entered and called even if the dialing string is not on the system call table.

5. TEST POWER MONITORING 149—When this menu option is selected, a software program, STSTPOW, 150 is invoked to test whether or not the main power monitoring feature of system is working properly. This test requires that an AC backup power system be attached to the Unit 10. This test causes the Work Station to continually poll the Unit until either the F2 key is pressed to abort testing or a main power failure occurs, which is normally triggered by the user disconnecting the AC main power plug as part of the test. When AC main power is cut off during the test, a message is display indicating the test was successful.

6. TEST BATTERY POWER 151—When this menu option is selected, a software program, STSTBAT, 152 is invoked to test whether or not the AC backup power detection feature of the Unit is working properly. This test requires that a AC power backup system (UPS) be attached to the Unit. This test causes the Work Station to continually poll the Unit until either the F2 key is pressed to abort testing or the backup power system fails, which is normally triggered by the user disconnecting the backup power plug as part of the test. When backup power is cut off during the test, a message is display indicating the test was successful.

7. TEST ADAPTER 1 157—When this menu option is selected, a software program, STSTADP1, 158 is invoked to test any monitoring device attached to Adapter 1 of the Unit 10. The actual testing process will depend on the type of device attached to the Unit. For example, if an entrance alarm device was attached to the adapter, all entrances that are monitored would be closed before conducting the test. Then, as instructed during the test, one of the entrances would be opened to insure the Unit correctly detected the simulated intruder situation.

If a device is plugged into the wrong Adapter port or not fully plugged into the correct Adapter Port, the Unit will always issue an incorrect alert immediately after testing begins, as opposed to when the device actually triggers the alert. Otherwise, this test causes the Work Station to continually poll the Unit until either the F2 key is pressed to abort testing or the Unit detects an alert from the device attached to Adapter 1.

8. TEST ADAPTER 2 159—When this menu option is selected, a software program, STSTADP2, 160 is invoked to test any external detection device attached to Adapter 2 of the Unit 10. The testing process follows testing procedures identical to those described for Adapter 1 in the narrative for block 158 above, except the test involves Adapter 2 instead of Adapter 1.

9. TEST FOR SMOKE 160A—When this menu option is selected, a software program, STSTSMOK, 160B is invoked to test for the sound of the smoke detector supplied for the Unit. This test involves activating the smoke alarm provided to insure that the Unit can detect the alarm during the test. Successive test are conducted until either the Smoke alarms siren is detected or the F2 key is pressed.

10. TEST FOR LOUD SOUND 161—When this menu option is selected, a software program, STSTLOUD, 162 is invoked to test the loud sound level detection system. The test involves activating an audible alarm system, such as a fire alarm presently installed in the building, to test if the Unit can detect the alarm. This test causes the Work Station to continually poll the Unit for a loud sound until either the F2 key is pressed to abort testing or the Unit detects the sound of the alarm through the internal microphone installed in the Unit.

11. TEST TEMPERATURE 163—When this menu option is selected, a software program, STSTTEMP, 164 is invoked to cause the Work Station to poll the Unit to obtain the current temperature. After the temperature is obtained, it is displayed on the Work Station's screen to conclude the test.

12. TEST MODEM OPTION 165—When this menu option is selected, the Work Station attempts to make the designated alert call 166 using the MODEM.EXE program and the modem attached to the Work Station. This test insures the Work Station is capable of placing an alert call should the Unit fail, as discussed in more detail in the narrative for FIG. 10B block 129B.

13. TEST POWER CUT 167—When this menu option is selected, a software program, STSTCUT, 168 is invoked to test the capability of the Unit to cut power to the Work Station. This test is usually the last test option selected since it will terminate processing by requesting the Unit to cut power to the Work Station temporarily forcing the Work Station to boot. Obviously, in this case Setup processing will be immediately aborted if the test is successful.

14. TESTING COMPLETE 169: When this menu option is selected, the user is returned back to the main setup menu at block 64 on FIG. 7B. Testing will continue looping back through the menu testing options at block 141A connector JI until this menu option is selected.

Figure 12:
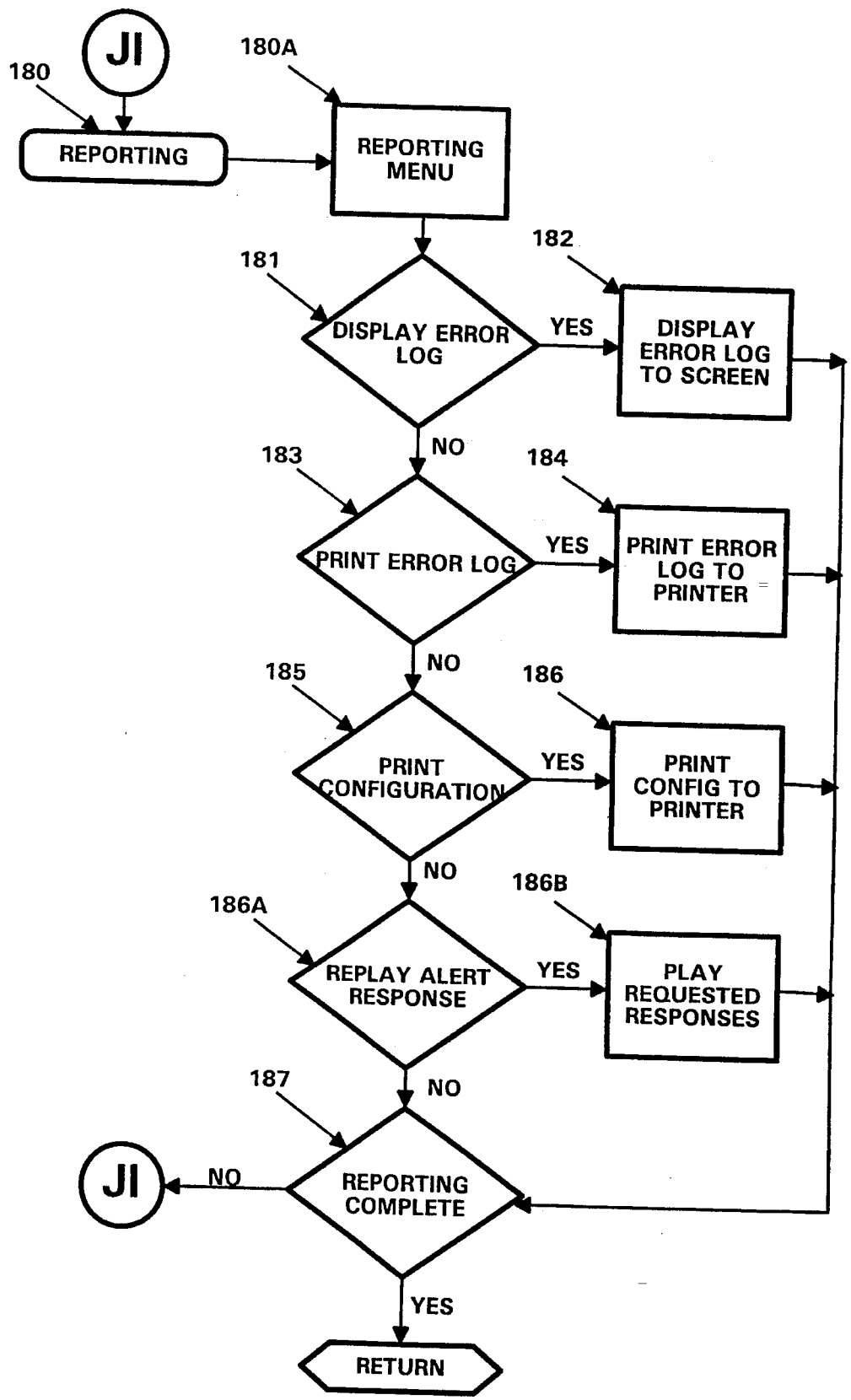
FIG. 12 is a block diagram describing the software, programs executed by the user to obtain reports from the system.

FIG. 12 is a block diagram detailing the software menu options presented to permit reporting by the apparatus. This block diagram begins at block 180 on FIG. 12 and details the processing steps performed in FIG. 7 block 66. Processing begins by displaying a list of five menu options 180A by this software program, N911REPT. When one of these menu options is selected processing occurs as follows:

1. DISPLAY ERROR LOG 181—When this menu option is selected, a software program, DISPPROB 182 is invoked to permit displaying the system error log to the Work Station's screen. This error log is updated during each monitoring session and reflects all major events occurring during a monitoring session. The display is terminated by pressing the F2 key and processing returns to the Main Reporting menu 66.

2. PRINT ERROR LOG 183—When this menu option is selected, a software program, PRNTPROB 184 is invoked to permit printing the system error log to a printer.

3. PRINT CONFIGURATION 185—When this menu option is selected, a software program, PRNTCONF 186 is invoked to permit printing the system configuration information out to a printer. Configuration information includes the contents of the system dialing string table, names of File Server(s)/Volumes Monitored, scheduled boot times, etc.

4. DISPLAY ALERT RESPONSE 186A—When this menu option is selected, it permits the user to replay whatever was spoken by the person answering the phone when the last alert message was delivered to a particular phone number 186B. When this option is selected, the user enters the desired numeric character string for the phone number where whatever was spoken when the last alert call was delivered should be replayed. Any recordings made for dialing strings containing the numeric string entered will be replayed.

5. REPORTING COMPLETE 187: When this menu option is selected, the user is returned back to the main setup menu at block 64 on FIG. 7. Reporting will continue until this menu option is selected.

Figure 13:
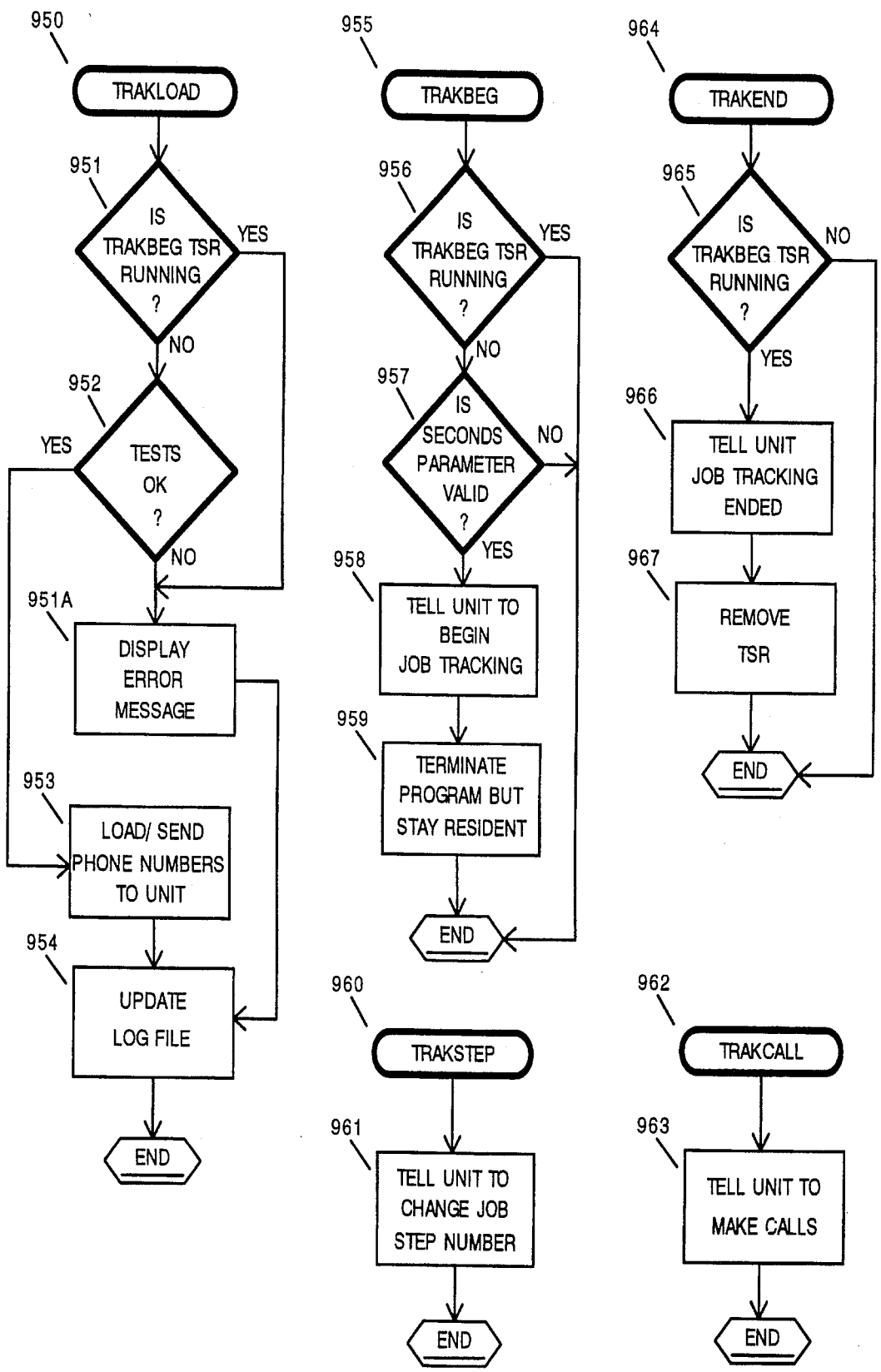
FIG. 13 is a block diagram describing the software programs used during a Job Status Monitoring session.

FIG. 13 is a block diagram detailing the Job Status Monitoring procedures occurring in the Work Station to monitor user jobs. A copy of 5 Microsoft C programs and 1 Assembler language source program code, presently used for Job Status Monitoring on a Work Station. The one assembly language program presently used for Job Status Tracking is a Terminate and Stay resident program used to monitor disk accesses.

TRAKLOAD 950 is the first batch file program executed to begin a Job Status Monitoring session. This program performs various tests to insure that a Job Status Monitoring session can be initiated. The first test verifies the Terminate and Stay Resident (TSR) program 959 is not already present in memory 951. If the TSR is running 951, communications by the TRAKLOAD program with the Unit will not be possible. Accordingly, TRAKLOAD processing will display an error message to the screen 951A indicating that the TRAKLOAD program was aborted and the TRAKEND program should be run (to remove the TSR from memory) before attempting to begin another session. Normally, this message would not occur unless the batch file for a previous monitoring session was interrupted or the batch file was improperly constructed (e.g. TRAKEND was not inserted at the end of the batch file).

Next, various tests are performed 952 to insure that a Lob Status Monitoring session can be initiated. Possible error messages that may be displayed indicating why Job Status Tracking is being aborted are as follows:

TRAK ALERT DIALING STRINGS NOT FOUND—At initiation, the TRAKLOAD program accesses a file called TRAKCALL.DAT to insure that at least one Job Status alert dialing string has been setup using the Setup program 6. If the file is missing or contains no dialing strings, this message is displayed.

SCHEDULED REBOOT IN PROGRESS—If a scheduled reboot (2 minute) Warning is in progress at the time TRAKLOAD processing occurs, this message will be displayed.

INVALID SERIAL PORT SPECIFIED—This error message normally indicates the Unit has been connected to a different serial port than where the Unit was last installed.

THE UNIT's POWER SWITCH IS OFF—A Job Status Monitoring session requires that the Unit be turned ON before invoking the TRAKLOAD program.

UNIT SERIAL CABLE NOT PROPERLY CONNECTED—When this error message occurs, the serial cable between the Unit and the Work Station is properly connected into the serial port.

UNIT NOT RESPONDING—The Unit appears to be properly connected, but the Unit is not responding to requests sent by the Work Station.

If any of the above errors occur, the related error message will appear for approximately 60 seconds; except in the case of the SCHEDULED REBOOT error message, which will appear until a key is pressed. If the F1 Key is pressed during this period, TRAKLOAD will re-attempt processing. This could correct a situation where, for example, the Unit's power ON/OFF switch had just been turned on. When 60 seconds have passed or another key is pressed, batch file processing will continue without the Job Status Monitoring system. Any Job Status Monitoring programs included in the batch file such as TRAKBEG, TRAKCALL, etc. will simply issue the message "TRAKBEG needs to be run first" and then abort.

If no errors are detected 952, processing continues at block 953 where the current Job Status alert dialing string(s) entered during Setup processing 6 are sent to the Unit. Then, a text file named "TRAK.LOG" is updated 954 by the TRAKLOAD program in the default directory used when the TRAKLOAD program is initiated. If this file does not exist, it will be created by the TRAKLOAD program. Otherwise, an entry will be appended to the log indicating when TRAKLOAD was initiated and any errors that may have precluded Job Status Monitoring processing from occurring.

TRAKBEG 955 is the second batch file program executed to initiate a Job Status Monitoring batch file. TRAKBEG installs a small memory resident TSR program (i.e. less than 2K in size) that must be loaded immediately after TRAKLOAD. TRAKBEG processing will terminate if either TRAKLOAD has not been run or TRAKBEG was previously loaded into memory 956. TRAKBEG is automatically removed from memory when the TRAKEND program is invoked at the end of a Job Status Monitoring session. TRAKBEG monitors all disk activity during a Job Status Monitoring session. Optionally, a parameter can be given to TRAKBEG on the program execution command line to set the maximum number of seconds that may occur between successive disk accesses before a job step is considered to have failed 957. The default number of seconds is currently set to 300 seconds. The maximum number of seconds that may be specified is currently set to no more than 999 seconds. If the number specified exceeds this limit or is not a valid numeric expression, TRAKBEG processing is aborted 957. Otherwise, the program notifies the Unit that a job status monitoring session is about to begin 958. When this message is received by the Unit, the Unit expects periodic (i.e. no more than once every five seconds) communications. from the Work Station each time a disk access occurs during the 5 second interval of reporting. If such constant communication cease for longer than the specified maximum number of seconds, the Unit will initiate job step failure calls. As the final step in TRAKBEG processing, TSR is loaded into memory 959 whose function is to monitor disk accesses occurring within the Work Station, as discussed above.

During a monitoring session, the TRAKSTEP program 960 may be inserted into the Job Status Monitoring batch file to assign a numeric ID to the next job(s) being executed. TRAKSTEP must always have a parameter indicating a NUMERIC step number. This step number cannot exceed 2 numeric digits. If the step number exceeds two digits, only the left most two digits will be used as the step number. If a alert or failure call is placed during Job Status Monitoring, step numbering helps the person called determine how far all jobs have progressed. The Job Status Monitoring system does not require that the TRAKSTEP programs be used. The default step assumed by the system when the TRAKSTEP feature is not used is step 1. When TRAKSTEP is executed, the job number specified on the command line is sent to Unit 961 where it is stored in nonvolatile ram and used for any subsequent alert calls.

The next program used for Job Status Monitoring is TRAKCALL 962. Whenever the TRAKCALL program is invoked the TRAKCALL program tells the Unit to place alert calls to everyone contained in the Job status call table indicating the last step number stored in non-volatile RAM was successfully completed 963.

The final program in a Job Status Monitoring session is TRAKEND 964. This program should always be run as the last step in a Job Status Monitoring session. If the Job Status monitoring program is not present in memory 965, TRAKEND has nothing to do and processing is terminated. Otherwise, TRAKEND informs the Unit that the Job Status Monitoring session has ended 966 and no further communications should be expected from the Work Station. Finally, TRAKEND terminates removing the TRAKBEG TSR from memory 967.

We claim:

1. A monitoring apparatus for monitoring an operation of a power supply system connected to a computer, comprising:

first connecting means for connecting an external AC power source to the monitoring apparatus;

power output means connected to said first connecting means for supplying said AC power from the monitoring apparatus to said computer;

detecting means connected to said first connecting means for detecting the presence or absence of said AC power and generating an indicating signal in response;

communication means connected to said detecting means for selectively connecting the monitoring apparatus to a telephone network and placing a telephone call to a person in a location away from the system; and control means connected to said detecting means and said communication means for receiving said indicating signal and activating said communication means to place said telephone call when said detecting means detects the presence or absence of said AC power.

2. The monitoring apparatus of claim 1 further comprising:

second connecting means for selectively connecting a source of backup AC power to said power output means; and switching means connected to said first and second connecting means, said detecting means, and said power output means for switching the supply of said power output means from said external AC power source to said backup AC power source in response to said indicating signal from the detecting means when said signal indicates that said external AC power is absent.

3. The monitoring apparatus of claim 2 further comprising second detecting means connected to said second connecting means and said control means for detecting the presence or absence of said backup AC power and generating a second indicating signal in response;

wherein said control means further receives said second indicating signal and activate said communication means to place said telephone call when said detecting means detects the presence or absence of said backup AC power.

4. The monitoring apparatus of claim 1 wherein said communication means includes means for transmitting a user-recorded voice message.

5. The monitoring apparatus of claim 3 further comprising:
   a mass storage device associated with said computer;
   data interface means connected to said control means and said computer for connecting the monitoring apparatus to said computer to transfer data between the monitoring apparatus and said mass storage device associated with said computer in response to signals received from said control means; and
   data conversion means connected to said control means and said communication means for receiving digital data defining a user-recorded voice message and generating an output to said communication means compatible with said telephone network, to generate said voice message on said telephone network;
   wherein said digital data defining said user recorded voice message is stored on said mass storage device within the computer, and said control means retrieves said digital data and transmits said data to the data conversion means whereby said voice message is generated and transmitted.

6. The monitoring apparatus of claim 1 further comprising recording means connected to the communication means and the control means for recording a response from the person receiving the telephone call.

7. The monitoring apparatus of claim 5 further comprising:
   a mass storage device associated with said computer;
   data interface means connected to said control means and said computer for connecting the monitoring apparatus to said computer to permit transfer of data between the monitoring apparatus and said mass storage device associated with said computer in response to signals received from said control means;
   data conversion means connected to said control means and said communication means for receiving a voice message from said communication means, generating a digital output representative of said voice message, and transmitting said digital output to said control means;
   wherein said data interface means transfers said digital output representing said voice message to said computer where said digital data is stored in said mass storage device.

8. A method of monitoring an operation of an external AC power supply system connected to a computer, comprising the steps of:
   monitoring power output of said power supply to the computer;
   detecting a change in the presence or absence of said power output;
   generating an indicating signal when said change in the presence or absence of said power output is detected; and
   transmitting said indicating signal to an automatic telephone communications means for selectively establishing a connection between said automatic telephone communications means and a telephone network, and placing a telephone call to a person in a location away from the computer when said change in the presence or absence of said power outant is detected.

9. The method of claim 8 comprising the further steps of:
   providing a selectively operable source of backup AC power; and
   providing switching means for switching the power supply of the computer from said external AC power supply to said backup AC source in response to said generated indicating signal when said signal indicates that said external AC power is absent.

10. The method of claim 8 comprising the further steps of:
    selectively obtaining digital data from a mass storage device associated with said computer, said digital data representing a user-recorded voice message;
    converting the digital data to a signal format compatible with said telephone network to form said voice message; and
    transmitting said voice message signal format in said telephone call.

11. The method of claim 8 comprising the further steps of:
    receiving a voice response signal from the recipient of said telephone call;
    converting the voice response signal into a digital data format compatible with a mass storage device associated with said computer and representing said voice response signal; and
    storing said digital data in said mass storage device for later retrieval and review.

* * * * *